US005598568A

United States Patent [19]

Frisch

[11] Patent Number: 5,598,568

[45] Date of Patent: Jan. 28, 1997

[54] MULTICOMPUTER MEMORY ACCESS ARCHITECTURE

[75] Inventor: Robert C. Frisch, Westford, Mass.

[73] Assignee: Mercury Computer Systems, Inc., Chelmsford, Mass.

[21] Appl. No.: 58,485

[22] Filed: May 6, 1993

[51] Int. Cl.[6] .................................................. G06F 13/00

[52] U.S. Cl. .............. 395/800; 395/200.09; 364/DIG. 1; 364/242.92; 364/251; 364/243

[58] Field of Search .................................... 395/800, 725, 395/200, 325, 425, 200.09, 200.08, 200.07; 370/60, 94.1; 364/736

[56] References Cited

U.S. PATENT DOCUMENTS

| | | | |
|---|---|---|---|
| 4,498,133 | 2/1985 | Bolton et al. | 395/200.15 |
| 4,598,400 | 7/1986 | Hillis | 370/60 |
| 4,965,718 | 10/1990 | George et al. | 395/478 |
| 4,980,822 | 12/1990 | Brantley, Jr. et al. | 395/412 |
| 5,005,167 | 4/1991 | Arthurs et al. | 370/4 |
| 5,008,882 | 4/1991 | Peterson et al. | 370/94.1 |
| 5,038,386 | 8/1991 | Li | 382/49 |
| 5,105,424 | 4/1992 | Flaig et al. | 370/94.1 |
| 5,111,389 | 5/1992 | McAuliffe et al. | 395/800 |
| 5,179,669 | 1/1993 | Peters | 395/325 |
| 5,181,017 | 1/1993 | Frey, Jr. et al. | 395/200 |
| 5,187,801 | 2/1993 | Zenios et al. | 395/800 |
| 5,191,578 | 3/1993 | Lee | 370/60 |
| 5,212,773 | 5/1993 | Hillis | 395/200 |
| 5,218,676 | 6/1993 | Ben-Ayed et al. | 395/200 |
| 5,237,670 | 8/1993 | Wakerly | 395/425 |
| 5,243,596 | 9/1993 | Port et al. | 370/94.1 |
| 5,261,059 | 11/1993 | Hedberg et al. | 395/325 |
| 5,280,474 | 1/1994 | Nickolls et al. | 370/60 |
| 5,287,345 | 2/1994 | Osmon et al. | 370/60 |
| 5,327,127 | 7/1994 | May et al. | 370/60 |
| 5,367,636 | 11/1994 | Colley et al. | 395/200 |
| 5,371,852 | 12/1994 | Attanasio et al. | 395/200 |
| 5,408,613 | 4/1995 | Okabayashi | 395/275 |
| 5,434,977 | 7/1995 | Zapisek | 395/200 |
| 5,471,592 | 11/1995 | Gove et al. | 395/300.03 |

OTHER PUBLICATIONS

Takanobu Baba et al, "A parallel Object–Oriented Total Architecture: A–Net", IEEE Computer Society Press, Los Altimos, CA, Conference Paper Conference Date: 12–16 Nov. 1990 pp. 276–285.

Dimitri Bertsekas et al, Data Networks, Prentice–Hall, Inc. Jan. 6, 1992, pp. 377–378.

*Primary Examiner*—Mehmet B. Geckil
*Attorney, Agent, or Firm*—Choate, Hall & Stewart

[57] ABSTRACT

A multicomputer is shown made up of a crossbar network to which are connected processing nodes and I/O interface nodes. The processing nodes include crossbar interface circuits that provide routing signals in local registers so that a local processor can access memory in remote processing nodes. The crossbars include circuits to establish communication paths through the crossbar networks in response to the routing signals, so that a local processor has direct access to remote memory, which is mapped into local address space. The routing signal can have a broadcast mode and can establish priority for the signal. Under some circumstances the crossbar circuit can choose between alternative paths through a crossbar. Arbitrary sized and shaped networks of crossbars can be readily implemented, and the direct memory burst transactions allow very high speed performance.

13 Claims, 2 Drawing Sheets

MULTICOMPUTER MEMORY ACCESS ARCHITECTURE

This invention relates to multicomputer memory access architecture and particularly to multicomputer communications systems in which memory mapping provides direct communication between the processing nodes and memory located in other nodes.

BACKGROUND OF THE INVENTION

Most existing computer systems are built around a single high-speed common bus. As semiconductor technology advances, faster digital devices can be constructed. This allows the devices sharing a bus to recognize and respond to briefer, higher-frequency bus signals. Unfortunately, this improvement also makes each bus device capable of consuming a greater portion of the total bus bandwidth. Any gains obtained through process improvements can quickly be offset by adding a small number of high-speed devices to the bus.

One solution is to boost the signal bandwidth of the bus by, for example, using fiber optics as a communications channel. However, a single, large bandwidth bus introduces additional problems in handling the bus in the physical environment of the typical computer.

Another way to circumvent the bandwidth limitations of a common bus is to provide a distributed communication scheme. In this approach, the components of a system are interconnected by multiple local buses. Both the nature and number of local buses can be varied to match the communications needs of a particular system.

A hypercube-based system provides multiple paths between masters and slaves. These paths are not what one thinks of as busses. Rather they are communication links between nodes which allow traffic to communicate with the attached nodes, or to pass through the connection to more distant nodes. The traffic consists of messages which are interpreted by the slave, as against specific memory accesses such as are used on busses.

A mesh multicomputer system is similar in function to a hypercube except that it generally takes the form of a two-dimensional array with, therefore, four communication ports at each node.

A multicomputer is a type of parallel processor that consists of an ensemble of computing nodes, each of which is a relatively complete and self-sufficient computing environment. The relative self-sufficiency of multicomputer nodes differentiates multicomputers from multiprocessors.

The object of the invention is to provide, for a complex multicomputer, a scalable, high performance multicomputer communication system in which multiple, direct memory accesses can occur simultaneously. Another object is to provide for a large number of computing nodes. Still another object is to provide a high performance multicomputer with reliable standard functional modules.

SUMMARY OF THE INVENTION

The invention provides, in a multicomputer including processing nodes, each having a processor and memory, and crossbars, in which a plurality of communication paths can be established between and among the processing nodes by one or more crossbars, a memory map system by which one node can access directly the memory of another through the crossbars. Each crossbar includes a plurality of ports, each being coupled to a processing node or another crossbar, for transfer of digital signals therebetween. Each processing node includes means for generating a request for access to memory, and a crossbar interface for generating message headers with routing signals, based on the access requests, for mapping remote node memory addresses on to local node memory addresses. Each crossbar includes a logic circuit, responsive to information in the message header received at a port, for establishing a path through the crossbar for the routing signal, the cumulative paths through the crossbar network providing a path for the routing signals and also for memory access between the remote node memory and the local node.

Preferably, the processing node has means for generating a routing signal that includes a header portion having a plurality of successive routing signal segments in fixed relative positions in the header portion, each representing a respective successive crossbar port between a source and destination of the routing signal. The crossbar logic circuit can decode a routing signal segment in a fixed relative position in the header portion and modify the header portion to move the next successive routing signal segment to that fixed relative position.

Also, the crossbar logic circuit can determine the availability of alternate paths through the crossbar for the routing signal. Furthermore, the processing node can generate a routing signal header portion that includes a broadcast signal in a fixed relative position in the header, to designate a broadcast mode of communication, and the crossbar logic circuit would respond to the broadcast signal to establish multiple crossbar paths.

In addition, the processing node can generate a priority signal header portion that includes a priority signal in a fixed relative position in the header, to designate a relative priority, and the crossbar logic circuit would respond to the priority signal to establish or disestablish a path through the crossbar according to that relative priority.

DESCRIPTION OF THE DRAWINGS

Other objects, features and advantages of the invention are set out below, or will be seen as inherent in the following description of a preferred embodiment of the invention, including the drawings thereof, in which.

BRIEF DESCRIPTION OF A PREFERRED EMBODIMENT

Figure 1:
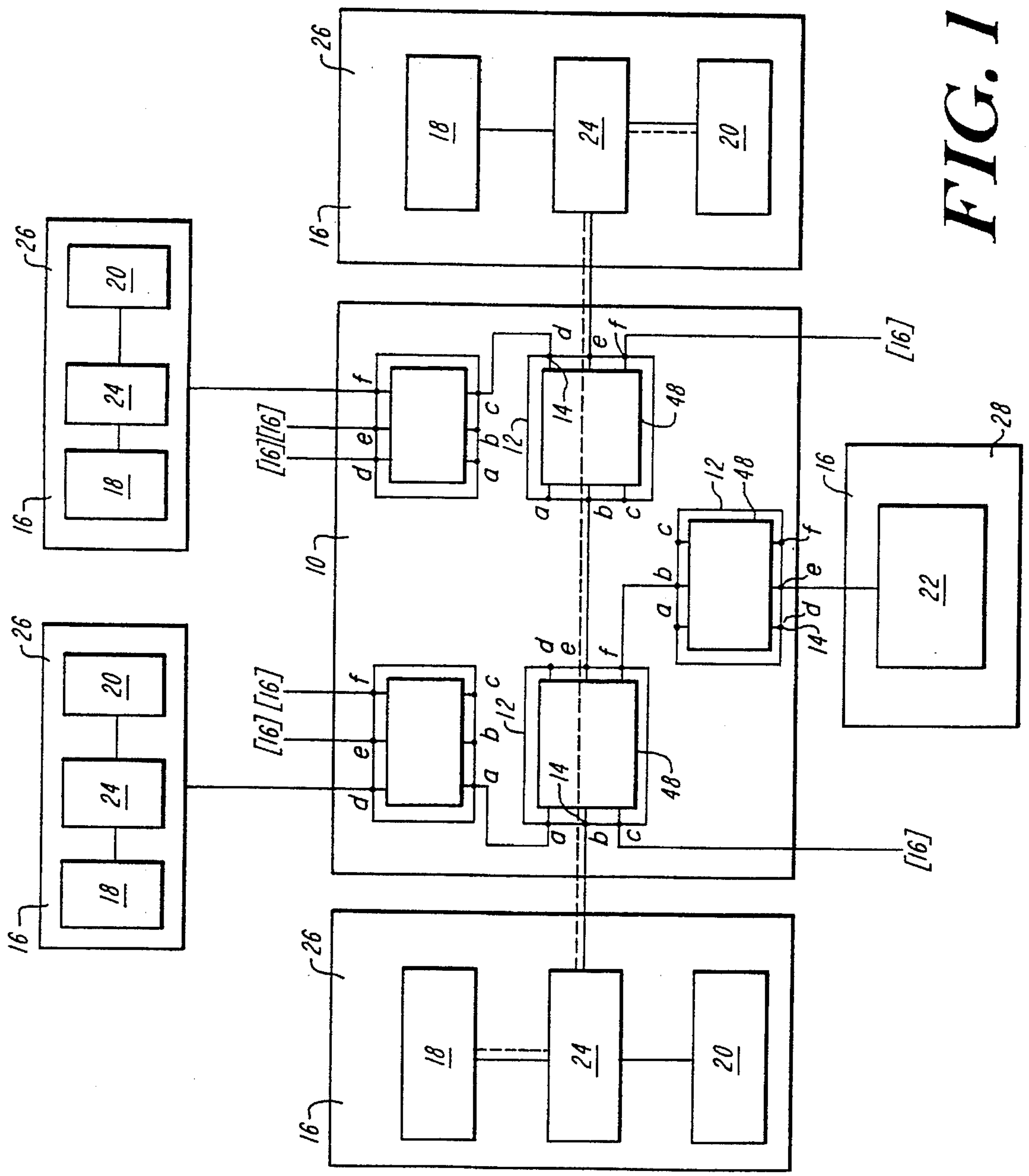
FIG. 1 is a block diagram of a multicomputer system embodying the invention.

FIG. 1 is a block diagram of a multicomputer using a communication network providing configurable architecture for multicomputing. The communication network, or crossbar network 10, is made up of a number of interconnected crossbars 12, multi-port communications devices in which one or more communication paths can be established between pairs of ports 14. Connected to the ports 14 of the crossbar network 10 are computer nodes 16, functional modules that contain some or all of the following computer resources: processors 18, memory 20, and interface (I/O) logic 22.

Based on its capabilities and its intended role in the system, a node 18 can be classified as a "processing node", an "interface node", or a "memory node".

A "processing node" 26 is intended to execute user-loadable programs. Such a node typically consists of a processor 18, its local memory 20, and other supporting hardware devices (DMA engine, timers, etc.). A processing node can also contain one or more communications interfaces. A processing node must also contain an interface 24 to the crossbar network.

An "interface node" 28 is intended to provide specific kinds of communications interfaces for use by the processing nodes. An interface node typically consists of bus-interface or I/O port logic 22. An interface node must also contain an interface to the crossbar network. The node may also contain a processor, as well as local working memory and program-storage memory. Generally, the processor in an interface node will execute I/O-related firmware, rather than user-loadable code, although there is no inherent reason why the code cannot be user loadable.

A "memory node" is intended to provide data and/or program storage for use by processing nodes and interface modes. Such a node may contain one or more kinds of memory, such as SRAM, DRAM and ROM, as well as supporting circuitry, such as refresh logic, error-checking and correction logic, or EEPROM write-circuitry. A memory node must also contain an interface to the crossbar network.

The block diagram of FIG. 1 depicts a CAM system containing several crossbars 12 and several nodes 16. It illustrates the principles of the system. Much larger systems can be built by simply enlarging the crossbar network 10 and populating its ports 14 with nodes 16.

The crossbars 12 making up the network 10 have six ports 14, a, b, c, d, e and f. The ports 14 may act as "internal" ports 14, connected to other crossbar ports 14, or as "external" ports 14, connected to nodes 16. A crossbar 12 may include both internal and external ports 14.

The crossbar network's terminal ports 14 mark a boundary 30 between the crossbar network 10 and the nodes 16. The boundary 30 is characterized by a communication protocol that is uniform across all the terminal ports 14. That is, each node 16 uses this standard protocol to send information, by means of digital signals, through the crossbar network 10. A communications path between the processor of one processing node 26 and the memory of another processing node 26 is shown in FIG. 1 as the dashed line 31. The crossbars 12 use the same protocol to send information between internal ports 14 of the network 10.

Figure 2:
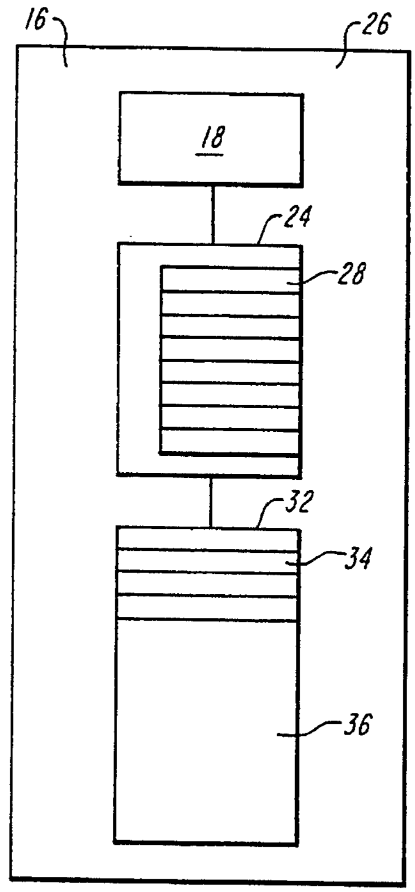
FIG. 2 is a detailed block diagram of a processing node in the multicomputer system.

As seen in FIG. 2, each node 16 can be viewed as having local address-space 32 containing registers 34 and memory 36 in specific locations. The communication link, or path, through the crossbar network 10 provides a means for mapping a remote node's address space into a local node's address space, for direct access between the local node 16 and remote memory.

In the system, many sets of nodes 16 may be simultaneously executing logically-distinct transactions. In each such set of nodes 16, one "master" node initiates a transaction to which one or more "slave" nodes respond. As time progresses, the roles of master and slave may be exchanged.

Nodes 16 share use of the system's resources. However, in the system shown only one node 16 can "own" a particular resource at any given time. The node 16 that currently controls a given resource is called the "master" of that resource. Nodes 16 that contain resources accessed by a master are referred to as "slaves". Such nodes 16 temporarily relinquish control of one of the local resources (e.g., memory 20) to the master through the crossbar network 10.

A processing node 26 (or computing environment, or "CE") contains an interface 24 with the crossbar network 10, which in the preferred embodiment takes the form of logic circuitry 38 embedded in an application specific integrated circuit, or CE ASIC. This crossbar interface logic circuit 38 converts some digital signals generated by the processor 18 into digital signals for the crossbar network 10. This allows a node processor 16, for example, to access resources, such as memory, in remote nodes 16, through normal processor reads and writes. The logic circuitry 38 also acts as a path arbiter and as a data-routing switch within the processing node 26, allowing both the local processor 18 and external masters to access node resources such as memory 36 and control registers. When an external master needs to use a node's resources, the logic circuitry 38 switches access to them from the local processor 18 to the external master.

The processor 18 used in the preferred embodiment described herein is the Intel i860 processor. The logic circuitry 38 of the CE ASIC is selected to conform to the control signals generated by that processor 18. If another processor is used instead of the i860 the crossbar interface logic circuitry can be adjusted accordingly.

In particular, the crossbar interface 38 provides routing registers 40 so that a node processor 18 can, in effect, map a portion of an external slave's memory into the node's local memory. In the preferred embodiment, each processor node 26 is provided by the crossbar interface registers 40 with thirteen "external memory pages", that is, the ability to map up to thirteen segments of memory from remote slave node memories. In the preferred embodiment, for example, each external memory page is approximately 256 Mbytes long, so that a node can use up to approximately 3.25 Gbytes of remote slave address space. Each external memory page can be programmed to access a different external resource, or several pages can be programmed to access one slave's address space.

These routing registers 40, in the preferred embodiment, include two registers for each external memory page, an "external routing" register 42 and a "return routing" register 44. A routing registers may be programmed with two related pieces of information. One is a routing field which specifies a communications path through the crossbar network between the local, master, node and the remote, slave node. The other is a routing word used by a split read device to communicate back to a master. This second register is used only by split read devices.

Figure 3:
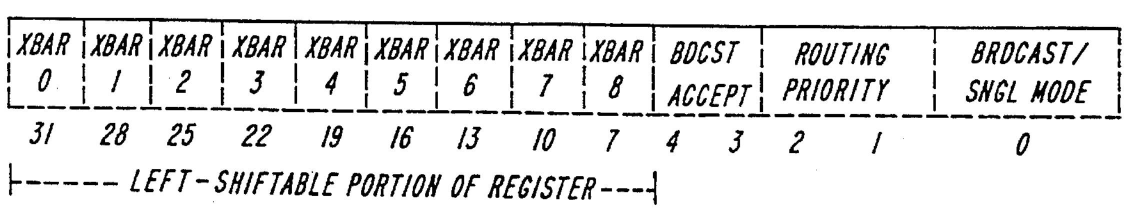
FIG. 3 is a representation of a routing register in a processing node.

A routing field 46 in an external routing register 42 is shown in FIG. 3. Bits 31:5 specify a communications path through up to nine successive crossbars 12. For each crossbar 12, the routing signal contains a 3-bit code which specify which port 14 of the crossbar is to be used to relay a message from the processor 18.

To communicate with resources in remote nodes, a local node programs one of its routing registers 40, and then transfers data to and from an address in the external memory page controlled by the register 40. The address in the external memory page corresponds to an address in memory of a remote node, accessed through the crossbar network 10 by way of the communication path (e.g., path 31) designated by the routing fields 46 of the routing registers 40. Once a processor 18 has programmed a routing register 40, the processor 18 can access the remote node's memory by simply reading and writing locations within the external memory page. The local processor's read or write address serves as an offset into the remote node's local address space.

Certain slaves may have a special "split-read" capability, in which the slave controls the timing of the return of read-data back to the master. For this type of slave, the master must program the "return routing" register 44 as well as the "external routing" register 42, so that a communications path back through the crossbar network 10 is designated for the slave for when it is ready to transfer data back to the master.

The information in the routing fields 46 of the routing registers 40 of the processor nodes 26 is used by the crossbars 12 to establish a communications path through the crossbar network 10. When the local processor 18 addresses one of the external memory pages, a message is directed to the crossbar network 10 which includes the routing field 46 in a message header.

That header contains "path" information which lists a series of segments in fixed relative positions corresponding to crossbar ports 14 through which the message is to be routed. Each crossbar 12 (which in the preferred embodiment is embodied in an application specific integrated circuit, or ASIC) contains a crossbar logic circuit 48 that decodes the message header to establish a communications path through the crossbar 12.

As the message traverses each crossbar 12, the crossbar logic circuit alters the message header so as to "expose" the routing information for the next crossbar 12. That is, the message header has a plurality of successive routing signal segments in fixed relative positions. As the message traverses crossbars 12, the crossbar logic circuit 48 decodes a routing signal segment in a particular fixed relative position in the header (in the preferred embodiment, the three most significant bits) and modifies the header portion to move the next successive routing signal segment to that fixed relative position. The process is repeated until the communication path through the crossbar network 10 is complete. Typically, the process can be repeated up to nine times, allowing construction of crossbar networks 10 with up to nine levels of crossbars 12.

Besides establishing routes along a predetermined path, the crossbar logic circuit 48 can provide a "self-routing" crossbar mode. That is, the crossbar logic circuit 48 can route some messages to either of two ports 14. This allows the logic circuit 48 to route the message to an idle port 14 if the preferred port 14 is busy, reducing the likelihood of temporary blockage of a path.

The crossbar logic circuit 48 also accords a different priority to each of the ports 14 a, b, c, d, e, and f in the crossbar 12, in order to avoid possible deadlocks or cases in which conflicting requests block one another.

Also, the processing node 26 generates a priority signal in a fixed relative position (at bits 2:1 in the preferred embodiment) in the header, to designate a relative priority. Even after paths are established through a crossbar 12, a high-priority message can successfully acquire a port 14 presently in use by a lower-priority message. The sender of the lower-priority message is suspended by the crossbar logic circuit 48; the higher priority message is routed and sent; and then the lower priority sender's path is automatically re-established, and transmission resumes.

The header routing word of each message also contains a broadcast signal (at bit 0 in the preferred embodiment), and a "broadcast acceptance mask" in a fixed relative position (at bits 4:3 in the preferred embodiment), which the master processor 18 can program. Slave nodes compare the broadcast acceptance mask against the contents of a slave register and receive the broadcast message if the acceptance mask matches the slave register acceptance key. A master can thus use this mechanism to select different sub-populations of slaves during broadcast.

The system hand-shake protocol supports a block transfer mode in which a block of consecutive data (e.g., 2 Kbytes) may be transferred in a burst. This allows a master to acquire a path, use it intensively for a short while, and then release the path for use by other devices.

The system also allows a master to "lock" the usage of the path that it has acquired. This ensures that other port-requesters cannot acquire use of any of the current master's crossbar ports until the master has completed its block transfer and released its lock. In the preferred embodiment, assertion and deassertion of the crossbar lock occurs through execution of the i860 processor "lock" and "unlock" instructions. The crossbar logic circuit relays this "lock" signal to all of the crossbar ports that are part of the communication path. The crossbar lock allows a master to perform indivisible external-memory bus cycles, such as read-modify-write and read-maybe modify-write.

For slave devices such as serial links, which have a high data-access latency, or which transfer data slowly, the crossbar network provides a special "split-read" capability to minimize the impact of such slow devices or faster system resources. Once a path is established between a master and a slave device, the hand-shake signals allow a master to be held in a suspended state while a slave accesses read-data requested by the master. An appropriately equipped slave can suspend the master to control the pace of data transfer back to the master.

These and other features of the crossbar network are described in further detail below.

Overview

The i860 processor node 26 has:

One i860 microprocessor 18.

2, 4, 8, 16, 32 or 64 MB of DRAM with refresh and error-checking and correction (ECC) 20.

An ASIC (application specific integrated circuit) with:

A 4 kbyte or 32 kbyte mailbox.

Two programmable 32-bit timers and a free-running clock.

A crossbar interface 24.

DMA control logic.

Interrupt control logic.

Address Space

A node's processor's overall 4-Gbyte address range is segmented into local and remote resources. A node has 2 MBytes to 256 MBytes of DRAM with error-checking and correction (ECC). DRAM is mapped into cachable and non-cachable segments; each may be as large as 256 MBytes. These segments are images of one another; their size is identical, and every cachable location has a non-cachable alias.

When non-cachable addresses space is read, data is read from DRAM, not from cache. This is true even if the i860 page-table is enabled and calls for a cached access within that address range.

The node has control registers in cachable DRAM. These registers are overlaid on non-cachable DRAM. Writing to a control-register also writes to the non-cachable alias. For example, a write to the Broadcast (B) register located at FFFF FC68 also writes to EFFF FC68. Reading a register produces the current register contents; reading the DRAM alias location returns shadow memory contents, which is determined by hardware associated with that register. Register reads are not cachable.

The node processors perform I/O operations through programmable registers and memory.

TABLE 1

| Address Map | |
|---|---|
| Address | Resource |
| Local Memory: | |
| FFFF FFFF - F000 0000 | Cachable DRAM |
| FFFF FFFF - FFFF FE00 | Cachable DRAM - 512 Bytes |
| FFFF FFFF - FFE0 0000 | Cachable DRAM - 2 MB |
| FFFF FFFF - FFC0 0000 | Cachable DRAM - 4 MB |
| FFFF FFFF - FF80 0000 | Cachable DRAM - 8 MB |
| FFFF FFFF - FF00 0000 | Cachable DRAM - 16 MB |
| FFFF FFFF - FE00 0000 | Cachable DRAM - 32 MB |
| FFFF FFFF - FC00 0000 | Cachable DRAM - 64 MB |
| FFFF FFFF - F800 0000 | Cachable DRAM - 128 MB |
| FFFF FFFF - F000 0000 | Cachable DRAM - 256 MB |
| FFFF FDFF - FFFF FC00 | Control Registers - 512 Bytes |
| FFFF FDFF - FFFF FD00 | I/O Mapping Registers |
| FFFF FDFF - FFFF FDE0 | Reserved |
| FFFF FDDC | Return Routing Register - Page 13 |
| FFFF FDD4 | External Routing Register - Page 13 |
| FFFF FDCC | Return Routing Register - Page 12 |
| FFFF FDC4 | External Routing Register - Page 12 |
| FFFF FDBC | Return Routing Register - Page 11 |
| FFFF FCE0 | Clear DMA Interrupt Register (CDI) |
| FFFF FCD8 | Reserved |
| FFFF FCD0 | Clear Debug Interrupt Register (CDBI) |
| FFFF FCC8 | Clear Local-Bus Error Interrupt Register (CLEI) |
| FFFF FCC0 | Clear Uncorrectable ECC Error Interrupt Register CUEI) |
| FFFF FCB8 | Clear Correctable ECC Error Interrupt Register (CCEI) |
| FFFF FCB0 | Clear Remote Bus Error Interrupt Register (CREI) |
| FFFF FCA8 | Clear IACK Interrupt Register (CII) |
| FFFF FCA0 | DMA Xfer Count Register (DMABC) |
| FFFF FC98 | DMA Command Pointer Register (DMACPT) |
| FFFF FC90 | DMA Next-Descriptor Register (DND) |
| FFFF FC88 | DMA Local Address Register (DLA) |
| FFFF FC80 | Mailbox Counter Register(MC) |
| FFFF FC68 | Broadcast Register (B) |
| FFFF FC60 | Time-Stamp Register (TS) |
| FFFF FC58 | Timer-2 Counter Load Register (T2CL) |
| FFFF FC50 | Timer-2 Interval Register (T2I) |
| FFFF FC48 | Timer-1 Counter Load Register (T1CL) |
| FFFF FC40 | Timer-1 Interval Register (T1I) |
| FFFF FC38 | Performance Monitor Counter Register(PMC) |
| FFFF FC30 | Performance Monitor Mode Register (PMM) |
| FFFF FC28 | Reserved |
| FFFF FC20 | Interrupt Control Register (IC) |
| FFFF FC18 | Reserved |
| FFFF FC10 | Node Configuration Register (NC) |
| FFFF FC08 | Debug Interrupt Register (DBI) |
| FFFF FC00 | Mailbox Write Register (MW) |
| FFFF FBFF - FFFF 8000 | Cachable DRAM - 31 Kbytes |
| FFFF 7FFF - FFFF 7000 | Mailbox - 4Kbytes |
| FFFF 7FFF - FFFF 0000 | Mailbox - 32Kbytes |
| EFFF FFFF - E000 0000 | Uncachable DRAM |
| EFFF FFFF - EFE0 0000 | 2 MB |
| EFFF FFFF - EFC0 0000 | 4 MB |
| EFFF FFFF - EF80 0000 | 8 MB |
| EFFF FFFF - EF00 0000 | 16 MB |
| EFFF FFFF - EE00 0000 | 32 MB |
| EFFF FFFF - EC00 0000 | 64 MB |
| EFFF FFFF - E800 0000 | 128 MB |
| EFFF FFFF - E000 0000 | 256 MB |
| External Memory | |
| DFFF FFFF - D000 0000 | External DRAM - Page 13 - 256 MB |
| CFFF FFFF - C000 0000 | External DRAM - Page 12 - 256 MB |
| BFFF FFFF - B000 0000 | External DRAM - Page 11 - 256 MB |
| AFFF FFFF - A000 0000 | External DRAM - Page 10 - 256 MB |
| 9FFF FFFF - 9000 0000 | External DRAM - Page 9 - 256 MB |
| 8FFF FFFF - 8000 000 | External DRAM - Page 8 - 256 MB |
| 7FFF FFFF - 7000 0000 | External DRAM - Page 7 - 256 MB |
| 6FFF FFFF - 6000 0000 | External DRAM - Page 6 - 256 MB |
| 5FFF FFFF - 5000 0000 | External DRAM - Page 5 - 256 MB |
| 4FFF FFFF - 4000 0000 | External DRAM - Page 4 - 256 MB |
| 3FFF FFFF - 3000 0000 | External DRAM - Page 3 - 256 MB |
| 2FFF FFFF - 2000 0000 | External DRAM - Page 2 - 256 MB |
| 1FFF FFFF - 1000 0000 | External DRAM - Page 1 - 256 MB |
| 0FFF FFFF - 0000 0000 | External DRAM - Page 0 - 256 MB - DMA |

Node Registers

Each processor node has a set of 32-bit control registers. Writing to a node register also writes to local non-cachable DRAM. In general, reading from a cachable-DRAM register address yields a different value than does reading from the aliased non-cachable DRAM location. (Note that accesses to the node registers actually use uncached reads and writes, even though these addresses exist within the cachable DRAM address range).

Each of the following 54 registers has a specific purpose:

| Interrupt Registers | Timer Registers |
|---|---|
| Clear IACK Interrupt (CII) | Performance Monitor Counter (PMC) |
| Clear Remote-Bus Error Interrupt (CREI) | Performance Monitor Mode (PMM) Clear |
| Correctable ECC Error Interrupt (CCEI) | Timer-1 Interval (T1I) Clear |
| Uncorrectable ECC Error Interrupt (CUEI) | Timer-1 Counter-Load (T1CL) Clear |
| Local-Bus Error Interrupt (CLEI) | Timer-2 Interval (T2I) |
| Clear Debug Interrupt (CDBI) | Timer-2 Counter-Load (T2CL) |
| Clear DMA Interrupt (CDI) | Time-Stamp (TS) |
| Clear Mailbox Interrupt (CMI) | Broadcast (BCAST) |
| Clear Timer-1 Interrupt (CT1I) | |
| Clear Timer-2 Interrupt (CT2I) | |
| Debug Interrupt (DI) | |
| **DMA Registers** | **Mailbox Registers** |
| DMA Word-Count (DWC) | Mailbox Counter (MC) |
| DMA Local Address (DLA) | Mailbox Write (MW) |
| DMA Next-Descriptor/ | |

-continued

| |
|---|
| Start (DND) |
| DMA Remote Address (DRA) |
| DMA Block Count (DBC) |
| Routing Registers |
| Return-Routing (RR) registers for DRAM pages 0 through 13 |
| External-Routing (ER) registers for DRAM pages 0 through 13 |

These registers are described in the related sections of this document. For example, the mailbox registers are described in "Mailbox Message Area"

The following two registers contain distinct control and status fields:

Interrupt Control (IC).

Node Configuration (NC).

As its name implies, the IC register contains interrupt control functions. The NC register contains control bits for a number of different functions. Upcoming sections describe these registers. The node registers are mapped as follows:

| Location | Register | Local Access | Remote Access | Notes |
|---|---|---|---|---|
| FFFF FC00 | Mailbox Write (MW) | | W | 0 |
| FFF FC08 | Debug Interrupt Register (DBI) | W | W | 1 |
| FFF FC10 | Node Configuration (NC) | R/W | R/W | |
| FFF FC20 | Interrupt Control Register (IC) | R/W | R | |
| FFF FC30 | Performance Monitor Mode (PMM) | W | W | |
| FFF FC38 | Performance Monitor Counter (PMC) | R | R | |
| FFFFC40 | Timer-1 Interval (T1I) | R/W | R/ | |
| FFFF FC48 | Timer-1 Counter Load (T1CL) | R/W | R/W | |
| FFFF FC50 | Timer-2 Interval (T2I) | R/W | R/W | |
| FFFF FC58 | Timer-2 Counter Load (T2CL) | R/W | R/W | |
| FFFF FC60 | Time-Stamp (TS) | R/W | R/W | 2 |
| FFFF FC68 | Broadcast (B) | R/W | R/W | |
| FFFF FC70 | Mailbox Counter (MC) | R/W | R/W | 3 |
| FFFF FC80 | DMA Word-Count (DWC) | R | R | 4 |
| FFFF FC88 | DMA Local Address (DLA) | R | R | 4 |
| FFFF FC90 | DMA Next-Descriptor (DND) | R/W | R/W | |
| FFFF FC9C | DMA Remote Address (DRA) | R/W | R | 4 |
| FFFF FCA0 | DMA Block Count (DBC) | R/W | R | 5 |
| FFFF FCA8 | Clear IACK Interrupt (CII) | R/W | W | 6 |
| FFFF FCB0 | Clear Remote-Bus Error Int (CREI) | R/W | W | 6 |
| FFFF FCB8 | Clear Correctable ECC Error Int (CCEI) | R/W | W | 6 |
| FFFF FCC0 | Clear Uncorrect-able ECC Error Int (CUEI) | R/W | W | 6 |
| FFFF FCC8 | Clear Local-Bus Error-Interrupt (CLEI) | R/W | W | 6 |
| FFFF FCD0 | Clear Debug Interrupt (CDBI) | R/W | W | 6 |
| FFFF FCD8 | (Reserved) | | | |
| FFFF FCE0 | Clear DMA | R/W | W | 6 |

-continued

| Location | Register | Local Access | Remote Access | Notes |
|---|---|---|---|---|
| | Interrupt (CDI) | | | |
| FFFF FCE8 | Clear Mailbox-Interrupt (CMI) | R/W | W | 6 |
| FFFF FCF0 | Clear Timer-1 Interrupt (CT1I) | R/W | W | 6 |
| FFFF FCF8 | Clear Timer-2 Interrupt (CT2I) | R/W | W | 6 |
| FFFF FD04 | EM Page 0 External-Routing | R/W | R/W | |
| FFFF FD0C | EM Page 0 Return-Routing | R/W | R/W | |
| FFFF FD14 | EM Page 1 External-Routing | R/W | R/W | |
| FFFF FD1C | EM Page 1 Return-Routing | R/W | R/W | |
| FFFF FD24 | EM Page 2 External-Routing | R/W | R/W | |
| FFFF FD2C | EM Page 2 Return-Routing | R/W | R/W | |
| FFFF FD34 | EM Page 3 External-Routing | R/W | R/W | |
| FFFF FD3C | EM Page 3 Return-Routing | R/W | R/W | |
| FFFF FD44 | EM Page 4 External-Routing | R/W | R/W | |
| FFFF FD4C | EM Page 4 Return-Routing | R/W | R/W | |
| FFFF FD54 | EM Page 5 External-Routing | R/W | R/W | |
| FFFF FD5C | EM Page 5 Return-Routing | R/W | R/W | |
| FFFF FD64 | EM Page 6 External-Routing | R/W | R/W | |
| FFFF FD6C | EM Page 6 Return-Routing | R/W | R/W | |
| FFFF FD74 | EM Page 7 External-Routing | R/W | R/W | |
| FFFF FD7C | EM Page 7 Return-Routing | R/W | R/W | |
| FFFF FD84 | EM Page 8 External-Routing | R/W | R/W | |
| FFFF FD8C | EM Page 8 Return-Routing | R/W | R/W | |
| FFFF FD94 | EM Page 9 External-Routing | R/W | R/W | |
| FFFF FD9C | EM Page 9 Return-Routing | R/W | R/W | |
| FFFF FDA4 | EM Page 10 External-Routing | R/W | R/W | |
| FFFF FDAC | EM Page 10 Return-Routing | R/W | R/W | |
| FFFF FDB4 | EM Page 11 External-Routing | R/W | R/W | |
| FFFF FDBC | EM Page 11 Return-Routing | R/W | R/W | |
| FFFF FDC4 | EM Page 12 External-Routing | R/W | R/W | |
| FFFF FDCC | EM Page 12 Return-Routing | R/W | R/W | |
| FFFF FDD4 | EM Page 13 External-Routing | R/W | R/W | |
| FFFF FDDC | EM Page 13 Return-Routing | R/W | R/W | |

Notes:
0: This register provides a window through which external masters write data into slave memory.
1: This register is normally used by diagnostics. Writing to it sets an interrupt to the local processor; this is usually-non-maskable except when executing a service routine.
2: This is a free-running register which is normally read-only.
3: This register is 16 bits wide (lower 2 bytes of 32-bit register location).
4: This dynamic register is reserved for diagnostics.
5: This register is written by the DMA controller.
6: The local processor can synchronously clear this interrupt by writing to this register; asynchronous clear is done by reading this register. Only the local processor can do an asynchronous clear.

Node Configuration (NC) Register FFFF FC10

Each processing node has a Node Configuration (NC) register which supports various node configuration and diagnostic functions. Several of the Configuration-register fields MUST be specified immediately following power-up; these include the following:

Local DRAM configuration: bank-size, row/column select, and bank-enable.

Processor execution-state controls: run/stop and CS8/normal instruction-fetch.

Oscillator divide-down ratio (if the timers are to be used).

Mailbox size (needed in most applications).

The Configuration register also contains control fields for a number of diagnostic features. The following diagnostic controls can be, but need not be, programmed following node power-up:

Counter diagnostics split-mode.

ECC diagnostic mode

DRAM refresh-rate diagnostic mode.

Configuration of the node DRAM is described in the section titled "Node DRAM Configuration". Selection of the node's mailbox size is described in the section titled "Setting and Reading Mailbox Size". The remaining Configuration-register configuration and diagnostic functions are described in sections below.

| Bit | Mnemonic | R/W | Definition |
|---|---|---|---|
| 31-16 | ECCS | R | ECC Syndrome |
| 15 | DRR | R/W | DRAM diagnostic refresh rate |
| 14 | CDM | R/W | Counter diagnostic mode |
| 13 | ECCE | R/W | ECC enable |
| 12 | | | Unused |
| 11 | CS8 | R/W | CS8 Mode Control |
| 10 | ODR | R/W | Oscillator divide-down ratio |
| 9 | EDM | R/W | ECC diagnostic mode |
| 8 | DBE | R/W | DRAM bank 1 enable |
| 7:5 | DBS | R/W | DRAM bank size |
| 4:2 | DRC | R/W | DRAM row/column configuration |
| 1 | MBS | R/W | Mailbox size |
| 0 | RSC | R/W | Run/stop control |

DRAM Diagnostic Refresh Rate (DRR) - Bit 15

DRR selects either normal refresh or fast refresh.

1=1X refresh (625 refreshes/8 ms, 1 refresh/12.8 us) (normal)

0=4X refresh (2500 refreshes/8 ms, 1 refresh/3.2 us) (fast)

Each node has a DRAM refresh controller that performs asynchronous refresh cycles at a rate compatible with the DRAM chips. Set for normal refresh.

Counter Diagnostic Mode (CDM) - Bit 14

CDM selects either normal counter or partitioned counter:

0=the counters operate as 32-bit counters (normal).

1=partition the counters into 4-bit counters.

A processing node has a number of counters, such as the DMA Block-Counter register. Since these are 32-bit registers, it would take quite a while to exercise these counters through their full count range. Partitioning speeds up this process. In this mode, a counter increment pulse is simultaneously applied to all 4-bit segments; 16 increment pulses fully exercise the counter.

To utilize this operating mode, the diagnostic code can do the following:

1) Set the "enable force-increment" NC-register bit to select diagnostic mode.

2) Diagnostics loads each register with a known value, such as 0.

3) Diagnostics hits the Force Increment location (FFFF FC78) several times.

4) Diagnostics reads back the counter, and compares the read value against the expected value. If these disagree, the counter is probably faulty.

ECC Enable (ECE) - Bit 13

ECE selects either of two ECC error-bit generation and checking modes.

0=ECC generates and checks its usual ECC codes (normal)

1=ECC uses byte parity

Using byte parity, each 8 of the 14 check-bits stores the parity of each of the 8 bytes of the (64-bitwide) data words. The error-checking circuitry then tests for correct byte-parity, rather than for a correct ECC code. This is the state of bit 13 following power-up. Byte parity only detects errors, and it is not as comprehensive as normal ECC. Clear bit 13, to enable normal ECC operation.

Oscillator Divide-Down Ratio (ODR) - Bit 10

ODR selects the clock divide ratio to generate a 10 MHz clock for the timers:

0=/4 (40 MHz CPU clock)

1=/5 (50 MHz CPU clock)

The node timer software uses a 10 MHz clock, and the processor board generates either a 40 MHz or 50 MHz clock. ODR selects the divide down ratio to generate a 10 MHz timer clock.

ECC Diagnostic Mode (EDM) - Bit 9

EDM enables or disables the ECC check bit drivers:

0=enables the ECC check-bit drivers (normal).

1=disables the ECC check bit drivers.

The check bits are enabled after power-up.

EDM can be used to test the DRAM error checking and correction ECC) circuitry. If the drivers are disabled, an ECC logic check routine can write a value to DRAM; the check bits will remain unchanged. When the check routine reads the same DRAM location, one of the ECC Error interrupts should be asserted if the ECC circuitry is operating correctly.

Note: Disabling the check bit drivers does not affect ECC checking; it only affects writing ECC check bits to memory.

DRAM Bank-Enable (DBE) - Bit 8

DBE enables and disables DRAM bank 1:

0=disable DRAM bank 1

1=enable DRAM bank 1

DBE must be programmed when the node is initialized. Each node has two DRAM banks (0 and 1). If a node has 128 MB of DRAM, only bank 0 is populated. If the node's DRAM exceeds 128 MB, bank 1 is also populated. If bank 1 is populated, set DBE to enable use of that bank. Otherwise, only bank 0 is accessible (that is, the top-most 128 MBytes or less of the cachable (or non-cachable) address space).

Note: DBE is used by address validation circuitry; if a node contains only one 128-MByte bank, a read- or write to bank-1 will cause a local-bus error.

DBE is cleared to 0 following power-up.

DRAM Bank Size (DBS) - Bits 7:5

DBS encodes the node DRAM bank size, as follows:

| NC Bits | | | |
|---|---|---|---|
| 7 | 6 | 5 | Bank Size (MB) |
| 0 | 0 | 0 | 2 |
| 0 | 1 | 0 | 8 |
| 1 | 0 | 0 | 32 |

A node's physical DRAM is populated from the top of the local address-space down. Thus, DRAM bank 0 always occupies the top of the node address range. If the optional second bank is also populated, it is located below bank 0.

DBS power-up as 000. This is 2 Mbytes. If a larger bank-size is present, the node's bank-size bits must be properly programmed before DRAM outside the 2-MByte range is accessible.

DRAM Row/Column Configuration (DRC) - Bits 4:2

DRC encodes the row- and column-address bits for a given DRAM type. When initializing the node, program DRC with the appropriate code:

| DRAM: | 1Mx16 | 256Kx16 | 4Mx16 | 1Mx4 | 16Mx4 | 8Mx8 | 4Mx4 |
|---|---|---|---|---|---|---|---|
| DRC: | 000 | X00. | 110 | XX0 | 111 | 110 | |

DRC powers-up as 000.

Mailbox Size (MBS) - Bit 1

MBS defines the size of the mailbox.

1=4 Kbytes

0=32 Kbytes.

Note: If a 4-Kbyte mailbox area is used, the unused lower 28-Kbyte portion of the mailbox address range is available for other uses.

Run/Stop Control (RSC) - Bit 0

RSC starts and stops the i860 processor as follows:

0=reset and halt the i860 processor.

1=restart the i860 processor.

An external node can reset a node, access the node's resources, then restart the node. The restart starts execution at the processor's reset-trap location (FFFF FF00).

Note: Either the node processor or an external node can program RSC. If the node processor resets and halts itself, an external master must restart it, or the motherboard must be reset. If a node processor writes a 1 to its RSC bit, normal execution continues (since the bit was already a 1 then clear and set bit 0 NC:RSC to reset the processor.

8-bit instruction fetches are used to boot, otherwise use 64-bit instruction fetches.

Routing Registers External Routing FFFF FDx4

Return Routing FFFF FDxC

The routing registers define the data route from master to slave through the Crossbars. The external routing register defines the communication route through the crossbars. Each crossbar has 6 ports, requiring 3-bits of data to define the output port. The routing specification is 27 bits long so that an address can route through as many as 9 crossbars.

The return routing register defines the data path used by a split-read slave when sending data to the master. In all other data transfers, the master retains control of the bus until it has received the data from the slave. If a master knows that an addressed slave lacks split-read capability, the master need not program its return routing register.

The routing registers have the following bits:

| Bit | Mnemonic | R/W | Definition |
|---|---|---|---|
| 31:29 | XBO | | Crossbar 0 |
| 28:26 | XB1 | | Crossbar 1 |
| 25:23 | XB2 | | Crossbar 2 |
| 22:20 | XB3 | | Crossbar 3 |
| 19:17 | XB4 | | Crossbar 4 |
| 16:14 | XB5 | | Crossbar 5 |
| 13:11 | XB6 | | Crossbar 6 |
| 10:8 | XB7 | | Crossbar 7 |
| 7:5 | XB8 | | Crossbar 8 |
| 4:3 | BACC | | Broadcast accept |
| 2:1 | RPRI | | Routing priority |
| 0 | BMOD | | Broadcast/single mode |

Crossbar Port n (XBn) - Bits 31: 5

Bits 31:5 specify a route through successive crossbar switches. For each crossbar traversed, the routing word contains a 3-bit code which selects an output port. As the message traverses each crossbar, the crossbar logic shifts the route data (bits 28:5) left 3 bits so that the next crossbar has its decode in bits 31:29. Bits 4:0 remain unchanged by the shift-left.

To create the 3-bit Crossbar routing codes, you need to know:

Where you are routing to and what path to use.

Within each crossbar on this route, you need to know:

Through which port are you exiting the Crossbar?

Are you doing a single-port or a broadcast transfer?

With this information, you can create the codes according to the following table:

| Code | Single-port | Broadcast |
|---|---|---|
| 0 | F first, auto-route* | A, B, C, D, F |
| 1 | E first, auto-route* | A, B, C, D, E |
| 2 | F F | |
| 3 | E E | |
| 4 | D D** | |
| 5 | C C** | |
| 6 | B B** | |
| 7 | A A** | |

*Auto-route is available when a crossbar switch is used in non-broadcast mode. In auto-route mode, the routing logic will first attempt to assign the selected port (say, port F) as the output through which to route the message. If arbitration for that port fails, the routing logic will attempt to route the message through the other crossbar port (i.e. port E). The attempted routing will continue to toggle between the two crossbar ports until arbitration for one of these ports succeeds.

**If a requesting port selects a routing code that matches its port ID, the crossbar routing logic interprets that code as a request to send to all other node ports (ports A through D, not to ports E and F). For example, if a master attached to port A of a crossbar requests routing with a code of 7 (which is the code for port A), then ports B, C, and D are selected. If a port-B master uses a routing code of 6, ports A, C and D are selected.

Broadcast Accept (BACC) - Bits 4: 3

Routing-word bits 4:3 hold a broadcast acceptance code which is used to make the broadcast process more selective than simply sending a message to all ports at the end-point of a routing path. Each slave node contains a "broadcast" control register located at non-cachable local DRAM address FFFF FC68. Bits 11:8 of this register can be programmed with a (broadcast)"acceptance" code which is compared against the broadcast-acceptance code of any broadcast message. A slave receives and stores an incoming broadcast message ONLY if the broadcast-acceptance bits of the message match that slave's local broadcast-register acceptance code bits.

The broadcast acceptance codes are defined as follows:

| Broadcast Accept Code | | Slave Broadcast Control Register (SBCR) | |
|---|---|---|---|
| Bit 4 | Bit 3 | Use Slave Broadcast Offset | Receive Broadcast if |
| 0 | 0 | No | SBCR bit 8 is 1 |
| 0 | 1 | Yes | SBCR bit 9 is 1 |
| 1 | 0 | Yes | SBCR bit 10 is 1 |
| 1 | 1 | Yes | SBCR bit 11 is 1 |

Broadcast code 0 is intended for use in broadcasting a high-priority message which is to affect the same address in all recipients. (This explains why the broadcast offset register is not used to generate a local slave address for code 0; see below for further details). As an example, this broadcast acceptance code can be used to broadcast to the mailbox of each of a set of processing nodes, thus interrupting all of those node processors.

Broadcast acceptance codes 1, 2 and 3 allow each slave to control its own reception of broadcasts. In addition, these broadcast codes DO use the slave's broadcast offset register. This allows a slave to store received broadcasts in a local buffer whose base address is programmed by the slave (by loading the slave's broadcast offset register).

After powering-up, all bits in the slave broadcast control register are 0. This means that a slave node is unable to receive broadcasts until bit 8, 9, 10, or 11 of its broadcast control register is explicitly programmed to a 1.

After powering-up, initialize the routing registers before accessing external resources.

The slave processing node compares this message-header information against the contents of a slave register and receive the broadcast only if the acceptance mask matches the slave-register acceptance key. A master can use this mechanism to select sub-populations of slaves during broadcasts.

Routing Priority (RPRI) - Bits 2:1

Routing priority (RPRI) specifies the routing priority of a message through all crossbars that the message traverses. If multiple messages simultaneously present routing requests to a crossbar, the message with the highest priority wins access. The priority codes are defined as follows:

| Priority Code | | |
|---|---|---|
| Bit 2 | Bit 1 | Priority Level |
| 0 | 0 | 0 (lowest) |
| 0 | 1 | 1 |
| 1 | 0 | 2 |
| 1 | 1 | 3 (highest) |

Routing priority arbitrates Crossbar port contention when more than one master simultaneously tries to access a Crossbar port. The master with the highest routing priority is granted the crossbar path. If, while it is using the path, a higher-priority request is asserted, the path is granted to the new highest priority master, and the lesser-priority master is suspended. If the lesser-priority master is executing a locked transfer, it retains the path until finished with the locked transfer. When the highest-priority master releases the path, the path is returned to the original master.

This arbitration and the access suspensions are transparent to software

If more than one request has the same priority level, the requesters' port IDs are used, where Port F has the highest priority and port A has the lowest priority.

Broadcasts have a single priority level which applies to all paths created during the broadcast. Data is not sent to the slaves until all paths to the slaves have been acquired. Broadcasts should use a high priority level, so that a broadcast is not blocked for a long time waiting for a higher-priority nonbroadcast transfer to finish.

Broadcast/Single Mode (BMOD) - Bit 0

Bit 0 selects either single port or broadcast transfer:

0=Single port

1=Broadcast

In single port mode, each three-bit code establishes a single point-to-point path through that crossbar. In broadcast mode, each Crossbar crossing branches out through one or more paths.

Routing Notes

If a master writes to an unpopulated crossbar port, the write data is lost. The master does not receive any indication that this has occurred. If a master attempts to read from an unpopulated crossbar port, the master receives a remote-bus error interrupt. The read data is undefined.

Software must ensure that each routing-path through a series of crossbars encounters an addressable end-point within 9 switches.

When a master requests a route through a crossbar, a copy of the selected external routing register is presented to the crossbar. Bits 31:29 of this copy always contain the routing code which applies to the next crossbar to be traversed. This is ensured by left-shifting bits 31:5 of the copy after bits 31:29 have been used to guide a traversal. The most-recently-used routing code is thus discarded (leftshifted out of the high 3 bits of the routing word). As this occurs, 0's are shifted into bits 7:5 of the copy of the routing word.

Accessing an External Slave

A master accesses an external slave by reading or writing the slave's page within the master's local address space. The slave receives the following address, decoded from the master's address and transfer control data.

| Bit | Mnemonic | R/W | Definition |
|---|---|---|---|
| 31:28 | PALIGN | | Page access alignment |
| 27:3 | OFFSET | | Offset passed to slave |
| 2 | | | Not used |
| 1 | READ | | Read flag |
| 0 | LOCK | | Lock flag |

PALIGN is encoded from the data width and alignment requested by the master. PALIGN is defined as follows (where B0 is bits 7:0 and B7 is bits 63:56):

| Page Access | PALIGN | | | |
|---|---|---|---|---|
| Alignment | 31 | 30 | 29 | 28 |
| B0 | 0 | 0 | 0 | 0 |
| B1 | 0 | 0 | 0 | 1 |
| B2 | 0 | 0 | 1 | 0 |
| B3 | 0 | 0 | 1 | 1 |
| B4 | 0 | 1 | 0 | 0 |
| B5 | 0 | 1 | 0 | 1 |
| B6 | 0 | 1 | 1 | 0 |
| B7 | 0 | 1 | 1 | 1 |
| B1:B0 | 1 | 0 | 0 | 0 |
| B3:B2 | 1 | 0 | 1 | 0 |
| B5:B4 | 1 | 1 | 0 | 0 |
| B7:B6 | 1 | 1 | 1 | 0 |
| B3:B0 | 1 | 0 | 0 | 1 |
| B7:B4 | 1 | 1 | 0 | 1 |
| B7:B0 | 1 | 0 | 1 | 1 |

OFFSET is copied from bits 27:3 of the address asserted by the master.

The crossbar sets READ to 1 if the master is reading, otherwise READ is cleared.

LOCK is cleared to 0 if the master is requesting a locked transfer.

Split-Read Accesses

A split-read slave can split a master's read cycle by requesting the master to issue a return route address, and then suspend its process. The slave will respond later with data to that route address. While the master is suspended, other devices may access master node resources through available Crossbar routes. The split read is transparent to software running on the master node.

While the master is suspended, the split-read slave may complete its current processing, and then send the requested data to the master using the path specified in the return-routing register. When the master receives this data, it is released from the suspended state, and resumes its normal execution.

Note: Slaves initiate split-reads; not masters, but masters must have anticipated it and stored a valid return routing word.

A master cannot perform a read-modify-write or a read-maybe-write access to a split-read slave. Instead, when a master performs a locked access to such a slave, the slave responds to the master's read-access by performing a write of all 1's to the accessed slave address. This implements a test-and set operation.

Access Errors

The following table shows local and external access errors. Local and external errors are described in greater detail following the table. For further information on ECC errors, see the section, "Error Checking and Correction (ECC)". For further information on VME errors, see the document, "The VME Interface".

External Access Errors

If a processing-node master access an invalid slave node location, the master receives a remote-bus error interrupt. In this case, the slave node also receives a local-bus error.

Invalid types of access to otherwise-valid locations, such as write attempts to a read-only location, do not cause an error indication.

If a remote-bus error occurs due to any of the conditions described above, the external master assessor bit of the external node's Configuration register is set, indicating that the external node's (local) bus error was due to an access by an external node.

If the external access causes a local-bus error in the slave node, then the slave node's Configuration register captures address-bits 27:13 of the offending external master's address.

Note: The Configuration register of the node which CAUSES a remote-bus error does NOT latch either an "external master" indication or the MSBs of the offending address.

| ←Event→ | | ←Generated Error Signal→ | | | |
|---|---|---|---|---|---|
| Local | External | Local | Latch | External | Latch |
| Correctable ECC | | Corr ECC | Yes | None | No |
| Uncorrectable ECC | | Uncorr ECC | Yes | None | NO |
| Non-DMA page-0 access | | Local-bus | Yes | None | No |
| R/W invalid location | | Local-bus | Yes | None | No |
| R unpop'ltd Crossbar port | | Rem-bus No | None | No | |
| W unpop'ltd Crossbar port | | None | No | None | No |
| R VME | | VME-read | No | None | No |
| W VME | | VME-write | No | None | No |
| | R/W invalid loc | Rem-bus | No | Local-bus | Yes |
| | Correctable ECC | None | No | Local-bus | Yes |
| | Uncorrectable ECC | Rem-bus | No | Local-bus | Yes |

Local-Access Errors

If a node processor, DMA controller, or an external master, attempts to access an invalid location within its local address space, the node processor receives a local-bus error interrupt. Invalid accesses include reads or writes to unpopulated DRAM or accesses to external- DRAM page 0.

The bottom 256 MBytes of DRAM (external memory page 0) is reserved for the node's DMA controller. If the processor attempts a read from this area, the read data is undefined. If the processor attempts to write to this address range, DRAM is left unaltered.

Reads of undefined control register locations (FFFF FC00-FFFF FDFF) will return the internal CE state. Writes to undefined control register locations are ignored by internal CE state, but are shadowed in DRAM.

If a local-bus error, a correctable ECC error or an uncorrectable ECC error occurs during a local read or write, the NC register captures bits 27:13 of the offending address. Bits 12:0 are not captured. This means that the address associated with the error can only be localized to within 8 Kbytes. The NC register has a flag (bit 16) which indicates that the error occurred during a local access.

Both the local-error indicator and the lower 13 bits of the offending address remain latched in NC until the local processor clears all three interrupts (correctable ECC, uncorrectable ECC and local-bus interrupts). This mechanism ensures that the Configuration register captures information relating the first of what might be several occurrences of these interrupts.

When a node's processor or its DMA controller specifies a path which attempts to route through an unpopulated crossbar port, that node receives a remote-bus error interrupt. Similarly, when a node performs a read of an external node, and that read fails (that is, the slave incurs a local-bus error or an uncorrectable ECC error), the master receives a remote-bus error. In this case, the slave also receives a (local-bus) error indication. If the read-error was caused by an uncorrectable ECC error in the slave, the master receives a copy of the erroneous (uncorrected) data.

If a master reads from a slave, and the slave incurs a correctable ECC error, the master receives no error indication. The master receives a copy of the corrected data, not of the original incorrect data. The slave receives a correctable ECC interrupt, and the offending address is captured in the slave's Configuration register.

If a node attempts to write to an external node, and that write fails, the master receives NO error indication. The slave does not receive an error indication, either.

Node Resource Arbitration

Each node arbitrates conflicts for access to that node's resources. The following devices, listed from highest priority (DMA controller) to lowest priority, share the node's resources.

The node's local DMA controller.

External masters.

The node's CE_ASIC-resident DRAM refresh controller.

The node's processor.

This arbitration is invisible to software, but it may affect code-execution timing (access latency, data transfer rates, etc.).

Interrupts

The node processor receives internal and external interrupts. The node processor can be interrupted by the following resources and conditions:

The node timers.

The node's DMA controller (to inform the processor that a DMA transfer has been completed).

ECC errors.

A mailbox message is received.

A local bus-error.

A remote bus-error (invalid read or write to external memory).

A debug interrupt (to debug interrupt service routines).

External device interrupts.

The VME interrupt-generator circuitry is available to post a new VME interrupt.

The DMA controller cannot directly respond to interrupts; the node processor receives interrupts for the DMA controller and then responds accordingly.

Interrupt Control Register (IC) FFFF FC20

The Interrupt Control Register (IC) receives interrupts.

IC has three bit-fields: enabled, pending and vector. Pending indicates whether an interrupt source is currently active. Enabled determines whether an active interrupt source actually generates an interrupt to the node processor. Vector is a code that corresponds to a particular combination of active interrupt sources. The vector dispatches a particular interrupt service routine, and selects a new set of enabled bits to be used when servicing of the interrupt. The enable bits are read/write, but the pending bits and vector bits are read only.

Each of these fields has a bit for each interrupt source as follows:

| Interrupt | Mne-monic | Int Enable R/W | Int Pending (R) | Int Vector (R) |
|---|---|---|---|---|
| VME Interrupter Free | VIF | 21 | 9 | 4 |
| Remote-Bus Error | RBE | 22 | 10 | 3 |
| Correctable ECC Error | CEE | 23 | 11 | 3 |
| Uncorrectable ECC Error | UEE | 24 | 12 | 3 |
| Local Bus Error | LBE | 25 | 13 | 3 |
| Debug Interrupt | DBE | * | 14 | 3 |
| External Interrupt | EXT | 27 | 15 | 4 |
| DMA Controller Interrupt | DMI | 28 | 16 | 5 |
| Mailbox Interrupt | MBI | 29 | 17 | 6 |
| Timer-1 Interrupt | T1I | 30 | 18 | 7 |
| Timer-2 Interrupt | T2I | 31 | 19 | 8 |

Note: All unlisted bits are unused, and read as 0.
*The debug interrupt is not maskable.

Interrupt Enable Bits

The interrupt enable bits enable and mask interrupts. Only the local node processor can write to its enable bits.

0=Masks the interrupt.

1=Enables the interrupt.

Interrupt Vector Bits

The vector bits combine related interrupt-sources, so that one interrupt service routine (ISR) can handle any of the members of a related interrupt group. Bits 10 through 14 (vector 3) a indicate exceptional conditions. Bits 9 and 15 are often used together; usually, bit 9 is used when interrupting a VME slave, while bit 15 is used to receive VME interrupts.

Pending Bits

The pending bits are set by active interrupt sources, but must be cleared by the local node processor. This is normally done while the local processor executes the associated interrupt service routine. With the exception of bit 15 (external interrupts), each pending bit has an associated interrupt clear register.

Clearing Interrupts - Synchronously and Asynchronously

Each interrupt source has an associated interrupt clearing register. Reading or writing an interrupt clear register clears the interrupt's pending bit in the IC register.

To clear interrupts, write or read the following registers:

| Interrupt Clear Register | Mne-monic | IC BIT | Address |
|---|---|---|---|
| Clear VME Interrupter FreeR | CVI | 9 | FFFF FCA8 |
| Clear Remote-Bus Error | CRBE | 10 | FFFF FCB0 |
| Clear Correctable ECC Error | CCEE | 11 | FFFF FCB8 |
| Clear Uncorrectable ECC Error | CUEE | 12 | FFFF FCC0 |
| Clear Local-Bus Error | CLBE | 13 | FFFF FCC8 |
| Clear Debug Interrupt | CDBE | 14 | FFFF FCD0 |
| Clear DMA Controller Interrupt | CDMI | 16 | FFFF FCE0 |
| Clear Mailbox Interrupt | CMBI | 17 | FFFF FCE8 |
| Clear Timer-1 Interrupt | CT1I | 18 | FFFF FCF0 |
| Clear Timer-2 Interrupt | CT2I | 19 | FFFF FCF8 |

The node control registers are located in cached DRAM. Within cached DRAM, writes are buffered in the cache, while reads are not. If the read address is cached, the cache line is flushed.

These interrupts may be cleared by either reading or writing the respective interrupt clear registers. A read causes a synchronous clear that is not buffered in cache. This guarantees that a pending interrupt will be cleared (if the associated ISR is done before the current clear is completed. A write causes an asynchronous clear that flushes the associated cache line to DRAM. An asynchronous clear does not guarantee that a previously-set interrupt from that same source was cleared before the current clear; the associated interrupt-service routine may not execute for every pending interrupt from that source.

Only the local processor can do a synchronous clear.

An interrupt-service routine should synchronously clear an interrupt. However, an asynchronous clear may increase performance if software ensures that any pending interrupt is cleared before that interrupt is re-enabled.

DRAM

Each processing node has as much as 256 MB of DRAM. Each of two DRAM banks is 71 bits wide with 64 data bits and 7 ECC bits. DRAM can be accessed with 64-bit, 32-bit, 16-bit or 8-bit transfers.

When the system is initialized or configured, the DRAM bank size DBS), DRAM row/column configuration (DRC), and DRAM bank enable DBE) bits must be set up in the node configuration (NC) register for each processing node. See the descriptions in the NC register.

Software must write and read DRAM to determine how much DRAM is installed in the node.

Cachable and Non-Cachable DRAM

Each node has cachable and non-cachable DRAM. FFFF FFFF-F000 0000 does cached DRAM accesses. EFFF FFFF - E000 0000 is a non-cachable alias of the cachable address block. The node processor can perform cachable and non-cachable read- and write-accesses to its DRAM. Cachable DRAM includes the node control registers and mailboxes. External DRAM accesses are not cached.

Locked Accesses

A node processor can lock access to its local DRAM by executing a lock instruction. The processor can then execute up to 30 i860 instructions before it must deassert its lock by executing an unlock instruction; a trap is generated if this constraint is violated. The lock gives the processor exclusive access to its resources. This enables a program to perform read-modify-write accesses or read-maybe write accesses, as well as other combinations control shared resources, such as shared DRAM buffers or semaphore registers.

To release a lock, the node processor must execute an unlock instruction followed by a dummy-read.

An external processor can also lock accesses to a node's DRAM, by performing the above actions and accessing an external-DRAM page. This relays the external processor's lock-pin state across the crossbar network. The crossbar lock-signal then locks access to the local DRAM.

Error Checking and Correction

Error-checking and correction (ECC) logic generates ECC bits during write cycles, and checks for errors during read cycles. The ECC logic checks for one- or two-bit errors, and corrects one-bit errors. When DRAM is written, the ECC logic computes ECC bits and writes them to DRAM with the data. When DRAM is read, the ECC logic compares the ECC bits with the data, and determines whether a DRAM error has occurred.

During a local read, when the ECC logic encounters a correctable one-bit error, it corrects the error, puts the data on the data lines, and then asserts a correctable-error interrupt to the node processor. When the ECC logic encounters a non-correctable two-bit error, it puts the uncorrected data on the data lines and asserts an uncorrectable-error interrupt to the node processor.

During a slave read, ECC corrects one-bit errors, but does not assert a correctable-error interrupt to the master. When the ECC logic encounters a non-correctable two-bit error, it puts the uncorrected data on the data lines and asserts an uncorrectable-error interrupt to the master.

When either an ECC error (correctable or uncorrectable) or a local-bus error occurs, bits 27:13 of the offending address are latched into the node configuration register, as well as a flag which identifies the accessing node as local or remote. This makes it possible to identify which 8 Kbyte page of local DRAM contains the address which caused the error. Since the low 13 bits of the address are not saved, it is not possible to directly identify the specific error-causing address. The latched information is held until all three error interrupts (correctable ECC, uncorrectable ECC and local-bus) are cleared. This means that the latched information describes the first of several possible errors.

If an ECC error was caused by a slave read, the master can read the Configuration Register (NC) of the affected node to get the offending address. The master does not know when a remote correctable ECC error occurs.

If a slave access causes a local-bus error in the slave (such as by addressing an invalid register or DRAM location), the slave's NC register will capture the offending address. In addition, the master receives a remote-bus error interrupt.

The IPC Mailbox

Each processor node has a 4 Kbyte or 32 Kbyte mailbox to receive messages from masters. The address ranges are:

4-Kbyte: FFFF 7FFF - FFFF 7000

32-Kbyte: FFFF 7FFF - FFFF 0000

Each node has a Mailbox Write (MW) register and a Mailbox Counter MC) register. Masters write write data to the mailbox by writing to MW. MC reflects how many 64-bit message long-words presently reside in the node's mailbox area. The high-order bits of the MC register can be used to detect overrun of a node's mailbox area.

The mail routine should maintain a read-pointer into the mailbox.

Writing to a Mailbox

The master can send mailbox data by writing to the slave's MW register. MC automatically increments with each write, and if it reaches the end of the buffer, MC wraps to the beginning.

Mailbox Write (MW) Register FFFF FC00

The Mailbox Write (MW) register writes data from a master to the node's IPC mailbox.

| Bits | Definition |
|---|---|
| 64-0 | Mailbox write data |

Before sending messages to a slave node, a master should find out the size of the slave's mailbox buffer to avoid overrunning the mailbox. To obtain this information, read the slave's NC:MBS (bit 1, 1=4 Kbytes, 0=32 Kbytes), then read the slave's MC register to determine how much mailbox space remains. If the mailbox is full, delay sending the message.

Resets clear MC, therefore MW write-pointer points to the first address in the mailbox area (FFFF 7000 for a 4-Kbyte mailbox, or FFFF 0000 for a 32-Kbyte mailbox). Each subsequent write increments the write-pointer by 1.

When a master writes to a slave's MW register, a mailbox interrupt is asserted through the interrupt control register (IC:MBI bit 17). Mailbox interrupts can be enabled or masked via mailbox interrupt enable IC:MBI bit 29. Set to enable, clear to mask.

When the mailbox interrupt is asserted, it remains pending until it has been cleared by the slave. Multiple mailbox interrupts overwrite one another.

A processor can clear its mailbox interrupt by reading or writing the Clear Mailbox Interrupt (CMI)register at FFFF FCE8. This also clears IC:MBI bit 17. See the section, "Clearing Interrupts - Synchronously and Asynchronously".

Mailbox Counter (MC) Register FFFF FC70

MC is a 16-bit register that counts how many messages currently reside in that node's mailbox. Also, MC specifies where the next mailbox item will be written. Each write to MW increments MC by 1.

MC can be read either by the slave or by the master. Resets clear MC. Clearing MC clears the mailbox.

| Bit | Mnemonic | R/W | Definition |
|---|---|---|---|
| 31:20 | | R/W | Unused |
| 32K | | | Mailbox: |
| 19:21 | OVF | R/W | Mailbox overflow |
| 11:0 | MC | R/W | Mailbox count. |
| 4K | | | Mailbox: |
| 19:9 | OVF | R/W | Mailbox overflow |
| 8:0 | MC | R/W | Mailbox count. |

Mailbox data is aligned on 64-bit boundaries. MC bits 19:12 for a 32 Kbyte mailbox and bits 19:9 for a 4 Kbyte mailbox should always be 0. If they are not 0, the buffer has been overrun. MC is automatically incremented when MCB is written, but not automatically decremented when the buffer is read; the slave processor must decrement MC.

The MC value can be changed while being read by a slave, giving the slave an incorrect message length. This can happen if a master writes to the slave's mailbox while the slave is reading its MC. To avoid this, the slave should perform a locked read.

Direct Memory Access (DMA)

The DMA controller transfers blocks of data between local memory and external memory. The controller must be able to generate addresses in local memory, define paths to and from a external node, and define addresses within the node's local address-space. In addition, the DMA controller must be capable of maintaining control information, such as requested transfer block-length and current transferred-word count. Finally, the DMA controller must be able to process a sequence of memory resident DMA commands, as well as detect when its tasks are complete.

The node processor creates a linked-list of transfer commands in local memory, and then starts the DMA controller. To monitor the progress of DMA activities, either enable the DMA Interrupt (IC:DMI), or poll the DMA controller for status information.

The DMA controller accesses external DRAM through page 0 and its associated map-register.

Note: A DMA transfer command only needs to specify a return path (from an external resource to the DMA controller's node) if the command calls for a block-read from a "split-read"-capable external resource. See the section titled "Split-Read Accesses" for more information on such transactions.

The DMA controller receives its instructions from a linked-list of DMA-transfer descriptor structures in node DRAM. This mechanism allows a processor to queue multiple DMA requests for the DMA controller, and then to proceed with other activities. The DMA controller sequentially processes each entry in the request-queue, posting progress-status information as it proceeds.

The DMA controller has two registers: DMA Next-Descriptor (DND) and DMA Transfer-Count (DTC).

DMA Next-Descriptor Register (DND) FFFF FC90

The DMA Next-Descriptor register points to the descriptor for the next DMA operation to be performed; DND points to one of the elements in a linked-list of DMA descriptors.

Following power-up, the DND register is initialized to zero.

The master can write to DND to direct the DMA controller to process a particular DMA descriptor. A processor can also obtain DMA processing-status information by reading DND.

| Bit | Mnemonic | R/W | Definition |
|---|---|---|---|
| 31-28 | | Not used - read as 0 27:3 | |
| DAD | | Descriptor address | |
| 2 | GO | DMA go. | |
| 1:0 | | Not used - read as. | |

If the DMA controller is halted, and if the DND register is written with the address of a descriptor and an active go-bit (set to 1), the DMA controller immediately begins processing the descriptor pointed to by the DND.

If the node processor (or an external processor) writes a new descriptor-address and an active go-bit to the DND while the DMA controller is active, then the DMA controller will process the DND-indicated descriptor after it finishes its current activities (if any). This is how the processor initiates DMA operations. It also provides a mechanism for changing the DMA command-stream.

If a write to DND initiates or alters DMA operations, ensure that the descriptor pointed to by DND is part of a normally-terminated descriptor-chain. GO Setting DND:GO starts a DMA transfer; clearing DND:GO does not halt a DMA transfer.

Writing a new descriptor address and an inactive go-bit to the DND register has no effect on the DMA controller, which is normally controlled by the go-bit in the link-word of a memory-resident descriptor. In fact, if the DMA controller is active while such a DND register-write occurs, the DMA controller will over-write the newly-written address when the controller completes its transfer and posts its status to the DND register.

An active go-bit in the DND register is directly presented to the DMA controller; the controller does NOT need to poll the DND register to determine when a new DMA request has been written to the register. Thus, there is no access contention for this register. Similarly, when the DMA controller is ready to begin processing the next descriptor in the memory-resident descriptor chain, the controller reads the entire descriptor from memory. This avoids memory-access conflicts with the processor.

DMA Block Count Register (DBC) FFFF FCA0

A node's DMA Block Count (DBC) register is a 32-bit counter which is incremented by the DMA controller after the controller finishes processing a DMA descriptor. The DBC register is incremented by one after each entire DMA transfer is completed (NOT after each data item is transferred).

The node processor can read DBC register to determine how many descriptors have been completely processed by the DMA controller.

Following power-up, this register is initialized to zero.

Dynamic DMA Registers

A processing node contains several registers maintained by the node's DMA controller as it transfers data. The following registers are only available for use by diagnostic routines:

DMA Dynamic Word-Count Register (DWC) FFFF FC80

DWC contains the current DMA transfer word count. The node maintains DWC as it transfers data. DWC is available only to diagnostic routines.

DMA Dynamic Local-Address Register (DLA) FFFF FC88

DLA contains the local address of the current DMA transfer. The node maintains DLA as it transfers data. DLA is available only to diagnostic routines.

DMA Dynamic Remote-Address Register (DRA) FFFF FC9C

DRA contains the external address of the current DMA transfer. The node maintains DRA as it transfers data. DRA is available only to diagnostic routines.

Transfer-Descriptor Chain

The DMA controller operates under the direction of a linked-list of "transfer-descriptor" data structures. This linked-list resides in node DRAM; normally, it is built by local node processor. However, external devices can also build such a list in local memory. Each descriptor contains a pointer to the descriptor for the next command to be executed, or an end-of-command-chain indicator.

Each DMA descriptor contains 6 32-bit words. All descriptors must begin on an 8-byte boundary. In addition, the contents of a given descriptor cannot straddle a 2-Kbyte DRAM page boundary. (Note that this is a 2-Kbyte DRAM page, not an 8-Kbyte external-memory page). Different descriptors within a descriptor-chain can, however, reside in different 2-Kbyte DRAM pages.

The contents of a DMA descriptor are as follows:

| Byte-Offset | Field Name | Field Description |
|---|---|---|
| 0 | Transfer-count | 2's COMPLEMENT of the number of 64-bit words to transfer |
| 4 | External route | External routing word establishes a path to an external node |
| 8 | Local address | Local-DRAM starting address of source of destination |
| 12 | Return route | Return routing word establishes a path from the external node back to this node (for split-reads only) |
| 16 | Link | Address of next descriptor and start-flag, or address of current descriptor and stop-flag |
| 20 | Remote address | Starting address of remote-node source or destination, including transfer direction and interrupt-request flags |

Transfer-Count

The transfer-count is the 2's complement of the number of 64-BIT words to be transferred. This allows the DMA logic to increment the count-value until it reaches 0, indicating that the transfer is complete. The DMA controller transfers only 64-bit long-words; shorter-length data must be grouped into 64-bit long-words for transfer, or they can be transferred by the node processor.

Since the transfer-count is a full 32-bit (signed) quantity, the block-length can be made large enough to move the entire 256-MByte local DRAM in one DMA transfer.

External-Route

The external route defines the communication route through the crossbars. Also see the External Routing register description earlier in this document.

Local-Address

The local address is a 28-bit quantity, specified in a 32-bit word. This allows the DMA controller to access any location in the node's DRAM. Only bits 27:3 of the address are used.

Return-Route

The return route defines the data path used by a split-read slave when sending data to the requester. Also see the Return Routing register description earlier in this document.

Link

The 32-bit DMA-descriptor link word contains the address of the next DMA descriptor to be processed. Bits 27:3 specify the descriptor's starting-address in local DRAM; bits 1:0 are not used.

| Bit | Mnemonic | R/W | Definition |
|---|---|---|---|
| 31:28 | | | not used - must be 0000 |
| 27:3 | LA | | Local address bits 27:3 |
| 2 | GO | | Go |
| 1:0 | | | not used - must be 00 |

GO

GO enables the DMA controller to process the descriptor. If GO=1, the DMA controller processes the descriptor. If GO=0, the DMA controller stops performing DMA transfers. To resume DMA operations, set GO.

A special convention is used to delineate the last descriptor in a linked-list of descriptors. First, the last descriptor's link-address is set to point back to the last descriptor. In addition, the last descriptor's go-bit is cleared. When the DMA controller finishes processing a descriptor and then encounters a cleared go-bit in the link-word of that descriptor, the controller halts.

External Address

The external address gives the DMA controller access to slave address space:

| Bit | Mnemonic | R/W | Definition |
|---|---|---|---|
| 31:28 | | not used - must be 0000 | |
| 27:3 | EA | External address bits 27:3 | |
| 2 | FD | Fast DMA (DMA flow-control mode flag). | |
| 1 | IR | Interrupt-request | |
| 0 | TD | Transfer direction | |

Bits 2:0 are provided by the Crossbar logic.

The DMA controller has a 128-byte data buffer. The external-address word contains a "Fast DMA" flag (bit 2) which selects the operating mode for this data buffer.

1=the DMA buffer is filled as soon as there is any room in the buffer.

In this mode, data moves into the buffer at the same rate that it moves out. Thus, if the slave is as fast as the DMA controller, data moves between the two nodes as a single burst.

Fast DMA (FD)

If FD=0 (fast DMA), the DMA logic does not request use of the node's local bus until the buffer is half-full.

If FD=1 (slow DMA), the DMA buffer is used differently for reads than for writes. If the DMA controller is reading from a slave, the DMA logic will accumulate 4 64-bit long-words of read-data in the DMA buffer before it transfers this data to local DRAM. If the DMA controller is writing to a slave, the DMA logic will start a read from local DRAM when the DMA buffer has room for 8 64-bit long-words.

Interrupt-request (IR)

If IR=1, the DMA logic issues a "DMA transfer complete" (DTC) interrupt to the node processor after completing the current DMA transfer. This allows the processor to initiate a DMA operation and then to engage in other processing until the requested transfer is completed. An interrupt can be generated following each of a series of transfers, or following particular transfers, or following completion of an entire series of transfers.

Transfer direction (TD)

If TD=1, the DMA controller transfers data from a slave to DRAM. If TD=0, the DMA controller transfers data from DRAM to the slave.

Adding a Descriptor to a Chain

A node processor can add a new DMA descriptor to an existing linked-list of descriptors. Normally, a new descriptor is appended at the end of the existing chain; however, a descriptor can also be "spliced" into a point within the chain. In that case, the new descriptor can simply be interleaved with the existing descriptors, or it can be used to direct subsequent DMA processing to a different chain of descriptors. The contents of the new descriptor's link-word determine which of these possibilities occurs in a given situation.

Assume that a descriptor is to be added at the end of an existing linked-list of descriptors. The addition requires four or five separate steps:

1) The new descriptor must be created in local memory, abiding by the descriptor alignment and page-boundary constraints.

2) The new descriptor's link-word address must be set to point to the beginning of the new descriptor. That link-word's go-bit must be cleared (indicating end-of-chain).

3) The address in the link-word of the current last descriptor in the chain must be set to point to the beginning of the descriptor to be added. The go-bit of the patched descriptor's link-word must be set (active).

4) After step 3, the node processor must read the node's DMA Next-Descriptor (DND) register. If the DND value is not equal to the address of the descriptor patched in step 3, then the DMA controller has not yet processed the patched descriptor. In that case, the descriptor addition is complete.

5) If the DND value is equal to the address of the descriptor patched in step 3, this indicates that the DMA controller has processed the patched descriptor and has read its inactive go-bit (previous end-of-chain indication) before addition of the new descriptor was completed. In this case, the processor must write the address of the newly-added descriptor to the node's DND register, together with an active go-bit. This causes the DMA controller to begin processing the new descriptor.

When the processor creates the first descriptor in a chain, a "dummy" descriptor must be allocated; then, the dummy-descriptor's link-word can be set to point to the first real descriptor. With this approach, the descriptor-adding procedure works the same for the first descriptor as for subsequently added descriptors.

Timers

The processing node has two programmable timers, each of which can generate periodic interrupts to the node processor. In addition, each node contains a free-running Time-Stamp register which can be used to determine the length of time between two events. The timers are configured as follows:

The timers use a 10 MHz clock (100 ns). You must program the Oscillator Divide-Down Ratio (ODR), Bit 10 of the NC register to derive this clock from the system clock.

The timer registers are:

Using the Timer Registers

Write to the TnI registers to load a count-down period. To start counting down, write to the Timer Counter (TnC) register. This transfers the contents of the Interval register into the Counter register, and enables the count-down.

When the counter reaches zero, two things happen: the processor's Timer (1 or 2) interrupt is asserted, and the counter is automatically reloaded from the Interval register. This prepares the counter for the next count-down.

Timer 1 and Timer 2 each drive an interrupt-source; when a count reaches zero, an interrupt is asserted. To clear a timer interrupt, read (synchronous clear) or write (asynchronous clear) the corresponding clear timer register.

The processor can read the Counter register to obtain the current count; however, since the counter cannot be disabled, the processor cannot indirectly read back the Interval value by loading the counter from the Interval register, and then reading the counter.

A Counter register can be set to count down from a value much shorter than 32 bits. Thus, it is possible for a counter to decrement past 0 more than once while a timer interrupt is being serviced. Use the Time-stamp register to detect this.

By reading the TS upon entry to the timer interrupt service routine (ISR), and by comparing that value to a TS value stored on entry to the previous Timer ISR call, it is possible to determine the length of time since the previous time-stamp was taken. By dividing that interval by the current Counter-register count-down interval, one can calculate how many times the counter has wrapped around since the previous time-stamp.

Performance Metering

Performance metering non-intrusively captures system performance information to help a user analyze how a program utilizes system resources. Each node can be programmed to monitor the performance of:

node DRAM node crossbar-port usage

| Register | Address | R/W | Action |
|---|---|---|---|
| Timer-1 Interval (T1I) | FFFF FC40 | W | Write: load interval |
| Timer-1 Counter (T1C) | FFFF FC48 | R/W | Write: load Counter 1 from T1I<br>Read: get current Counter-1 value |
| Clear Timer-1 Interrupt (CT1I) | FFFF FCF0 | R/W | Write: asynchronously clear interrupt<br>Read: synchronously clear interrupt |
| Timer-2 Interval (T2I) | FFFF FC50 | W | Write: load interval |
| Timer-2 Counter (T2C) | FFFF FC58 | R/W | Write: load Counter 1 from T2I<br>Read: get current Counter-2 value |
| Clear Timer-2 Interrupt (CT2I) | FFFF FCF8 | R/W | Write: ashynchronously clear interrupt<br>Read: synchronously clear interrupt |
| Time-Stamp (TS) | FFFF FC60 | R/W | Write: initialize count-up value<br>Read: get current TS value |

Following reset, all timer registers are cleared.

Timer Interval Registers (TnI)

Timer 1 and Timer 2 are 32-bit general-purpose timers. Timer-1 and Timer-2 registers are identical. Write to the TnI registers to load a count-down period.

Timer Counter Registers (TnC)

The Timer Counter registers (TnC) are dual purpose: writes load the Counter register from the Interval register; reads return the current value of the counter.

Time Stamp Register (TS) FFFF FC60

TS is written and read by local and external processors. Typically, TS is only read, and is used to measure elapsed time. TS wraps around every (2**32) * (0.10 microseconds), or about every 7 minutes.

TS begins counting up immediately after it is cleared.

node processor activity.

Each node can monitor a different set of performance data. However, the internal performance of the crossbar network cannot be directly monitored. For example, when crossbar auto-routing is used, the routing frequencies along different paths between two end-points cannot be measured.

Instead, each node can obtain information about how that node's local crossbar ports are used (such as port-contention data), information about path-establishment latency, and information about path utilization (such as effective transfer-rate).

A processing node has two performance-metering registers: Performance-Monitor Mode (PMM) and Performance-Monitor Counter (PMC). PMM specifies which performance conditions are to be monitored; one or more conditions can be studied. PMC records how many of the selected event occurred during a metering period.

The performance-metering registers can be used in conjunction with the node timer registers. In particular, the node Time-Stamp register can be used to determine the length of time during which events are recorded. This allows a user to calculate event counts per unit time, and to gather average performance figures over some period.

Performance-Monitor Mode (PMM) Register FFFF FC30

The Performance-Monitor Mode (PMM) register is a 32-bit register which resides at local address FFFF FC30. The PMM register can be programmed with a code which identifies what type of event is to be counted. The following table lists the supported event-type codes, grouped by event category:

| PMM Value | Event |
|---|---|
| Count accesses to local memory: (1 count per DRAM CAS pulse). | |
| 0x0000 0000 | with local processor as master |
| 0x0000 0001 | with local DMA as master |
| 0x0000 0002 | with external master |
| 0x0000 0003 | with any local-memory accesses |
| 0x0000 0020 | with local-processor instruction-cache fills |
| Count non-D64 accesses to local memory: | |
| 0x0000 0010 | with local processor as master |
| 0x0000 0012 | with external master |
| 0x0000 0013 | all non-D64 local-memory accesses |
| Current accesses to new DRAM rows. (There can be many accesses within a given row). | |
| 0x0000 0030 | Local-processor DRAM-row starts |
| 0x0000 0031 | Local-DMA DRAM-row starts |
| 0x0000 0032 | External-master DRAM-row starts |
| 0x0000 0033 | all DRAM-row starts |
| Freeze the performance counter: | |
| 0x0000 0040 | Do not count |
| Codes to count 20-MHz local-bus clock cycles: 0x0000 0070 with local processor as master | |
| 0x0000 0071 | with local DMA as master |
| 0x0000 0072 | with external master |
| 0x0000 0073 | all 20-MHz clock-cycles |
| Monitor crossbar (Xbar) performance: | |
| 0x0000 0100 | Local master Crossbar requests killed by external master Crossbar requests |
| 0x0000 0101 | Local-DMA crossbar requests killed by external master Crossbar requests |
| 0x0000 0103 | Any killed crossbar requests |
| 0x0000 0110 | Idle Crossbar cycles with local processor as master |
| 0x0000 0111 | Idle Crossbar cycles with local DMA as master |
| 0x0000 0113 | Idle Crossbar cycles with local processor or local DMA as master |
| 0x0000 0120 | Crossbar cycles with local processor Crossbar-access request but no local-processor Crossbar transfers |
| 0x0000 0121 | Crossbar cycles with local DMA Crossbar-access request but no local-DMA Crossbar transfers |
| 0x0000 0123 | Crossbar cycles with local-processor or local-DMA Crossbar-access request but no local-processor or local-DMA Crossbar transfers |
| 0x0000 0130 | Local-processor Crossbar requests not killed |
| 0x0000 0131 | Local-DMA Crossbar requests not killed |
| 0x0000 0133 | Local-processor or local-DMA Crossbar requests not killed |
| 0x0000 0140 | Total local-processor Crossbar requests |
| 0x0000 0141 | Total local-DMA Crossbar requests |
| 0x0000 0143 | Total local-processor or local-DMA Crossbar requests |
| 0x0000 0150 | Total local-processor-driven Crossbar transfers |
| 0x0000 0151 | Total local-DMA-driven Crossbar transfers |
| 0x0000 0153 | Total local-processor-driven or local-DMA-driven Crossbar transfers |
| 0x0000 0160 | 20-MHz cycles with local processor waiting to receive split-read data |
| 0x0000 0161 | 20-MHz cycles with local DMA waiting to receive split-read data |
| 0x0000 0163 | 20-MHz cycles with local processor or local DMA waiting to receive split-read data Codes for miscellaneous conditions |
| 0x0000 0200 | 20-MHz cycles with interrupt to local processor pending |
| 0x0000 0210 | Local-processor accesses to DRAM stalled by other DRAM accesses |
| 0x0000 0220 | Local-processor accesses to Crossbar stalled by other Crossbar accesses |
| 0x0000 0230 | Local-processor accesses to DRAM stalled by external master accesses to DRAM |
| 0x0000 0240 | Local-processor stalls while accessing either local or external memory |
| 0x0000 0250 | 20-MHz cycles with local DRAM idle but accessible |

Performance-Monitor Counter (PMC) Register FFFF FC3 8

Each processing node has a 32-bit Performance-Monitor Counter (PMC) register that counts events.

Once a monitor event-type code has been written to the Performance-Monitor Mode register, the performance-metering logic increments PMC by one for every occurrence of the event.

PMC can be read and written by both local and external masters. This allows a processor to load the PMC register with an initial count, such as 0.

Before loading a value into PMC, stop PMC by writing 0×00000 0040 (do not count) to it.

Some events increment PMC twice, due to the use of two distinct 20-MHz clocks in implementing the performance-metering logic.

Using The Performance-Metering Facility

Clear PMC by writing 0 to it.

To do cumulative counts, load PMC with a previous count. The metering routine then writes an event-type code to the PMM register, to select what type of event is to be counted. This immediately enables the PMC register for counting. The metering routine should then immediately pass control to the monitored code (to avoid possibly corrupting a metering interval measurement by counting spurious ticks from unrelated system events).

At the end of the code to be monitored, execution is passed back to the metering routine. If the monitored code is to be monitored for some fixed period of time, the metering routine can use one of the two node timers to produce a local-processor interrupt at the end of the metering period. The timer-interrupt service routine can then pass control back to the metering routine.

When control returns to the metering routine, that routine stops the PMC register (by writing 0×0000 0040 to the PMM register). The metering routine reads the PMC register to obtain the number of events of interest which occurred during the metering period.

The node timers are normally used in conjunction with the performance-metering registers. The timer resources can be used to measure the length of time between two events, or to count events for a predetermined period.

For example, measuring the length of time between two events might be used to count the number of local-processor crossbar-port requests which occur between external-processor crossbar accesses. To make this type of performance measurement, a performance-metering routine can read the node Time-Stamp register before and immediately after execution of a code-segment of interest. The difference between the ending-value and starting-value of the Time-Stamp register establishes the duration of the metering period.

Booting From Local EEPROM

To support self-booting processor nodes, the i860 processor has a CS8 instruction access mode. In the CS8 mode, upon exiting a reset trap, the i860 fetches instructions through byte-wide processor bytelane 0 (rather than fetching 64-bit-wide instructions).

The following events will reset and boot a node:

System power-up.

VME bus reset.

Processor board reset by an external VME master.

If CS8 mode is selected, the node fetches instructions from the motherboard-resident EEPROM, one byte at a time. Instruction-fetching begins as soon as reset is released.

In contrast, if the external interrupt pin calls for normal instruction-fetch mode, the node processor will not start to fetch instructions until it is remotely enabled to do so. (See NC:RSC).

Upon exiting a reset trap, the i860 always begins execution at FFFF FF00. In CS8 mode, the top of EEPROM is mapped to that restart-vector address.

If the node is reset by an external master and the node is not configured to boot in CS8 mode, the external master must down-load code to the slave DRAM, then set the node's NC:RSC bit.

If the processing node is configured to boot in CS8 mode, the node processor should set NC:CS8 and NC:RSC to reflect the execution state. When it is done executing the byte-wide EEPROM, the node processor must clear the CS8 bit in its internal DIRBASE register, then the processor must set its NC:RSC and clear NC:CS8.

The following guidelines must be followed in order to ensure a successful transition to normal 64-bit instruction-fetching:

The boot-strap instructions must be addressed in the cached address-space, so that they are copied into the processor cannot be allowed to execute these instructions until the cache-line which contains them has been loaded.

The write to NC must be flushed out of the cache and into the external Configuration register. This can be done by following the write with an uncached read from memory, or from a node register.

Other details of a preferred embodiment of the system of the invention may be found in the VHDL listings for a crossbar ASIC and a computer node (or computing environment) ASIC, both accompanying this application as Appendix A.

APPENDIX A

Multicomputer Memory
Access Architecture

Robert Charles Frisch

Att. Ref: MRS-001

Mercury Computer Systems
MODULE DEVELOPMENT

Title
*XBAR ASIC: VHDL Listings*

February 1, 1993 adrmux.vhd
adrmuxl.vhd
adrmuxm.vhd
buf32.vhd
bufio32.vhd
config.vhd
eregl1.vhd
ereg16.vhd
ereg32.vhd
ereg8.vhd
fif_cnt.vhd
fif_in.vhd
fifo16x16x2.vhd
fifo16x16x4.vhd
fifo32x16.vhd
fifo64x16.vhd
i2mux16.vhd
i2mux32.vhd
i3mux16.vhd
i3mux32.vhd
int_vec.vhd
lat32.vhd
mas.vhd
matchl.vhd
matchm.vhd
misc.vhd
msel.vhd
mux81.vhd
or16.vhd
pa2l.vhd
pa2m.vhd
pckcomp.vhd
pcksela.vhd
pckselb.vhd
pckselc.vhd
pckseld.vhd
pcksele.vhd
pckself.vhd
port_req.vhd
pullup16.vhd
reg16.vhd
reg32.vhd
selfa.vhd
selfb.vhd
selfc.vhd
selfd.vhd
shift32.vhd
shiftmux32.vhd
slv.vhd
smsel.vhd
smsele.vhd
smself.vhd
spckcomp.vhd
sport_req.vhd
swap16.vhd
swap32.vhd
vme_ctl.vhd
xbal.vhd
xbam.vhd
xbreg32.vhd
xbutil.vhd
xcv32.vhd Computer Systems, Inc.
*MERCURY*

```
adrmux.vhd          Mon Sep 28 17:21:37 1992          1

-- adrmux
-- a 4 input 32 bit mux for x-bar address port
-- 8/9/92 tpb
-- 9/22/92 cek removed SIXPORTN and FDO[31:0] inputs

LIBRARY synth;
USE synth.stdsynth.all;

ENTITY adrmux  IS PORT(

MPA              : IN VLBIT_VECTOR(18 DOWNTO 0);
DAT              : IN VLBIT_VECTOR(31 DOWNTO 0);
PAO              : IN VLBIT_VECTOR(31 DOWNTO 0);
ADSCYCLN         : IN VLBIT;
LDSLVAD          : IN VLBIT;
MASTER           : IN VLBIT;
CLK              : IN VLBIT;
EN_MAP_LD        : OUT VLBIT;
Y                : OUT VLBIT_VECTOR(31 DOWNTO 0)
                   );

END adrmux ;

ARCHITECTURE rtl OF adrmux  IS

    SIGNAL LDSLVAD_D :  VLBIT;

BEGIN

PROC1: PROCESS (MPA,DAT,PAO,ADSCYCLN,LDSLVAD,MASTER)
BEGIN

      IF (MASTER = '1' AND ADSCYCLN = '0') THEN
         Y <= PAO;
      ELSIF (MASTER = '0' AND LDSLVAD = '1') THEN
         Y <= MPA & b"0000000000000";
      ELSE
         Y <= DAT;
      END IF;

END PROCESS;

reg_proc :  process

begin

wait until CLK = '1';
```

```
adrmux.vhd          Mon Sep 28 17:21:37 1992        2


        LDSLVAD_D   <= LDSLVAD;
        EN_MAP_LD   <= LDSLVAD AND NOT LDSLVAD_D  ;

end process;


END rtl;
```

```
adrmuxl.vhd         Tue Nov 10 09:44:36 1992         1

-- adrmuxl
-- a 4 input 16 bit mux for x-bar address port
-- 8/9/92 tpb
-- 9/22/92 cek removed SIXPORTN and FDO[31:0] inputs
-- 10/8/92 cek  Created adrmuxl.vhd from adrmux.vhd to split the
--              adrmux into most and least significant 16-bit words.
-- 11/4/92 cek  Changed mux structure to optimize for speed of y
--              output from ldslvad in synthesis.
LIBRARY synth;
USE synth.stdsynth.all;

ENTITY adrmuxl  IS PORT(

MPA              : IN VLBIT_VECTOR(2 DOWNTO 0);
DAT              : IN VLBIT_VECTOR(15 DOWNTO 0);
PAO              : IN VLBIT_VECTOR(15 DOWNTO 0);
ADSCYCLN         : IN VLBIT;
LDSLVAD          : IN VLBIT;
MASTER           : IN VLBIT;
CLK              : IN VLBIT;
EN_MAP_LD        : OUT VLBIT;
Y                : OUT VLBIT_VECTOR(15 DOWNTO 0);
-- Speed optimization i/o
x_ldslvadn       : INOUT VLBIT;
x_ldsn           : INOUT VLBIT_VECTOR(15 DOWNTO 0);
x_lds            : INOUT VLBIT_VECTOR(15 DOWNTO 0)
                   );

END adrmuxl ;

ARCHITECTURE rtl OF adrmuxl  IS

    SIGNAL LDSLVAD_D :  VLBIT;

BEGIN

--PROC1: PROCESS (MPA,DAT,PAO,ADSCYCLN,LDSLVAD,MASTER)
--BEGIN
--
--      IF (MASTER = '1' AND ADSCYCLN = '0') THEN
--         Y <= PAO;
--      ELSIF (MASTER = '0' AND LDSLVAD = '1') THEN
--         Y <= MPA & b"0000000000000";
--      ELSE
--       Y <= DAT;
--      END IF;
--
```

```
adrmux1.vhd        Tue Nov 10 09:44:36 1992        2

--END PROCESS;

x_ldslvadn <= not LDSLVAD;

x_ldsn <=       PAO when (MASTER = '1' AND ADSCYCLN = '0') else
                DAT;
x_lds  <=       MPA & b"0000000000000" when (MASTER = '0') else
                PAO when (ADSCYCLN = '0') else
                DAT;
y <=    x_ldsn when (x_ldslvadn = '1') else
        x_lds;
reg_proc :  process

begin

wait until CLK = '1';


        LDSLVAD_D  <= x_ldslvadn;
        EN_MAP_LD  <= not x_ldslvadn AND  LDSLVAD_D  ;

end process;


END rtl;
```

```
adrmuxm.vhd        Tue Nov 10 09:45:08 1992        1

-- adrmuxm
-- a 4 input 16 bit mux for x-bar address port
-- 8/9/92 tpb
-- 9/22/92 cek removed SIXPORTN and FDO[31:0] inputs
-- 10/8/92 cek  Created adrmuxm.vhd from adrmux.vhd to split the
--              adrmux into most and least significant 16-bit words.
-- 11/4/92 cek  Changed mux structure to optimize for speed of y
--              output from ldslvad in synthesis.

LIBRARY synth;
USE synth.stdsynth.all;

ENTITY adrmuxm  IS PORT(

MPA              : IN VLBIT_VECTOR(18 DOWNTO 3);
DAT              : IN VLBIT_VECTOR(31 DOWNTO 16);
PAO              : IN VLBIT_VECTOR(31 DOWNTO 16);
ADSCYCLN         : IN VLBIT;
LDSLVAD          : IN VLBIT;
MASTER           : IN VLBIT;
Y                : OUT VLBIT_VECTOR(31 DOWNTO 16);
-- Speed optimization i/o
x_ldslvadn       : INOUT VLBIT;
x_ldsn           : INOUT VLBIT_VECTOR(31 DOWNTO 16);
x_lds            : INOUT VLBIT_VECTOR(31 DOWNTO 16)
                   );

END adrmuxm ;

ARCHITECTURE rtl OF adrmuxm  IS

BEGIN

--PROC1: PROCESS (MPA,DAT,PAO,ADSCYCLN,LDSLVAD,MASTER)
--BEGIN
--
--       IF (MASTER = '1' AND ADSCYCLN = '0') THEN
--          Y <= PAO;
--       ELSIF (MASTER = '0' AND LDSLVAD = '1') THEN
--          Y <= MPA;
--       ELSE
--        Y <= DAT;
--       END IF;
--
--END PROCESS;

x_ldslvadn <= not LDSLVAD;
```

```
adrmuxm.vhd          Tue Nov 10 09:45:08 1992          2

x_ldsn <=          PAO when (MASTER = '1' AND ADSCYCLN = '0') else
                   DAT;
x_lds  <=          MPA when (MASTER = '0') else
                   PAO when (ADSCYCLN = '0') else
                   DAT;
y <=     x_ldsn when (x_ldslvadn = '1') else
         x_lds;

END rtl;
```

```
buf32.vhd        Wed Oct 21 13:34:30 1992        1

--Title: BUF32
--Desc:  32 bit buffer model
--Date:  April 8, 1992

entity BUF32 is port(
--INS
        DIN:                            IN      vlbit_vector(31 downto 0);

--OUTS
        DOUT:                           OUT     vlbit_vector(31 downto 0)
 );

end BUF32;

architecture behavior of BUF32 is

--INTERNAL

begin

        DOUT <= DIN;

end behavior;
```

```
bufio32.vhd          Wed Oct 21 13:34:28 1992          1

--Title: BUFIO32
--Desc:  32 bidirectional model
--Date:  April 8, 1992

entity BUFIO32 is port(
--INS
        DIN:                                IN      vlbit_vector(31 downto 0);
        OE:                                 IN      vlbit;

--OUTS
        DOUT:                               OUT     vlbit_vector(31 downto 0);
        DIO:                                INOUT   vlbit_vector(31 downto 0) );

end BUFIO32;

architecture behavior of BUFIO32 is

--INTERNAL

begin

        DIO <= DIN when OE = '0' else X"ZZZZZZZZ";

        DOUT <= DIO;

end behavior;
```

```
config.vhd        Tue Nov  3 14:13:49 1992        1

-- filename: CONFIG.ABF
-- description:
-- history: 7/28/92 created tpb
--
-- LATCH CONFIGURATION BITS ON RESET DEASSERTING
--
ENTITY config IS PORT(

--inputs:

SIGNAL CLK, RESET, SWAP, EN_AD_INC, FORCE_32E : IN  VLBIT;

--outputs:

SIGNAL SIXPORTN, RAM_3_CHIPS, BROADCAST_SEL, S6PORT   :   INOUT VLBIT);

END config;

ARCHITECTURE rtl OF config IS

begin

hold_proc: process


   begin

   wait until (clk = '1');

        if (reset = '1') then

                sixportn <= swap;
                ram_3_chips <= en_ad_inc;
                broadcast_sel <= force_32e;


        else

                sixportn  <= sixportn;
                ram_3_chips <= ram_3_chips;
                broadcast_sel <= broadcast_sel;

        end if;

end process;

s6port  <= NOT sixportn;
```

```
end rtl;
```

```
eregll.vhd          Wed Oct 21 13:33:21 1992          1

-- eregll
-- a 11 bit register with rising edge clock
-- and active high clock enable.
-- author: Tom Baillio
-- history: 8/8/92 created

LIBRARY synth;
USE synth.stdsynth.all;

ENTITY eregll IS PORT(

DIN : IN VLBIT_VECTOR(10 DOWNTO 0);
CLK  : IN VLBIT;
EN   : IN VLBIT;
DOUT : INOUT VLBIT_VECTOR(10 DOWNTO 0)
                    );

END eregll;

ARCHITECTURE rtl OF eregll IS

BEGIN

eregll_proc: process begin

  wait until (clk = '1');

  if (en = '1') then
       dout <= din;
  else
       dout <= dout;
  end if;

end process;

END rtl;
```

```
ereg16.vhd        Wed Oct 21 13:33:22 1992        1

-- ereg16
-- a 8 bit register with rising edge clock
-- and active high clock enable.
-- author: Tom Baillio
-- history: 8/11/92  created

LIBRARY synth;
USE synth.stdsynth.all;

ENTITY ereg16 IS PORT(

DIN : IN VLBIT_VECTOR(15 DOWNTO 0);
CLK  : IN VLBIT;
EN   : IN VLBIT;
DOUT : INOUT VLBIT_VECTOR(15 DOWNTO 0)
                    );

END ereg16;

ARCHITECTURE rtl OF ereg16 IS

BEGIN

ereg16_proc: process begin

  wait until (clk = '1');

  if (en = '1') then
       dout <= din;
  else
       dout <= dout;
  end if;

end process;

END rtl;
```

```
ereg32.vhd          Wed Oct 21 14:14:50 1992          1

-- ereg32
-- a 32 bit register with rising edge clock
-- and active high clock enable.
-- author: Tom Morin
-- history: 4/14/92 created

LIBRARY synth;
USE synth.stdsynth.all;

ENTITY ereg32 IS PORT(

DIN : IN VLBIT_VECTOR(31 DOWNTO 0);
CLK  : IN VLBIT;
EN   : IN VLBIT;
DOUT : INOUT VLBIT_VECTOR(31 DOWNTO 0)
                    );

END ereg32;

ARCHITECTURE rtl OF ereg32 IS

BEGIN

ereg32_proc: process begin

  wait until (clk = '1');

  if (en = '1') then
       dout <= din;
  else
       dout <= dout;
  end if;

end process;

END rtl;
```

```
ereg8.vhd        Wed Oct 21 13:33:22 1992        1

-- ereg8
-- a 8 bit register with rising edge clock
-- and active high clock enable.
-- author: Tom Baillio
-- history: 8/8/92  created

LIBRARY synth;
USE synth.stdsynth.all;

ENTITY ereg8 IS PORT(

DIN : IN VLBIT_VECTOR(7 DOWNTO 0);
CLK  : IN VLBIT;
EN   : IN VLBIT;
DOUT : INOUT VLBIT_VECTOR(7 DOWNTO 0)
                    );

END ereg8;

ARCHITECTURE rtl OF ereg8 IS

BEGIN

ereg8_proc: process begin

  wait until (clk = '1');

  if (en = '1') then
       dout <= din;
  else
       dout <= dout;
  end if;

end process;

END rtl;
```

```
fif_cnt.vhd          Wed Oct 28 16:26:18 1992          1

-- TEMPORARY file created by CHRIS KOLB from
-- filename: fif_cnt.abf
-- description: fifo controller for crossbar
-- history: 5/20/92 converted to vhdl from Bob Frisch's
--            abf text file by trm
--
LIBRARY synth;
USE synth.stdsynth.all;

ENTITY fif_cnt IS PORT (

-- inputs:

clk, rn, outlen, lastd, xout, ldslvad, wrt0_15N, fifoclk : in vlbit;

-- outputs:

in_rda, in_wrta   : inout vlbit_vector(3 downto 0);
fo_rda, fo_wrta   : inout vlbit_vector(3 downto 0);
fo_wpn : inout vlbit);

end fif_cnt;

ARCHITECTURE rtl OF fif_cnt IS

SIGNAL
fo_rst, in_rst, fo_rd_inc, en_in_rdc : vlbit;
SIGNAL  en_fo_wrtc : vlbit;
SIGNAL clkn : vlbit;
SIGNAL in_wrta_ci1 ,in_wrta_ci2 ,in_wrta_ci3 : VLBIT;
SIGNAL in_wrta_civ : vlbit_vector(3 downto 0);
SIGNAL pre_in_wrta : vlbit_vector(3 downto 0);
SIGNAL fo_wrta_ci1 ,fo_wrta_ci2 ,fo_wrta_ci3 : VLBIT;
SIGNAL fo_wrta_civ : vlbit_vector(3 downto 0);
SIGNAL pre_fo_wrta : vlbit_vector(3 downto 0);
SIGNAL in_rda_ci1 ,in_rda_ci2 ,in_rda_ci3 : VLBIT;
SIGNAL in_rda_civ : vlbit_vector(3 downto 0);
SIGNAL pre_in_rda : vlbit_vector(3 downto 0);
SIGNAL rda_ci1 ,rda_ci2 ,rda_ci3 : VLBIT;
SIGNAL rda_civ : vlbit_vector(3 downto 0);
SIGNAL ifo_rda, rfo_rda : vlbit_vector(3 downto 0);

CONSTANT TERM_COUNT : vlbit_ld( 3 downto 0) := ('1','1','1','1');
CONSTANT ZERO       : vlbit_ld( 3 downto 0) := ('0','0','0','0');
CONSTANT ONE        : vlbit_ld( 3 downto 0) := ('0','0','0','1');
```

```
fif_cnt.vhd        Wed Oct 28 16:26:18 1992        2

BEGIN

IN_RST  <= LDSLVAD OR NOT RN;

EN_IN_RDC <= FIFOCLK AND NOT XOUT;


wpn_proc: process begin

        wait until (CLK = '1');
        FO_WPN <=  NOT (FIFOCLK AND XOUT);

end process;

--WRT0_15N IS WRT CLK TO INPUT FIFO
--
--      -------- INPUT FIFO WRT COUNTER ------------------
--
--IN_RDA(0:3)    - 4 BIT COUNTER
--               - INCREMENTS ON WRT0_15N GOING UP
--               - CLEARED BY IN_RST
--      NOT NOT  WANT TO DELAY COUNT UP TO MEET TAH ON RAMS
--
-- This process was replaced by assignments in the concurrent section
--inwrta_proc: process

-- variable inwrta_temp : vlbit_vector(4 downto 0);

--begin

-- the clocked-process-with-async-clear construct:
--
--      wait until ((prising(wrt0_15N)) OR (in_rst = '1'));
--
--              if (in_rst = '1') then
--
--                      inwrta_temp := b"00000";
--
--              else
--
--                      inwrta_temp := addum(inwrta_temp(3 downto 0),b"1");
--
--              -- handle the wrap condition:
--
--                 if (inwrta_temp(4 downto 0) = b"10000") then
--
--                      inwrta_temp := b"00000";
```

```
fif_cnt.vhd         Wed Oct 28 16:26:18 1992         3

--
--                  end if;
--
--              end if;
--
--      in_wrta <= inwrta_temp(3 downto 0);
--
--end process;

--INPUT FIFO WRT COUNTER
in_wrta_ci1 <= in_wrta(0);
in_wrta_ci2 <= in_wrta_ci1 and in_wrta(1);
in_wrta_ci3 <= in_wrta_ci2 and in_wrta(2);

in_wrta_civ <= ( in_wrta_ci3 &  in_wrta_ci2  & in_wrta_ci1 & b"1");
pre_in_wrta <= in_wrta xor in_wrta_civ;

dffc_v(pre_in_wrta,in_rst,wrt0_15N,in_wrta);
--      input         clr    clk       output


--      ------   out wrt counter ---------------
--      EN_FO_WRTC       - WHEN HIGH INCREMENT
--      FO_RST           - CLEAR

--fowrt_proc: process

--VARIABLE FOWRTA_TEMP   :  vlbit_1d( 4 downto 0 );

--begin

--      wait until (clk = '0');

--         EN_FO_WRTC <= NOT FO_WPN;

--         if (FO_RST = '1') then
--              FO_WRTA <= ZERO;
--
--                 elsif (EN_FO_WRTC = '1') then
--
--              if ( FO_WRTA = TERM_COUNT ) then -- only to keep VHDL happy
--                      FO_WRTA <= ZERO;     -- not needed in final
--                                                   -- implementation
--              else
--
--                      FOWRTA_TEMP := addum(FO_WRTA, ONE);
--                      FO_WRTA  <= FOWRTA_TEMP( 3 downto 0 );
```

```
fif_cnt.vhd        Wed Oct 28 16:26:18 1992        4

--
--              end if;
--
--          else
--
--              FO_WRTA <= FO_WRTA;
--
--          end if;
--
--
--end process;
--OUTPUT FIFO WRT COUNTER
fo_wrta_ci1 <= fo_wrta(0) and NOT fo_wpn ;
fo_wrta_ci2 <= fo_wrta_ci1 and fo_wrta(1) ;
fo_wrta_ci3 <= fo_wrta_ci2 and fo_wrta(2) ;

fo_wrta_civ <= ( fo_wrta_ci3 &  fo_wrta_ci2  & fo_wrta_ci1 & NOT fo_wpn );
pre_fo_wrta <= fo_wrta xor fo_wrta_civ;

clkn <= NOT clk;
dffc_v(pre_fo_wrta,fo_rst,clkn,fo_wrta);
--      input        clr    clk      output



--      ------  input read counter   ---------------
--      EN_IN_RDC       - WHEN HIGH INCREMENT
--      IN_RST          - CLEAR

--inrda_proc: process
--
--variable inrda_temp : vlbit_1d(4 downto 0);
--
--begin
--
--    wait until (clk = '1');
--
--              if (IN_RST = '1') then
--              in_rda <= ZERO;
--
--              elsif ( EN_IN_RDC = '1') then
--
--              if ( in_rda = TERM_COUNT ) then -- only to keep VHDL happy
--                      in_rda <= ZERO;         -- not needed in final implementation
--
--              else
--                      inrda_temp := addum(in_rda, ONE);
```

```
fif_cnt.vhd         Wed Oct 28 16:26:18 1992        5

--                          in_rda  <= inrda_temp( 3 downto 0 );
--
--              end if;
--      else
--              in_rda  <= in_rda;
--
--      end if;
--
--
--end process;

--INPUT FIFO READ COUNTER
in_rda_ci1 <= in_rda(0) and en_in_rdc;
in_rda_ci2 <= in_rda_ci1 and in_rda(1);
in_rda_ci3 <= in_rda_ci2 and in_rda(2);

in_rda_civ <= ( in_rda_ci3 &  in_rda_ci2  & in_rda_ci1 & en_in_rdc);
pre_in_rda <= in_rda xor in_rda_civ;

dffc_v(pre_in_rda,in_rst,clk,in_rda);
--     input       clr    clk      output



--OUTPUT READ COUNTERS
--      - EFFECTIVELY INC ON OUTLEN UP IF LASTD
--      - ADDRESS TO FIFO CHANGES ON OUTLEN LOW
--
--
--            OUTLEN                                  /|
--           +------                          +---o< |+----OUTLEN
--           |                                |      \|
--           |                                |
--         +---+                            +---+
--         |CE |           ____             |CE |
--   +---->|   |---------->/    \ ifo_rda   |   |--+---->  (Fo_rda(3:0)
--   |     |reg|          | +1 |---------->|reg|   |
--   |     +---+           \_EN_/           +---+   |
--   |                       |                      |
--   |              enb_inc--+                      |
--   +----------------------------------------------+
--
--

-- The registers are clk by system clock with sync. clock enables

-- The incrementer:
```

```
fif_cnt.vhd        Wed Oct 28 16:26:18 1992        6

--
--rforda_proc: process (rfo_rda,fo_rd_inc)

-- variable rforda_temp : vlbit_vector(4 downto 0);

--begin

--      if (fo_rd_inc = '1') then
--
--              rforda_temp := addum(rfo_rda, ONE );
--      else
--              rforda_temp := addum(rfo_rda, ZERO);
--      end if;
--
--      ifo_rda  <=  rforda_temp( 3 downto 0 );


--end process;

--OUTPUT READ COUNTER INCREMENTER
rda_ci1 <= fo_rd_inc and rfo_rda(0);
rda_ci2 <= rda_ci1 and rfo_rda(1);
rda_ci3 <= rda_ci2 and rfo_rda(2);

rda_civ <= ( rda_ci3 & rda_ci2 & rda_ci1 & fo_rd_inc);

ifo_rda  <=  rfo_rda xor rda_civ;


-- **************** the old way with output latches *****************
-- the registers:
--dffc_v(fo_rda,fo_rst,outleni2,rfo_rda);
--   input   clk     output
-- the latches:
--dlatchc_v(ifo_rda,fo_rst,outleni,fo_rda);
--         input   clr    le     output

rforda_proc: process
        begin
        wait until CLK = '1';

        if (outlen = '0' AND fo_rst = '0') then
                fo_rda <= ifo_rda ;
                rfo_rda <= rfo_rda;
        elsif (outlen = '1' AND fo_rst = '0') then
                fo_rda <= fo_rda;
                rfo_rda <= fo_rda;
```

```
        elsif fo_rst = '1' then
                fo_rda <= b"0000";
        else
                fo_rda <= b"xxxx";
        end if;

end process;



-- the control signals:

-- increment enables:
FO_RD_INC <= LASTD AND XOUT;

-- latch resets:
fo_rst <= LDSLVAD OR NOT RN;


END rtl;
```

```
fif_in.vhd        Wed Oct 28 16:26:22 1992        1

-- filename: fif_in.abf
-- description: write clocks for crossbar input fifo
-- history: 5/22/92 ported from Bob's source to VHDL by trm
--
--
--
--    LCS 3 2 1     AD 21      WRITES          INC  DUP_LS_IN
--      --------     --        ---------       ---  ---------
--        0 0 0      00        0 0 0 1         16       0
--        0 0 1      01        0 0 1 0                  0
--        0 1 0      10        0 1 0 0                  0
--        0 1 1      11        1 0 0 0 I                0
--
--        1 0 0      00        0 0 1 1         32       1
--        1 1 0      10        1 1 0 0 I                1
--
--        1 0 1      00        1 1 1 1 I       64       1
--
--
ENTITY fif_in IS PORT (

-- inputs:
FDOUT, INCLK, LCS1,LCS2,LCS3 : IN VLBIT;

-- outputs:

WRT0_15N, WRT16_31N, WRT48_63N, WRT32_47N,
DUP_LS_IN, LASTDO : OUT VLBIT );

END fif_in;

ARCHITECTURE rtl OF fif_in IS

BEGIN

WRT0_15N <= NOT INCLK OR NOT (
            (NOT LCS3 AND LCS2 AND LCS1)        -- 16 BIT WRITE AND AD=11
          OR (LCS3 AND LCS2)            -- 32 BIT WRITE AND AD=10
          OR (LCS3 AND LCS1)            -- 64 BIT WRITE
                );

WRT16_31N <= NOT INCLK OR NOT (
           (NOT LCS3 AND LCS2 AND NOT LCS1)     -- 16 BIT WRITE AND AD=10
         OR (INCLK AND  LCS3 AND LCS2)  -- 32 BIT WRITE AND AD=10
         OR (INCLK AND  LCS3 AND LCS1)  -- 64 BIT WRITE
                );
```

fif_in.vhd Wed Oct 28 16:26:22 1992 2

```
WRT32_47N <= NOT INCLK  OR NOT (
            (NOT LCS3 AND NOT LCS2 AND LCS1)      -- 16 BIT WRITE AND AD=01
         OR (INCLK AND  LCS3 AND NOT LCS2)        -- 32 BIT WRITE AND AD=00
         OR (INCLK AND  LCS3 AND LCS1)  -- 64 BIT WRITE
                );

WRT48_63N <= NOT INCLK  OR NOT (
            (NOT LCS3 AND NOT LCS2 AND NOT LCS1) -- 16 BIT WRITE AND AD=00
         OR (INCLK AND  LCS3 AND NOT LCS2)       -- 32 BIT WRITE AND AD=00
         OR (INCLK AND  LCS3 AND LCS1)  -- 64 BIT WRITE
                );

DUP_LS_IN <= LCS3; -- Duplicate LS 16 BIT IN onto ms 16-bit into FIFO
                   -- now active low

-- needed to rename "out" to "fdout" in the next equation
-- since "out" is a reserved word in VHDL.

LASTDO <= (FDOUT AND LCS2);     -- FOR OUT FIFO COUNT

END rtl;
```

```
fifo16x16x2.vhd        Tue Oct 20 15:43:20 1992        1

-- filename: fifo16x16x2.vhd
-- description: A 16 deep fifo with 1 read pointer, 1 write pointer,
--              1 read clock and four write clocks. This fifo is a total
--              of 64 bits wide. The data comes in and goes out as two
--              32 bit busses. FWECLK3 writes bits 63:48. FWECLK0 writes 15:0.
--
--              The read pointer advances on the rising edge of RDCLK
--
-- history: 5/19/92 created by trm.
--      10/5/92 cek     created fifo16x16x2.vhd from fifo16x16x4.vhd

ENTITY fifo16x16x2 IS PORT (

FWECLK1, FWECLK0 : IN VLBIT;

RP, WP : IN VLBIT_VECTOR(3 downto 0); -- read and write pointer

DINM, DINL : IN VLBIT_VECTOR(15 downto 0);

DOUTM, DOUTL : OUT VLBIT_VECTOR(15 downto 0));

END fifo16x16x2;

ARCHITECTURE rtl OF fifo16x16x2 IS

SIGNAL fweclk1d, fweclk0d : vlbit;
SIGNAL dout1, dout0 : vlbit_vector(15 downto 0);

-- define a ram data type:

TYPE data_type IS ARRAY(15 downto 0) of vlbit; -- mem width 16 bits
TYPE data_array IS ARRAY(0 to 15) of data_type; -- mem depth 16 entries

BEGIN

fweclk1d <= fweclk1 after 5 ns;
fweclk0d <= fweclk0 after 5 ns;

-- The actual fifo processes. It wake up anytime input data, the read
-- pointer, or the write pulse changes

fifo_proc1: process(din1,rp,fweclk1d)

variable fifo1 : data_array; -- declare the fifo memory.

begin
```

```
fifo16x16x2.vhd          Tue Oct 20 15:43:20 1992          2

   if (fweclk1 = '0') then
        fifo1(v1d2int(wp)) := din1(31 downto 16);
   end if;

-- read this fifo:

dout1 <= fifo1(v1d2int(rp));

end process;

fifo_proc0: process(din1,rp,fweclk0d)

variable fifo0 : data_array; -- declare the fifo memory (MSW).

begin

   if (fweclk0 = '0') then
        fifo0(v1d2int(wp)) := din1(15 downto 0);
   end if;

-- read this fifo:

dout0 <= fifo0(v1d2int(rp));

end process;

-- build the MS output longword (D32):

doutm <= dout1;

-- build the LS output longword (D32):

doutl <= dout0;

END rtl;
```

```
fifo16x16x4.vhd        Wed Oct 21 13:33:22 1992        1

-- filename: fifo16x16x4.vhd
-- description: A 16 deep fifo with 1 read pointer, 1 write pointer,
--              1 read clock and four write clocks. This fifo is a total
--              of 64 bits wide. The data comes in and goes out as two
--              32 bit busses. FWECLK3 writes bits 63:48. FWECLK0 writes 15:0.
--
--              The read pointer advances on the rising edge of RDCLK
--
-- history: 5/19/92 created by trm.
--

ENTITY fifo16x16x4 IS PORT (

FWECLK3, FWECLK2, FWECLK1, FWECLK0 : IN VLBIT;

RP, WP : IN VLBIT_VECTOR(3 downto 0); -- read and write pointer

DINM, DINL : IN VLBIT_VECTOR(31 downto 0);

DOUTM, DOUTL : OUT VLBIT_VECTOR(31 downto 0));

END fifo16x16x4;

ARCHITECTURE rtl OF fifo16x16x4 IS

SIGNAL fweclk3d, fweclk2d, fweclk1d, fweclk0d : vlbit;
SIGNAL dout3, dout2, dout1, dout0 : vlbit_vector(15 downtc 0);

-- define a ram data type:

TYPE data_type IS ARRAY(15 downto 0) of vlbit; -- mem width 16 bits
TYPE data_array IS ARRAY(0 to 15) of data_type; -- mem depth 16 entries

BEGIN

fweclk3d <= fweclk3 after 5 ns;
fweclk2d <= fweclk2 after 5 ns;
fweclk1d <= fweclk1 after 5 ns;
fweclk0d <= fweclk0 after 5 ns;

-- The actual fifo processes. It wake up anytime input data, the read
-- pointer, or the write pulse changes

fifo_proc3: process(dinm,rp,fweclk3d)

variable fifo3 : data_array; -- declare the fifo memory (MSW).
```

```
fifo16x16x4.vhd         Wed Oct 21 13:33:22 1992         2

begin

   if (fweclk3 = '0') then
        fifo3(v1d2int(wp)) := dinm(31 downto 16);
   end if;

-- read this fifo:

dout3 <= fifo3(v1d2int(rp));

end process;

fifo_proc2: process(dinm,rp,fweclk2d)

variable fifo2 : data_array; -- declare the fifo memory.

begin

   if (fweclk2 = '0') then
        fifo2(v1d2int(wp)) := dinm(15 downto 0);
   end if;

-- read this fifo:

dout2 <= fifo2(v1d2int(rp));

end process;

fifo_proc1: process(dinl,rp,fweclk1d)

variable fifo1 : data_array; -- declare the fifo memory.

begin

   if (fweclk1 = '0') then
        fifo1(v1d2int(wp)) := dinl(31 downto 16);
   end if;

-- read this fifo:

dout1 <= fifo1(v1d2int(rp));

end process;

fifo_proc0: process(dinl,rp,fweclk0d)

variable fifo0 : data_array; -- declare the fifo memory (MSW).
```

fifo16x16x4.vhd Wed Oct 21 13:33:22 1992 3

```
begin

   if (fweclk0 = '0') then
        fifo0(v1d2int(wp)) := din1(15 downto 0);
   end if;

-- read this fifo:

dout0 <= fifo0(v1d2int(rp));

end process;

-- build the MS output longword (D32):

doutm <= dout3 & dout2;

-- build the LS output longword (D32):

doutl <= dout1 & dout0;

END rtl;
```

```
fifo32x16.vhd        Tue Oct 20 15:43:27 1992        1

-- filename: fifo32x16.vhd
-- description: a 32 bit wide x 16 deep fifo
-- history: 5/19/92 created by trm
--       5/10/92 cek     created fif32x16.vhd from fif32x16.vhd

LIBRARY synth;
USE synth.stdsynth.all;


ENTITY fifo32x16 IS PORT (

RP, WP : IN VLBIT_VECTOR(3 downto 0);--read pointer,write pointer
WRITE  : IN VLBIT;
DIN    : IN VLBIT_VECTOR(31 downto 0);
DOUT   : OUT VLBIT_VECTOR(31 downto 0));

END fifo32x16;

ARCHITECTURE rtl OF fifo32x16 IS

SIGNAL writed : vlbit;

TYPE data_type IS ARRAY(31 downto 0) of vlbit; --mem width 32 bits
TYPE data_array IS ARRAY(0 to 15) of data_type; --mem depth 16 entries

BEGIN

writed <= write after 5 ns;

fifo_proc: process(din,rp,writed)

variable ram : data_array; --define the fifo memory

begin

if (write = '0') then
   ram(v1d2int(wp)) := din;

end if;
-- read the data

 dout <= ram(v1d2int(rp));

end process;

END rtl;
```

```
fifo64x16.vhd          Wed Oct 21 13:33:23 1992        1

-- filename: fifo64x16.vhd
-- description: a 64 bit wide x 16 deep fifo
-- history: 5/19/92 created by trm

LIBRARY synth;
USE synth.stdsynth.all;


ENTITY fifo64x16 IS PORT (

RP, WP : IN VLBIT_VECTOR(3 downto 0);--read pointer,write pointer
WRITE  : IN VLBIT;
DIN    : IN VLBIT_VECTOR(63 downto 0);
DOUT   : OUT VLBIT_VECTOR(63 downto 0));

END fifo64x16;

ARCHITECTURE rtl OF fifo64x16 IS

SIGNAL writed : vlbit;

TYPE data_type IS ARRAY(63 downto 0) of vlbit; --mem width 32 bits
TYPE data_array IS ARRAY(0 to 15) of data_type; --mem depth 16 entries

BEGIN

writed <= write after 5 ns;

fifo_proc: process(din,rp,writed)

variable ram : data_array; --define the fifo memory

begin

if (write = '0') then
   ram(v1d2int(wp)) := din;

end if;
-- read the data

 dout <= ram(v1d2int(rp));

end process;

END rtl;
```

```
i2mux16.vhd          Wed Oct 21 13:33:23 1992          1

-- i2mux16
-- a 16 bit wide, 2:1 mux
-- 5/19/92 trm

LIBRARY synth;
USE synth.stdsynth.all;

ENTITY I2mux16 IS PORT(

A,B : IN VLBIT_VECTOR(15 DOWNTO 0);
S   : IN VLBIT;
Q : OUT VLBIT_VECTOR(15 DOWNTO 0)  := x"XXXX"
                    );

END I2mux16;

ARCHITECTURE rtl OF I2mux16 IS

BEGIN

PROC1: PROCESS (A,B,S)
BEGIN

      IF (s = '0') THEN
         Q <= B;
      ELSIF (s = '1') THEN
         Q <= A;
      ELSE
         Q <= x"XXXX";
      END IF;

END PROCESS;

END rtl;
```

i2mux32.vhd Wed Oct 21 13:33:23 1992 1

```
-- i2mux32
-- a 32 bit mux
-- 3/23/92 trm

LIBRARY synth;
USE synth.stdsynth.all;

ENTITY I2mux32 IS PORT(

AIN,BIN : IN VLBIT_VECTOR(31 DOWNTO 0);
SELB   : IN VLBIT;
DOUT : OUT VLBIT_VECTOR(31 DOWNTO 0) := x"XXXXXXXX"
                    );

END I2mux32;

ARCHITECTURE rtl OF I2mux32 IS

BEGIN

PROC1: PROCESS (AIN,BIN,SELB)
BEGIN

      IF (selb = '0') THEN
         DOUT <= BIN;
      ELSIF (selb = '1') THEN
         DOUT <= AIN;
      ELSE
         DOUT <= x"XXXXXXXX";
      END IF;

END PROCESS;

END rtl;
```

```
i3mux16.vhd         Wed Oct 21 13:33:24 1992         1

-- i3mux16
-- a 3 input 16 bit mux
-- 5/19/92 trm

LIBRARY synth;
USE synth.stdsynth.all;

ENTITY I3mux16 IS PORT(

AIN,BIN,CIN : IN VLBIT_VECTOR(15 DOWNTO 0);
SEL1,SEL0    : IN VLBIT;
DOUT : OUT VLBIT_VECTOR(15 DOWNTO 0)
                    );

END I3mux16;

ARCHITECTURE rtl OF I3mux16 IS

BEGIN

PROC1: PROCESS (AIN,BIN,CIN,SEL1,SEL0)
BEGIN

      IF (SEL1 = '0') THEN
         DOUT <= CIN;
      ELSIF (SEL1 = '1' AND SEL0 = '0') THEN
         DOUT <= BIN;
      ELSIF (SEL1 = '1' AND SEL0 = '1') THEN
         DOUT <= AIN;
      ELSE DOUT <= x"XXXX";

      END IF;

END PROCESS;

END rtl;
```

```
i3mux32.vhd        Wed Oct 21 13:33:24 1992        1

-- i3mux32
-- a 3 input 32 bit mux
-- 3/31/92 trm

LIBRARY synth;
USE synth.stdsynth.all;

ENTITY I3mux32 IS PORT(

AIN,BIN,CIN : IN VLBIT_VECTOR(31 DOWNTO 0);
SEL1,SEL0   : IN VLBIT;
DOUT : OUT VLBIT_VECTOR(31 DOWNTO 0)
                   );

END I3mux32;

ARCHITECTURE rtl OF I3mux32 IS

SIGNAL temp : vlbit_vector(31 downto 0) ;

BEGIN


temp <= BIN when (SEL1 = '1' ) else CIN ;

DOUT <= AIN when (SEL1 = '1' AND SEL0 = '1') else temp;


END rtl;
```

```
int_vec.vhd        Wed Oct 21 13:33:24 1992        1

-- int_vec
-- vme interupt vector register control
--
-- author: Tom Baillio
-- history: 8/11/92  created

LIBRARY synth;
USE synth.stdsynth.all;

ENTITY int_vec IS PORT(

SIGNAL EN_INT_VEC               : IN VLBIT;
SIGNAL OUTLEN                   : IN VLBIT;
SIGNAL MASTER                   : IN VLBIT;
SIGNAL EN_IVEC_LD               : OUT VLBIT;
SIGNAL SEL_IVEC                 : OUT VLBIT
                    );

END int_vec;

ARCHITECTURE rtl OF int_vec IS

  SIGNAL OUTLEND        : VLBIT;

BEGIN

en_ivec_ld  <= en_int_vec AND master AND  OUTLEN ;

sel_ivec  <= en_int_vec AND ( NOT master ) ;

END rtl;
```

```
lat32.vhd        Wed Oct 21 13:33:25 1992        1

-- lat32
-- a 32 bit latch with active high le
-- 3/23/92 trm

LIBRARY synth;
USE synth.stdsynth.all;

ENTITY lat32 IS PORT(

DIN : IN VLBIT_VECTOR(31 DOWNTO 0);
LE  : IN VLBIT;
DOUT : INOUT VLBIT_VECTOR(31 DOWNTO 0)
                    );

END lat32;

ARCHITECTURE rtl OF lat32 IS

BEGIN

        dlatch_v(DIN, LE, DOUT);

END rtl;
```

```
mas.vhd         Wed Oct 28 16:26:27 1992        1

-- filename: mas.abf
-- description: pbus master control signals
-- history: 5/22/92 ported Bob's source file to VHDL -- trm
--
--                MASTER.ABF
--
--LD_ROUTE        - GRAB ROUTE INFO FROM ADDRESS
--LD_PA           - LOAD ASIC TO P ADDRESS
--INC_PA                  - INCREMENT A TO P ADDRESS COUNTER
--
-- XB_REQ_P       - XB REQUEST OF PBUS USE XFREQ_O
--                        - ALREADY GATED THAT NOT A KILL FROM XBAR
--
LIBRARY synth;
USE synth.stdsynth.all;

ENTITY mas IS PORT (
-- inputs:

CLK, C20M, FRDYI, MASTER, XB_REQ_P,
OUTLEN, EN_AD_INC   : IN VLBIT;

-- outputs:
LD_ROUTE   : INOUT vlbit;
LD_PA , INC_PA            : OUT vlbit;
PASS_ROUTE        :       INOUT vlbit );

END mas;

ARCHITECTURE rtl OF mas IS

SIGNAL CHG_TO_AD, ROUTE_VALID, XB_REQ_PD : vlbit;
SIGNAL OUTLEND, OUTLENDD          : vlbit;
SIGNAL LD_ROUTE_D    :  vlbit;

BEGIN

dff (OUTLEN, CLK, OUTLEND);
dff (OUTLEND, CLK, OUTLENDD);

CHG_TO_AD <= C20M AND FRDYI AND XB_REQ_P AND XB_REQ_PD AND
                        NOT ROUTE_VALID AND MASTER ;

                -- FRDYI AND C20M    --> RDY
                -- FRDYI AND NOT C20M  --> DSEN
                -- FOR CE RQUESTING PBUS TO BE P/VME MASTER
                -- MUST MAKE SURE THIS READY IS FROM PBUS
```

```
mas.vhd         Wed Oct 28 16:26:27 1992        2

                 --      AND NOT BEING DRIVEN TO PBUS
                 --      inserting master should help

INC_PA <= MASTER AND OUTLEND AND NOT OUTLENDD AND EN_AD_INC;

internal_mas_proc: process begin

   wait until (clk = '1');

   XB_REQ_PD <= XB_REQ_P;

   LD_ROUTE <= CHG_TO_AD ;       -- GRAB FROM FOUT

   LD_ROUTE_D    <=  LD_ROUTE;   -- delay from LD_ROUTE to delay LD_PA

   ROUTE_VALID <=  CHG_TO_AD             -- MASTER
                OR (ROUTE_VALID AND XB_REQ_P);

                        -- PICK ON CHANGE_TO_AD READY FROM PBUS
                        -- HOLD AS LONG AS REQUEST TO P IS VALID

   LD_PA <= LD_ROUTE_D ;         -- GRAB FROM FOUT

   PASS_ROUTE <= NOT XB_REQ_P    -- ASSERT ON NO REQUEST
        OR (PASS_ROUTE AND NOT CHG_TO_AD);       -- HOLD TILL CHANGE

end process;

END rtl;
```

```
matchl.vhd        Mon Nov 23 09:15:42 1992        1

-- filename: MATCHL.ABF
-- description:
-- history: 5/19/92 created trm
--      10/5/92 cek     created matchl.abf from match.abf
--
-- GENERATE MATCHL SIGNAL WHEN PA MATCHES MATCH
-- COUNTER
-- NO MATCH IF CROSS A 2K BOUNARY
--
-- COUNTER :
--      - LOADS PA(11:2) ON LDSLVAD,
--              - INCS BY 32 BITS ON INC_MATCH_CNT
-- REGISTER
--      - LOADS  PA(31:11) ON LDSLVAD
--      - NOTICE BIT 11 APPEARS IN BOTH THIS GAURANTEES NO
--              MATCH ON INCREMENT THROUGH A 2K BOUNDARY
--
ENTITY matchl IS PORT(

--inputs:

CLK, LDSLVAD, INC_MATCH_CNT : IN VLBIT;
PAI : IN VLBIT_VECTOR(15 downto 2);

--outputs:

MATCHL_pin : OUT VLBIT;
-- timing optimization i/o
x_pmatch, x_ldslvadn, x_cp0, x_cp1 : inout vlbit;
x_mat_inc : inout vlbit_vector(11 downto 2);
x_pmatcnt : inout vlbit_vector(11 downto 2)
);

END matchl;

ARCHITECTURE rtl OF matchl IS

SIGNAL MATREG : vlbit_vector(15 downto 11);
SIGNAL matcnt : vlbit_vector(11 downto 2);
signal mat_civ : vlbit_vector(11 downto 2);
signal  ci3 ,ci4 ,ci5 ,ci6 ,ci7 ,ci8 ,ci9 ,ci10, ci11 :vlbit;

begin

-- match count incrementor - replaces addum in process matchl_proc

ci3 <= matcnt(2);
```

```
match1.vhd        Mon Nov 23 09:15:42 1992        2

ci4 <= ci3 and matcnt(3);
ci5 <= ci4 and matcnt(4);
x_cp0 <= ci5;
ci6 <= ci5 and matcnt(5);
ci7 <= ci6 and matcnt(6);
ci8 <= ci7 and matcnt(7);
x_cp1 <= matcnt(5) and matcnt(6) and matcnt(7);
ci9 <= x_cp0 and x_cp1 and matcnt(8);
ci10 <= ci9 and matcnt(9);
ci11 <= ci10 and matcnt(10);

mat_civ <= ( ci11 & ci10  & ci9  & ci8  & ci7  & ci6  & ci5  & ci4  & ci3  & b"1");
x_mat_inc <= matcnt(11 downto 2) xor mat_civ;

x_ldslvadn <= not ldslvad;


x_pmatcnt <=    x_mat_inc(11 downto 2) when (inc_match_cnt = '1')
                else matcnt; -- hold

match1_proc: process

begin

   wait until (clk = '1');

        if (x_ldslvadn = '0') then

                matcnt  <= pai(11 downto 2);
                matreg  <= pai(15 downto 11);

--      elsif (inc_match_cnt = '1') then
--
----            x_mat_inc := addum(matcnt(11 downto 2), b"1");
--
--              matcnt <= x_mat_inc(11 downto 2);
--              matreg <= matreg;
--
--      else
--
--              matcnt <= matcnt; -- hold
--              matreg <= matreg; -- hold
--
--      end if;

        else
```

```
matchl.vhd        Mon Nov 23 09:15:42 1992        3

                  matcnt <= x_pmatcnt;
                  matreg <= matreg; -- hold

          end if;

end process;

--
--        match = 1 if (( matcnt(11:2) = pai(11:2) ) and
--                                (matreg(31:11) := pai(31:11) ))
--
x_pmatch <=          (matreg(15) XOR pai(15))
                  OR (matreg(14) XOR pai(14))
                  OR (matreg(13) XOR pai(13))
                  OR (matreg(12) XOR pai(12))
                  OR (matreg(11) XOR pai(11))
                  OR (matcnt(11) XOR pai(11))
                  OR (matcnt(10) XOR pai(10))
                  OR (matcnt(9) XOR pai(9))
                  OR (matcnt(8) XOR pai(8))
                  OR (matcnt(7) XOR pai(7))
                  OR (matcnt(6) XOR pai(6))
                  OR (matcnt(5) XOR pai(5))
                  OR (matcnt(4) XOR pai(4))
                  OR (matcnt(3) XOR pai(3))
                  OR (matcnt(2) XOR pai(2))   ;
MATCHL_pin <= NOT (
             ( x_LDSLVADn AND x_pmatch )

             OR  (NOT x_LDSLVADn AND NOT pai(15) AND NOT pai(14) AND NOT pai(13) )

            );

end rtl;
```

```
matchm.vhd        Mon Nov 23 09:15:45 1992        1

-- filename: MATCHM.ABF
-- description:
-- history: 5/19/92 created trm
--       10/5/92 cek     created matchm.abf from match.abf
--
-- GENERATE MATCH SIGNAL WHEN PA MATCHES MATCH
-- COUNTER
-- NO MATCH IF CROSS A 2K BOUNARY
--
-- COUNTER :
--       - LOADS PA(11:2) ON LDSLVAD,
--               - INCS BY 32 BITS ON INC_MATCH_CNT
-- REGISTER
--       - LOADS  PA(31:11) ON LDSLVAD
--       - NOTICE BIT 11 APPEARS IN BOTH THIS GAURANTEES NO
--                MATCH ON INCREMENT THROUGH A 2K BOUNDARY
--
ENTITY matchm IS PORT(

--inputs:

CLK, LDSLVAD               : IN VLBIT;
PAI                        : IN VLBIT_VECTOR(31 downto 16);

--outputs:

MATCHM_pin : OUT VLBIT;
-- speed optimization i/o
x_pmatch, x_ldslvadn       : inout vlbit

);

END matchm;

ARCHITECTURE rtl OF matchm IS

SIGNAL matreg              : vlbit_vector(31 downto 16);

begin

x_ldslvadn <= NOT ldslvad;

match1_proc: process

begin
```

```
matchm.vhd        Mon Nov 23 09:15:45 1992        2

   wait until (clk = '1');

        if (x_ldslvadn = '0') then

                matreg  <= pai(31 downto 16);

        else

                matreg <= matreg; -- hold

        end if;

end process;

--
--      match = 1 if (( matcnt(11:2) = pai(11:2) ) and
--                              (matreg(31:11) := pai(31:11) ))
--
x_pmatch <=       (matreg(31) XOR pai(31))
                OR (matreg(30) XOR pai(30))
                OR (matreg(29) XOR pai(29))
                OR (matreg(28) XOR pai(28))
                OR (matreg(27) XOR pai(27))
                OR (matreg(26) XOR pai(26))
                OR (matreg(25) XOR pai(25))
                OR (matreg(24) XOR pai(24))
                OR (matreg(23) XOR pai(23))
                OR (matreg(22) XOR pai(22))
                OR (matreg(21) XOR pai(21))
                OR (matreg(20) XOR pai(20))
                OR (matreg(19) XOR pai(19))
                OR (matreg(18) XOR pai(18))
                OR (matreg(17) XOR pai(17))
                OR (matreg(16) XOR pai(16));

MATCHM_pin <= NOT (
             ( x_LDSLVADn AND x_pmatch )

             OR  (NOT x_LDSLVADn AND NOT pai(20) AND NOT pai(19) AND NOT pai(18) AND NOT pai(17)
                   AND NOT pai(16)
                 )
           );

end rtl;
```

matchm.vhd Mon Nov 23 09:15:45 1992 3

```
misc.vhd        Tue Nov  3 14:13:59 1992        1

-- filename: misc.abf
-- description: muxes control signals based on xbar configuration.
-- history: 5/22/92 ported from Bob's source file to VHDL by trm.
-- 10/13/92      cek     Replaced match input with matchl and matchm.
--                       The least and most significant word match lines.

ENTITY misc IS PORT (

--inputs:
ldslvad, b256, matchl, matchm, master, sixportn, edoe, fdoe, eriug, roeug,
oemasn_eug, eoerply_ug, estrobei, erdyi, edseni, oeatpan,
oeatpdn , adscycln : in vlbit;

-- outputs:
pd_e_oen, pa_f_oen, beri, roe, oemasn_e, eoerply, lcs1,
lcs2, lcs3, xout, pass_data : out vlbit;
mat_b256 : inout vlbit
);

END misc;

ARCHITECTURE rtl OF misc IS

        SIGNAL match    :       vlbit;

--   PIN SHARING
--      5PORT       6PORT
--
--      mat_b256 <= roe         port e request out
--      lcs1     <= estrobei
--      lcs2     <= erdyi
--      lcs3     <= edsen
--      xout     <= eri


begin
match    <= NOT (((NOT matchl OR NOT matchm) AND NOT ldslvad) OR (NOT matchl AND NOT matchm AND ldslvad));

mat_b256 <= b256        when (master = '1') else match;

pd_e_oen <= edoe       when (sixportn = '0') else oeatpdn;
pa_f_oen <= fdoe       when (sixportn = '0') else oeatpan;
beri     <= eriug      when (sixportn = '0') else '0';
roe      <= roeug      when (sixportn = '0') else mat_b256;
oemasn_e <= oemasn_eug when (sixportn = '0') else '1';
eoerply  <= eoerply_ug when (sixportn = '0') else '1';
lcs1     <= '0'        when (sixportn = '0') else estrobei;
```

```
misc.vhd          Tue Nov  3 14:13:59 1992        2

lcs2      <= '0'        when (sixportn = '0') else erdyi;
lcs3      <= '0'        when (sixportn = '0') else edseni;
xout      <= '0'        when (sixportn = '0') else eriug;


pass_data  <= NOT (master AND oeatpan AND NOT oeatpdn AND NOT adscycln);

        -- PASS_DATA is low during route and address phase of
        -- master transfer


END rtl;
```

```
msel.vhd        Wed Oct 21 13:35:07 1992        1


-- 5->6
--      - gate change to ad on c20m
--      - block grdy until


-- Title: MSEL
-- Desc:  Master port control logic for XBAR ASIC
-- Date:  April 1, 1992

entity MSEL is port(
--INS
CLK,  C20M, RI, RX, EX_KILL, DSEN_I, RDY_I, SLVOUT,
PK_SEL0, PK_SEL1, PK_SEL2,
ARI, BRI, CRI, DRI, ERI, FRI,
ASTROBEI,BSTROBEI,CSTROBEI,DSTROBEI,ESTROBEI,FSTROBEI,
A_KILL_ME,B_KILL_ME,C_KILL_ME,D_KILL_ME,E_KILL_ME,F_KILL_ME,
SSEL0, SSEL1, SSEL2, RESETN, RIG, CLR:                  in      vlbit;

--OUTS
RO, REQ_O,OE_RPLYN,
I_KILL_A,I_KILL_B,I_KILL_C,I_KILL_D,I_KILL_E,I_KILL_F,
MSEL0R, MSEL1R, MSEL2R,
DOEN, GREADY_I, SHIFT, KILL_RI:                          inout  vlbit;

DSELV:                                  out     vlbit_vector(2 downto 0);

OEMASN, GDSEN_I,STROBE_OUT,
CONA, CONB, CONC, COND, CONE, CONF:             out     vlbit);

--input signal description:
--RI - request in
--RX - request
--EX_KILL - External kill from downstream device
--DSEN - grant for data transfer
--SSEL - slave select logic
end MSEL;

architecture RTL of MSEL is

--internals

signal
SPLIT, NOSPLIT,
DSEL0,DSEL1,DSEL2,
```

```
msel.vhd        Wed Oct 21 13:35:07 1992        2

MSEL0, MSEL1, MSEL2,
HOLD_MSEL, CNG_TO_AD,
GREADY_ID2, GREADY_ID, NEQ,
PK_REQ_KILL, VALID_REQ, PK_REQ_O, REQ_KILL,
EN_I_KILL, SLV_KILL_ME, MAS_WANTS_ME,
SLVOUTD, SEL_MSEL,REQ_OD2, REQ_OD, RID:          vlbit;

--------------------------------------------------------------------------
-- KILLING - TO KILL A PORT, THAT PORT MUST KILL IT'S BUS
--                         MASTER WITH MULTIPLE XBAR LEVELS.
--                         THE KILL MUST BE PASSED ALL THE WAY BACK
--                         TO THE ORIGINAL MASTER.
--
-- EXAMPLES OF KILLING BUS A
--      BUS A IS MASTER OF BUS B
--              1) ANOTHER PORT WANTS B
--                      - B SEES NEQ AND ISSUES I_KILL_A , WHICH IS
--                        B_KILL_A AT A.
--                      - A SEES B_KILL_A  AND TRIES
--                              TO KILL BUS A
--              2) B'S REMOTE BUS DEVICE WANTS TO KILL THE XFER
--                      - EX_KILL IS GENERATED AT B'S REQUEST PAL
--                        CAUSING I_KILL_A, WHICH IS B_KILL_A AT A.
--                      - A SEES B_KILL_A  AND TRIES
--                              TO KILL BUS A
--              3) ANOTHER PORT WANTS A
--                      - MAS_WANTS_ME IS GENERATED AT A WHEN IT SEES
--                              PCKSEL <>0
--                      - A  TRIES TO KILL BUS A
--
--   THE FIRST TWO CASES SHOW A SLAVE TRYING TO KICK OFF IT"S MASTER< WHILE
--      THE THIRD CASE IS A MASTER SEEING THAT SOMONE OTHER THAN HIS SLAVE
--      WANTS HIM OFF
--
--      I_KILL_X         -
--              -  GENERATED TO KILL THE REMOTE PORT THAT IS MY
---                MASTER WHEN:
--                    1) MY REMOTE BUS IS TRYING TO KILL ME (EX_KILL)
--                    2) HIGHER PRIORITY PORT WANTS ME ( NEQ )
--
--      SLV_KILL_ME      - GENERATED WHEN ANYONE IS TRYING TO KILL ME
--                       - ONLY MY CURRENT SLAVES WILL GENERATE
--                       - THE OR OF ALL I_KILL_X INTO THIS PORT
--
--      EX_KILL - MY EXTERNAL BUS WANTS TO FREE UP MY PORT
--                       - COMES FROM MY PORT LOGIC
--
```

```
msel.vhd        Wed Oct 21 13:35:07 1992        3

--      MAS_WANTS_ME - GENERATED TO KILL MY EXTERNAL BUS
--                      BECAUSE  A HIGHER PRIORITY MASTER WANTS ME
--
--  FASTER KILLING WITH RIG
--      - IF DSEN IS NOT TO A MASTER PORT THEN THAT PORT CAN BE EFFECTIVELY
--      -       KILLED BY GATING OFF HIS RI, SO YOU DON'T HAVE TO WAIT FOR RI
--      -       TO DEASSERT.
--      - THE KILL MUST STILL PROPOGATE PACK TO THE MASTER
--  CONSIDER A KILL COMING IN TO PORT A
--      - KILL_EX IS GENERATED TO KILL MASTER OF A
--      -       RO FROM A DEASERTS WHEN THE OLD MASTER OF A PULLS OFF
--      -       OR HIS RI IS GATED OFF.


-------------------------------------------------------------------------


begin
--      *****************  KILLING REMOTE PORT  *****************
--      KILL THE PORT THAT IS THE MASTER OF ME
--              - A HIGHER PRIORITY PORT THAN MY MASTER WANTS ME (NEQ)
--              - MY EXTERNAL BUS WANTS TO GET IN (EX_KILL)

NEQ <=    (MSEL2R XOR PK_SEL2)  -- PK_SEL SAYS NEW MASTER
        OR (MSEL1R XOR PK_SEL1) -- WANTED GENERATE
        OR (MSEL0R XOR PK_SEL0);        -- EN_I_KILL

        -- NEQ: highest priority port NOT EQUAL to current port

EN_I_KILL <= REQ_O AND ( NEQ OR EX_KILL );

I_KILL_A <= EN_I_KILL AND  MSEL2R AND  MSEL1R AND  MSEL0R;
I_KILL_B <= EN_I_KILL AND  MSEL2R AND  MSEL1R AND NOT MSEL0R;
I_KILL_C <= EN_I_KILL AND  MSEL2R AND NOT MSEL1R AND  MSEL0R;
I_KILL_D <= EN_I_KILL AND  MSEL2R AND NOT MSEL1R AND NOT MSEL0R;
I_KILL_E <= EN_I_KILL AND NOT MSEL2R AND  MSEL1R AND  MSEL0R;
I_KILL_F <= EN_I_KILL AND NOT MSEL2R AND  MSEL1R AND NOT MSEL0R;

-- sinc i_kill is gated by both req_o and mselr you will never genrate a
--      kill erroneously, i_kill will end 1 cycle after

--      **************  KILLING MY EXTERNAL BUS   ********
-- I will try to kill my external bus port if I get a kill from one of the
--      slaves (x_kill_me) or a higher priority port wants me (kill_pw_me)
```

```
msel.vhd        Wed Oct 21 13:35:07 1992        4

SLV_KILL_ME <=RX AND ( A_KILL_ME OR B_KILL_ME OR C_KILL_ME OR D_KILL_ME OR E_KILL_ME
                OR F_KILL_ME );

MAS_WANTS_ME <=  ( PK_SEL2 OR PK_SEL1 OR PK_SEL0) AND RX;

        --AN ACTIVE PK_SEL WHILE I AM REQUESTING SOMEONE,
        --      MEANING SOME PORT WANTS ME AND IS OF HIGHER PRIORITY

KILL_RI <= NOT REQ_O AND(
           (NOT C20M AND SLV_KILL_ME)    -- KILL FROM SLAVE PORT
        OR  (NOT C20M AND MAS_WANTS_ME)          -- KILL, OTHER PORT WANTS ME
        OR  (NOT C20M AND CLR)           -- KILL, FROM PCKCOMP
        OR REQ_KILL      -- HOLD TILL RI DEASSERTS
                );

PK_REQ_KILL <= RI AND KILL_RI;

--      ***************  REQUEST EXTERNAL BUS ***************

VALID_REQ <=     -- MASTER POINTED TO BY MSEL IS REQUESTING
        ( (ARI AND  MSEL2 AND  MSEL1 AND  MSEL0)
        OR (BRI AND  MSEL2 AND  MSEL1 AND NOT MSEL0)
        OR (CRI AND  MSEL2 AND NOT MSEL1 AND  MSEL0)
        OR (DRI AND  MSEL2 AND NOT MSEL1 AND NOT MSEL0)
        OR (ERI AND NOT MSEL2 AND  MSEL1 AND  MSEL0)
        OR (FRI AND NOT MSEL2 AND  MSEL1 AND NOT MSEL0)  );

        -- VALID_REQ FROM 8:1 MUX CHECKING TO SEE THAT CURRENT
        -- MASTER STILL TIED IN , EQUIVELENT TO MCON
        -- CAUSES REQUEST OUT TO PORT


-- pick request output:
PK_REQ_O <=  VALID_REQ AND (
          (NOT C20M AND NOT RI AND NOT RID AND NOT REQ_KILL AND SHIFT)
                                          --ON VALID_REQUEST AND KILLING
        OR  REQ_O                -- HOLD ON VALID REQUEST
                        );

reqo_proc:process begin wait until CLK = '1';
        OEMASN   <= NOT RESETN OR NOT PK_REQ_O;
        REQ_O    <= PK_REQ_O;
        REQ_KILL <= PK_REQ_KILL ;
        RO       <= RESETN AND (PK_REQ_KILL OR PK_REQ_O);
        REQ_OD   <= REQ_O;
        RID     <= RI ;
        REQ_OD2 <= REQ_OD ;
```

```
msel.vhd        Wed Oct 21 13:35:07 1992        5

end process;

--      ***************  MSEL CONTOL     ***********************

HOLD_MSEL <= REQ_O OR C20M;    -- ONLY SAMPLE ON NOT C20M AND NOT REQ_O

MSEL0<= (NOT HOLD_MSEL AND PK_SEL0)
        OR (HOLD_MSEL AND MSEL0R);

MSEL1<= (NOT HOLD_MSEL AND PK_SEL1)
        OR (HOLD_MSEL AND MSEL1R);

MSEL2<= (NOT HOLD_MSEL AND PK_SEL2)
        OR (HOLD_MSEL AND MSEL2R);

msel_proc:process begin wait until CLK = '1';
        MSEL0R <= MSEL0 AND VALID_REQ ;
        MSEL1R <= MSEL1 AND VALID_REQ ;
        MSEL2R <= MSEL2 AND VALID_REQ ;
end process;


-- *********************************
--     SIGNALS AT BUS MASTER
-- ***********************************
-- GREADY IS RDY_I (READY IN) GATED SO THAT READY DOESN'T PASS UNTIL
-- AFTER GOT THE FIRST ONE THAT SETS SHIFT LOW

GDSEN_I <= REQ_O AND NOT SHIFT AND DSEN_I;      -- only pass on NOT shift and req_o

GREADY_I <= REQ_O AND NOT SHIFT AND RDY_I;      -- only pass on NOT shift and req_o

--CNG_TO_AD = Change to Address. route info is accepted from
--              target node and RDY is sent back. The sending msel
--              changes to address phase.

CNG_TO_AD <= RDY_I AND REQ_O AND REQ_OD AND SHIFT AND C20M;

OE_RPLYN <= REQ_OD2 OR REQ_OD OR REQ_O ;

mas_con_proc:process begin wait until CLK = '1';

        GREADY_ID <= (C20M AND GREADY_I AND REQ_O AND NOSPLIT)-- PICK ON 20M
              OR (NOT C20M AND GREADY_ID AND REQ_O );    -- 20M HOLD
```

```
msel.vhd        Wed Oct 21 13:35:07 1992        6

        GREADY_ID2 <=  GREADY_ID AND REQ_O;

        SLVOUTD <= RIG AND SLVOUT;       -- slvout from port pal picks with ready

        SHIFT <= NOT RESETN OR NOT  (
                  (SLVOUT AND RIG)
                OR (SLVOUTD AND RIG)           -- DON'T SHIFT ON SLAVE OUT
                OR (REQ_O AND CNG_TO_AD)
                OR (NOT SHIFT AND REQ_O )
                        );
                -- NORMALLY SAYS SHIFT ANTICIPATING BEING MASTER
                -- AS BUS MASTER GOES LOW ON CNG_TO_AD AND HOLDS ON REQ_O
                -- AS BUS SLAVE GOES LOW  to output data

        STROBE_OUT <= RESETN AND PK_REQ_O AND (
                  (ASTROBEI AND  MSEL2R AND  MSEL1R AND  MSEL0R )
                OR (BSTROBEI AND  MSEL2R AND  MSEL1R AND NOT MSEL0R )
                OR (CSTROBEI AND  MSEL2R AND NOT MSEL1R AND  MSEL0R )
                OR (DSTROBEI AND  MSEL2R AND NOT MSEL1R AND NOT MSEL0R )
                OR (ESTROBEI AND NOT MSEL2R AND  MSEL1R AND  MSEL0R )
                OR (FSTROBEI AND NOT MSEL2R AND  MSEL1R AND NOT MSEL0R )
                        );

        DOEN <= NOT (
              RESETN AND (
            (PK_REQ_O AND SHIFT)  -- PCK WITH REQUEST
          OR (PK_REQ_O AND NOT SHIFT AND NOT (C20M AND GREADY_I) AND NOT GREADY_ID AND NOT GREADY_ID2)
                                        -- DRIVE UNLESS READY or readyD
          OR (PK_REQ_O AND NOT SHIFT AND NOT NOSPLIT )
              OR (RIG AND SLVOUTD)      -- DRIVE FOR SLAVE
                )        );

        -- OUTPUT ENABLE TO DRIVE MASTER SIGNALS ACROSS BUS
                -- DRIVE WHEN MASTER OF EXTERNAL PORT AND NOT DOING A
                -- READ OR WHEN A SLAVE AND BEING READ

--      --------  handling split read  ------------------

    SPLIT <= (REQ_O AND GREADY_I AND C20M AND NOT NOSPLIT) -- pick on second rdy
          OR (RESETN AND SPLIT AND REQ_O);               -- hold till NOT REQO

    NOSPLIT <= (REQ_O AND NOT C20M AND GREADY_I AND NOT SPLIT) -- PICK ON FIRST DSEN
            OR (RESETN AND NOSPLIT AND REQ_O);     -- HOLD TILL DROP REQUEST OUT

end process;
```

```
msel.vhd        Wed Oct 21 13:35:07 1992        7


-- MASTER DEVICE
-- 20m --___---___---___---___---___---___---___---___---___---___---___---
-- REQ_O ___-------------------------------------------------___________
-- DOEN  ---_______________________________------------_____-----------
-- RDY_IN __________---__________________---____________________________
-- SHIFT ------------_____________________________________________--------
-- 20m --___---___---___---___---___---___---___---___---___---___---___---

-- SLAVE DEVICE
-- 20m __---___---___---___---___---___---___---___---___---___---___---
-- DOEN -------------------------------------------_________-----------------
-- SLVOUT ________________________________------____________________
-- SHIFT  ------------------------------------__________-------------
-- DSEL   -----------------------------< SSEL>-----------------

--      *************  DSEL CONTROL      *******************
--   DEFAULT IS MSEL
--       - MUST HOLD ROUTE INFO FROM REQ_O UNTIL SHIFT GOES LOW
--               SHIFT GOES LOW WHEN NEXT DEVICE HAS GRABBED
--               ROUTE
--       - CHOOSE SSEL IN RESPONSE TO SLVOUT
--       - DSEL=0 WILL HOLD DATA IN REGISTER


-- SEL_MSEL picks when just as master drives request or after shift low

SEL_MSEL <= NOT SLVOUTD AND (NOT REQ_O OR NOT SHIFT);

DSEL0 <=  (MSEL0 AND SEL_MSEL)
        OR (SSEL0 AND SLVOUTD );

DSEL1 <=  (MSEL1 AND SEL_MSEL)
        OR (SSEL1 AND SLVOUTD );

DSEL2 <=  (MSEL2 AND SEL_MSEL)
        OR (SSEL2 AND SLVOUTD );

DSELV <= ( DSEL2 & DSEL1 & DSEL0 );


--      ************    CONNECT CONTROL ******************
--      USED BY OTHER'S PORT REQUEST LOGIC TO GENERATE GRANT

CONA <= REQ_O AND  MSEL2R AND  MSEL1R AND  MSEL0R;
CONB <= REQ_O AND  MSEL2R AND  MSEL1R AND NOT MSEL0R;
```

```
msel.vhd        Wed Oct 21 13:35:07 1992        8

CONC <= REQ_O AND  MSEL2R AND NOT MSEL1R AND  MSEL0R;
COND <= REQ_O AND  MSEL2R AND NOT MSEL1R AND NOT MSEL0R;
CONE <= REQ_O AND NOT MSEL2R AND  MSEL1R AND  MSEL0R;
CONF <= REQ_O AND NOT MSEL2R AND  MSEL1R AND NOT MSEL0R;


-- cleanup
--          | , | , | , | , | , | , | , | , |
-- XRME ------------_______________
-- REQ_O  --------------_____________
-- CONX ----------------_______________
-- I_KILL -------------_______________
-- msel        master  | pcksel
-- mselr       master     |
--          | , | , | , | , | , | , | , | , |

--          | , | , | , | , | , | , | , | , |
-- XRME ----------------_______________
-- REQ_O  ------------------_____________
-- CONX --------------------_______________
-- I_KILL -----------------_______________
-- mselr       master     |
--          | , | , | , | , | , | , | , | , |


--      ************** THINGS TO WATCH OUT FOR  ***********
--
--      RI DEASSERT THEN REASSERT
--              - MUST ALLOW MSEL FROM PREVIOUS TO CLEAR
--              - COULD SEE VALID REQ DEASSERTED AND PREVENT IT
--                      FROM REPICKING FOR A CYCLE OR 2
--      NOT NOT  may want ari ect to be gated ari where gating insures that the
--              signal has been asserted for at least 2 cycles previous
end RTL;
```

```
mux81.vhd        Tue Dec 15 12:58:38 1992        1

--Title: MUX81
--Desc:  Muxltiplexer with 8 longword (32 bit) ins, 1 longword out
--Date:  April 7, 1992
-- 11/12/92 cek Inverted the polarity of SEL so that it can
--              drive an 8 to 1 mux directly.

entity MUX81 is port(
--INS
        AIN,BIN,CIN,DIN,EIN,FIN,GIN,HIN:IN      vlbit_vector(31 downto 0);
        SEL:                            IN      vlbit_vector(2 downto 0);

--OUTS
        DOUT:                           OUT     vlbit_vector(31 downto 0) );

end MUX81;

architecture behavior of MUX81 is

signal
        SELn:                           vlbit_vector(2 downto 0);
begin

        SELn <= not SEL;

        DOUT <= AIN when SELn = B"111" else
                BIN when SELn = B"110" else
                CIN when SELn = B"101" else
                DIN when SELn = B"100" else
                EIN when SELn = B"011" else
                FIN when SELn = B"010" else
                GIN when SELn = B"001" else
                HIN when SELn = B"000" else
                x"XXXXXXXX";

end behavior;
```

```
or16.vhd        Thu Sep 24 10:40:26 1992        1

-- or16
-- a 16 bit wide or gate withe the B inputs tied together
-- 9/2/92 cek   Created

LIBRARY synth;
USE synth.stdsynth.all;

ENTITY OR16 IS PORT(

A : IN VLBIT_VECTOR(15 DOWNTO 0);
B  : IN VLBIT;
Z : OUT VLBIT_VECTOR(15 DOWNTO 0) := x"XXXX"
                    );

END OR16;

ARCHITECTURE rtl OF OR16 IS

BEGIN

PROC1: PROCESS (A,B)
BEGIN

      IF (B = '0') THEN
         Z <= A;
      ELSIF (B = '1') THEN
         Z <= X"FFFF";
      ELSE
         Z <= x"XXXX";
      END IF;

END PROCESS;

END rtl;
```

```
pa21.vhd        Tue Nov  3 14:14:02 1992        1

-- filename: PA2L.ABF
-- description: Used in crossbar to store address info
--              for port E AND F when they are tied together
--              to drive a PBUS.
--
-- history:
--      5/18/92 created trm
--      7/17/92 TPB, shifted all route positions to left by 8-bits
--                      to accomidate maximum number of X-BAR crossings
--      ROUTE field now defined as:
--              [31:28] -       MS Address Bits
--              [27:26] -       VME/VSB/Local Select
--              [25:23] -       Slave Size
--              [22:21] -       A32/A24/A16
--              [  20 ] -       Privileged/Supevisory
--              [19:18] -       Spares
--              [17:03] -       15-port routing bits
--              [  02 ] -       Not Used
--              [  01 ] -       Read/Write
--              [  00 ] -       Locked
--
--      9/22/92 CEK, shifted all route positions to the right by 3-bits
--                      when loading into ROUTE or MSPA and on PAD
--                      during pass_route, because the VME logic will
--                      now see the E and F port prior to the route
--                      shift function.
--      10/1/92 cek  Created pa21.abf from pa2.abf when dividing the VME
--                      datapath into least significant word and most significant
--                      word slices.
ENTITY pa21 IS PORT (

-- INPUTS:

CLK, LD_PA, INC_PAX ,
RAM : IN VLBIT;
CPA : IN VLBIT_VECTOR(2 downto 0);
FO  : IN VLBIT_VECTOR(15 downto 0);

-- OUTPUTS:

PA  : INOUT VLBIT_VECTOR(15 downto 0);

B256 : OUT VLBIT;

--timing optimization i/o
x_incpa : INOUT vlbit_vector(10 downto 3)              -- to do inc'ing on pa
```

```
pa21.vhd        Tue Nov  3 14:14:02 1992        2

);

END pa21;

-- C20M          _--_--_--_--_--_--_--_--_--_--_--_--_--
-- FRDYI         ___--________________________________
-- CNG_TO_AD     ___--________________________________
-- LD_ROUTE      ______--_____________________________
-- PASS_ROUTE    -------______________________________
-- SHIFT         -------______________________________
-- LD_PA         __________--_________________________
-- LDSLVAD       _____________--______________________
-- PD[15:00]     <ROUTE>X<ADR>ZZZZZZZZZZZZZZZZZZZZ

ARCHITECTURE pla OF pa21 IS

SIGNAL RGPA : vlbit_vector(15 downto 11);            -- Upper PA address bits
SIGNAL CNTPA : vlbit_vector(10 downto 3);            -- Lower 2K-byte PA address counter
signal incpa_civ        : vlbit_vector(10 downto 3);
signal ci4 ,ci5 ,ci6 ,ci7 ,ci8 ,ci9 ,ci10 : vlbit;


-- CONSTANT ONE : vlbit_1d( 7 downto 0 ) := ('0','0','0','0','0','0','0','1');

BEGIN

-- Lower 2K-byte PA address counter incrementer
ci4 <= CNTPA(3);
ci5 <= ci4 and CNTPA(4);
ci6 <= ci5 and CNTPA(5);
ci7 <= ci6 and CNTPA(6);
ci8 <= ci7 and CNTPA(7);
ci9 <= ci8 and CNTPA(8);
ci10 <= ci9 and CNTPA(9);

incpa_civ <= ( ci10  & ci9  & ci8  & ci7  & ci6  & ci5  & ci4  & b"1");
x_incpa     <= incpa_civ xor CNTPA;

-- PA IS MASTER OUT ADDRESS
-- PAD CONTAINS THE ROUTE INFO TO SEND TO D PATH
--
-- SPECIAL STUFF
--       PA(0) OUT
--              - ALWAYS 0 FOR VSB
--              - SET TO 0 IF LWORD TRANSFER FOR VME
--              - SET TO PCON(0) FOR PROM INIT
```

```
pa21.vhd        Tue Nov  3 14:14:02 1992        3

--            - SET TO A(23) FOR PROM READ OR WRITE
--        ??ADDRESS IS SHIFTER UP WHEN READING OR WRITING RAM
--            - COULD HANDLE HERE FOR MASTER BUT NOT SLAVE
--
--   MASTER LS CONTROL
-- --------------------
--                                          PPP
--      B B B B B B B B   P P P P           AAA W W W W
--      0 1 2 3 4 5 6 7   3 2 1 0           210 0 1 2 3
--      ___________________________
--      1 1 1 1 1 1 1 0   0 0 0 0           000  0 0 0 1
--      1 1 1 1 1 1 0 1   0 0 0 1           001  0 0 1 0
--      1 1 1 1 1 0 1 1   0 0 1 0           010  0 1 0 0
--      1 1 1 1 0 1 1 1   0 0 1 1           011  1 0 0 0
--      1 1 1 0 1 1 1 1   0 1 0 0           100  0 0 0 1
--      1 1 0 1 1 1 1 1   0 1 0 1           101  0 0 1 0
--      1 0 1 1 1 1 1 1   0 1 1 0           110  0 1 0 0
--      0 1 1 1 1 1 1 1   0 1 1 1           111  1 0 0 0
--
--      1 1 1 1 1 1 0 0   1 0 0 0           000  0 0 1 1
--      1 1 1 1 0 0 1 1   1 0 1 0           010  1 1 0 0
--      1 1 0 0 1 1 1 1   1 1 0 0           100  0 0 1 1
--      0 0 1 1 1 1 1 1   1 1 1 0           110  1 1 0 0
--
--      1 1 1 1 0 0 0 0   1 0 0 1           000  1 1 1 1
--      0 0 0 0 1 1 1 1   1 1 0 1           100  1 1 1 1
--
--      0 0 0 0 0 0 0 0   1 0 1 1           000  1 1 1 1
--
-- ROUTE(27:25) - BUS SELECT                     27       26       23
-- PD BUS DURING ROUTE PHASE                     07       06       03
--                                               --       --       --
--                           PROM_INT             1        0        0
--                           PROM_RD              1        0        1
--                           RAM R/W              0        1        0
--                           MISC_MO              0        1        1
--.                          VME                  0        0        X
--                           VSB                  1        1        X
--
-- ROUTE(25:24) - SLAVE SIZE                     25       24
-- PD BUS DURING ROUTE PHASE                     05       04
--                                               --       --
--                           16                   0        0
--                           32                   0        1
--                           64                   1        X
--
--
```

```
pa21.vhd        Tue Nov  3 14:14:02 1992        4

B256 <= PA(7) AND PA(6) AND PA(5) AND PA(4) AND PA(3) AND PA(2);
        -- WATCH MAY WANT PA2 INCLUDED

PA_PROC: PROCESS

--variable incpa : vlbit_vector(11 downto 3); -- to do inc'ing on pa

BEGIN

WAIT UNTIL (clk = '1');


   IF (LD_PA = '1') THEN

        IF (RAM = '1') THEN
                RGPA(15 downto 13 ) <= FO(5 downto 3);  -- SHIFT-UP  upper RAM address bits
                RGPA(12 downto 11 ) <= b"00";
        ELSE
                RGPA <= FO(15 downto 11);        -- LOAD Upper PA address bits
        END IF;

        CNTPA <= FO(10 downto 3);                -- LOAD Lower PA address bits

   ELSE                         -- inc or holding stuff:

        RGPA <= RGPA; -- HOLD

        IF (INC_PAX = '1') THEN

--              INCPA := addum(CNTPA , ONE);
                CNTPA(10 downto 3)   <= X_INCPA(10 downto 3);

        ELSE
                CNTPA <= CNTPA; -- hold

        END IF;
   END IF;


END PROCESS;

-- build the final PA vector from all the parts:

PA <= RGPA ( 15 downto 11) & CNTPA(10 downto 3) & CPA;
```

```
END pla;
```

```
pa2m.vhd        Fri Oct 23 10:04:03 1992        1

-- filename: PA2M.ABF
-- description: Used in crossbar to store address info
--              for port E AND F when they are tied together
--              to drive a PBUS.
--
-- history:
--      5/18/92 created trm
--      7/17/92 TPB, shifted all route positions to left by 8-bits
--                      to accomidate maximum number of X-BAR crossings
--      ROUTE field now defined as:
--              [31:28] -       MS Address Bits
--              [27:26] -       VME/VSB/Local Select
--              [25:23] -       Slave Size
--              [22:21] -       A32/A24/A16
--              [  20 ] -       Privileged/Supevisory
--              [19:18] -       Spares
--              [17:03] -       15-port routing bits
--              [  02 ] -       Not Used
--              [  01 ] -       Read/Write
--              [  00 ] -       Locked
--
--      9/22/92 CEK, shifted all route positions to the right by 3-bits
--                      when loading into ROUTE or MSPA and on PAD
--                      during pass_route, because the VME logic will
--                      now see the E and F port prior to the route
--                      shift function.
--      10/1/92 cek  Created pa2m.abf from pa2.abf when dividing the VME
--                      datapath into least significant word and most significant
--                      word slices.
--      10/20/92 cek    Shifted all route positions to the left by
--                      3-bits when loading into ROUTE or MSPA and on
--                      PAD during pass_route, because the VME logic
--                      will now capture the route data after it is
--                      shifted bye the previous crossbar.
--

ENTITY pa2m IS PORT (

-- INPUTS:

CLK, LD_PA, LD_ROUTE, INC_PA , pass_route : IN VLBIT;
FOM   : IN VLBIT_VECTOR(31 downto 16);
FOL   : IN VLBIT_VECTOR(15 downto 0);

-- OUTPUTS:

PA   : OUT VLBIT_VECTOR(31 downto 16);
```

```
pa2m.vhd        Fri Oct 23 10:04:03 1992        2

PAD : OUT VLBIT_VECTOR(15 downto 0);

INC_PAX , RAM : INOUT VLBIT;

CPA : OUT VLBIT_VECTOR(2 downto 0)
);

END pa2m;


-- C20M          -__--__--__--__--__--__--__--__--__--__--__--__--
-- FRDYI         ____--________________________________________
-- CNG_TO_AD     ____--________________________________________
-- LD_ROUTE      ______--______________________________________
-- PASS_ROUTE    -------_______________________________________
-- SHIFT         -------_______________________________________
-- LD_PA         __________--__________________________________
-- LDSLVAD       ____________--________________________________
-- PD[15:00]     <ROUTE>X<ADR>ZZZZZZZZZZZZZZZZZZZZ

ARCHITECTURE pla OF pa2m IS

SIGNAL vsb, vme, prom_init, prom_rd, p3, p2, p1,
       p0, pcon_gt_16, cpa2, cpa1, cpa0,
       ss_eq_16, ss_eq_32, ss_eq_64, inc_pa1,
       inc_pa2 : vlbit;

SIGNAL MSPA : vlbit_vector(31 downto 28);          -- MS Address bits
SIGNAL route : vlbit_vector(27 downto 23);         -- VME/VSB , Slave size
SIGNAL RGPA : vlbit_vector(27 downto 16);          -- Upper PA address bits


BEGIN

-- PA IS MASTER OUT ADDRESS
-- PAD CONTAINS THE ROUTE INFO TO SEND TO D PATH
--
-- SPECIAL STUFF
--      PA(0) OUT
--              - ALWAYS 0 FOR VSB
--              - SET TO 0 IF LWORD TRANSFER FOR VME
--              - SET TO PCON(0) FOR PROM INIT
--              - SET TO A(23) FOR PROM READ OR WRITE
--      ??ADDRESS IS SHIFTER UP WHEN READING OR WRITING RAM
--              - COULD HANDLE HERE FOR MASTER BUT NOT SLAVE
--
```

```
pa2m.vhd        Fri Oct 23 10:04:03 1992        3

--   MASTER LS CONTROL
-- ---------------------
--                                                PPP
--        B B B B B B B B   P P P P             AAA W W W W
--        0 1 2 3 4 5 6 7   3 2 1 0             210 0 1 2 3
--
--        1 1 1 1 1 1 1 0   0 0 0 0             000  0 0 0 1
--        1 1 1 1 1 1 0 1   0 0 0 1             001  0 0 1 0
--        1 1 1 1 1 0 1 1   0 0 1 0             010  0 1 0 0
--        1 1 1 1 0 1 1 1   0 0 1 1             011  1 0 0 0
--        1 1 1 0 1 1 1 1   0 1 0 0             100  0 0 0 1
--        1 1 0 1 1 1 1 1   0 1 0 1             101  0 0 1 0
--        1 0 1 1 1 1 1 1   0 1 1 0             110  0 1 0 0
--        0 1 1 1 1 1 1 1   0 1 1 1             111  1 0 0 0
--
--        1 1 1 1 1 1 0 0   1 0 0 0             000  0 0 1 1
--        1 1 1 1 0 0 1 1   1 0 1 0             010  1 1 0 0
--        1 1 0 0 1 1 1 1   1 1 0 0             100  0 0 1 1
--        0 0 1 1 1 1 1 1   1 1 1 0             110  1 1 0 0
--
--        1 1 1 1 0 0 0 0   1 0 0 1             000  1 1 1 1
--        0 0 0 0 1 1 1 1   1 1 0 1             100  1 1 1 1
--
--        0 0 0 0 0 0 0 0   1 0 1 1             000  1 1 1 1
--
-- ROUTE(27:25) - BUS SELECT                          27       26       23
-- PD BUS DURING ROUTE PHASE                          07       06       03
--                                                    --       --       --
--                                  PROM_INT          1        0        0
--                                  PROM_RD           1        0        1
--                                  RAM R/W           0        1        0
--                                  MISC_MO           0        1        1
--.                                 VME               0        0        X
--                                  VSB               1        1        X
--
-- ROUTE(25:24) - SLAVE SIZE                          25       24
-- PD BUS DURING ROUTE PHASE                          05       04
--                                                    --       --
--                                  16                0        0
--                                  32                0        1
--                                  64                1        X
--
--
VSB         <= ( ROUTE(27) AND  ROUTE(26));
VME         <= (NOT ROUTE(27) AND NOT ROUTE(26));
PROM_INIT <= (ROUTE(27) AND NOT ROUTE(26) AND NOT ROUTE(23));
PROM_RD     <= (ROUTE(27) AND NOT ROUTE(26) AND ROUTE(23));
```

```
pa2m.vhd        Fri Oct 23 10:04:03 1992        4

RAM       <= (NOT ROUTE(27) AND ROUTE(26) AND NOT ROUTE(23));
CPA       <= CPA2 & CPA1 & CPA0;

P3 <= FOM(31);
P2 <= FOM(30);
P1 <= FOM(29);
P0 <= FOM(28);

-- PCON_EQ_32 <=  (P3 AND NOT P1 AND P0);        -- PCON SET FOR 32
PCON_GT_16 <=  (P3 AND P0);      -- PCON SET FOR 32 OR 64

SS_EQ_16 <= (NOT ROUTE(25) AND NOT ROUTE(24));  -- SLAVE SIZE  32 OR 64
SS_EQ_32 <= (NOT ROUTE(25) AND  ROUTE(24));     -- SLAVE SIZE  32
SS_EQ_64 <=   ROUTE(25);                   -- SLAVE SIZE  64

-- NOT NOT    NOTE INCREMENT IS A FUNCTION OF SLAVE SIZE ONLY

INC_PA1 <= (INC_PA AND SS_EQ_16);         -- INC FOR SSIZE=16 OR 8


INC_PA2 <= INC_PA AND (
           (SS_EQ_16 AND CPA1)  -- INC FOR SSIZE=16 OR 8
         OR (INC_PA AND SS_EQ_32)                 -- INC FOR SSIZE=32
               );

INC_PAX <= INC_PA AND (
           ( SS_EQ_16 AND CPA2 AND CPA1) -- INC FOR SSIZE=16 OR 8
         OR ( SS_EQ_32 AND CPA2)            -- INC FOR SSIZE=32
         OR ( SS_EQ_64)             -- INC FOR SSIZE=64
               );


PA_PROC: PROCESS

BEGIN

WAIT UNTIL (clk = '1');

   IF (LD_ROUTE = '1') THEN
        ROUTE <= FOM(27 downto 23);      -- LOAD VME/VSB, AM's and Slave size from route
        MSPA  <= FOM(31 downto 28);      -- LOAD MS address FROM ROUTE


   ELSE
        ROUTE <= ROUTE;          -- HOLD
        MSPA  <= MSPA;           -- HOLD
```

```
pa2m.vhd        Fri Oct 23 10:04:03 1992        5

    END IF;

    IF (LD_PA = '1') THEN

        IF (RAM = '1') THEN
                RGPA(27 downto 16 ) <= FOM(17 downto 16) & FOL(15 downto 6); -- SHIFT-UP  upper RAM address bits
                MSPA(29 downto 28 ) <= FOM(19 downto 18);
        ELSE
                RGPA <= FOM(27 downto 16);      -- LOAD Upper PA address bits
        END IF;

    ELSE                            -- inc or holding stuff:

        RGPA <= RGPA; -- HOLD

    END IF;

    CPA0 <= (

          (LD_PA AND VME AND NOT (PCON_GT_16 AND NOT SS_EQ_16)) -- ON VME LWORDN
        OR (LD_PA AND PROM_INIT AND P0)         -- ON PROM_INIT USE P0
        OR (LD_PA AND PROM_RD AND FOM(23))      -- ON PROM RD USE F(23)
        OR (NOT LD_PA AND CPA0)                 -- HOLD ON NON-LOAD, DON'T COUNT
             );

    CPA1 <= (
          (LD_PA AND VME AND NOT PCON_GT_16 AND P1) -- ON NOT >16 USE P1
        OR (LD_PA AND PROM_INIT AND P1)    -- ON PROM_INIT USE P1
        OR (LD_PA AND PROM_RD AND FOM(24)) -- ON PROM RD USE F(24) ADDRESS BIT
        OR (NOT LD_PA AND INC_PA1 AND NOT CPA1) -- TOGGLE ON INCREMENT
        OR (NOT LD_PA AND NOT INC_PA1 AND CPA1) -- HOLD
             );

    CPA2 <= (
          (LD_PA AND (VME OR VSB) AND  P2) -- P2=0 ON 64-bit
        OR (LD_PA AND PROM_INIT AND P2)    -- ON PROM USE P2
        OR (LD_PA AND PROM_RD AND FOM(25))  -- ON PROM RD USE F(25)
        OR (NOT LD_PA AND INC_PA2 AND NOT CPA2) -- TOGGLE ON INCREMENT
        OR (NOT LD_PA AND NOT INC_PA2 AND CPA2) -- HOLD
          );

END PROCESS;

-- build the final PA vector from all the parts:
```

```
pa2m.vhd        Fri Oct 23 10:04:03 1992        6

PA <= MSPA(31 downto 28) & RGPA ( 27 downto 16);

PAD <=          FOM(19 downto 16) & FOL(15 downto 12 ) & FOM(27 downto 20)  when ( pass_route = '1' )
--              filler (not used) & VME/VSB, SLVSZ, AM's
--      Note FO(19,18) are spare bits, FO(17 downto 12) may contain port routing info

        else
                FOM(27 downto 18) & FOM(31 downto 28) & FOL(1 downto 0)     ;
--               repeat ms bits  &      pcon        & lock and r/w

END pla;
```

```
pckcomp.vhd        Wed Oct 21 13:35:19 1992        1

-- with extra controls on arbitration
--      - if fair doesn't work,want e to loose on a tie
--              - in 5 port don,t care what e does
--              - in 6 port have lots of free signals
--      - on NOT fair may want to hold agtb on aactive, ect
--              -no reason not to do it

--Title:        PCKCOMP
--Desc:         Priority comparison for use with PCKSEL logic
--Date:         March 27,1992

LIBRARY synth;
USE synth.stdsynth.all;

--module I/O
entity PCKCOMP is
        port(
                CLK:                    IN      vlbit;
                C20M:                   IN      vlbit;
                FAIR:                   IN      vlbit;
                ENKILL:                 IN      vlbit;
                SSELENA,SSELENB:        IN      vlbit;
                SSELENC,SSELEND:        IN      vlbit;
                SSELENE,SSELENF:        IN      vlbit;
                AD01,AD02:              IN      vlbit;
                BD01,BD02:              IN      vlbit;
                CD01,CD02:              IN      vlbit;
                DD01,DD02:              IN      vlbit;
                ED01,ED02:              IN      vlbit;
                FD01,FD02:              IN      vlbit;
                FMSEL0,FMSEL1,FMSEL2:   IN      vlbit;
                ARX, BRX, CRX, DRX:     IN      vlbit;
                ARB, ARC, ARD, ARE, ARF :       IN      vlbit;
                BRA, BRC, BRD, BRE, BRF :       IN      vlbit;
                CRA, CRB, CRD, CRE, CRF :       IN      vlbit;
                DRA, DRB, DRC, DRE, DRF :       IN      vlbit;
                ERA, ERB, ERC, ERD      :       IN      vlbit;
                FRA, FRB, FRC, FRD      :       IN      vlbit;
                A_ACTIVE, B_ACTIVE, C_ACTIVE, D_ACTIVE: IN      vlbit;
                BROADA, BROADB, BROADC, BROADD: IN      vlbit;

                CLR_A,CLR_B,CLR_C,CLR_D :       INOUT   vlbit;
                AGTB,AGTC,AGTD,AGTE,AGTF:       INOUT   vlbit;
                BGTA,BGTC,BGTD,BGTE,BGTF:       INOUT   vlbit;
                CGTA,CGTB,CGTD,CGTE,CGTF:       INOUT   vlbit;
```

```
                DGTA,DGTB,DGTC,DGTE,DGTF:       INOUT   vlbit;
                EGTA,EGTB,EGTC,EGTD,EGTF:       INOUT   vlbit;
                FGTA,FGTB,FGTC,FGTD,FGTE:       INOUT   vlbit);
end PCKCOMP;

architecture behavioral of PCKCOMP is

--internal signals
SIGNAL  iad,ibd,icd,idd,ied,ifd:                vlbit_vector(1 downto 0);
SIGNAL  iap,ibp,icp,idp,iep,ifp:                vlbit_vector(1 downto 0);
SIGNAL  avec,bvec,cvec,dvec,evec,fvec:          vlbit_vector(1 downto 0);
SIGNAL  fsel:                                   vlbit_vector(2 downto 0);
SIGNAL  killai, killao ,killap, killas:  VLBIT;
SIGNAL  killbi, killbo ,killbp, killbs:  VLBIT;
SIGNAL  killci, killco ,killcp, killcs:  VLBIT;
SIGNAL  killdi, killdo ,killdp, killds:  VLBIT;
SIGNAL        aeqb, aeqc ,aeqd, aeqe  : VLBIT;
SIGNAL  beqa,       beqc ,beqd, beqe  : VLBIT;
SIGNAL  ceqa, ceqb,       ceqd, ceqe  : VLBIT;
SIGNAL  deqa, deqb, deqc      , deqe  : VLBIT;
SIGNAL  ABTB, ABTC, ABTD, BBTC, BBTD, CBTD  : VLBIT;
SIGNAL  ABTE, BBTE, CBTE, DBTE  : VLBIT;
SIGNAL  ABTBD, ABTCD, ABTDD, BBTCD, BBTDD, CBTDD  : VLBIT;


begin
-------------------------------------------------------------------------------
--INPUT REGISTER

--vectorize input address for ease of use
        avec <= (AD02 & AD01);
        bvec <= (BD02 & BD01);
        cvec <= (CD02 & CD01);
        dvec <= (DD02 & DD01);
        evec <= (ED02 & ED01);
        fvec <= (FD02 & FD01);

        FSEL <= (FMSEL2 & FMSEL1 & FMSEL0);

--feedback mux for register load enable (input enable is active high)
        iad <= avec when SSELENA = '1' else iap;
        ibd <= bvec when SSELENB = '1' else ibp;
        icd <= cvec when SSELENC = '1' else icp;
        idd <= dvec when SSELEND = '1' else idp;
        ied <= evec when SSELENE = '1' else iep;
        ifd <= fvec when SSELENF = '1' else ifp;
```

```
pckcomp.vhd        Wed Oct 21 13:35:19 1992        3

------------------------------------------------------------------------------

-- killo - kill stuck outgoing
--       - if requesting e or f and requested by pier at same level
-- killi - kill stuck incoming - if accessing a port accessed by e or f
-- killp - kill if accessing an active pier node


killAo <= (Arf OR Are) AND NOT A_active AND (   -- stuck going out non bcast
                 (Aeqb AND brA)                 -- if somone wants you
               OR (Aeqc AND crA)
               OR (Aeqd AND drA));

killBo <= (Brf OR Bre) AND NOT B_active AND (           -- stuck going out
                 (Beqa AND arB)
               OR (Beqc AND crB)
               OR (Beqd AND drB));

killCo <= (Crf OR Cre) AND NOT C_active AND (           -- stuck going out
                 (Ceqa AND arC)
               OR (Ceqb AND brC)
               OR (Ceqd AND drC));

killDo <= (Drf OR Dre) AND NOT D_active AND (           -- stuck going out
                 (Deqa AND arD)
               OR (Deqb AND brD)
               OR (Deqc AND crD));

--      kill on e or f have your slave

killAi <= (Arb AND (crA OR drA ) AND ((erb AND egtA) OR (frb AND fgtA)))
       OR (Arc AND (brA OR drA ) AND ((erc AND egtA) OR (frc AND fgtA)))
       OR (Ard AND (brA OR crA ) AND ((erd AND egtA) OR (frd AND fgtA)));

killBi <= (Bra AND (crB OR drB ) AND ((era AND egtB) OR (fra AND fgtB)))
       OR (Brc AND (arB OR drB ) AND ((erc AND egtB) OR (frc AND fgtB)))
       OR (Brd AND (arB OR crB ) AND ((erd AND egtB) OR (frd AND fgtB)));

killCi <= (Cra AND (brC OR drC ) AND ((era AND egtC) OR (fra AND fgtC)))
       OR (Crb AND (arC OR drC ) AND ((erb AND egtC) OR (frb AND fgtC)))
       OR (Crd AND (arC OR brC ) AND ((erd AND egtC) OR (frd AND fgtC)));

killDi <= (Dra AND (brD OR crD ) AND ((era AND egtD) OR (fra AND fgtD)))
       OR (Drb AND (arD OR crD ) AND ((erb AND egtD) OR (frb AND fgtD)))
       OR (Drc AND (arD OR brD ) AND ((erc AND egtD) OR (frc AND fgtD)));
```

```
pckcomp.vhd          Wed Oct 21 13:35:19 1992          4

killAp <= (Arb AND bgtA AND b_active AND ( cra OR dra ))              -- active pier
       OR (Arc AND cgtA AND c_active AND ( bra OR dra ))
       OR (Ard AND dgtA AND d_active AND ( bra OR cra ));

killBp <= (Bra AND agtB AND a_active AND ( crb OR drb))          -- active pier
       OR (Brc AND cgtB AND c_active AND ( arb OR drb))
       OR (Brd AND dgtB AND d_active AND ( arb OR crb));

killCp <= (Cra AND agtC AND a_active AND ( brc OR drc))          -- active pier
       OR (Crb AND bgtC AND b_active AND ( arc OR drc))
       OR (Crd AND dgtC AND d_active AND ( arc OR brc));

killDp <= (Dra AND agtD AND a_active AND ( brd OR crd))          -- active pier
       OR (Drb AND bgtD AND b_active AND ( ard OR crd))
       OR (Drc AND cgtD AND c_active AND ( ard OR brd));


killAs <= (Arb AND crb AND c_active AND cgtA AND drA)
       OR (Arb AND drb AND d_active AND dgtA AND crA)
       OR (Arc AND brc AND b_active AND bgtA AND drA)
       OR (Arc AND drc AND d_active AND dgtA AND brA)
       OR (Ard AND brd AND b_active AND bgtA AND crA)
       OR (Ard AND crd AND c_active AND cgtA AND brA);

killBs <= (Bra AND cra AND c_active AND cgtB AND drB)
       OR (Bra AND dra AND d_active AND dgtB AND crB)
       OR (Brc AND arc AND a_active AND agtB AND drB)
       OR (Brc AND drc AND d_active AND dgtB AND arB)
       OR (Brd AND ard AND a_active AND agtB AND crB)
       OR (Brd AND crd AND c_active AND cgtB AND arB);

killCs <= (Cra AND bra AND b_active AND bgtC AND drC)
       OR (Cra AND dra AND d_active AND dgtC AND brC)
       OR (Crb AND arb AND a_active AND agtC AND drC)
       OR (Crb AND drb AND d_active AND dgtC AND arC)
       OR (Crd AND ard AND a_active AND agtC AND brC)
       OR (Crd AND brd AND b_active AND bgtC AND arC);

killDs <= (Dra AND bra AND b_active AND bgtD AND crD)
       OR (Dra AND cra AND c_active AND cgtD AND brD)
       OR (Drb AND arb AND a_active AND agtD AND crD)
       OR (Drb AND crb AND c_active AND cgtD AND arD)
       OR (Drc AND arc AND a_active AND agtD AND brD)
       OR (Drc AND brc AND b_active AND bgtD AND arD);
```

```
pckcomp.vhd        Wed Oct 21 13:35:19 1992        5

-- kill a pier is not necessary if fairness is used since if the port
--      is active then it also must have been first
--      - can heelp if fairness is not used since won't kil active

clr_A <= enkill AND NOT broada AND (killAo OR killAi OR killAp OR killAs) ;
clr_B <= enkill AND NOT broadb AND (killBo OR killBi OR killBp OR killBs) ;
clr_C <= enkill AND NOT broadc AND (killCo OR killCi OR killCp OR killCs) ;
clr_D <= enkill AND NOT broadd AND (killDo OR killDi OR killDp OR killDs) ;


--      ------------ EQUAL TO ---------------------------------

AEQB <= '1' when (iap = ibp) else '0';
AEQC <= '1' when (iap = icp) else '0';
AEQD <= '1' when (iap = idp) else '0';
AEQE <= '1' when (iap = iep) else '0';

BEQA <= AEQB;
BEQC <= '1' when (ibp = icp) else '0';
BEQD <= '1' when (ibp = idp) else '0';
BEQE <= '1' when (ibp = iep) else '0';

CEQA <= AEQC;
CEQB <= BEQC;
CEQD <= '1' when (icp = idp) else '0';
CEQE <= '1' when (icp = iep) else '0';

DEQA <= AEQD;
DEQB <= BEQD;
DEQC <= CEQD;
DEQE <= '1' when (idp = iep) else '0';

--      ----------- GREATER THANS --------------------------------


ABTB <= '1' when (iap > ibp) else '0';
ABTC <= '1' when (iap > icp) else '0';
ABTD <= '1' when (iap > idp) else '0';
ABTE <= '1' when (iap > iep) else '0';

BBTC <= '1' when (ibp > icp) else '0';
BBTD <= '1' when (ibp > idp) else '0';
BBTE <= '1' when (ibp > iep) else '0';

CBTD <= '1' when (icp > idp) else '0';
```

```
pckcomp.vhd        Wed Oct 21 13:35:19 1992        6

CBTE <= '1' when (icp > iep) else '0';

DBTE <= '1' when (idp > iep) else '0';

AGTB <= ARX AND (
        ( NOT BRX)                    -- if a request and not B
      OR ( ABTB )                     -- if bigger
      OR ( ABTBD AND AEQB AND fair));    -- hold on a tie

AGTC <= ARX AND (
        ( NOT CRX)                            -- if a request and not C
      OR ( ABTC )                     -- if bigger
      OR ( ABTCD AND AEQC AND fair));    -- hold on a tie

AGTD <= ARX AND (
        ( NOT DRX)                            -- if a request and not D
      OR ( ABTD )                     -- if bigger
      OR ( ABTDD AND AEQD AND fair));    -- hold on a tie

BGTC <= BRX AND (
        ( NOT CRX)                            -- if a request and not C
      OR ( BBTC )                     -- if bigger
      OR ( BBTCD AND BEQC AND fair));    -- hold on a tie

BGTD <= BRX AND (
        ( NOT DRX)                            -- if a request and not D
      OR ( BBTD )                     -- if bigger
      OR ( BBTDD AND BEQD AND fair));    -- hold on a tie

CGTD <= CRX AND (
        ( NOT DRX)                            -- if a request and not D
      OR ( CBTD )                     -- if bigger
      OR ( CBTDD AND CEQD AND fair));    -- hold on a tie

-- e wins ties unless port is master of f

AGTE <= ABTE
--    OR (AEQE AND ELOOSE)
      OR (FAIR AND AEQE AND FMSEL2 AND  FMSEL1 AND  FMSEL0);

BGTE <= BBTE
--    OR (BEQB AND ELOOSE)
      OR (FAIR AND BEQE AND FMSEL2 AND  FMSEL1 AND NOT FMSEL0);

CGTE <= CBTE
--    OR (CEQE AND ELOOSE)
      OR (FAIR AND CEQE AND FMSEL2 AND NOT FMSEL1 AND  FMSEL0);
```

```
pckcomp.vhd          Wed Oct 21 13:35:19 1992        7

DGTE <= DBTE
--      OR (DEQE AND ELOOSE)
        OR (FAIR AND DEQE AND FMSEL2 AND NOT FMSEL1 AND NOT FMSEL0);


AGTF <= '1' when iap > ifp else '0'; -- f wins ties as default
BGTF <= '1' when ibp > ifp else '0';
CGTF <= '1' when icp > ifp else '0';
DGTF <= '1' when idp > ifp else '0';
EGTF <= '1' when iep > ifp else '0';

BGTA  <= NOT AGTB;
CGTA  <= NOT AGTC;
DGTA  <= NOT AGTD;
EGTA  <= NOT AGTE;
FGTA  <= NOT AGTF;
CGTB  <= NOT BGTC;
DGTB  <= NOT BGTD;
EGTB  <= NOT BGTE;
FGTB  <= NOT BGTF;
DGTC  <= NOT CGTD;
EGTC  <= NOT CGTE;
FGTC  <= NOT CGTF;
EGTD  <= NOT DGTE;
FGTD  <= NOT DGTF;
FGTE  <= NOT EGTF;


before_proc: process begin wait until clk = '1';

        iap <= iad;
        ibp <= ibd;
        icp <= icd;
        idp <= idd;
        iep <= ied;
        ifp <= ifd;

        ABTBD <= (NOT C20M AND AGTB)
                OR ( C20M AND ABTBD);
        ABTCD <= (NOT C20M AND AGTC)
                OR ( C20M AND ABTCD);
        ABTDD <= (NOT C20M AND AGTD)
                OR ( C20M AND ABTDD);
```

```
        BBTCD <= (NOT C20M AND BGTC)
                OR ( C20M AND BBTCD);
        BBTDD <= (NOT C20M AND BGTD)
                OR ( C20M AND BBTDD);

        CBTDD <= (NOT C20M AND CGTD)
                OR ( C20M AND CBTDD);

end process;

end behavioral;
```

```
pcksela.vhd        Wed Oct 21 13:35:23 1992        1

--Title:        PCKSELA
--Desc:         Priority control for port A (master)
--Date:         March 27,1992

LIBRARY synth;
USE synth.stdsynth.all;

--module I/O
entity PCKSELA is
        port(
                ARX:                            IN      vlbit;
                  --ARX = A is master of another port.

                ARA,BRA,CRA,DRA,ERA,FRA:        IN      vlbit;
                  -- ARB = port A requests port B for transfer.

                AGTB,AGTC,AGTD,AGTE,AGTF:       IN      vlbit;
                         BGTC,BGTD,BGTE,BGTF:       IN          vlbit;
                                  CGTD,CGTE,CGTF:       IN      vlbit;
                                           DGTE,DGTF:       IN          vlbit;
                                                    EGTF:       IN          vlbit;

                  -- AGTB = port A has higher priority over port B.

                PCKSEL0,PCKSEL1,PCKSEL2:        OUT     vlbit
                  --decoded master of this port (port A).

        );
end PCKSELA;

architecture RTL of PCKSELA is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                                     vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port A

begin
```

pcksela.vhd    Wed Oct 21 13:35:23 1992    2

```
-- Port decoding:
--       A        1 1 1
--       B        1 1 0
--       C        1 0 1
--       D        1 0 0
--       E        0 1 1
--       F        0 1 0
--       mas      0 0 0

-----------------------------------------------------------------------------
--PCKSEL0 is active only if priority of (A,C,E) > (B,D,F)
--PCKSEL1 is active only if priority of (A,B,E,F) > (C,D)
--PCKSEL2 is active only if priority of (A,B,C,D) > (E,F)
-----------------------------------------------------------------------------
PCKSEL0  <= (CRA AND CWA AND CWB AND CWD AND CWF)              --C request A
          OR (ERA AND EWA AND EWB AND EWD AND EWF);            --E request A

PCKSEL1  <= (BRA AND BWA AND BWC AND BWD)              --B request A
          OR (ERA AND EWA AND EWC AND EWD)             --E request A
          OR (FRA AND FWA AND FWC AND FWD);            --F request A

PCKSEL2  <= (BRA AND BWA AND BWE AND BWF )             --B request A
          OR (CRA AND CWA AND CWE AND CWF )            --C request A
          OR (DRA AND DWA AND DWE AND DWF );           --D request A
-----------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
EGTC <= NOT CGTE;
FGTC <= NOT CGTF;

EGTD <= NOT DGTE;
FGTD <= NOT DGTF;

FGTE <= NOT EGTF;

BWA <= NOT ARX OR BGTA;
BWC <= NOT CRA OR BGTC;
```

```
pcksela.vhd        Wed Oct 21 13:35:23 1992        3

BWD <= NOT DRA OR BGTD;
BWE <= NOT ERA OR BGTE;
BWF <= NOT FRA OR BGTF;

CWA <= NOT ARX OR CGTA;
CWB <= NOT BRA OR CGTB;
CWD <= NOT DRA OR CGTD;
CWE <= NOT ERA OR CGTE;
CWF <= NOT FRA OR CGTF;

DWA <= NOT ARX OR DGTA;
DWB <= NOT BRA OR DGTB;
DWC <= NOT CRA OR DGTC;
DWE <= NOT ERA OR DGTE;
DWF <= NOT FRA OR DGTF;

EWA <= NOT ARX OR EGTA;
EWB <= NOT BRA OR EGTB;
EWC <= NOT CRA OR EGTC;
EWD <= NOT DRA OR EGTD;
EWF <= NOT FRA OR EGTF;

FWA <= NOT ARX OR FGTA;
FWB <= NOT BRA OR FGTB;
FWC <= NOT CRA OR FGTC;
FWD <= NOT DRA OR FGTD;
FWE <= NOT ERA OR FGTE;
------------------------------------------------------------------------------
end RTL;
```

```
pckselb.vhd        Wed Oct 21 13:35:28 1992        1

--Title:        PCKSELB
--Desc:         Priority control for port B (master)
--Date:         March 27,1992

LIBRARY synth;
USE synth.stdsynth.all;

--module I/O
entity PCKSELB is
        port(
                BRX:                            IN      vlbit;
                  --BRX = B is master of another port.

                ARB,BRB,CRB,DRB,ERB,FRB:        IN      vlbit;
                  -- ARB = port A requests port B for transfer.

                AGTB,AGTC,AGTD,AGTE,AGTF:       IN      vlbit;
                         BGTC,BGTD,BGTE,BGTF:       IN      vlbit;
                                  CGTD,CGTE,CGTF:     IN      vlbit;
                                           DGTE,DGTF:     IN      vlbit;
                                                        EGTF:     IN      vlbit;

                  -- AGTB = port A has higher priority over port B.

                PCKSEL0,PCKSEL1,PCKSEL2:        OUT     vlbit
                  --decoded master of this port (port B).

        );
end PCKSELB;

architecture RTL of PCKSELB is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                                 vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port B

begin
```

```
pckselb.vhd        Wed Oct 21 13:35:28 1992        2

-- Port decoding:
--       A        1 1 1
--       B        1 1 0
--       C        1 0 1
--       D        1 0 0
--       E        0 1 1
--       F        0 1 0
--       mas      0 0 0

--------------------------------------------------------------------------------
--PCKSEL0 is active only if priority of (A,C,E) > (B,D,F) or B not master
--PCKSEL1 is active only if priority of (A,B,E,F) > (C,D) or B not master
--PCKSEL2 is active only if priority of (A,B,C,D) > (E,F) or B not master
--------------------------------------------------------------------------------
PCKSEL0  <= (ARB AND AWB AND AWD AND AWF)               --A request B
          OR (CRB AND CWB AND CWD AND CWF)              --C request B
          OR (ERB AND EWB AND EWD AND EWF);             --E request B

PCKSEL1  <= (ARB AND AWB AND AWC AND AWD)               --A request B
          OR (ERB AND EWB AND EWC AND EWD)              --E request B
          OR (FRB AND FWB AND FWC AND FWD);             --F request B

PCKSEL2  <= (ARB AND AWB AND AWE AND AWF )              --A request B
          OR (CRB AND CWB AND CWE AND CWF )             --C request B
          OR (DRB AND DWB AND DWE AND DWF );            --D request B
--------------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
EGTC <= NOT CGTE;
FGTC <= NOT CGTF;

EGTD <= NOT DGTE;
FGTD <= NOT DGTF;

FGTE <= NOT EGTF;

AWB <= NOT BRX OR AGTB;
```

```
pckselb.vhd        Wed Oct 21 13:35:28 1992        3

AWC <= NOT CRB OR AGTC;
AWD <= NOT DRB OR AGTD;
AWE <= NOT ERB OR AGTE;
AWF <= NOT FRB OR AGTF;

CWA <= NOT ARB OR CGTA;
CWB <= NOT BRX OR CGTB;
CWD <= NOT DRB OR CGTD;
CWE <= NOT ERB OR CGTE;
CWF <= NOT FRB OR CGTF;

DWA <= NOT ARB OR DGTA;
DWB <= NOT BRX OR DGTB;
DWC <= NOT CRB OR DGTC;
DWE <= NOT ERB OR DGTE;
DWF <= NOT FRB OR DGTF;

EWA <= NOT ARB OR EGTA;
EWB <= NOT BRX OR EGTB;
EWC <= NOT CRB OR EGTC;
EWD <= NOT DRB OR EGTD;
EWF <= NOT FRB OR EGTF;

FWA <= NOT ARB OR FGTA;
FWB <= NOT BRX OR FGTB;
FWC <= NOT CRB OR FGTC;
FWD <= NOT DRB OR FGTD;
FWE <= NOT ERB OR FGTE;
--------------------------------------------------------------------------------
end RTL;
```

```
pckselc.vhd        Wed Oct 21 13:35:30 1992        1

--Title:        PCKSELC
--Desc:         Priority control for port C (master)
--Date:         March 27,1992

LIBRARY synth;
USE synth.stdsynth.all;

--module I/O
entity PCKSELC is
        port(
                CRX:                            IN      vlbit;
                  --CRX = C is master of another port.

                ARC,BRC,CRC,DRC,ERC,FRC:        IN      vlbit;
                  -- ARB = port A requests port B for transfer.

                AGTB,AGTC,AGTD,AGTE,AGTF:       IN      vlbit;
                         BGTC,BGTD,BGTE,BGTF:       IN          vlbit;
                                  CGTD,CGTE,CGTF:       IN      vlbit;
                                           DGTE,DGTF:       IN          vlbit;
                                                        EGTF:       IN          vlbit;

                  -- AGTB = port A has higher priority over port B.

                PCKSEL0,PCKSEL1,PCKSEL2:        OUT     vlbit
                  --decoded master of this port (port C).

        );
end PCKSELC;

architecture RTL of PCKSELC is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                                        vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port C

begin
```

```
pckselc.vhd        Wed Oct 21 13:35:30 1992        2

-- Port decoding:
--      A       1 1 1
--      B       1 1 0
--      C       1 0 1
--      D       1 0 0
--      E       0 1 1
--      F       0 1 0
--      mas     0 0 0

------------------------------------------------------------------------------
--PCKSEL0 is active only if priority of (A,C,E) > (B,D,F)
--PCKSEL1 is active only if priority of (A,B,E,F) > (C,D)
--PCKSEL2 is active only if priority of (A,B,C,D) > (E,F)
------------------------------------------------------------------------------
PCKSEL0  <= (ARC AND AWB AND AWC AND AWD AND AWF)         --A request C
          OR (ERC AND EWB AND EWC AND EWD AND EWF);       --E request C

PCKSEL1  <= (ARC AND AWC AND AWD)                         --A request C
          OR (BRC AND BWC AND BWD)                        --B request C
          OR (ERC AND EWC AND EWD)                        --E request C
          OR (FRC AND FWC AND FWD);                       --F request C

PCKSEL2  <= (ARC AND AWC AND AWE AND AWF )                --A request C
          OR (BRC AND BWC AND BWE AND BWF )               --B request C
          OR (DRC AND DWC AND DWE AND DWF );              --D request C
------------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
EGTC <= NOT CGTE;
FGTC <= NOT CGTF;

EGTD <= NOT DGTE;
FGTD <= NOT DGTF;

FGTE <= NOT EGTF;

AWB <= NOT BRC OR AGTB;
```

```
pckselc.vhd          Wed Oct 21 13:35:30 1992          3

AWC <= NOT CRX OR AGTC;
AWD <= NOT DRC OR AGTD;
AWE <= NOT ERC OR AGTE;
AWF <= NOT FRC OR AGTF;

BWA <= NOT ARC OR BGTA;
BWC <= NOT CRX OR BGTC;
BWD <= NOT DRC OR BGTD;
BWE <= NOT ERC OR BGTE;
BWF <= NOT FRC OR BGTF;

DWA <= NOT ARC OR DGTA;
DWB <= NOT BRC OR DGTB;
DWC <= NOT CRX OR DGTC;
DWE <= NOT ERC OR DGTE;
DWF <= NOT FRC OR DGTF;

EWA <= NOT ARC OR EGTA;
EWB <= NOT BRC OR EGTB;
EWC <= NOT CRX OR EGTC;
EWD <= NOT DRC OR EGTD;
EWF <= NOT FRC OR EGTF;

FWA <= NOT ARC OR FGTA;
FWB <= NOT BRC OR FGTB;
FWC <= NOT CRX OR FGTC;
FWD <= NOT DRC OR FGTD;
FWE <= NOT ERC OR FGTE;
--------------------------------------------------------------------------------
end RTL;
```

```
pckseld.vhd        Wed Oct 21 13:35:32 1992        1

--Title:        PCKSELD
--Desc:         Priority control for port D (master)
--Date:         March 27,1992

LIBRARY synth;
USE synth.stdsynth.all;

--module I/O
entity PCKSELD is
        port(
                DRX:                            IN      vlbit;
                  --DRX = D is master of another port.

                ARD,BRD,CRD,DRD,ERD,FRD:        IN      vlbit;
                  -- ARB = port A requests port B for transfer.

                AGTB,AGTC,AGTD,AGTE,AGTF:       IN      vlbit;
                         BGTC,BGTD,BGTE,BGTF:       IN          vlbit;
                                  CGTD,CGTE,CGTF:       IN      vlbit;
                                           DGTE,DGTF:       IN          vlbit;
                                                        EGTF:       IN          vlbit;

                  -- AGTB = port A has higher priority over port B.

                PCKSEL0,PCKSEL1,PCKSEL2:        OUT     vlbit
                  --decoded master of this port (port D).

        );
end PCKSELD;

architecture RTL of PCKSELD is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                                vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port D

begin
```

```
pckseld.vhd          Wed Oct 21 13:35:32 1992        2

-- Port decoding:
--       A        1 1 1
--       B        1 1 0
--       C        1 0 1
--       D        1 0 0
--       E        0 1 1
--       F        0 1 0
--       mas      0 0 0

-------------------------------------------------------------------------------
--PCKSEL0 is active only if priority of (A,C,E) > (B,D,F)
--PCKSEL1 is active only if priority of (A,B,E,F) > (C,D)
--PCKSEL2 is active only if priority of (A,B,C,D) > (E,F)
-------------------------------------------------------------------------------
PCKSEL0  <= (ARD AND AWB AND AWD AND AWF)              --A request D
         OR (CRD AND CWB AND CWD AND CWF)              --C request D
         OR (ERD AND EWB AND EWD AND EWF);             --E request D

PCKSEL1  <= (ARD AND AWC AND AWD)                      --A request D
         OR (BRD AND BWC AND BWD)                      --B request D
         OR (ERD AND EWC AND EWD)                      --E request D
         OR (FRD AND FWC AND FWD);                     --F request D

PCKSEL2  <= (ARD AND AWD AND AWE AND AWF )             --A request D
         OR (BRD AND BWD AND BWE AND BWF )             --B request D
         OR (CRD AND CWD AND CWE AND CWF );            --C request D
-------------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
EGTC <= NOT CGTE;
FGTC <= NOT CGTF;

EGTD <= NOT DGTE;
FGTD <= NOT DGTF;

FGTE <= NOT EGTF;
```

```
AWB <= NOT BRD OR AGTB;
AWC <= NOT CRD OR AGTC;
AWD <= NOT DRX OR AGTD;
AWE <= NOT ERD OR AGTE;
AWF <= NOT FRD OR AGTF;

BWA <= NOT ARD OR BGTA;
BWC <= NOT CRD OR BGTC;
BWD <= NOT DRX OR BGTD;
BWE <= NOT ERD OR BGTE;
BWF <= NOT FRD OR BGTF;

CWA <= NOT ARD OR CGTA;
CWB <= NOT BRD OR CGTB;
CWD <= NOT DRX OR CGTD;
CWE <= NOT ERD OR CGTE;
CWF <= NOT FRD OR CGTF;

EWA <= NOT ARD OR EGTA;
EWB <= NOT BRD OR EGTB;
EWC <= NOT CRD OR EGTC;
EWD <= NOT DRX OR EGTD;
EWF <= NOT FRD OR EGTF;

FWA <= NOT ARD OR FGTA;
FWB <= NOT BRD OR FGTB;
FWC <= NOT CRD OR FGTC;
FWD <= NOT DRX OR FGTD;
FWE <= NOT ERD OR FGTE;
---------------------------------------------------------------------------
end RTL;
```

```
pcksele.vhd        Wed Oct 21 13:35:35 1992        1

--Title:        PCKSELE
--Desc:         Priority control for port E (master)
--Date:         March 27,1992

LIBRARY synth;
USE synth.stdsynth.all;

--module I/O
entity PCKSELE is
        port(
                ERX:                            IN      vlbit;
                  --ERX = E is master of another port.

                ARE,BRE,CRE,DRE,ERE,FRE:        IN      vlbit;
                  -- ARB = port A requests port B for transfer.

                AGTB,AGTC,AGTD,AGTE,AGTF:       IN      vlbit;
                        BGTC,BGTD,BGTE,BGTF:        IN          vlbit;
                                CGTD,CGTE,CGTF:         IN      vlbit;
                                        DGTE,DGTF:          IN          vlbit;
                                                EGTF:           IN          vlbit;

                  -- AGTB = port A has higher priority over port B.

                E_PCKA, E_PCKB, E_PCKC, E_PCKD,
                PCKSEL0,PCKSEL1,PCKSEL2:        INOUT   vlbit
                  --decoded master of this port (port E).

        );
end PCKSELE;

architecture RTL of PCKSELE is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                                vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port E
```

```
pcksele.vhd        Wed Oct 21 13:35:35 1992        2

begin

-- Port decoding:
--       A       1 1 1
--       B       1 1 0
--       C       1 0 1
--       D       1 0 0
--       E       0 1 1
--       F       0 1 0
--       mas     0 0 0

-----------------------------------------------------------------------------
--PCKSEL0 is active only if priority of (A,C,E) > (B,D,F)
--PCKSEL1 is active only if priority of (A,B,E,F) > (C,D)
--PCKSEL2 is active only if priority of (A,B,C,D) > (E,F)
-----------------------------------------------------------------------------
PCKSEL0  <= (ARE AND AWB AND AWD AND AWE AND AWF)        --A request E
          OR (CRE AND CWB AND CWD AND CWE AND CWF);      --C request E

PCKSEL1  <= (ARE AND AWE AND AWC AND AWD)                --A request E
          OR (BRE AND BWE AND BWC AND BWD)               --B request E
          OR (FRE AND FWE AND FWC AND FWD);              --F request E

PCKSEL2  <= (ARE AND AWE AND AWF )                       --A request E
          OR (BRE AND BWE AND BWF )                      --B request E
          OR (CRE AND CWE AND CWF )                      --C request E
          OR (DRE AND DWE AND DWF );                     --D request E

E_PCKA <= PCKSEL2 AND  PCKSEL1 AND  PCKSEL0 ;
E_PCKB <= PCKSEL2 AND  PCKSEL1 AND NOT PCKSEL0 ;
E_PCKC <= PCKSEL2 AND NOT PCKSEL1 AND  PCKSEL0 ;
E_PCKD <= PCKSEL2 AND NOT PCKSEL1 AND NOT PCKSEL0 ;

-----------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
EGTC <= NOT CGTE;
```

```
pcksele.vhd        Wed Oct 21 13:35:35 1992        3

FGTC <= NOT CGTF;

EGTD <= NOT DGTE;
FGTD <= NOT DGTF;

FGTE <= NOT EGTF;

AWB <= NOT BRE OR AGTB;
AWC <= NOT CRE OR AGTC;
AWD <= NOT DRE OR AGTD;
AWE <= NOT ERX OR AGTE;
AWF <= NOT FRE OR AGTF;

BWA <= NOT ARE OR BGTA;
BWC <= NOT CRE OR BGTC;
BWD <= NOT DRE OR BGTD;
BWE <= NOT ERX OR BGTE;
BWF <= NOT FRE OR BGTF;

CWA <= NOT ARE OR CGTA;
CWB <= NOT BRE OR CGTB;
CWD <= NOT DRE OR CGTD;
CWE <= NOT ERX OR CGTE;
CWF <= NOT FRE OR CGTF;

DWA <= NOT ARE OR DGTA;
DWB <= NOT BRE OR DGTB;
DWC <= NOT CRE OR DGTC;
DWE <= NOT ERX OR DGTE;
DWF <= NOT FRE OR DGTF;

FWA <= NOT ARE OR FGTA;
FWB <= NOT BRE OR FGTB;
FWC <= NOT CRE OR FGTC;
FWD <= NOT DRE OR FGTD;
FWE <= NOT ERX OR FGTE;
--------------------------------------------------------------------------------
end RTL;
```

```
pckself.vhd        Wed Oct 21 13:35:37 1992        1

--Title:        PCKSELF
--Desc:         Priority control for port F (master)
--Date:         March 27,1992

LIBRARY synth;
USE synth.stdsynth.all;

--module I/O
entity PCKSELF is
        port(
                FRX:                            IN      vlbit;
                  --FRX = F is master of another port.

                ARF,BRF,CRF,DRF,ERF,FRF:        IN      vlbit;
                  -- ARB = port A requests port B for transfer.

                AGTB,AGTC,AGTD,AGTE,AGTF:       IN      vlbit;
                         BGTC,BGTD,BGTE,BGTF:       IN      vlbit;
                                  CGTD,CGTE,CGTF:       IN      vlbit;
                                           DGTE,DGTF:       IN      vlbit;
                                                    EGTF:       IN      vlbit;

                  -- AGTB = port A has higher priority over port B.

                F_PCKA, F_PCKB, F_PCKC, F_PCKD,
                PCKSEL0,PCKSEL1,PCKSEL2:        INOUT   vlbit
                  --decoded master of this port (port F).

        );
end PCKSELF;

architecture RTL of PCKSELF is

--internal signals

SIGNAL BGTA,CGTA,CGTB,DGTA,DGTB,DGTC,EGTA,EGTB,EGTC,EGTD:       vlbit;
SIGNAL FGTA,FGTB,FGTC,FGTD,FGTE:                                vlbit;

SIGNAL  AWA,AWB,AWC,AWD,AWE,AWF:                vlbit;
SIGNAL  BWA,BWB,BWC,BWD,BWE,BWF:                vlbit;
SIGNAL  CWA,CWB,CWC,CWD,CWE,CWF:                vlbit;
SIGNAL  DWA,DWB,DWC,DWD,DWE,DWF:                vlbit;
SIGNAL  EWA,EWB,EWC,EWD,EWE,EWF:                vlbit;
SIGNAL  FWA,FWB,FWC,FWD,FWE,FWF:                vlbit;
  --AWC = A wins over C for port F
```

```
pckself.vhd        Wed Oct 21 13:35:37 1992        2

begin

-- Port decoding:
--       A        1 1 1
--       B        1 1 0
--       C        1 0 1
--       D        1 0 0
--       E        0 1 1
--       F        0 1 0
--       mas      0 0 0

------------------------------------------------------------------------------
--PCKSEL0 is active only if priority of (A,C,E) > (B,D,F)
--PCKSEL1 is active only if priority of (A,B,E,F) > (C,D)
--PCKSEL2 is active only if priority of (A,B,C,D) > (E,F)
------------------------------------------------------------------------------
PCKSEL0  <= (ARF AND AWB AND AWD AND AWF)              --A request F
          OR (CRF AND CWB AND CWD AND CWF)             --C request F
          OR (ERF AND EWB AND EWD AND EWF);            --E request F

PCKSEL1  <= (ARF AND AWF AND AWC AND AWD)              --A request F
          OR (BRF AND BWF AND BWC AND BWD)             --B request F
          OR (ERF AND EWF AND EWC AND EWD);            --E request F

PCKSEL2  <= (ARF AND AWE AND AWF )                     --A request F
          OR (BRF AND BWE AND BWF )                    --B request F
          OR (CRF AND CWE AND CWF )                    --C request F
          OR (DRF AND DWE AND DWF );                   --D request F

F_PCKA <= PCKSEL2 AND  PCKSEL1 AND  PCKSEL0 ;
F_PCKB <= PCKSEL2 AND  PCKSEL1 AND NOT PCKSEL0 ;
F_PCKC <= PCKSEL2 AND NOT PCKSEL1 AND  PCKSEL0 ;
F_PCKD <= PCKSEL2 AND NOT PCKSEL1 AND NOT PCKSEL0 ;

------------------------------------------------------------------------------
BGTA <= NOT AGTB;
CGTA <= NOT AGTC;
DGTA <= NOT AGTD;
EGTA <= NOT AGTE;
FGTA <= NOT AGTF;

CGTB <= NOT BGTC;
DGTB <= NOT BGTD;
EGTB <= NOT BGTE;
FGTB <= NOT BGTF;

DGTC <= NOT CGTD;
```

```
EGTC <= NOT CGTE;
FGTC <= NOT CGTF;

EGTD <= NOT DGTE;
FGTD <= NOT DGTF;

FGTE <= NOT EGTF;

AWB <= NOT BRF OR AGTB;
AWC <= NOT CRF OR AGTC;
AWD <= NOT DRF OR AGTD;
AWE <= NOT ERF OR AGTE;
AWF <= NOT FRX OR AGTF;

BWA <= NOT ARF OR BGTA;
BWC <= NOT CRF OR BGTC;
BWD <= NOT DRF OR BGTD;
BWE <= NOT ERF OR BGTE;
BWF <= NOT FRX OR BGTF;

CWA <= NOT ARF OR CGTA;
CWB <= NOT BRF OR CGTB;
CWD <= NOT DRF OR CGTD;
CWE <= NOT ERF OR CGTE;
CWF <= NOT FRX OR CGTF;

DWA <= NOT ARF OR DGTA;
DWB <= NOT BRF OR DGTB;
DWC <= NOT CRF OR DGTC;
DWE <= NOT ERF OR DGTE;
DWF <= NOT FRX OR DGTF;

EWA <= NOT ARF OR EGTA;
EWB <= NOT BRF OR EGTB;
EWC <= NOT CRF OR EGTC;
EWD <= NOT DRF OR EGTD;
EWF <= NOT FRX OR EGTF;

FWA <= NOT ARF OR FGTA;
FWB <= NOT BRF OR FGTB;
FWC <= NOT CRF OR FGTC;
FWD <= NOT DRF OR FGTD;
FWE <= NOT ERF OR FGTE;
--------------------------------------------------------------------------------
end RTL;
```

```
port_req.vhd        Wed Oct 21 13:35:41 1992        1


--Title: PORT_REQ
--Desc:  XBAR Slave Port request logic
--Date:  April 2, 1992

--module I/O:
entity PORT_REQ is port(

-------------------------------------------------------------------------------
-- INS
CLK,C20M, D31,D30,D29,D00,RI,RO,RESETN,
ACON,BCON,CCON,DCON,ECON,FCON,
AGREADY_I,BGREADY_I,CGREADY_I,DGREADY_I,EGREADY_I,FGREADY_I,
AGDSEN_I,BGDSEN_I,CGDSEN_I,DGDSEN_I,EGDSEN_I,FGDSEN_I, KILL_RI,
E_PCK, F_PCK, S6PORT, SELSELF : in      vlbit;

-- OUTS
RA,RB,RC,RD,RE,RF,RX, SSEL0,SSEL1,SSEL2,SSELEN,
SLVOUT,RDY_O, DSEN_O, EX_KILL,BROAD, RIG, ACTIVE:       inout   vlbit);

end PORT_REQ;
-------------------------------------------------------------------------------

architecture RTL of PORT_REQ is

-- INTERNALS
signal  PK_DSEN_O, RID,PK_RDY_O,GRANTD,GRANT,ROD,
KILL_RIST, BLK_RI, HOLD, HOLDR, AUTO, SPLIT, NOSPLIT,
B5PORT, B6PORT, SEL4, SELSELFR  :       vlbit;

begin

SSELEN <=  RI AND NOT RID AND NOT ROD;
        -- ENABLE CLOCKING IN OF ROUTE BITS ONLY FOR VALID RI
        -- JUST WENT ACTIVE and not a kill ri

AUTO <= NOT BROAD AND NOT SSEL2 AND NOT SSEL1 AND RX ;  -- automatic bus select

HOLD <= (E_PCK OR F_PCK OR HOLDR) AND RI;        -- hold current selection in auto

ssel_proc: process begin wait until CLK = '1';

        RX <= ( SSELEN)                  -- PICK ON REQUEST THAT IS NOT A KILL
                OR (RX AND (C20M OR RIG));       -- HOLD ON 20M OR RI
```

```
port_req.vhd        Wed Oct 21 13:35:41 1992        2
        -- either rx or ex_kill pick

        RID <= RI;              -- DELAYED VERSION OF RI
        ROD <= RO;              -- DELAYED VERSION OF RO

        BROAD <= (SSELEN AND D00)
                OR (NOT SSELEN AND BROAD);

        B5PORT <= (SSELEN AND NOT S6PORT AND D00)
                OR (NOT SSELEN AND B5PORT);

        B6PORT <= (SSELEN AND S6PORT AND D00)
                OR (NOT SSELEN AND B6PORT);

        SELSELFR <= (SSELEN AND SELSELF AND D00)
                OR (NOT SSELEN AND SELSELFR);

--      SEL4   <= (SSELEN AND S6PORT AND D00 AND SELSELF)        -- 6 port self
--              OR (SSELEN AND S6PORT AND D00 AND NOT D31 AND NOT D30)  -- 6 port
--              OR (SSELEN AND NOT S6PORT AND D00 AND  D30 AND NOT D29) -- 5 port
--              OR (NOT SSELEN AND BROAD);

        HOLDR <= HOLD ;

        SSEL0 <= (SSELEN AND D29)                                   -- load
                OR (NOT SSELEN AND NOT AUTO AND SSEL0)              -- non auto hold
                OR (NOT SSELEN AND  AUTO AND NOT C20M AND  HOLD AND  SSEL0)  -- hold
                OR (NOT SSELEN AND  AUTO AND NOT C20M AND NOT HOLD AND NOT SSEL0)  -- try other
                OR (C20M AND SSEL0);                        -- 20m  hold

        SSEL1 <= (SSELEN AND D30)
                OR (NOT SSELEN AND SSEL1);

        SSEL2 <= (SSELEN AND D31)
                OR (NOT SSELEN AND SSEL2);

        EX_KILL <=                      -- KILL FROM MY EXTERNAL BUS
                  (RI AND NOT RID AND ROD)      -- ri asserted to kill
                OR (EX_KILL AND RI);    -- HOLD TILL RI DEACTIVATES

                -- KILL FROM EXTERNAL BUS - EXTERNAL BUS REQUESTS
                -- WHEN I AM OR JUST WAS DRIVING REQUEST TO HIM
                -- HOLD UNTIL I STOP DRIVING REQUEST TO HIM
end process;

--      ************ GENERATING REQUEST TO OTHER PORTS ********
-- BROADCAST SELECTS
```

```
port_req.vhd        Wed Oct 21 13:35:41 1992        3

--            5port      6 port        non broadcast
-- 0 0 0  -    B C D     A B C D F     F first auto
-- 0 0 1  -    B C       A B C D E     E first auto
-- 0 1 0  - A B C D      F             F
-- 0 1 1  - A B C        E             E
-- 1 0 0  -    B   D     D             D
-- 1 0 1  -    B         C             C
-- 1 1 0  - A B C D      B             B
-- 1 1 1  - A B          A             A

SEL4    <= ( S6PORT AND BROAD AND SELSELFR)                 -- 6 port self
        OR ( S6PORT AND BROAD AND NOT SSEL2 AND NOT SSEL1)      -- 6 port normal
        OR (NOT S6PORT AND BROAD AND  SSEL2 AND NOT SSEL0);     -- 5 port

RA <= ( RX AND SSEL2 AND  SSEL1 AND  SSEL0)                 -- broadcast or non broadcast
    OR ( RX AND B5PORT AND SSEL2 )                          -- 5 port
    OR ( RX AND SEL4  ) ;                                   -- sel all 4

RB <= ( RX AND SSEL2 AND  SSEL1 AND NOT SSEL0)              -- broadcast or not
    OR ( RX AND B5PORT )                                    -- 5 port
    OR ( RX AND SEL4  ) ;                                   -- sel all 4

RC <= ( RX AND NOT B5PORT AND  SSEL2 AND NOT SSEL1 AND  SSEL0)-- non b5port
    OR ( RX AND B5PORT AND NOT SSEL2 )                      -- b5port
    OR ( RX AND SEL4  ) ;                                   -- sel all 4

RD <= ( RX AND SSEL2 AND NOT SSEL1 AND NOT SSEL0)
    OR ( RX AND B5PORT AND NOT SSEL1          )             -- 5 port
    OR ( RX AND SEL4  ) ;                                   -- sel all 4

RE <= ( RX AND NOT B5PORT AND NOT SSEL2 AND SSEL0);

RF <= ( RX AND NOT B5PORT AND NOT SSEL2 AND NOT SSEL0);

--      ************    GRANT GENERATION        ********************

GRANT <=  RX AND (
           (NOT RA OR ACON )
        AND (NOT RB OR BCON )
        AND (NOT RC OR CCON )
        AND (NOT RD OR DCON )
        AND (NOT RE OR ECON )
        AND (NOT RF OR FCON )
              );
```

```
port_req.vhd        Wed Oct 21 13:35:41 1992        4

        -- grant follows request out at the slave port

-- *********************************
-- SIGNALS AT BUS SLAVE
-- ***********************************
busslave_proc: process begin wait until CLK = '1';

   RDY_O <= NOT RI
        OR (GRANT AND C20M AND NOT GRANTD)       -- change to address
        OR PK_RDY_O ;

   DSEN_O <= NOT RI
        OR  PK_DSEN_O ;

   GRANTD <= RIG AND GRANT;

   SLVOUT <= RIG AND RID AND NOT EX_KILL AND (  -- ONLY DRIVE ON RI
        (C20M AND PK_RDY_O AND NOSPLIT) -- DRIVE ON SENDING REPLY
        OR (NOT C20M AND SLVOUT)                -- 20M HOLD
                        ) ;
                -- GRANTD PREVENTS HITTING ON CHG_TO_AD
                -- gating with exkill prevents output cycles from an
                --      ri that is killing

   ACTIVE <= ( PK_RDY_O AND NOT C20M ) -- pick on first legitimate dsen
        OR (ACTIVE AND RI);             -- HOLD TILL RI DEASSERTS

   KILL_RIST <= RI AND (KILL_RI OR KILL_RIST);
                -- remenber that kill ri was sent

   SPLIT <= (PK_RDY_O AND C20M AND NOT NOSPLIT) -- pick on second rdy
          OR (SPLIT AND RIG);                -- hold till NOT RIG

   NOSPLIT <= (PK_RDY_O AND NOT C20M AND NOT SPLIT) -- PICK ON FIRST DSEN
            OR (NOSPLIT AND RIG);     -- HOLD TILL DROP RIG OUT


end process;

BLK_RI <= NOT ACTIVE AND (KILL_RI OR KILL_RIST ) ;

RIG <= RI AND NOT BLK_RI;

PK_RDY_O <=  GRANTD AND RIG AND (
                  (NOT RA OR AGREADY_I )
                AND (NOT RB OR BGREADY_I )
                AND (NOT RC OR CGREADY_I )
```

```
                AND (NOT RD OR DGREADY_I )
                AND (NOT RE OR EGREADY_I )
                AND (NOT RF OR FGREADY_I )
                        );

        -- RPLY IS ONLY PASSED IF ACTIVE OR NOT PK_REQ_KILL
        -- SEND REPLY ON GRANT JUST ASSERTED TO SAY CNG_TO_AD
        -- TO GET AN ACTIVE REPLY OUT ALL PORTS BEING REQUESTED
        -- MUST BE ASSERTING GATED REPLY
        -- IF NOT FOR BROADCAST A MUX COULD HAVE BEEN USED

PK_DSEN_O <=   GRANTD AND RIG AND (
                   (NOT RA OR AGDSEN_I )
                AND (NOT RB OR BGDSEN_I )
                AND (NOT RC OR CGDSEN_I )
                AND (NOT RD OR DGDSEN_I )
                AND (NOT RE OR EGDSEN_I )
                AND (NOT RF OR FGDSEN_I )
                        );


end RTL;
```

```
pullup16.vhd        Wed Oct 21 13:33:28 1992        1

-- pullup16
-- 16-bit pullup
-- author: Tom Baillio
-- history: 8/11/92  created

LIBRARY synth;
USE synth.stdsynth.all;

ENTITY pullup16 IS PORT(

PU   : OUT VLBIT_VECTOR(15 DOWNTO 0)
                   );

END pullup16;

ARCHITECTURE rtl OF pullup16 IS

BEGIN

PU  <= X"FFFF";


END rtl;
```

```
reg16.vhd        Wed Oct 21 13:33:28 1992        1

-- reg16
-- a 16 bit register with rising edge clock
-- 4/13/92 trm

LIBRARY synth;
USE synth.stdsynth.all;

ENTITY reg16 IS PORT(

DIN : IN VLBIT_VECTOR(15 DOWNTO 0);
CLK  : IN VLBIT;
DOUT : INOUT VLBIT_VECTOR(15 DOWNTO 0)
                    );

END reg16;

ARCHITECTURE rtl OF reg16 IS

BEGIN

        dff_v(DIN, CLK, DOUT);

END rtl;
```

```
reg32.vhd        Wed Oct 21 13:33:28 1992        1

-- reg32
-- a 32 bit register with rising edge clock
-- 3/31/92 trm

LIBRARY synth;
USE synth.stdsynth.all;

ENTITY reg32 IS PORT(

DIN : IN VLBIT_VECTOR(31 DOWNTO 0);
CLK  : IN VLBIT;
DOUT : INOUT VLBIT_VECTOR(31 DOWNTO 0)
                    );

END reg32;

ARCHITECTURE rtl OF reg32 IS

BEGIN

        dff_v(DIN, CLK, DOUT);

END rtl;
```

selfa.vhd Wed Oct 21 13:35:47 1992 1

```
LIBRARY synth;
USE synth.stdsynth.all;

ENTITY selfa IS PORT (

D31,D30,D29 : IN VLBIT;

SELF : OUT VLBIT:='Z');

END selfa;

ARCHITECTURE pla OF selfa IS

BEGIN

        SELF <= D31 AND D30 AND D29 ;

END pla;
```

selfb.vhd        Wed Oct 21 13:35:49 1992        1

```
LIBRARY synth;
USE synth.stdsynth.all;

ENTITY selfb IS PORT (

D31,D30,D29 : IN VLBIT;

SELF : OUT VLBIT:='Z');

END selfb;

ARCHITECTURE pla OF selfb IS

BEGIN

        SELF <= D31 AND D30 AND NOT D29 ;

END pla;
```

selfc.vhd Wed Oct 21 13:35:52 1992 1

```
LIBRARY synth;
USE synth.stdsynth.all;

ENTITY selfc IS PORT (

D31,D30,D29 : IN VLBIT;

SELF : OUT VLBIT:='Z');

END selfc;

ARCHITECTURE pla OF selfc IS

BEGIN

        SELF <= D31 AND NOT D30 AND D29 ;

END pla;
```

```
selfd.vhd          Wed Oct 21 13:35:54 1992          1


LIBRARY synth;
USE synth.stdsynth.all;

ENTITY selfd IS PORT (

D31,D30,D29 : IN VLBIT;

SELF : OUT VLBIT:='Z');

END selfd;

ARCHITECTURE pla OF selfd IS

BEGIN

        SELF <= D31 AND NOT D30 AND NOT D29 ;

END pla;
```

```
shift32.vhd        Fri Oct 23 10:04:09 1992        1

--Title: SHIFT32
--Desc:  Bitwise Shift for XBAR to shift left 3 bits, keeping A1 AND A2 stationary
--       Circuit is used to extract the port destination portion of the address
--       when passing thru the crossbar. Bits 31-29 contain information about
--       which port to exit; destination information for the next crossbar down
--       the line (if any) is contained on bits 28-26. When exiting the crossbar
--       the new destination has to be lined up on 31-29. However, A1 AND A2
--       contain priority information and must stay in that position.
--Date:  April 7, 1992
--      10/6/92 cek     Made all 29 possible route bits shift.

entity SHIFT32 is port(
--INS
        DIN:                            IN      vlbit_vector(31 downto 0);
        SHIFT:                          IN      vlbit;

--OUTS
        DOUT:                           OUT     vlbit_vector(31 downto 0) );

end SHIFT32;

architecture behavior of SHIFT32 is

--INTERNAL
SIGNAL          reg:            vlbit_vector(31 downto 0);

begin
        reg <= (DIN(28 downto 3) & DIN(5 downto 0));

        DOUT <= reg when SHIFT = '1' else DIN;

end behavior;
```

```
shiftmux32.vhd        Fri Oct 23 10:04:11 1992        1

--Title: SHIFTMUX32
--Desc:  Multiplexor for VME data, and Bitwise Shift for XBAR routing
--       data.  Shifts route data left 3 bits, keeping A1 AND A2
--       stationary Circuit is used to extract the port destination
--       portion of the address when passing thru the crossbar. Bits
--       31-29 contain information about which port to exit;
--       destination information for the next crossbar down the line
--       (if any) is contained on bits 28-26. When exiting the
--       crossbar the new destination has to be lined up on 31-29.
--       However, A1 AND A2 contain priority information and must stay
--       in that position.
--Revisions History
--Date: 4/7/92              SHIFT32 created
--      8/3/92 - CEK -      Created SHIFTMUX32 Added multiplexor to
--                          SHIFT32 to provide access for the VME data to
--                          the E and F ports.
--      10/6/92 cek         Made all 29 possible route bits shift.

entity SHIFTMUX32 is port(
--INS
        DIN:                            IN      vlbit_vector(31 downto 0);
        BIN:                            IN      vlbit_vector(31 downto 0);
        SHIFT:                          IN      vlbit;
        SELB:                           IN      vlbit;

--OUTS
        DOUT:                           OUT     vlbit_vector(31 downto 0) );

end SHIFTMUX32;

architecture behavior of SHIFTMUX32 is

--INTERNAL
SIGNAL          reg:            vlbit_vector(31 downto 0);

begin
        reg <= (DIN(28 downto 3) & DIN(5 downto 0));

        DOUT <= BIN when SELB = '1'
                else reg when SHIFT = '1'
                else DIN;

end behavior;
```

```
slv.vhd        Wed Oct 28 16:26:38 1992        1

-- filename: slv.abf (bus slave)
-- description: control signals for the pbus address path
-- history: 5/22/92 ported Bob's source file to VHDL - trm
--
--              BUS SLAVE.ABF
--
--
--INC-MATCH-AD  - INC MATCH ADDRESS
--INC_XA                - INC ADDRESS TO XBAR
--DATAMODE      - SELECT ADDRESS OR DATA TO DRIVE INTO XBAR
--                      WHEN MASTER
--ROUTE         - SEND ROUTE OR ADDRESS STUFF TO XBAR WHEN
--                      XBAR MASTER ( COULD GEN INTERNALLY)
--              - MAY USE TO LATCH ROUTE STUFF FROM ASIC
--
--
ENTITY slv IS PORT (

-- inputs:

clk, frdyo, p_req_xb, master, outlen, en_ad_inc, fstrobei,
c20m , fifoclk : IN VLBIT;

-- outputs:

INC_MATCH_AD, INC_XA : out vlbit;
DATAMODE, ADPHASE : inout vlbit );

end slv;

ARCHITECTURE rtl OF slv IS

-- internals:

SIGNAL CHG_TO_AD, OUTLEND, OUTLENDD,  DS_TO_XB, P_REQ_XBD : vlbit;

BEGIN

--      FRDYO AND NOT C20M      - READY TO PBUS
--      P_REQ_XB        - REQUEST FROM PBUS FOR XBAR

DS_TO_XB    <= P_REQ_XB AND NOT C20M AND FSTROBEI AND ADPHASE AND P_REQ_XB;
                        -- MAKE SURE THAT IT ISN'T A DS TO PBUS

slv_proc: process begin
```

```
slv.vhd        Wed Oct 28 16:26:38 1992        2

   wait until (clk = '1');

   P_REQ_XBD  <= P_REQ_XB;              -- added on 6/29/92 TPB

   CHG_TO_AD <= NOT C20M AND FRDYO AND P_REQ_XB AND P_REQ_XBD;

        -- THIS CHANGE IS ALSO COMPUTED EXTERNALLY
        --      IN E_SLV.ABF
        -- C20M IS USED IN MOST CASES BUT HERE XB'S 20M IS DIFFERENT

   ADPHASE <= (CHG_TO_AD AND P_REQ_XB)
           OR (ADPHASE AND P_REQ_XB);

               -- drive address when you see cng_to_ad AND HOLD
               --      UNTIL PBUS STOPS REQUESTING XB
               -- IF P KILLING XB NO PROBLEM SINCE ADPHSE WILL
               --      DEASSERT THEN REASSERT

   DATAMODE <= (NOT MASTER AND DS_TO_XB)                  -- PICK ON FIRST DS
            OR (NOT MASTER AND DATAMODE AND P_REQ_XB)     -- HOLD TILL P_REQ_XB Deasserts
            OR MASTER ;                                   -- For Master Reads

-- DATAMODE selects between data and route/address on slave transfers
--      DATAMODE always selects the input FIFO's output for master transfers

   INC_XA <= FIFOCLK AND NOT MASTER;          -- increment the slave address counter
                                     -- after every data transfer started
                                     -- counter will increment after LS portion of
                                     -- data is transferred

   OUTLEND <= OUTLEN;
   OUTLENDD <= OUTLEND;

END PROCESS;

IN' MATCH_AD <= (NOT MASTER AND OUTLEND AND NOT OUTLENDD AND EN_AD_INC);

END rtl;
```

```
smsel.vhd        Thu Jan  7 10:22:08 1993        1

-- 11/12/92    cek      Inverted the polarity of DSELV so that it can
--                      drive an 8 to 1 mux directly.


-- added try_pksel since c20m could be slow

-- RDCON
--       - MRDCON - MUXED
--       - SRDCON - FROM BUS
-- ACTIVE
--       - MACTIVE - MUXED ACTIVE - REMOTE SLAVE PORTS ARE ACTIVE
--       - SACTIVE - LOCAL BUS IS ACTIVE
--
-- killing
--       -

-- Title: smsel
-- Desc:  Master port control logic for XBAR ASIC
-- Date:  April 1, 1992

entity smsel is port(
--INS
CLK,  S6PORT, C20M, MRDCON,
PK_SEL0, PK_SEL1, PK_SEL2,
ARX ,BRX ,CRX ,DRX ,ERX ,FRX ,
A_KILL_ME,B_KILL_ME,C_KILL_ME,D_KILL_ME,E_KILL_ME,F_KILL_ME,
SSEL0, SSEL1, SSEL2, RN, CLR,CLR1, MACTIVE, CHANGED, SACTIVE ,SRDCON,
reqib,RO,REQ_KILL,RX, REQ_O                              :in vlbit;

-- speed i/o
x_pk_kill_ri, x_pk_mdoe,x_hld_doe,x_slw_kill_ri,
x_pk_ri_is_kill, x_pk_rx, x_hld_rx,x_pk_req         : inout vlbit;

--OUTS
SSELEN                                   : inout   vlbit;
BLK_RI                                   : inout vlbit;
HLD_CNG,PK_CNG,HLD_ACTIVE,PK_ACTIVE      : out   vlbit;
OE_RPLYN, I_KILL_A,I_KILL_B,I_KILL_C,I_KILL_D,I_KILL_E,I_KILL_F ,
OMSEL0R, OMSEL1R, OMSEL2R                : out   vlbit;
OMSEL0,  OMSEL1,  OMSEL2                 : inout vlbit;
SHIFT, RID                               : inout vlbit;

DSELV:                                   out     vlbit_vector(2 downto 0);

SLVOUT                          : inout vlbit;
CONA, CONB, CONC, COND, CONE, CONF:              out     vlbit);
```

```
--input signal description:
--RI - request in
--RX - request
--RI_IS_KILL - External kill from downstream device
--DSEN - grant for data transfer
--SSEL - slave select logic
end smsel;

architecture RTL of smsel is

--internals

signal
MFORCE_VMEP, GMSEL0R, GMSEL1R,
A_IS_MAS,B_IS_MAS,C_IS_MAS,D_IS_MAS,E_IS_MAS,F_IS_MAS,
msel0, msel1,msel2,
msel0r, msel1r, msel2r,
VALID_REQ, MFORCE_VME, SFORCE_VME, TRY_PKSEL,C20,
ROD, RI_IS_KILL,SLVOUTD,PK_SLVOUT,
BLK_M_DOED, BLK_M_DOE,FAST_DEASSERT,
DSEL0,DSEL1,DSEL2,
NEW_MASTER,
en_kill2, en_kill,
--      NOT NOT  REQ_O,
PK_REQ_O, slv_kill_me,
KILL_MAS_PORT,  MAS_WANTS_ME,
USE_PKSEL,USE_MSELR,RXD_FOR_RPLY, REQ_OD, old_shift:           vlbit;

-------------------------------------------------------------------------
-- KILLING - TO KILL A PORT, THAT PORT MUST KILL IT'S BUS
--                      MASTER WITH MULTIPLE XBAR LEVELS.
--                      THE KILL MUST BE PASSED ALL THE WAY BACK
--                      TO THE ORIGINAL MASTER.
--
-- EXAMPLES OF KILLING BUS A
--      BUS A IS MASTER OF BUS B
--              1) ANOTHER PORT WANTS B
--                      - B SEES NEW_MASTER AND ISSUES I_KILL_A , WHICH IS
--                        B_KILL_A AT A.
--                      - A SEES B_KILL_A  AND TRIES
--                              TO KILL BUS A
--              2) B'S REMOTE BUS DEVICE WANTS TO KILL THE XFER
--                      - RI_IS_KILL IS GENERATED AT B'S REQUEST PAL
--                        CAUSING I_KILL_A, WHICH IS B_KILL_A AT A.
--                      - A SEES B_KILL_A  AND TRIES
```

```
smsel.vhd        Thu Jan  7 10:22:08 1993        3

--                              TO KILL BUS A
--                  3) ANOTHER PORT WANTS A
--                          - MAS_WANTS_ME IS GENERATED AT A WHEN IT SEES
--                                  PCKSEL <>0
--                          - A  TRIES TO KILL BUS A
--
--   THE FIRST TWO CASES SHOW A SLAVE TRYING TO KICK OFF IT"S MASTER< WHILE
--      THE THIRD CASE IS A MASTER SEEING THAT SOMONE OTHER THAN HIS SLAVE
--      WANTS HIM OFF
--
--      I_KILL_X        -
--              -  GENERATED TO KILL THE REMOTE PORT THAT IS MY
---                MASTER WHEN:
--                    1) MY REMOTE BUS IS TRYING TO KILL ME (RI_IS_KILL)
--                    2) HIGHER PRIORITY PORT WANTS ME ( NEW_MASTER )
--
--      SLV_KILL_ME      - GENERATED WHEN ANYONE IS TRYING TO KILL ME
--                       - ONLY MY CURRENT SLAVES WILL GENERATE
--                       - THE OR OF ALL I_KILL_X INTO THIS PORT
--
--      RI_IS_KILL       - MY EXTERNAL BUS WANTS TO FREE UP MY PORT
--                       - COMES FROM MY PORT LOGIC
--
--      MAS_WANTS_ME - GENERATED TO KILL MY EXTERNAL BUS
--                       BECAUSE  A HIGHER PRIORITY MASTER WANTS ME
--
--  FAST KILLING
--      - IF A MASTER PORT IS NOT ACTIVE IT CAN BE KILLED BEFORE HIS RI
--              DEASSERTS
--      - THE master port removes his rx and prevents dsen from passing
--              this will cause the ro at his slave to deasset
--      - THE slave port can remove ro when he sends i_kill_x if the slave
--              port is not active since the master port is gauranteed not to
--              pass dsen to an inactive master on reciept of a x_kill_me
--  CONSIDER A KILL COMING IN TO PORT A when port b is his master
--      - rI_IS_KILL BECOMES I_KILL_B, B, SENDS KILL TO HIS BUS AND
--              DISABLES DSEN FROM GOING OUT IF INACTIVE
--      - a can deasert ro if NOT sactive since he knows a will generate a
--              kill and block dsen

--      NOT NOT NOT  a port only gets killed if rx exists
--              - if you are going to request a port just as it gets an
--                ri, the rx will be formed and you will generate the
--                kill on the next cycle if conditions still met

--------------------------------------------------------------------------
```

```
smsel.vhd        Thu Jan  7 10:22:08 1993        4


begin
--      *****************  KILLING REMOTE PORT  *****************
--      KILL THE PORT THAT IS THE MASTER OF ME
--              - A HIGHER PRIORITY PORT THAN MY MASTER WANTS ME (NEW_MASTER)
--              - MY EXTERNAL BUS WANTS TO GET IN (RI_IS_KILL)

new_mas_proc:process begin wait until CLK = '1';

   NEW_MASTER <=
          (NOT C20 AND REQ_O AND (MSEL2R XOR PK_SEL2)) -- PK_SEL SAYS NEW MASTER
        OR (NOT C20 AND REQ_O AND (MSEL1R XOR PK_SEL1)) --WANTED->GENERATE KILL_MAS_PORT
        OR (NOT C20 AND REQ_O AND (MSEL0R XOR PK_SEL0))
        OR ( C20 AND NEW_MASTER );

        -- NEW_MASTER: pcksel NOT EQUAL to current port

end process;

KILL_MAS_PORT <= REQ_O AND ( NEW_MASTER OR RI_IS_KILL );
        -- kill port that is master of me on my ri or other master wants me

I_KILL_A <= KILL_MAS_PORT AND A_IS_MAS;
I_KILL_B <= KILL_MAS_PORT AND B_IS_MAS;
I_KILL_C <= KILL_MAS_PORT AND C_IS_MAS;
I_KILL_D <= KILL_MAS_PORT AND D_IS_MAS;
I_KILL_E <= KILL_MAS_PORT AND E_IS_MAS;
I_KILL_F <= KILL_MAS_PORT AND F_IS_MAS;

-- sinc i_kill is gated by both req_o and mselr you will never genrate a
--      kill erroneously, i_kill will end 1 cycle after ri from master port
--      deasserts
-- i_killx causes the kill_me at the master port, which will try to kill
--      his remote bus master
--      - says slave port wants to deassert his req_o to free himself up

--      **************  KILLING MY EXTERNAL BUS   ********
-- I will try to kill my external bus port if I get a kill from one of the
--      slaves (x_kill_me) or a higher priority port wants me (kill_pw_me)

SLV_KILL_ME <= ( A_KILL_ME OR B_KILL_ME OR C_KILL_ME OR D_KILL_ME OR E_KILL_ME
                OR F_KILL_ME );

MAS_WANTS_ME <= ( PK_SEL2 OR PK_SEL1 OR PK_SEL0);

        --AN ACTIVE PK_SEL WHILE I AM REQUESTING SOMEONE,
```

```
smsel.vhd        Thu Jan  7 10:22:08 1993        5

        --      MEANING SOME PORT WANTS ME AND IS OF HIGHER PRIORITY
        -- gated with rx to get a chance to look at priority

x_pk_kill_ri <=  NOT c20 AND (
           ( x_slw_kill_ri )
        OR  (en_kill AND MAS_WANTS_ME)  -- KILL, OTHER PORT WANTS ME
        OR  (en_kill AND CLR));                    -- KILL, FROM PCKCOMP

blk_ri <=  ( x_slw_kill_ri AND NOT mactive )      -- KILL FROM SLAVE PORT
        OR  ( en_kill2 AND MAS_WANTS_ME)          -- KILL, OTHER PORT WANTS ME
        OR  ( en_kill2 AND CLR1) ;                -- KILL, FROM PCKCOMP

x_slw_kill_ri <=   ( en_kill AND SLV_KILL_ME)     -- KILL FROM SLAVE PORT
        OR  (REQ_KILL AND RN);  -- HOLD TILL RI DEASSERTS


--      port expects this to activate on on NOT 20m and hold

--      ***************  REQUEST EXTERNAL BUS ***************


FAST_DEASSERT <= NOT SACTIVE AND KILL_MAS_PORT ;        -- fast deassert of req_o
        -- if have not recieved dsen from bus

x_hld_doe <= (REQ_O AND RN AND NOT BLK_M_DOE AND NOT BLK_M_DOED
                AND NOT (SACTIVE AND NOT C20 AND NOT SRDCON ))
            OR (SLVOUT AND RID AND C20 );

x_pk_mdoe <= (NOT FAST_DEASSERT AND SSELEN AND old_SHIFT AND MAS_WANTS_ME ) ;
                -- gated with NOT reqi to pick doe

--   registered   SSELEN <= NOT RID AND C20 AND NOT RO AND RN ;

x_PK_REQ<= (NOT FAST_DEASSERT AND SSELEN AND old_SHIFT AND MAS_WANTS_ME)
        OR (NOT FAST_DEASSERT AND VALID_REQ ) ;


-- x_PK_REQ_O <= x_pk_req AND NOT blk_rim ;
-- x_en_req <= NOT REQI OR req_o  ;  -- disable if ri in before your ro
-- REQ_O <= RO AND NOT REQ_KILL ;

x_pk_ri_is_kill <= ( NOT C20 AND NOT RID AND ROD)
                OR ( NOT C20 AND RI_IS_KILL );     -- HOLD TILL RI DEACTIVATES

x_pk_rx <= (NOT C20 AND NOT RID AND NOT ROD AND RN)       -- initial pick
        OR (NOT C20 AND RX AND NOT BLK_RI AND RN);      -- repick
```

```
smsel.vhd        Thu Jan  7 10:22:08 1993        6

x_hld_rx <= RX AND C20 AND RN;               -- 20m hold

        -- blk if remote ports are inactive
        -- blk_ri says ignore the ri since we are killing
        --      the ri and no dsen has been issued or will be issued
        -- when the ri is a kill it must also be ignored
        --      - no rx, so no attempt to request
        --      - rx deasserts on blk_ri
        -- goes to port_req to disable issue of dsen

reqo_proc:process begin wait until CLK = '1';

   C20 <= NOT C20M;
   TRY_PKSEL <= C20M AND NOT REQ_O;

   SSELEN <= NOT RID AND C20 AND NOT RO AND RN ;

   VALID_REQ <= REQ_O AND C20 AND RN AND (
             (ARX AND A_IS_MAS)
          OR (BRX AND B_IS_MAS)
          OR (CRX AND C_IS_MAS)
          OR (DRX AND D_IS_MAS)
          OR (ERX AND E_IS_MAS)
          OR (FRX AND F_IS_MAS));

   en_kill <= ( RX AND NOT req_o AND c20 );

   en_kill2 <= ( RX AND NOT req_o AND c20 AND NOT MACTIVE );

--   RO  <= ( REQIB AND x_pk_kill_ri )  -- kill
--        OR ( MRI AND x_en_req AND x_PK_REQ_O1);

--   REQ_KILL <= REQIB AND x_pk_kill_ri ;        -- delay NOT NOT

--   DOEA <= (
--        (REQIN AND x_pk_mdoe)              -- delay ??
--      OR (x_hld_doe )             -- hold till old_shift deassets
--      OR (REQIB AND SLVOUT)       -- DRIVE FOR SLAVE
--       );

   ROD <= RO ;

   SHIFT <= REQ_O AND NOT ROD;  -- activate 1 cycle after ro

   BLK_M_DOE <= NOT old_SHIFT AND REQ_O AND (     -- block doe of master for read
          ( NOT C20 AND NOT SRDCON )           -- block on rdcon
       OR ( BLK_M_DOE AND C20 AND RN ));  -- hold
```

```
smsel.vhd        Thu Jan  7 10:22:08 1993        7

   BLK_M_DOED <= BLK_M_DOE AND REQ_O ;

   RID  <= (NOT C20 AND REQIB)            -- delay
         OR ( RID AND C20 );

   REQ_OD       <= REQ_O ;

   RXD_FOR_RPLY <= RX
                OR (RXD_FOR_RPLY AND RID) ;


--   RX <= ( REQIB AND x_pk_rx )  -- PICK ON REQUEST THAT IS NOT A KILL
--       OR ( x_hld_rx );         -- HOLD ON 20M OR RI
--
--        -- either rx or RI_IS_KILL pick on ri AND NOT rid depending on rod

   RI_IS_KILL <=                        -- KILL FROM MY EXTERNAL BUS
        (REQIB AND x_pk_ri_is_kill)   -- ri asserted to kill
      OR (C20 AND RI_IS_KILL );     -- HOLD TILL RI DEACTIVATES

              -- KILL FROM EXTERNAL BUS - EXTERNAL BUS REQUESTS
              -- WHEN I AM OR JUST WAS DRIVING REQUEST TO HIM
              -- HOLD UNTIL I STOP DRIVING REQUEST TO HIM

   PK_SLVOUT <= (NOT C20 AND RX AND NOT RI_IS_KILL AND NOT REQ_O AND NOT MRDCON) -- picks on first
          OR (PK_SLVOUT AND RX AND C20 );                -- hold

   SLVOUT <= (`RX AND PK_SLVOUT AND C20)               -- assert after pk_slvout
         OR (NOT C20 AND RX AND SLVOUT AND NOT MRDCON); -- repick on slvout and NOT mrdcon

   SLVOUTD <= SLVOUT ;

      MSEL0R <= OMSEL0  ;
      MSEL1R <= OMSEL1  ;
      MSEL2R <= OMSEL2  ;


      GMSEL0R <= ( MFORCE_VME OR OMSEL0);
      GMSEL1R <= (NOT MFORCE_VME AND OMSEL1);

   A_IS_MAS <=  OMSEL2 AND  OMSEL1  AND  OMSEL0;
   B_IS_MAS <=  OMSEL2 AND  OMSEL1  AND NOT OMSEL0;
   C_IS_MAS <=  OMSEL2 AND NOT OMSEL1  AND  OMSEL0;
   D_IS_MAS <=  OMSEL2 AND NOT OMSEL1  AND NOT OMSEL0;
   E_IS_MAS <= NOT OMSEL2 AND  OMSEL1  AND  OMSEL0;
   F_IS_MAS <= NOT OMSEL2 AND  OMSEL1  AND NOT OMSEL0;
```

```
smsel.vhd        Thu Jan  7 10:22:08 1993        8


end process;

--      ***************  MSEL CONTOL    ***********************

MSEL0<= ( TRY_PKSEL AND PK_SEL0)
        OR (REQ_O AND MSEL0R);

MSEL1<= ( TRY_PKSEL AND PK_SEL1)
        OR (REQ_O AND MSEL1R);

MSEL2<= (  TRY_PKSEL AND PK_SEL2)
        OR (REQ_O AND MSEL2R);

OMSEL0 <= MSEL0;
OMSEL1 <= MSEL1;
OMSEL2 <= MSEL2;

OMSEL0R <= MSEL0R;
OMSEL1R <= MSEL1R;
OMSEL2R <= MSEL2R;

-- *********************************
--      SIGNALS AT BUS MASTER
-- ***********************************

PK_CNG   <=  REQ_O AND REQ_OD AND NOT CHANGED AND C20;
HLD_CNG  <=  REQ_O AND CHANGED;

PK_ACTIVE <=  REQ_O AND REQ_OD AND NOT SACTIVE AND CHANGED  AND NOT C20;
HLD_ACTIVE <=  (C20 OR REQ_O) AND SACTIVE;

OE_RPLYN <= NOT ( RX OR RXD_FOR_RPLY );

old_SHIFT <=  NOT  (
          (SLVOUT AND RID)       -- deassert for slvout
        OR (SLVOUTD AND RID)     -- deassert for slvoutd
        OR (REQ_O AND CHANGED)   -- deassert for changed master
                        );

-- MASTER DEVICE
-- 20m --___---___---___---___---___---___---___---___---___---___---___---
-- REQ_O ___-------------------------------------------___________
-- DOEN ---___________________________------------_____-----------
-- RPLY_I ________---_______________---______________________________
-- SHIFT ------------_______________________________________---------
```

```
smsel.vhd        Thu Jan  7 10:22:08 1993        9

-- 20m --___---___---___---___---___---___---___---___---___---___---___---___---

-- SLAVE DEVICE
-- 20m ___---___---___---___---___---___---___---___---___---___---___---___---
-- DOEN -----------------------------------________-----------------
-- SLVOUT ___________________________------___________________
-- SHIFT  ------------------------------__________------------
-- DSEL   ------------------------------< SSEL>----------------

--      *************  DSEL CONTROL      *******************
--   DEFAULT IS MSEL
--       - MUST HOLD ROUTE INFO FROM REQ_O UNTIL SHIFT GOES LOW
--              SHIFT GOES LOW WHEN NEXT DEVICE HAS GRABBED
--              ROUTE
--       - CHOOSE SSEL IN RESPONSE TO SLVOUT
--       - DSEL=0 WILL HOLD DATA IN REGISTER


-- SEL_MSEL is active from req in to req_o to pass input until change
--      to address sent to master then it deasserts to hold data,
--      then when master sees change sent from slave it passes msel again

USE_PKSEL <= NOT SLVOUT AND TRY_PKSEL; -- try pck_sel is NOT c20m AND NOT req_o

USE_MSELR <= NOT SLVOUT AND CHANGED;     -- use mselr to accept

MFORCE_VME <= NOT S6PORT AND NOT MSEL2 AND MSEL1 ;
SFORCE_VME <= NOT S6PORT AND NOT SSEL2 AND SSEL1 ;

MFORCE_VMEP <= NOT S6PORT AND NOT PK_SEL2 AND PK_SEL1 ;

DSEL0 <=  ((MFORCE_VMEP OR PK_SEL0) AND USE_PKSEL)
        OR ( GMSEL0R AND USE_MSELR )
        OR ((SFORCE_VME OR SSEL0) AND SLVOUT );

DSEL1 <=  (NOT MFORCE_VMEP AND PK_SEL1 AND USE_PKSEL)
        OR ( GMSEL1R AND USE_MSELR )
        OR (NOT SFORCE_VME AND SSEL1 AND SLVOUT );

DSEL2 <=  (PK_SEL2 AND USE_PKSEL)
        OR ( MSEL2R AND USE_MSELR )
        OR (SSEL2 AND SLVOUT );

DSELV <= not ( DSEL2 & DSEL1 & DSEL0 );

--      ************     CONNECT CONTROL ******************
```

```
smsel.vhd        Thu Jan  7 10:22:08 1993        10

--      USED BY OTHER'S PORT REQUEST LOGIC TO GENERATE GRANT

CONA <= REQ_O AND A_IS_MAS;
CONB <= REQ_O AND B_IS_MAS;
CONC <= REQ_O AND C_IS_MAS;
COND <= REQ_O AND D_IS_MAS;
CONE <= REQ_O AND E_IS_MAS;
CONF <= REQ_O AND F_IS_MAS;

-- cleanup
--         |  ,  |  ,  |  ,  |  ,  |  ,  |  ,  |  ,  |  ,  |
-- XRME ------------_______________
-- REQ_O -------------_______________
-- CONX ----------------_______________
-- I_KILL -------------_______________
-- msel        master  | pcksel
-- mselr       master    |
--         |  ,  |  ,  |  ,  |  ,  |  ,  |  ,  |  ,  |  ,  |

--         |  ,  |  ,  |  ,  |  ,  |  ,  |  ,  |  ,  |  ,  |
-- XRME ----------------_______________
-- REQ_O ------------------_______________
-- CONX --------------------_______________
-- I_KILL ----------------_______________
-- mselr       master    |
--         |  ,  |  ,  |  ,  |  ,  |  ,  |  ,  |  ,  |  ,  |

--      ************** THINGS TO WATCH OUT FOR  ***********
--
--      RI DEASSERT THEN REASSERT
--              - MUST ALLOW MSEL FROM PREVIOUS TO CLEAR
--              - COULD SEE VALID REQ DEASSERTED AND PREVENT IT
--                      FROM REPICKING FOR A CYCLE OR 2
--      NOT NOT  may want ari ect to be gated ari where gating insures that the
--              signal has been asserted for at least 2 cycles previous
end RTL;
```

```
smsele.vhd        Thu Jan  7 10:22:11 1993        1

-- 11/12/92   cek     Inverted the polarity of DSELV so that it can
--                    drive an 8 to 1 mux directly.


-- added try_pksel since c20m could be slow

-- RDCON
--       - MRDCON - MUXED
--       - SRDCON - FROM BUS
-- ACTIVE
--       - MACTIVE - MUXED ACTIVE - REMOTE SLAVE PORTS ARE ACTIVE
--       - SACTIVE - LOCAL BUS IS ACTIVE
--
-- killing
--       -

-- Title: smsele
-- Desc:  Master port control logic for XBAR ASIC
-- Date:  April 1, 1992

entity smsele is port(
--INS
CLK,  S6PORT, C20M, MRDCON,
PK_SEL0, PK_SEL1, PK_SEL2,
ARX ,BRX ,CRX ,DRX ,ERX ,FRX ,
A_KILL_ME,B_KILL_ME,C_KILL_ME,D_KILL_ME,E_KILL_ME,F_KILL_ME,
SSEL0, SSEL1, SSEL2, RN, CLR,CLR1, MACTIVE, CHANGED, SACTIVE ,SRDCON,
reqib,RO,REQ_KILL,RX, REQ_O                                :in vlbit;

-- speed i/o
x_pk kill_ri, x_pk_mdoe,x_hld_doe,x_slw_kill_ri,
x_pk ri_is_kill, x_pk_rx, x_hld_rx,x_pk_req         : inout vlbit;

--OUTS
SSELEN                                  : inout   vlbit;
BLK_RI                                  : inout vlbit;
HLD_CNG,PK_CNG,HLD_ACTIVE,PK_ACTIVE     : out   vlbit;
OE_RPLYN, I_KILL_A,I_KILL_B,I_KILL_C,I_KILL_D,I_KILL_E,I_KILL_F ,
OMSEL0R, OMSEL1R, OMSEL2R               : out   vlbit;
OMSEL0,  OMSEL1,  OMSEL2                : inout vlbit;
SHIFT, RID                              : inout vlbit;

MDSELV:                                 out     vlbit_vector(2 downto 0);

SLVOUT                          : inout vlbit;
CONA, CONB, CONC, COND, CONE, CONF:             out     vlbit);
```

smsele.vhd        Thu Jan  7 10:22:11 1993        2

```
--input signal description:
--RI - request in
--RX - request
--RI_IS_KILL - External kill from downstream device
--DSEN - grant for data transfer
--SSEL - slave select logic
end smsele;

architecture RTL of smsele is

--internals

signal
A_IS_MAS,B_IS_MAS,C_IS_MAS,D_IS_MAS,E_IS_MAS,F_IS_MAS,
msel0, msel1,msel2,
msel0r, msel1r, msel2r,
VALID_REQ, TRY_PKSEL,C20,
ROD, RI_IS_KILL,SLVOUTD,PK_SLVOUT,
BLK_M_DOED, BLK_M_DOE,FAST_DEASSERT,
DSEL0,DSEL1,DSEL2,
MDSEL0,MDSEL1,MDSEL2,
NEW_MASTER,
en_kill2, en_kill,
--       NOT NOT  REQ_O,
PK_REQ_O, slv_kill_me,
KILL_MAS_PORT,  MAS_WANTS_ME,
USE_PKSEL,USE_MSELR,RXD_FOR_RPLY, REQ_OD, old_shift:            vlbit;

---------------------------------------------------------------------------
-- KILLING - TO KILL A PORT, THAT PORT MUST KILL IT'S BUS
--                    MASTER WITH MULTIPLE XBAR LEVELS.
--                    THE KILL MUST BE PASSED ALL THE WAY BACK
--                    TO THE ORIGINAL MASTER.
--
-- EXAMPLES OF KILLING BUS A
--      BUS A IS MASTER OF BUS B
--              1) ANOTHER PORT WANTS B
--                    - B SEES NEW_MASTER AND ISSUES I_KILL_A , WHICH IS
--                       B_KILL_A AT A.
--                    - A SEES B_KILL_A  AND TRIES
--                            TO KILL BUS A
--              2) B'S REMOTE BUS DEVICE WANTS TO KILL THE XFER
--                    - RI_IS_KILL IS GENERATED AT B'S REQUEST PAL
--                      CAUSING I_KILL_A, WHICH IS B_KILL_A AT A.
--                    - A SEES B_KILL_A  AND TRIES
```

```
smsele.vhd        Thu Jan  7 10:22:11 1993        3

--                               TO KILL BUS A
--                3) ANOTHER PORT WANTS A
--                        - MAS_WANTS_ME IS GENERATED AT A WHEN IT SEES
--                              PCKSEL <>0
--                        - A  TRIES TO KILL BUS A
--
--   THE FIRST TWO CASES SHOW A SLAVE TRYING TO KICK OFF IT"S MASTER< WHILE
--      THE THIRD CASE IS A MASTER SEEING THAT SOMONE OTHER THAN HIS SLAVE
--      WANTS HIM OFF
--
--      I_KILL_X        -
--              -  GENERATED TO KILL THE REMOTE PORT THAT IS MY
---                MASTER WHEN:
--                    1) MY REMOTE BUS IS TRYING TO KILL ME (RI_IS_KILL)
--                    2) HIGHER PRIORITY PORT WANTS ME ( NEW_MASTER )
--
--      SLV_KILL_ME      - GENERATED WHEN ANYONE IS TRYING TO KILL ME
--                       - ONLY MY CURRENT SLAVES WILL GENERATE
--                       - THE OR OF ALL I_KILL_X INTO THIS PORT
--
--      RI_IS_KILL       - MY EXTERNAL BUS WANTS TO FREE UP MY PORT
--                       - COMES FROM MY PORT LOGIC
--
--      MAS_WANTS_ME - GENERATED TO KILL MY EXTERNAL BUS
--                     BECAUSE  A HIGHER PRIORITY MASTER WANTS ME
--
--  FAST KILLING
--      - IF A MASTER PORT IS NOT ACTIVE IT CAN BE KILLED BEFORE HIS RI
--              DEASSERTS
--      - THE master port removes his rx and prevents dsen from passing
--              this will cause the ro at his slave to deasset
--      - THE slave port can remove ro when he sends i_kill_x if the slave
--              port is not active since the master port is gauranteed not to
--              pass dsen to an inactive master on reciept of a x_kill_me
--  CONSIDER A KILL COMING IN TO PORT A when port b is his master
--      - rI_IS_KILL BECOMES I_KILL_B, B, SENDS KILL TO HIS BUS AND
--              DISABLES DSEN FROM GOING OUT IF INACTIVE
--      - a can deasert ro if NOT sactive since he knows a will generate a
--              kill and block dsen

--      NOT NOT NOT  a port only gets killed if rx exists
--              - if you are going to reguest a port just as it gets an
--                ri, the rx will be formed and you will generate the
--                kill on the next cycle if conditions still met

---------------------------------------------------------------------------
```

```
smsele.vhd        Thu Jan  7 10:22:11 1993        4

begin
--      *****************  KILLING REMOTE PORT  *****************
--      KILL THE PORT THAT IS THE MASTER OF ME
--              - A HIGHER PRIORITY PORT THAN MY MASTER WANTS ME (NEW_MASTER)
--              - MY EXTERNAL BUS WANTS TO GET IN (RI_IS_KILL)

new_mas_proc:process begin wait until CLK = '1';

   NEW_MASTER <=
          (NOT C20 AND REQ_O AND (MSEL2R XOR PK_SEL2)) -- PK_SEL SAYS NEW MASTER
       OR (NOT C20 AND REQ_O AND (MSEL1R XOR PK_SEL1)) --WANTED->GENERATE KILL_MAS_PORT
       OR (NOT C20 AND REQ_O AND (MSEL0R XOR PK_SEL0))
       OR ( C20 AND NEW_MASTER );

       -- NEW_MASTER: pcksel NOT EQUAL to current port

end process;

KILL_MAS_PORT <= REQ_O AND ( NEW_MASTER OR RI_IS_KILL );
        -- kill port that is master of me on my ri or other master wants me

I_KILL_A <= KILL_MAS_PORT AND A_IS_MAS;
I_KILL_B <= KILL_MAS_PORT AND B_IS_MAS;
I_KILL_C <= KILL_MAS_PORT AND C_IS_MAS;
I_KILL_D <= KILL_MAS_PORT AND D_IS_MAS;
I_KILL_E <= KILL_MAS_PORT AND E_IS_MAS;
I_KILL_F <= KILL_MAS_PORT AND F_IS_MAS;

-- sinc i_kill is gated by both req_o and mselr you will never genrate a
--      kill erroneously, i_kill will end 1 cycle after ri from master port
--      deasserts
-- i_killx causes slv_kill_me at the master port, which will try to kill
--      his remote bus master
--      - says slave port wants to deassert his req_o to free himself up

--      **************  KILLING MY EXTERNAL BUS   ********
-- I will try to kill my external bus port if I get a kill from one of the
--      slaves (x_kill_me) or a higher priority port wants me (kill_pw_me)

SLV_KILL_ME <= ( A_KILL_ME OR B_KILL_ME OR C_KILL_ME OR D_KILL_ME OR E_KILL_ME
                OR F_KILL_ME );

MAS_WANTS_ME <= ( PK_SEL2 OR PK_SEL1 OR PK_SEL0);

        --AN ACTIVE PK_SEL WHILE I AM REQUESTING SOMEONE,
```

```
smsele.vhd        Thu Jan  7 10:22:11 1993        5

        --      MEANING SOME PORT WANTS ME AND IS OF HIGHER PRIORITY
        -- gated with rx to get a chance to look at priority

x_pk_kill_ri <=  NOT c20 AND (
              ( x_slw_kill_ri )
        OR  (en_kill AND MAS_WANTS_ME)  -- KILL, OTHER PORT WANTS ME
        OR  (en_kill AND CLR));                   -- KILL, FROM PCKCOMP

blk_ri <=  ( x_slw_kill_ri AND NOT mactive )    -- KILL FROM SLAVE PORT
        OR  ( en_kill2 AND MAS_WANTS_ME)        -- KILL, OTHER PORT WANTS ME
        OR  ( en_kill2 AND CLR1) ;              -- KILL, FROM PCKCOMP

x_slw_kill_ri <=  ( en_kill AND SLV_KILL_ME)    -- KILL FROM SLAVE PORT
        OR  (REQ_KILL AND RN);  -- HOLD TILL RI DEASSERTS


--      port expects this to activate on on NOT 20m and hold

--      ***************  REQUEST EXTERNAL BUS ***************


FAST_DEASSERT <= NOT SACTIVE AND KILL_MAS_PORT ;        -- fast deassert of req_o
        -- if have not recieved dsen from bus

x_hld_doe <= (REQ_O AND RN AND NOT BLK_M_DOE AND NOT BLK_M_DOED
                AND NOT (SACTIVE AND NOT C20 AND NOT SRDCCN ))
            OR (SLVOUT AND RID AND C20 );

x_pk_mdoe <= (NOT FAST_DEASSERT AND SSELEN AND old_SHIFT AND MAS_WANTS_ME ) ;
                -- gated with NOT reqi to pick doe

--   registered   SSELEN <= NOT RID AND C20 AND NOT RO AND RN ;

x_PK_REQ<= (NOT FAST_DEASSERT AND SSELEN AND old_SHIFT AND MAS_WANTS_ME)
         OR (NOT FAST_DEASSERT AND VALID_REQ );


-- x_PK_REQ_O <= x_pk_req AND NOT blk_rim ;
-- x_en_req <= NOT REQI OR req_o  ;  -- disable if ri in before your ro
-- REQ_O <= RO AND NOT REQ_KILL ;

x_pk_ri_is_kill <= ( NOT C20 AND NOT RID AND ROD)
                OR ( NOT C20 AND RI_IS_KILL );    -- HOLD TILL RI DEACTIVATES

x_pk_rx <= (NOT C20 AND NOT RID AND NOT ROD AND RN)       -- initial pick
        OR (NOT C20 AND RX AND NOT BLK_RI AND RN);      -- repick
```

```
smsele.vhd        Thu Jan  7 10:22:11 1993        6

x_hld_rx <= RX AND C20 AND RN;              -- 20m hold

        -- blk if remote ports are inactive
        -- blk_ri says ignore the ri since we are killing
        --      the ri and no dsen has been issued or will be issued
        -- when the ri is a kill it must also be ignored
        --      - no rx, so no attempt to request
        --      - rx deasserts on blk_ri
        -- goes to port_req to disable issue of dsen

reqo_proc:process begin wait until CLK = '1';

   C20 <= NOT C20M;
   TRY_PKSEL <= C20M AND NOT REQ_O;

   SSELEN <= NOT RID AND C20 AND NOT RO AND RN ;

   VALID_REQ <= REQ_O AND C20 AND RN AND (
              (ARX AND A_IS_MAS)
            OR (BRX AND B_IS_MAS)
            OR (CRX AND C_IS_MAS)
            OR (DRX AND D_IS_MAS)
            OR (ERX AND E_IS_MAS)
            OR (FRX AND F_IS_MAS));

   en_kill <= ( RX AND NOT req_o AND c20 );

   en_kill2 <= ( RX AND NOT req_o AND c20 AND NOT MACTIVE );

--   RO  <= ( REQIB AND x_pk_kill_ri )  -- kill
--        OR ( MRI AND x_en_req AND x_PK_REQ_O1);

--   REQ_KILL <= REQIB AND x_pk_kill_ri ;        -- delay NOT NOT

--   DOEA <= (
--       (REQIN AND x_pk_mdoe)            -- delay ??
--     OR (x_hld_doe )           -- hold till old_shift deassets
--     OR (REQIB AND SLVOUT)     -- DRIVE FOR SLAVE
--      );

   ROD <= RO ;

   SHIFT <= REQ_O AND NOT ROD AND S6PORT;        -- activate 1 cycle after ro

   BLK_M_DOE <= NOT old_SHIFT AND REQ_O AND (      -- block doe of master for read
          ( NOT C20 AND NOT SRDCON )            -- block on rdcon
       OR ( BLK_M_DOE AND C20 AND RN ));  -- hold
```

```
smsele.vhd        Thu Jan  7 10:22:11 1993        7

   BLK_M_DOED <= BLK_M_DOE AND REQ_O ;

   RID  <= (NOT C20 AND REQIB)            -- delay
         OR ( RID AND C20 );

   REQ_OD       <= REQ_O ;

   RXD_FOR_RPLY <= RX
                OR (RXD_FOR_RPLY AND RID) ;


--   RX <= ( REQIB AND x_pk_rx )  -- PICK ON REQUEST THAT IS NOT A KILL
--       OR ( x_hld_rx );         -- HOLD ON 20M OR RI
--
--        -- either rx or RI_IS_KILL pick on ri AND NOT rid depending on rod

   RI_IS_KILL <=                          -- KILL FROM MY EXTERNAL BUS
          (REQIB AND x_pk_ri_is_kill)   -- ri asserted to kill
        OR (C20 AND RI_IS_KILL );     -- HOLD TILL RI DEACTIVATES

               -- KILL FROM EXTERNAL BUS - EXTERNAL BUS REQUESTS
               -- WHEN I AM OR JUST WAS DRIVING REQUEST TO HIM
               -- HOLD UNTIL I STOP DRIVING REQUEST TO HIM

   PK_SLVOUT <= (NOT C20 AND RX AND NOT RI_IS_KILL AND NOT REQ_O AND NOT MRDCON) -- picks on first
             OR (PK_SLVOUT AND RX AND C20 );                -- hold

   SLVOUT <= ( RX AND PK_SLVOUT AND C20)                -- assert after pk_slvout
          OR (NOT C20 AND RX AND SLVOUT AND NOT MRDCON); -- repick on slvout and NOT mrdcon

   SLVOUTD <= SLVOUT ;

        MSEL0R <= OMSEL0  ;
        MSEL1R <= OMSEL1  ;
        MSEL2R <= OMSEL2  ;


   A_IS_MAS <=  OMSEL2 AND  OMSEL1  AND  OMSEL0;
   B_IS_MAS <=  OMSEL2 AND  OMSEL1  AND NOT OMSEL0;
   C_IS_MAS <=  OMSEL2 AND NOT OMSEL1  AND  OMSEL0;
   D_IS_MAS <=  OMSEL2 AND NOT OMSEL1  AND NOT OMSEL0;
   E_IS_MAS <= NOT OMSEL2 AND  OMSEL1  AND  OMSEL0;
   F_IS_MAS <= NOT OMSEL2 AND  OMSEL1  AND NOT OMSEL0;
```

```
smsele.vhd        Thu Jan  7 10:22:11 1993        8

end process;

--      ***************  MSEL CONTOL    ***********************

MSEL0<= ( TRY_PKSEL AND PK_SEL0)
        OR (REQ_O AND MSEL0R);

MSEL1<= ( TRY_PKSEL AND PK_SEL1)
        OR (REQ_O AND MSEL1R);

MSEL2<= (  TRY_PKSEL AND PK_SEL2)
        OR (REQ_O AND MSEL2R);

OMSEL0 <= MSEL0;
OMSEL1 <= MSEL1;
OMSEL2 <= MSEL2;

OMSEL0R <= MSEL0R;
OMSEL1R <= MSEL1R;
OMSEL2R <= MSEL2R;

-- *********************************
--     SIGNALS AT BUS MASTER
-- ***********************************

PK_CNG  <=  REQ_O AND REQ_OD AND NOT CHANGED AND C20;
HLD_CNG <=  REQ_O AND CHANGED;

PK_ACTIVE <=  REQ_O AND REQ_OD AND NOT SACTIVE AND CHANGED  AND NOT C20;
HLD_ACTIVE <=  (C20 OR REQ_O) AND SACTIVE;

OE_RPLYN <= NOT (( RX OR RXD_FOR_RPLY ) AND S6PORT );

old_SHIFT <=  NOT  (
          (SLVOUT AND RID)       -- deassert for slvout
        OR (SLVOUTD AND RID)     -- deassert for slvoutd
        OR (REQ_O AND CHANGED)   -- deassert for changed master
                        );

-- MASTER DEVICE
-- 20m --___---___---___---___---___---___---___---___---___---___---___---
-- REQ_O ___---------------------------------------------__________
-- DOEN  ---___________________________------------______----------
-- RPLY_I _________---_______________---______________________________
-- SHIFT ------------________________________________________--------
-- 20m --___---___---___---___---___---___---___---___---___---___---___---
```

```
smsele.vhd        Thu Jan  7 10:22:11 1993        9

-- SLAVE DEVICE
-- 20m __---___---___---___---___---___---___---___---___---___---___---___---___---
-- DOEN ----------------------------------------________----------------
-- SLVOUT __________________________------_________________
-- SHIFT  -----------------------------_________------------
-- DSEL   -----------------------------< SSEL>----------------

--      *************  DSEL CONTROL     *******************
--  DEFAULT IS MSEL
--      - MUST HOLD ROUTE INFO FROM REQ_O UNTIL SHIFT GOES LOW
--              SHIFT GOES LOW WHEN NEXT DEVICE HAS GRABBED
--              ROUTE
--      - CHOOSE SSEL IN RESPONSE TO SLVOUT
--      - DSEL=0 WILL HOLD DATA IN REGISTER


-- SEL_MSEL is active from req in to req_o to pass input until change
--      to address sent to master then it deasserts to hold data,
--      then when master sees change sent from slave it passes msel again

USE_PKSEL <= NOT SLVOUT AND TRY_PKSEL; -- try pck_sel is NOT c20m AND NOT req_o

USE_MSELR <= NOT SLVOUT AND CHANGED;    -- use mselr to accept


DSEL0 <=  ( PK_SEL0 AND USE_PKSEL)
        OR ( MSEL0R AND USE_MSELR )
        OR ( SSEL0 AND SLVOUT );

DSEL1 <=  ( PK_SEL1 AND USE_PKSEL)
        OR ( MSEL1R AND USE_MSELR )
        OR ( SSEL1 AND SLVOUT );

DSEL2 <=  (PK_SEL2 AND USE_PKSEL)
        OR ( MSEL2R AND USE_MSELR )
        OR (SSEL2 AND SLVOUT );


MDSELV <= not (( DSEL2 & DSEL1 & DSEL0 ) AND (S6PORT & S6PORT & S6PORT));

--      ************    CONNECT CONTROL ******************
--      USED BY OTHER'S PORT REQUEST LOGIC TO GENERATE GRANT

CONA <= REQ_O AND A_IS_MAS;
CONB <= REQ_O AND B_IS_MAS;
CONC <= REQ_O AND C_IS_MAS;
```

```
smsele.vhd        Thu Jan  7 10:22:11 1993        10

COND <= REQ_O AND D_IS_MAS;
CONE <= REQ_O AND E_IS_MAS;
CONF <= REQ_O AND F_IS_MAS;


-- cleanup
--          |  ,  |  ,  |  ,  |  ,  |  ,  |  ,  |  ,  |  ,  |
-- XRME ------------____________
-- REQ_O --------------____________
-- CONX ----------------_____________
-- I_KILL -------------_________ ______
-- msel         master  | pcksel
-- mselr        master        |
--          |  ,  |  ,  |  ,  |  ,  |  ,  |  ,  |  ,  |  ,  |

--          |  ,  |  ,  |  ,  |  ,  |  ,  |  ,  |  ,  |  ,  |
-- XRME ----------------______________
-- REQ_O ------------------______________
-- CONX --------------------_______________
-- I_KILL -----------------_______________
-- mselr        master        |
--          |  ,  |  ,  |  ,  |  ,  |  ,  |  ,  |  ,  |  ,  |


--      ************** THINGS TO WATCH OUT FOR  ***********
--
--      RI DEASSERT THEN REASSERT
--              - MUST ALLOW MSEL FROM PREVIOUS TO CLEAR
--              - COULD SEE VALID REQ DEASSERTED AND PREVENT IT
--                      FROM REPICKING FOR A CYCLE OR 2
--      NOT NOT  may want ari ect to be gated ari where gating insures that the
--              signal has been asserted for at least 2 cycles previous
end RTL;
```

```
smself.vhd        Thu Jan  7 10:22:13 1993        1

-- 11/12/92   cek      Inverted the polarity of DSELV so that it can
--                     drive an 8 to 1 mux directly.

-- added try_pksel since c20m could be slow

-- RDCON
--       - MRDCON - MUXED
--       - SRDCON - FROM BUS
-- ACTIVE
--       - MACTIVE - MUXED ACTIVE - REMOTE SLAVE PORTS ARE ACTIVE
--       - SACTIVE - LOCAL BUS IS ACTIVE
--
-- killing
--       -

-- Title: smself
-- Desc:  Master port control logic for XBAR ASIC
-- Date:  April 1, 1992

entity smself is port(
--INS
CLK,  S6PORT, C20M, MRDCON,
PK_SEL0, PK_SEL1, PK_SEL2,
ARX ,BRX ,CRX ,DRX ,ERX ,FRX ,
A_KILL_ME,B_KILL_ME,C_KILL_ME,D_KILL_ME,E_KILL_ME,F_KILL_ME,
SSEL0, SSEL1, SSEL2, RN, CLR,CLR1, MACTIVE, CHANGED, SACTIVE ,SRDCON,
reqib,RO,REQ_KILL,RX, REQ_O                              :in vlbit;

-- speed i/o
x_pk_kill_ri, x_pk_mdoe,x_hld_doe,x_slw_kill_ri,
x_pk_ri_is_kill, x_pk_rx, x_hld_rx,x_pk_req         : inout vlbit;

--OUTS
SSELEN                                  : inout   vlbit;
BLK_RI                                  : inout vlbit;
HLD_CNG,PK_CNG,HLD_ACTIVE,PK_ACTIVE     : out   vlbit;
OE_RPLYN, I_KILL_A,I_KILL_B,I_KILL_C,I_KILL_D,I_KILL_E,I_KILL_F ,
OMSEL0R, OMSEL1R, OMSEL2R               : out   vlbit;
OMSEL0,  OMSEL1,  OMSEL2                : inout vlbit;
SHIFT, RID                              : inout vlbit;

DSELV:                                  out     vlbit_vector(2 downto 0);
MDSELV:                                 out     vlbit_vector(2 downto 0);

SLVOUT                          : inout vlbit;
CONA, CONB, CONC, COND, CONE, CONF:             out     vlbit);
```

```
smself.vhd        Thu Jan  7 10:22:13 1993        2


--input signal description:
--RI - request in
--RX - request
--RI_IS_KILL - External kill from downstream device
--DSEN - grant for data transfer
--SSEL - slave select logic
end smself;

architecture RTL of smself is

--internals

signal
A_IS_MAS,B_IS_MAS,C_IS_MAS,D_IS_MAS,E_IS_MAS,F_IS_MAS,
msel0, msel1,msel2,
msel0r, msel1r, msel2r,
VALID_REQ, TRY_PKSEL,C20,
ROD, RI_IS_KILL,SLVOUTD,PK_SLVOUT,
BLK_M_DOED, BLK_M_DOE,FAST_DEASSERT,
DSEL0,DSEL1,DSEL2,
MDSEL0,MDSEL1,MDSEL2,
NEW_MASTER,
en_kill2, en_kill,
--      NOT NOT  REQ_O,
PK_REQ_O, slv_kill_me,
KILL_MAS_PORT,  MAS_WANTS_ME,
USE_PKSEL,USE_MSELR,RXD_FOR_RPLY, REQ_OD, old_shift:            vlbit;

-------------------------------------------------------------------------
-- KILLING - TO KILL A PORT, THAT PORT MUST KILL IT'S BUS
--                      MASTER WITH MULTIPLE XBAR LEVELS.
--                      THE KILL MUST BE PASSED ALL THE WAY BACK
--                      TO THE ORIGINAL MASTER.
--
-- EXAMPLES OF KILLING BUS A
--      BUS A IS MASTER OF BUS B
--              1) ANOTHER PORT WANTS B
--                      - B SEES NEW_MASTER AND ISSUES I_KILL_A , WHICH IS
--                        B_KILL_A AT A.
--                      - A SEES B_KILL_A  AND TRIES
--                              TO KILL BUS A
--              2) B'S REMOTE BUS DEVICE WANTS TO KILL THE XFER
--                      - RI_IS_KILL IS GENERATED AT B'S REQUEST PAL
--                        CAUSING I_KILL_A, WHICH IS B_KILL_A AT A.
--                      - A SEES B_KILL_A  AND TRIES
```

```
smself.vhd          Thu Jan  7 10:22:13 1993        3

--                                TO KILL BUS A
--                 3) ANOTHER PORT WANTS A
--                         - MAS_WANTS_ME IS GENERATED AT A WHEN IT SEES
--                                PCKSEL <>0
--                         - A  TRIES TO KILL BUS A
--
--   THE FIRST TWO CASES SHOW A SLAVE TRYING TO KICK OFF ::T"S MASTER< WHILE
--      THE THIRD CASE IS A MASTER SEEING THAT SOMONE OTHER THAN HIS SLAVE
--      WANTS HIM OFF
--
--      I_KILL_X         -
--              -   GENERATED TO KILL THE REMOTE PORT THAT IS MY
---                 MASTER WHEN:
--                     1) MY REMOTE BUS IS TRYING TO KILL ME (RI_IS_KILL)
--                     2) HIGHER PRIORITY PORT WANTS ME ( NEW_MASTER )
--
--      SLV_KILL_ME      - GENERATED WHEN ANYONE IS TRYING TO KILL ME
--                       - ONLY MY CURRENT SLAVES WILL GENERATE
--                       - THE OR OF ALL I_KILL_X INTO THIS PORT
--
--      RI_IS_KILL       - MY EXTERNAL BUS WANTS TO FREE UP MY PORT
--                       - COMES FROM MY PORT LOGIC
--
--      MAS_WANTS_ME - GENERATED TO KILL MY EXTERNAL BUS
--                      BECAUSE  A HIGHER PRIORITY MASTER WANTS ME
--
--  FAST KILLING
--      - IF A MASTER PORT IS NOT ACTIVE IT CAN BE KILLED BEFORE HIS RI
--              DEASSERTS
--      - THE master port removes his rx and prevents dsen from passing
--              this will cause the ro at his slave to deasset
--      - THE slave port can remove ro when he sends i_kill_x if the slave
--              port is not active since the master port is gauranteed not to
--              pass dsen to an inactive master on reciept of a x_kill_me
--  CONSIDER A KILL COMING IN TO PORT A when port b is his master
--      - rI_IS_KILL BECOMES I_KILL_B, B, SENDS KILL TO HIS BUS AND
--              DISABLES DSEN FROM GOING OUT IF INACTIVE
--      - a can deasert ro if NOT sactive since he knows a will generate a
--              kill and block dsen

--      NOT NOT NOT  a port only gets killed if rx exists
--              - if you are going to reguest a port just as it gets an
--                ri, the rx will be formed and you will generate the
--                kill on the next cycle if conditions still met

------------------------------------------------------------------------
```

```
smself.vhd        Thu Jan  7 10:22:13 1993        4


begin
--      *****************  KILLING REMOTE PORT  *****************
--      KILL THE PORT THAT IS THE MASTER OF ME
--              - A HIGHER PRIORITY PORT THAN MY MASTER WANTS ME (NEW_MASTER)
--              - MY EXTERNAL BUS WANTS TO GET IN (RI_IS_KILL)

new_mas_proc:process begin wait until CLK = '1';

   NEW_MASTER <=
          (NOT C20 AND REQ_O AND (MSEL2R XOR PK_SEL2)) -- PK_SEL SAYS NEW MASTER
        OR (NOT C20 AND REQ_O AND (MSEL1R XOR PK_SEL1)) --WANTED->GENERATE KILL_MAS_PORT
        OR (NOT C20 AND REQ_O AND (MSEL0R XOR PK_SEL0))
        OR ( C20 AND NEW_MASTER );

        -- NEW_MASTER: pcksel NOT EQUAL to current port

end process;

KILL_MAS_PORT <= REQ_O AND ( NEW_MASTER OR RI_IS_KILL );
        -- kill port that is master of me on my ri or other master wants me

I_KILL_A <= KILL_MAS_PORT AND A_IS_MAS;
I_KILL_B <= KILL_MAS_PORT AND B_IS_MAS;
I_KILL_C <= KILL_MAS_PORT AND C_IS_MAS;
I_KILL_D <= KILL_MAS_PORT AND D_IS_MAS;
I_KILL_E <= KILL_MAS_PORT AND E_IS_MAS;
I_KILL_F <= KILL_MAS_PORT AND F_IS_MAS;

-- sinc i_kill is gated by both req_o and mselr you will never genrate a
--      kill erroneously, i_kill will end 1 cycle after ri from master port
--      deasserts
-- i_killx causes slv_kill_me at the master port, which will try to kill
--      his remote bus master
--      - says slave port wants to deassert his req_o to free himself up

--      **************  KILLING MY EXTERNAL BUS   ********
-- I will try to kill my external bus port if I get a kill from one of the
--      slaves (x_kill_me) or a higher priority port wants me (kill_pw_me)

SLV_KILL_ME <= ( A_KILL_ME OR B_KILL_ME OR C_KILL_ME OR D_KILL_ME OR E_KILL_ME
                OR F_KILL_ME );

MAS_WANTS_ME <= ( PK_SEL2 OR PK_SEL1 OR PK_SEL0);

        --AN ACTIVE PK_SEL WHILE I AM REQUESTING SOMEONE,
```

```
smself.vhd        Thu Jan  7 10:22:13 1993        5

        --      MEANING SOME PORT WANTS ME AND IS OF HIGHER PRIORITY
        -- gated with rx to get a chance to look at priority

x_pk_kill_ri <=  NOT c20 AND (
            ( x_slw_kill_ri )
        OR  (en_kill AND MAS_WANTS_ME)  -- KILL, OTHER PORT WANTS ME
        OR  (en_kill AND CLR));                 -- KILL, FROM PCKCOMP

blk_ri <=  ( x_slw_kill_ri AND NOT mactive )    -- KILL FROM SLAVE PORT
        OR  ( en_kill2 AND MAS_WANTS_ME)        -- KILL, OTHER PORT WANTS ME
        OR  ( en_kill2 AND CLR1) ;              -- KILL, FROM PCKCOMP

x_slw_kill_ri <=  ( en_kill AND SLV_KILL_ME)    -- KILL FROM SLAVE PORT
        OR  (REQ_KILL AND RN);  -- HOLD TILL RI DEASSERTS


--      port expects this to activate on on NOT 20m and hold

--      ***************  REQUEST EXTERNAL BUS ***************


FAST_DEASSERT <= NOT SACTIVE AND KILL_MAS_PORT ;        -- fast deassert of req_o
        -- if have not recieved dsen from bus

x_hld_doe <= (REQ_O AND RN AND NOT BLK_M_DOE AND NOT BLK_M_DOED
                AND NOT (SACTIVE AND NOT C20 AND NOT SRDCON ))
            OR (SLVOUT AND RID AND C20 );

x_pk_mdoe <= (NOT FAST_DEASSERT AND SSELEN AND old_SHIFT AND MAS_WANTS_ME ) ;
                -- gated with NOT reqi to pick doe

--   registered   SSELEN <= NOT RID AND C20 AND NOT RO AND RN ;

x_PK_REQ<= (NOT FAST_DEASSERT AND SSELEN AND old_SHIFT AND MAS_WANTS_ME)
         OR (NOT FAST_DEASSERT AND VALID_REQ );


-- x_PK_REQ_O <= x_pk_req AND NOT blk_rim ;
-- x_en_req <= NOT REQI OR req_o  ;  -- disable if ri in before your ro
-- REQ_O <= RO AND NOT REQ_KILL ;

x_pk_ri_is_kill <= ( NOT C20 AND NOT RID AND ROD)
                OR ( NOT C20 AND RI_IS_KILL );    -- HOLD TILL RI DEACTIVATES

x_pk_rx <= (NOT C20 AND NOT RID AND NOT ROD AND RN)      -- initial pick
        OR (NOT C20 AND RX AND NOT BLK_RI AND RN);      -- repick
```

```
smself.vhd          Thu Jan  7 10:22:13 1993          6

x_hld_rx <= RX AND C20 AND RN;              -- 20m hold

        -- blk if remote ports are inactive
        -- blk_ri says ignore the ri since we are killing
        --       the ri and no dsen has been issued or will be issued
        -- when the ri is a kill it must also be ignored
        --       - no rx, so no attempt to request
        --       - rx deasserts on blk_ri
        -- goes to port_req to disable issue of dsen

reqo_proc:process begin wait until CLK = '1';

   C20 <= NOT C20M;
   TRY_PKSEL <= C20M AND NOT REQ_O;

   SSELEN <= NOT RID AND C20 AND NOT RO AND RN ;

   VALID_REQ <= REQ_O AND C20 AND RN AND (
              (ARX AND A_IS_MAS)
            OR (BRX AND B_IS_MAS)
            OR (CRX AND C_IS_MAS)
            OR (DRX AND D_IS_MAS)
            OR (ERX AND E_IS_MAS)
            OR (FRX AND F_IS_MAS));

   en_kill <= ( RX AND NOT req_o AND c20 );

   en_kill2 <= ( RX AND NOT req_o AND c20 AND NOT MACTIVE );

--   RO  <= ( REQIB AND x_pk_kill_ri )  -- kill
--        OR ( MRI AND x_en_req AND x_PK_REQ_O1);

--   REQ_KILL <= REQIB AND x_pk_kill_ri ;        -- delay NOT NOT

--   DOEA    (
--       (REQIN AND x_pk_mdoe)           -- delay ??
--     OR (x_hld_doe )           -- hold till old_shift deassets
--     OR (REQIB AND SLVOUT)     -- DRIVE FOR SLAVE
--      );

   ROD <= RO ;

   SHIFT <= REQ_O AND NOT ROD AND S6PORT;        -- activate 1 cycle after ro

   BLK_M_DOE <= NOT old_SHIFT AND REQ_O AND (     -- block doe of master for read
          ( NOT C20 AND NOT SRDCON )          -- block on rdcon
      OR ( BLK_M_DOE AND C20 AND RN ));  -- hold
```

```
smself.vhd        Thu Jan  7 10:22:13 1993        7

    BLK_M_DOED <= BLK_M_DOE AND REQ_O ;

    RID  <= (NOT C20 AND REQIB)           -- delay
          OR ( RID AND C20 );

    REQ_OD       <= REQ_O ;

    RXD_FOR_RPLY <= RX
                 OR (RXD_FOR_RPLY AND RID) ;

--   RX <= ( REQIB AND x_pk_rx )  -- PICK ON REQUEST THAT IS NOT A KILL
--       OR ( x_hld_rx );         -- HOLD ON 20M OR RI
--
--        -- either rx or RI_IS_KILL pick on ri AND NOT rid depending on rod

    RI_IS_KILL <=                        -- KILL FROM MY EXTERNAL BUS
          (REQIB AND x_pk_ri_is_kill)   -- ri asserted to kill
        OR (C20 AND RI_IS_KILL );      -- HOLD TILL RI DEACTIVATES

                 -- KILL FROM EXTERNAL BUS - EXTERNAL BUS REQUESTS
                 -- WHEN I AM OR JUST WAS DRIVING REQUEST TO HIM
                 -- HOLD UNTIL I STOP DRIVING REQUEST TO HIM

    PK_SLVOUT <= (NOT C20 AND RX AND NOT RI_IS_KILL AND NOT REQ_O AND NOT MRDCON) -- picks on first
             OR (PK_SLVOUT AND RX AND C20 );                -- hold

    SLVOUT <= ( RX AND PK_SLVOUT AND C20)                 -- assert after pk_slvout
            OR (NOT C20 AND RX AND SLVOUT AND NOT MRDCON); -- repick on slvout and NOT mrdcon

    SLVOUTD <= SLVOUT ;

         MSEL0R <= OMSEL0  ;
         MSEL1R <= OMSEL1  ;
         MSEL2R <= OMSEL2  ;


    A_IS_MAS <=  OMSEL2 AND  OMSEL1  AND  OMSEL0;
    B_IS_MAS <=  OMSEL2 AND  OMSEL1  AND NOT OMSEL0;
    C_IS_MAS <=  OMSEL2 AND NOT OMSEL1  AND  OMSEL0;
    D_IS_MAS <=  OMSEL2 AND NOT OMSEL1  AND NOT OMSEL0;
    E_IS_MAS <= NOT OMSEL2 AND  OMSEL1  AND  OMSEL0;
    F_IS_MAS <= NOT OMSEL2 AND  OMSEL1  AND NOT OMSEL0;
```

```
smself.vhd        Thu Jan  7 10:22:13 1993        8

end process;

--      ***************  MSEL CONTOL    ***********************

MSEL0<= ( TRY_PKSEL AND PK_SEL0)
        OR (REQ_O AND MSEL0R);

MSEL1<= ( TRY_PKSEL AND PK_SEL1)
        OR (REQ_O AND MSEL1R);

MSEL2<= (  TRY_PKSEL AND PK_SEL2)
        OR (REQ_O AND MSEL2R);

OMSEL0 <= MSEL0;
OMSEL1 <= MSEL1;
OMSEL2 <= MSEL2;

OMSEL0R <= MSEL0R;
OMSEL1R <= MSEL1R;
OMSEL2R <= MSEL2R;

-- *********************************
--     SIGNALS AT BUS MASTER
-- ***********************************

PK_CNG  <=  REQ_O AND REQ_OD AND NOT CHANGED AND C20;
HLD_CNG <=  REQ_O AND CHANGED;

PK_ACTIVE <=  REQ_O AND REQ_OD AND NOT SACTIVE AND CHANGED  AND NOT C20;
HLD_ACTIVE <=  (C20 OR REQ_O) AND SACTIVE;

OE_RPLYN <= NOT ( RX OR RXD_FOR_RPLY );

old_SHIFT <=  NOT  (
          (SLVOUT AND RID)      -- deassert for slvout
        OR (SLVOUTD AND RID)    -- deassert for slvoutd
        OR (REQ_O AND CHANGED)  -- deassert for changed master
                        );

-- MASTER DEVICE
-- 20m --___---___---___---___---___---___---___---___---___---___---___---
-- REQ_O ___---------------------------------------------___________
-- DOEN  ---___________________________------------______-----------
-- RPLY_I _________---_______________---______________________________
-- SHIFT ------------________________________________________--------
-- 20m --___---___---___---___---___---___---___---___---___---___---___---
```

```
smself.vhd        Thu Jan  7 10:22:13 1993        9

-- SLAVE DEVICE
-- 20m __---___---___---___---___---___---___---___---___---___---___---___---
-- DOEN ----------------------------------_______----------------
-- SLVOUT ___________________________------__________________
-- SHIFT  -----------------------------_________------------
-- DSEL   -----------------------------< SSEL>----------------

--      *************  DSEL CONTROL     *******************
--  DEFAULT IS MSEL
--      - MUST HOLD ROUTE INFO FROM REQ_O UNTIL SHIFT GOES LOW
--              SHIFT GOES LOW WHEN NEXT DEVICE HAS GRABBED
--              ROUTE
--      - CHOOSE SSEL IN RESPONSE TO SLVOUT
--      - DSEL=0 WILL HOLD DATA IN REGISTER


-- SEL_MSEL is active from req in to req_o to pass input until change
--      to address sent to master then it deasserts to hold data,
--      then when master sees change sent from slave it passes msel again

USE_PKSEL <= NOT SLVOUT AND TRY_PKSEL; -- try pck_sel is NOT c20m AND NOT req_o

USE_MSELR <= NOT SLVOUT AND CHANGED;    -- use mselr to accept


DSEL0 <=  ( PK_SEL0 AND USE_PKSEL)
        OR ( MSEL0R AND USE_MSELR )
        OR ( SSEL0 AND SLVOUT );

DSEL1 <=  ( PK_SEL1 AND USE_PKSEL)
        OR ( MSEL1R AND USE_MSELR )
        OR ( SSEL1 AND SLVOUT );

DSEL2 <=  (PK_SEL2 AND USE_PKSEL)
        OR ( MSEL2R AND USE_MSELR )
        OR (SSEL2 AND SLVOUT );

DSELV <= not ( DSEL2 & DSEL1 & DSEL0 );

MDSELV <= not (( DSEL2 & DSEL1 & DSEL0 ) AND (S6PORT & S6PORT & S6PORT));

--      ************    CONNECT CONTROL ******************
--      USED BY OTHER'S PORT REQUEST LOGIC TO GENERATE GRANT

CONA <= REQ_O AND A_IS_MAS;
CONB <= REQ_O AND B_IS_MAS;
```

```
smself.vhd        Thu Jan  7 10:22:13 1993        10

CONC <= REQ_O AND C_IS_MAS;
COND <= REQ_O AND D_IS_MAS;
CONE <= REQ_O AND E_IS_MAS;
CONF <= REQ_O AND F_IS_MAS;


-- cleanup
--          |   ,   |   ,   |   ,   |   ,   |   ,   |   ,   |   ,   |   ,   |
-- XRME  -------------____________________
-- REQ_O  --------------____________________
-- CONX  ----------------____________________
-- I_KILL  -------------____________________
-- msel         master  | pcksel
-- mselr        master      |
--          |   ,   |   ,   |   ,   |   ,   |   ,   |   ,   |   ,   |   ,   |

--          |   ,   |   ,   |   ,   |   ,   |   ,   |   ,   |   ,   |   ,   |
-- XRME  ----------------____________________
-- REQ_O  ------------------____________________
-- CONX  ---------------------____________________
-- I_KILL  -----------------____________________
-- mselr        master      |
--          |   ,   |   ,   |   ,   |   ,   |   ,   |   ,   |   ,   |   ,   |


--      ************** THINGS TO WATCH OUT FOR  ***********
--
--      RI DEASSERT THEN REASSERT
--              - MUST ALLOW MSEL FROM PREVIOUS TO CLEAR
--              - COULD SEE VALID REQ DEASSERTED AND PREVENT IT
--                      FROM REPICKING FOR A CYCLE OR 2
--      NOT NOT  may want ari ect to be gated ari where gating insures that the
--              signal has been asserted for at least 2 cycles previous
end RTL;
```

```
spckcomp.vhd        Wed Dec 23 15:55:13 1992        1

--  NOT NOT  made outpus out only
--      - no won't synthesize
--  computing of clr/ xGTy occurs over a 2 clock perion
--      - xGTy needed to get pcksel's
--


-- with extra controls on arbitration
--      - if fair doesn't work,want e to loose on a tie
--              - in 5 port don,t care what e does
--              - in 6 port have lots of free signals
--      - on NOT fair may want to hold agtb on aactive, ect
--              -no reason not to do it

--Title:        sPCKCOMP
--Desc:         Priority comparison for use with PCKSEL logic
--Date:         March 27,1992

LIBRARY synth;
USE synth.stdsynth.all;

--module I/O
entity sPCKCOMP is
        port(
                CLK:                    IN      vlbit;
                C20M:                   IN      vlbit;
                EN_RF_WE:               IN      vlbit;
                FAIR:                   IN      vlbit;
                ENKILL:                 IN      vlbit;
                AD01,AD02:              IN      vlbit;
                BD01,BD02:              IN      vlbit;
                CD01,CD02:              IN      vlbit;
                DD01,DD02:              IN      vlbit;
                ED01,ED02:              IN      vlbit;
                FD01,FD02:              IN      vlbit;
                ARX, BRX, CRX, DRX, ERX , FRX:  IN      vlbit;
                ARB, ARC, ARD, ARE, ARF :       IN      vlbit;
                BRA, BRC, BRD, BRE, BRF :       IN      vlbit;
                CRA, CRB, CRD, CRE, CRF :       IN      vlbit;
                DRA, DRB, DRC, DRE, DRF :       IN      vlbit;
                ERA, ERB, ERC, ERD      :       IN      vlbit;
                FRA, FRB, FRC, FRD      :       IN      vlbit;
                A_ACTIVE, B_ACTIVE, C_ACTIVE, D_ACTIVE: IN      vlbit;
                BROADA, BROADB, BROADC, BROADD: IN      vlbit;
```

spckcomp.vhd Wed Dec 23 15:55:13 1992 2

```
        ABTB, ABTC, ABTD, BBTC, BBTD, CBTD  : INOUT VLBIT;
        ABTE, BBTE, CBTE, DBTE  : INOUT VLBIT;
        ABTF, BBTF, CBTF, DBTF  : INOUT VLBIT;
        EBTF                    : INOUT VLBIT;

      aeqb, aeqc ,aeqd, aeqe  : INOUT VLBIT;
            beqc ,beqd, beqe  : INOUT VLBIT;
                  ceqd, ceqe  : INOUT VLBIT;
                        deqe  : INOUT VLBIT;

               EN_CLR_A,EN_CLR_B,EN_CLR_C,EN_CLR_D :   INOUT   vlbit;
               CLR_A,CLR_B,CLR_C,CLR_D :       OUT     vlbit;
               AGTB ,AGTC ,AGTD ,AGTE ,AGTF:   IN      vlbit;
                     BGTC ,BGTD ,BGTE ,BGTF:   IN      vlbit;
                           CGTD ,CGTE ,CGTF:   IN      vlbit;
                                 DGTE ,DGTF:   IN      vlbit;
                                       EGTF:   IN      vlbit;

               AGTBN ,AGTCN ,AGTDN ,AGTEN ,AGTFN:      OUT     vlbit;
                      BGTCN ,BGTDN ,BGTEN ,BGTFN:      OUT     vlbit;
                             CGTDN ,CGTEN ,CGTFN:      OUT     vlbit;
                                    DGTEN ,DGTFN:      OUT     vlbit;
                                           EGTFN:      OUT     vlbit);

end sPCKCOMP;

architecture behavioral of sPCKCOMP is

--internal signals
SIGNAL  iap,ibp,icp,idp,iep,ifp:                vlbit_vector(1 downto 0);
SIGNAL  killai, killao ,killap, killas:  VLBIT;
SIGNAL  killbi, killbo ,killbp, killbs:  VLBIT;
SIGNAL  killci, killco ,killcp, killcs:  VLBIT;
SIGNAL  killdi, killdo ,killdp, killds:  VLBIT;
SIGNAL  beqa                           : VLBIT;
SIGNAL  ceqa, ceqb                     : VLBIT;
SIGNAL  deqa, deqb, deqc               : VLBIT;
SIGNAL  ABTBD, ABTCD, ABTDD, BBTCD, BBTDD, CBTDD  : VLBIT;

SIGNAL
c20,
BGTA,  CGTA,  DGTA,  EGTA,  FGTA,
CGTB,  DGTB,  EGTB,  FGTB,
DGTC,  EGTC,  FGTC,
EGTD,  FGTD,
FGTE                   : vlbit ;
```

```
spckcomp.vhd        Wed Dec 23 15:55:13 1992        3

begin
--------------------------------------------------------------------------------


--vectorize input address for ease of use
        iap <= (AD02 & AD01);
        ibp <= (BD02 & BD01);
        icp <= (CD02 & CD01);
        idp <= (DD02 & DD01);
        iep <= (ED02 & ED01);
        ifp <= (FD02 & FD01);

--------------------------------------------------------------------------------

-- killo - kill stuck outgoing
--       - if requesting e or f and requested by pier at same level
-- killi - kill stuck incoming - if accessing a port accessed by e or f
-- killp - kill if accessing an active pier node
-- kills - kill if requesting an active slave and other node requests you


killAo <= (Arf OR Are) AND (    -- stuck going out non bcast
                   (Aeqb AND brA)             -- if somone wants you
                OR (Aeqc AND crA)
                OR (Aeqd AND drA));

killBo <= (Brf OR Bre) AND (           -- stuck going out
                   (Beqa AND arB)
                OR (Beqc AND crB)
                OR (Beqd AND drB));

killCo <= (Crf OR Cre) AND (           -- stuck going out
                   (Ceqa AND arC)
                OR (Ceqb AND brC)
                OR (Ceqd AND drC));

killDo <= (Drf OR Dre) AND (           -- stuck going out
                   (Deqa AND arD)
                OR (Deqb AND brD)
                OR (Deqc AND crD));


killAp <= (Arb AND bgtA )              -- active pier
        OR (Arc AND cgtA )
        OR (Ard AND dgtA );
```

spckcomp.vhd Wed Dec 23 15:55:13 1992 4

```
killBp <= (Bra AND agtB )                 -- active pier
        OR (Brc AND cgtB )
        OR (Brd AND dgtB );

killCp <= (Cra AND agtC )                 -- active pier
        OR (Crb AND bgtC )
        OR (Crd AND dgtC );

killDp <= (Dra AND agtD )                 -- active pier
        OR (Drb AND bgtD )
        OR (Drc AND cgtD );


killAs <= (Arb AND crb AND cgtA )
        OR (Arb AND drb AND dgtA )
        OR (Arc AND brc AND bgtA )
        OR (Arc AND drc AND dgtA )
        OR (Ard AND brd AND bgtA )
        OR (Ard AND crd AND cgtA );

killBs <= (Bra AND cra AND cgtB )
        OR (Bra AND dra AND dgtB )
        OR (Brc AND arc AND agtB )
        OR (Brc AND drc AND dgtB )
        OR (Brd AND ard AND agtB )
        OR (Brd AND crd AND cgtB );

killCs <= (Cra AND bra AND bgtC )
        OR (Cra AND dra AND dgtC )
        OR (Crb AND arb AND agtC )
        OR (Crb AND drb AND dgtC )
        OR (Crd AND ard AND agtC )
        OR (Crd AND brd AND bgtC );

killDs <= (Dra AND bra AND bgtD )
        OR (Dra AND cra AND cgtD )
        OR (Drb AND arb AND agtD )
        OR (Drb AND crb AND cgtD )
        OR (Drc AND arc AND agtD )
        OR (Drc AND brc AND bgtD );

--      kill on e or f have your slave

killAi <= (Arb AND ((erb AND egtA) OR (frb AND fgtA)))
        OR (Arc AND ((erc AND egtA) OR (frc AND fgtA)))
        OR (Ard AND ((erd AND egtA) OR (frd AND fgtA)));
```

```
spckcomp.vhd        Wed Dec 23 15:55:13 1992        5

killBi <= (Bra AND ((era AND egtB) OR (fra AND fgtB)))
        OR (Brc AND ((erc AND egtB) OR (frc AND fgtB)))
        OR (Brd AND ((erd AND egtB) OR (frd AND fgtB)));

killCi <= (Cra AND ((era AND egtC) OR (fra AND fgtC)))
        OR (Crb AND ((erb AND egtC) OR (frb AND fgtC)))
        OR (Crd AND ((erd AND egtC) OR (frd AND fgtC)));

killDi <= (Dra AND ((era AND egtD) OR (fra AND fgtD)))
        OR (Drb AND ((erb AND egtD) OR (frb AND fgtD)))
        OR (Drc AND ((erc AND egtD) OR (frc AND fgtD)));


-- kill a pier is not necessary if fairness is used since if the port
--      is active then it also must have been first
--      - can heelp if fairness is not used since won't kil active


en_clr_A<=(       bra OR cra OR dra OR era OR fra ) AND NOT A_ACTIVE AND enkill AND NOT broada ;
en_clr_B<=( arb OR       crb OR drb OR erb OR frb ) AND NOT B_ACTIVE AND enkill AND NOT broadb ;
en_clr_C<=( arc OR brc OR       drc OR erc OR frc ) AND NOT C_ACTIVE AND enkill AND NOT broadc ;
en_clr_D<=( ard OR brd OR crd OR       erd OR frd ) AND NOT D_ACTIVE AND enkill AND NOT broadd ;

clr_A <= en_clr_a AND (killAo OR killAi OR killAp OR killAs) ;
clr_B <= en_clr_b AND (killBo OR killBi OR killBp OR killBs) ;
clr_C <= en_clr_c AND (killCo OR killCi OR killCp OR killCs) ;
clr_D <= en_clr_d AND (killDo OR killDi OR killDp OR killDs) ;


--      ------------ EQUAL TO ---------------------------------

AEQB <= NOT (( AD02 xor BD02) or ( AD01 xor BD01));
AEQC <= NOT (( AD02 xor CD02) or ( AD01 xor CD01));
AEQD <= NOT (( AD02 xor DD02) or ( AD01 xor DD01));
AEQE <= NOT (( AD02 xor ED02) or ( AD01 xor ED01));

BEQC <= NOT (( BD02 xor CD02) or ( BD01 xor CD01));
BEQD <= NOT (( BD02 xor DD02) or ( BD01 xor DD01));
BEQE <= NOT (( BD02 xor ED02) or ( BD01 xor ED01));

CEQD <= NOT (( CD02 xor DD02) or ( CD01 xor DD01));
CEQE <= NOT (( CD02 xor ED02) or ( CD01 xor ED01));

DEQE <= NOT (( DD02 xor ED02) or ( DD01 xor ED01));
```

```
BEQA <= AEQB;
CEQA <= AEQC;
CEQB <= BEQC;
DEQA <= AEQD;
DEQB <= BEQD;
DEQC <= CEQD;

--      ----------- GREATER THANS --------------------------------

-- ABTB <= ( ad02 AND NOT bd02)                        -- =3,=2 vs =0,=1
--        OR ( ad01 AND NOT bd02 AND NOT bd01 )  -- =3,=1 vs =0
--        OR ( ad01 AND  ad02 AND NOT bd01 );    -- =3    vs =2,=0
-- gives same speed

ABTB <= '1' when (iap > ibp) else '0';
ABTC <= '1' when (iap > icp) else '0';
ABTD <= '1' when (iap > idp) else '0';
ABTE <= '1' when (iap > iep) else '0';
ABTF <= '1' when (iap > ifp) else '0';

BBTC <= '1' when (ibp > icp) else '0';
BBTD <= '1' when (ibp > idp) else '0';
BBTE <= '1' when (ibp > iep) else '0';
BBTF <= '1' when (ibp > ifp) else '0';

CBTD <= '1' when (icp > idp) else '0';
CBTE <= '1' when (icp > iep) else '0';
CBTF <= '1' when (icp > ifp) else '0';

DBTE <= '1' when (idp > iep) else '0';
DBTF <= '1' when (idp > ifp) else '0';

EBTF <= '1' when (iep > ifp) else '0';

AG      NOT (ARX AND (
         NOT BRX)                 -- if a request and not B
      OR ( ABTB )                 -- if bigger
      OR ( ABTBD AND AEQB )));    -- hold on a tie

AGTCN <= NOT (ARX AND (
        ( NOT CRX)                        -- if a request and not C
      OR ( ABTC )                 -- if bigger
      OR ( ABTCD AND AEQC )));    -- hold on a tie

AGTDN <= NOT (ARX AND (
        ( NOT DRX)                        -- if a request and not D
```

```
spckcomp.vhd        Wed Dec 23 15:55:13 1992        7

      OR ( ABTD )                   -- if bigger
      OR ( ABTDD AND AEQD )));      -- hold on a tie

BGTCN <= NOT (BRX AND (
        ( NOT CRX)                         -- if a request and not C
      OR ( BBTC )                   -- if bigger
      OR ( BBTCD AND BEQC )));      -- hold on a tie

BGTDN <= NOT (BRX AND (
        ( NOT DRX)                         -- if a request and not D
      OR ( BBTD )                   -- if bigger
      OR ( BBTDD AND BEQD )));      -- hold on a tie

CGTDN <= NOT (CRX AND (
        ( NOT DRX)                         -- if a request and not D
      OR ( CBTD )                   -- if bigger
      OR ( CBTDD AND CEQD )));      -- hold on a tie

-- e wins ties unless port is master of f

AGTEN <=NOT ( ( ARX AND ABTE )
      OR ( NOT ERX )
      OR ( AEQE AND ARF AND EN_RF_WE ));

BGTEN <= NOT (( BRX AND BBTE )
      OR ( NOT ERX )
      OR ( BEQE AND BRF AND EN_RF_WE ));

CGTEN <= NOT (( CRX AND CBTE )
      OR ( NOT ERX )
      OR ( CEQE AND CRF AND EN_RF_WE ));

DGTEN <= NOT (( DRX AND DBTE )
      OR ( NOT ERX )
      OR ( DEQE AND DRF AND EN_RF_WE ));


AGTFN <= NOT (( ARX AND ABTF)
      OR ( NOT FRX )) ;

BGTFN <= NOT (( BRX AND BBTF)
      OR ( NOT FRX )) ;

CGTFN <= NOT (( CRX AND CBTF)
      OR ( NOT FRX )) ;
```

```
DGTFN <= NOT (( DRX AND DBTF)
      OR ( NOT FRX )) ;

EGTFN <= NOT (( ERX AND EBTF)
      OR ( NOT FRX )) ;


BGTA  <= NOT AGTB;
CGTA  <= NOT AGTC;
DGTA  <= NOT AGTD;
EGTA  <= NOT AGTE;
FGTA  <= NOT AGTF;
CGTB  <= NOT BGTC;
DGTB  <= NOT BGTD;
EGTB  <= NOT BGTE;
FGTB  <= NOT BGTF;
DGTC  <= NOT CGTD;
EGTC  <= NOT CGTE;
FGTC  <= NOT CGTF;
EGTD  <= NOT DGTE;
FGTD  <= NOT DGTF;
FGTE  <= NOT EGTF;


before_proc: process begin wait until clk = '1';

        c20 <= NOT c20m;

        ABTBD <= (NOT c20 AND fair AND AGTB)
                OR ( C20 AND ABTBD);
        ABTCD <= (NOT C20 AND fair AND AGTC)
                OR ( C20 AND ABTCD);
        ABTDD <= (NOT C20 AND fair AND AGTD)
                OR ( C20 AND ABTDD);

        BBTCD <= (NOT C20 AND fair AND BGTC)
                OR ( C20 AND BBTCD);
        BBTDD <= (NOT C20 AND fair AND BGTD)
                OR ( C20 AND BBTDD);

        CBTDD <= (NOT C20 AND fair AND CGTD)
                OR ( C20 AND CBTDD);

end process;
```

```
end behavioral;
```

```
sport_req.vhd        Wed Dec 23 15:55:10 1992        1


-- self needs work


--Title: sPORT_REQ
--Desc:  XBAR Slave sPort request logic
--Date:  April 2, 1992

--module I/O:
entity sPORT_REQ is port(

--------------------------------------------------------------------------------
-- INS
CLK,C20M, D31,D30,D29,D00,
ACON,BCON,CCON,DCON,ECON,FCON,
AACTIVES, BACTIVES, CACTIVES, DACTIVES, EACTIVES, FACTIVES,
ACHANGEDS, BCHANGEDS, CCHANGEDS, DCHANGEDS, ECHANGEDS, FCHANGEDS,
E_PCK, F_PCK, S6PORT, SELSELF ,
RX,  BLK_RI                     :       in      vlbit;

-- speed outputs


-- OUTS
RPLYSEL0,RPLYSEL1,RPLYSEL2, FORCED_RPLY,FORCED_RDCON    : out vlbit;
MACTIVE, RA,RB,RC,RD,RE,RF      : inout vlbit;
RPLYS0, RPLYS1, RPLYS2          : inout vlbit;
SSEL0,SSEL1,SSEL2               : out vlbit;
BROAD                           : out vlbit;
GRANT                           : inout vlbit);

end sPORT_REQ;
--------------------------------------------------------------------------------

architecture RTL of sPORT_REQ is

-- INTERNALS
signal   COMPS0, GRANTD,C20,CONNECTED, RXD,
BRD_DSEN, SLV_CNGED,

AHOLD, AHOLDR, AUTO,D29C,
B5PORT, B6PORT, SEL4, SELSELFR  :       vlbit;

begin

AUTO <= NOT D00 AND NOT D31 AND NOT D30 AND RX ;        -- automatic bus select
```

```
sport_req.vhd        Wed Dec 23 15:55:10 1992        2

AHOLD <= (E_PCK OR F_PCK OR AHOLDR) AND RX;-- hold current selection in auto

BROAD <=  D00 AND RX;

B5PORT <= NOT S6PORT AND D00 ;

B6PORT <=  S6PORT AND D00;

SELSELFR <= SELSELF AND D00;

D29C <= ( COMPS0 xor D29);                                   -- load

SSEL0 <= D29C ;                                 -- load

SSEL1 <=  (NOT D31 OR D30);

SSEL2 <=  D31;

ssel_proc: process begin wait until CLK = '1';

   C20 <= NOT C20M;

   RXD <= ( NOT C20 AND RX )
        OR (  C20 AND RXD );

   AHOLDR <= (NOT C20 AND AHOLD)
           OR ( AHOLDR AND C20) ;

   COMPS0  <=                                    -- load
          (RX AND  AUTO AND N.: ^20 AND  AHOLD AND  COMPS0)  -- hold
        OR (RX AND  AUTO AND NOT C20 AND NOT AHOLD AND NOT COMPS0)  -- try other
        OR (C20 AND COMPS0);                          -- 20m  hold

   GRANTD <= RX AND GRANT;       -- GRANT SAYS YOU HAVE REQUESTED ALL NECESSARY
              -- not sync to 20m but ok

   CONNECTED      )T C20 AND SLV_CNGED) -- pick on slaves changed
        OR (CONNECTED AND RX AND C20 ) ;         -- 20m hold

         -- connected says all requested have issued a change to address ,
         --      - this signal is sync to c20

end process;

--      ************ GENERATING REQUEST TO OTHER PORTS ********
-- BROADCAST SELECTS
```

sport_req.vhd Wed Dec 23 15:55:10 1992 3

```
--             5port      6 port          non broadcast
-- 0 0 0  -     B C D     A B C D F       F first auto
-- 0 0 1  -     B C       A B C D E       E first auto
-- 0 1 0  - A B C D       F               F
-- 0 1 1  - A B C         E               E
-- 1 0 0  -     B   D     D               D
-- 1 0 1  -     B         C               C
-- 1 1 0  - A B C D       B               B
-- 1 1 1  - A B           A               A

-- on seect self select all 4 nodes (sel 4)

SEL4    <= ( S6PORT AND D00 AND SELSELFR)                  -- 6 port self
        OR ( S6PORT AND D00 AND NOT D31 AND NOT D30)            -- 6 port normal
        OR (NOT S6PORT AND D00 AND  D30 AND NOT D29);      -- 5 port

RA <= ( RX AND D31 AND  D30 AND  D29)              -- broadcast or non broadcast
    OR ( RX AND B5PORT AND D30 )                           -- 5 port
    OR ( RX AND SEL4  ) ;                                  -- sel all 4

RB <= ( RX AND D31 AND  D30 AND NOT D29)                   -- broadcast or not
    OR ( RX AND B5PORT )                                   -- 5 port
    OR ( RX AND SEL4  ) ;                                  -- sel all 4

RC <= ( RX AND NOT B5PORT AND  D31 AND NOT D30 AND  D29)-- non b5port
    OR ( RX AND B5PORT AND NOT D31 )                       -- b5port
    OR ( RX AND SEL4  ) ;                                  -- sel all 4

RD <= ( RX AND D31 AND NOT D30 AND NOT D29)
    OR ( RX AND B5PORT AND NOT D29          )              -- 5 port
    OR ( RX AND SEL4  ) ;                                  -- sel all 4

RE <= ( RX AND NOT B5PORT AND NOT D31 AND D29C);

RF <= ( RX AND NOT B5PORT AND NOT D31 AND NOT D29C);


--       ************    GRANT GENERATION        ********************

GRANT <=  RX AND RXD AND (                 -- GRANT SAYS YOU HAVE REQUESTED ALL NECESSARY
            (NOT RA OR ACON )
        AND (NOT RB OR BCON )
        AND (NOT RC OR CCON )
        AND (NOT RD OR DCON )
        AND (NOT RE OR ECON )
        AND (NOT RF OR FCON )
```

```
sport_req.vhd          Wed Dec 23 15:55:10 1992          4

                  );

        -- grant follows request out at the slave port

-- *********************************
-- SIGNALS AT BUS SLAVE
-- ***********************************


-- rply
--       force high if sending change to address on grant
--       force high for dsen if broadcasting and all connected

MACTIVE <= ( NOT RA OR AACTIVES )                 -- dsen on broadcast
        AND ( NOT RB OR BACTIVES )                -- will add delay to dsen path on
        AND ( NOT RC OR CACTIVES )                -- broadcast
        AND ( NOT RD OR DACTIVES )
        AND ( NOT RE OR EACTIVES )
        AND ( NOT RF OR FACTIVES )
        AND (  RX AND CONNECTED);

FORCED_RPLY <= (D00 AND RX AND RXD AND GRANTD AND MACTIVE AND NOT C20)
            OR (RX AND RXD AND NOT GRANTD AND GRANT AND C20);     -- look for GRANT
                 -- used when selects point to 0
                 -- force high for broadcast dsen

FORCED_RDCON <=  NOT SLV_CNGED OR D00 ; -- force high until changed
                                        -- unless broadcasting

SLV_CNGED <= (NOT RA OR ACHANGEDS ) -- says have recieved change to address from
            AND (NOT RB OR BCHANGEDS )           -- all ports, allows ssel to point
            AND (NOT RC OR CCHANGEDS )           --  to selected slave
            AND (NOT RD OR DCHANGEDS )
            AND (NOT RE OR ECHANGEDS )
            AND (NOT RF OR FCHANGEDS )
            AND (GRANTD AND RX );        -- grantd insures xchange for me

-- rplysels are held at 0 until RX and rxd
--      then they go to 1 to look for grant on 20m until grantd
--      then back to 0 until slv_chnged ( slvchanged blocks their cng-rply)
--      then they move to slvsel to see rply's unless broadcast
--      go back to 0 on NOT c20m and blkri
--      - must change to slvsel as soon as slvcnged happens
--      - ignore slvsel on broadcast, use go broad
--      - return to selecting 0 for dsen if ri is getting blocked
--      - blk_ri is asserted if killing and not active yet, block dsen
--              because dropping reqo
```

```
sport_req.vhd        Wed Dec 23 15:55:10 1992        5

RPLYS0 <=  (RX AND RXD AND D29C AND NOT D00 ) ;
RPLYS1 <= RX AND RXD AND (NOT D31 OR D30) AND NOT D00 ;
RPLYS2 <= RX AND RXD AND D31 AND NOT D00 ;

RPLYSEL0 <= RPLYS0 AND SLV_CNGED AND NOT BLK_RI;
RPLYSEL1 <= RPLYS1 AND SLV_CNGED AND NOT BLK_RI;
RPLYSEL2 <= RPLYS2 AND SLV_CNGED AND NOT BLK_RI;

        -- slv cnged says the rply's are valid to send
        -- blk ri is valid on c20m
--       |   ,   |   ,   |   ,   |   ,   |   ,   |   ,   |   ,   |   ,   |
-- ri   ____----------------------------------------____________
-- ro   ________________--------------------------------_____________
-- con/grant  ___________--------------------------------_____________
-- grantd  __________________--------------------------------________
-- rply_i xxxxxxxxxxxxxxxxxxxxxCNG,dse|rpl,dse|rpl,dse|
-- changed _________________________------------------------__________
-- slv_cnged _______________________------------------------__________
-- rply o ----------_______----_______|dse,rpl|dse,rpl|dse,----------
-- gsel  ______| 1 |___| 1 |_______|slvsel->
-- forced d ----________________________________________----------
--       |   ,   |   ,   |   ,   |   ,   |   ,   |   ,   |   ,   |   ,   |

        -- gsel=1 is looking for grant
end RTL;
```

```
swap16.vhd         Tue Nov 10 10:05:31 1992        1

-- filename: swap16.vhd
-- description: passes or swaps 2 32 bit busses
--              based on the level of the SWAP input.
--
-- history: 5/19/92 created by trm
--      10/5/92         cek     Created swap16.vhc from swap32.vhd
--      11/3/92         cek     Rewrote for speed.
--
ENTITY swap16 IS PORT (

SWAP : IN VLBIT;

AIN,BIN : IN VLBIT_VECTOR(15 downto 0);

AOUT, BOUT : OUT VLBIT_VECTOR(15 downto 0);
x_swapn : inout vlbit
);

END swap16;

ARCHITECTURE rtl OF swap16 IS BEGIN

x_swapn <= not swap;

AOUT <= AIN when (x_swapn = '1') else

        BIN when (x_swapn = '0') else

        x"XXXX";

BOUT <= BIN when (x_swapn = '1') else

        AIN when (x_swapn = '0') else

        x"XXXX";

END rtl;
```

swap32.vhd Wed Oct 21 13:33:31 1992 1

```
-- filename: swap32.vhd
-- description: passes or swaps 2 32 bit busses
--              based on the level of the SWAP input.
--
-- history: 5/19/92 created by trm
--
--
ENTITY swap32 IS PORT (

SWAP : IN VLBIT;

AIN,BIN : IN VLBIT_VECTOR(31 downto 0);

AOUT, BOUT : OUT VLBIT_VECTOR(31 downto 0));

END swap32;

ARCHITECTURE rtl OF swap32 IS BEGIN

AOUT <= AIN when (swap = '0') else

        BIN when (swap = '1') else

        x"XXXXXXXX";

BOUT <= BIN when (swap = '0') else

        AIN when (swap = '1') else

        x"XXXXXXXX";

END rtl;
```

```
vme_ctl.vhd        Tue Jan 19 10:11:09 1993        1

-- filename: vme_ctl.abf
-- description: Combines previous vme_ctl files misc, fif_cnt and
--   fif_in into one file for synthesys.
--
-- history:
-- 10/26/92      cek      Created file by combining misc, fif_cnt and
--                        fif_in into one file.
-- 11/22/92      cek      Added EN_FO_WRTC signal back into fo_wrta logic.
-- 12/7/92       cek      Replaced outlen with rd_clk_en for all control
--                        applications.
-- 12/8/92       cek      Moved the hold time delay on in_wrta outside this block.
--
LIBRARY synth;
USE synth.stdsynth.all;

ENTITY vme_ctl IS PORT (

--inputs:
 ldslvad, b256, matchl, matchm, master, sixportn, eriug,
 estrobei, erdyi, edseni, oeatpan, oeatpdn , adscycln : in vlbit;

 INCLK  : IN VLBIT;

 clk, rn, outlen, rd_clk_en, fifoclk : in vlbit;

-- outputs:
 lcs1             : inout vlbit;
 mat_b256, pass_data     : out vlbit;
 vseln                   : out vlbit_vector(3 downto 0);
 WRT0_15N                : INOUT VLBIT;
 WRT16_31N, WRT48_63N, WRT32_47N,
 DUP_LS_IN               : OUT VLBIT;

 in_rda, in_wrta         : inout vlbit_vector(3 downto 0);
 fo_rda, fo_wrta         : inout vlbit_vector(3 downto 0);
 fo_wpn                  : inout vlbit;

-- speed/timing control outputs

 x_cnt_rstn                      : inout vlbit;
 x_inc_fo_wrta                   : inout vlbit_vector(3 downto 0);
 x_inc_in_rda                    : inout vlbit_vector(3 downto 0);
 x_inc_rda                       : inout vlbit_vector(3 downto 0)
);

END vme_ctl;
```

```
vme_ctl.vhd        Tue Jan 19 10:11:09 1993        2

ARCHITECTURE rtl OF vme_ctl IS

SIGNAL  match, lcs2, lcs3, xout :        vlbit;
SIGNAL  vsn0, vsn1, vsn2, vsn3  :        vlbit;

SIGNAL   LASTDO                 :        vlbit;

SIGNAL fo_rd_inc, en_in_rdc : vlbit;
SIGNAL clkn , x_cnt_rst          : vlbit;
SIGNAL in_wrta_ci1 ,in_wrta_ci2 ,in_wrta_ci3 : VLBIT;
SIGNAL in_wrta_civ : vlbit_vector(3 downto 0);
SIGNAL pre_in_wrta : vlbit_vector(3 downto 0);
SIGNAL pre_fo_rda  : vlbit_vector(3 downto 0);
SIGNAL fo_wrta_ci1 ,fo_wrta_ci2 ,fo_wrta_ci3, en_fo_wrtc : VLBIT;
--SIGNAL fo_wrtan, fo_wrtap : vlbit_vector(3 downto 0);
SIGNAL fo_wrta_civ : vlbit_vector(3 downto 0);
SIGNAL pre_fo_wrta : vlbit_vector(3 downto 0);
SIGNAL in_rda_ci1 ,in_rda_ci2 ,in_rda_ci3 : VLBIT;
SIGNAL in_rda_civ : vlbit_vector(3 downto 0);
SIGNAL pre_in_rda : vlbit_vector(3 downto 0);
SIGNAL rda_ci1 ,rda_ci2 ,rda_ci3 : VLBIT;
SIGNAL rda_civ : vlbit_vector(3 downto 0);
SIGNAL ifo_rda, rfo_rda : vlbit_vector(3 downto 0);

--    PIN SHARING
--       5PORT        6PORT
--
--       mat_b256 <= zoe          port e request out
--       lcs1     <= estrobei
--       lcs2     <= erdyi
--       lcs3     <= edsen
--       xout     <= eri


begin
match    <= NOT (((NOT matchl OR NOT matchm) AND NOT ldslvad) OR (NOT matchl AND NOT matchm AND ldslvad));

mat_b256 <= b256        when (master = '1') else match;

lcs1     <= '0'         when (sixportn = '0') else estrobei;
lcs2     <= '0'         when (sixportn = '0') else erdyi;
lcs3     <= '0'         when (sixportn = '0') else edseni;
xout     <= '0'         when (sixportn = '0') else eriug;

-- buffered NOT outlen to drive the data path muxes.
vsn0    <=      NOT outlen;
vsn1    <=      NOT outlen;
```

```
vme_ctl.vhd          Tue Jan 19 10:11:09 1993        3

vsn2     <=      NOT outlen;
vsn3     <=      NOT outlen;
vseln    <=      (vsn0 & vsn1 & vsn2 & vsn3);

pass_data  <= NOT (master AND oeatpan AND NOT oeatpdn AND NOT adscycln);

        -- PASS_DATA is low during route and address phase of
        -- master transfer


-- moved from : fif_in.abf
-- description: write clocks for crossbar input fifo
-- history: 5/22/92 ported from Bob's source to VHDL by trm
--
--
--
--     LCS 3 2 1     AD 21       WRITES          INC  DUP_LS_IN
--       --------      --        ---------       ---  ---------
--         0 0 0       00        0 0 0 1         16       0
--         0 0 1       01        0 0 1 0                  0
--         0 1 0       10        0 1 0 0                  0
--         0 1 1       11        1 0 0 0 I                0
--
--         1 0 0       00        0 0 1 1         32       1
--         1 1 0       10        1 1 0 0 I                1
--
--         1 0 1       00        1 1 1 1 I       64       1
--
--


-- WRT0_15N_DLY <= NOT INCLK_DLY OR NOT (
--           (NOT LCS3 AND LCS2 AND LCS1)         -- 16 BIT WRITE AND AD=11
--         OR (LCS3 AND LCS2)             -- 32 BIT WRITE AND AD=10
--         OR (LCS3 AND LCS1)             -- 64 BIT WRITE
--               );

WRT0_15N <= NOT INCLK OR NOT (
            (NOT LCS3 AND LCS2 AND LCS1)         -- 16 BIT WRITE AND AD=11
          OR (LCS3 AND LCS2)             -- 32 BIT WRITE AND AD=10
          OR (LCS3 AND LCS1)             -- 64 BIT WRITE
                );

WRT16_31N <= NOT INCLK OR NOT (
          (NOT LCS3 AND LCS2 AND NOT LCS1)       -- 16 BIT WRITE AND AD=10
        OR (INCLK AND  LCS3 AND LCS2)  -- 32 BIT WRITE AND AD=10
        OR (INCLK AND  LCS3 AND LCS1)  -- 64 BIT WRITE
```

```
vme_ctl.vhd        Tue Jan 19 10:11:09 1993        4

                );

WRT32_47N <= NOT INCLK  OR NOT (
            (NOT LCS3 AND NOT LCS2 AND LCS1)      -- 16 BIT WRITE AND AD=01
         OR (INCLK AND  LCS3 AND NOT LCS2)        -- 32 BIT WRITE AND AD=00
         OR (INCLK AND  LCS3 AND LCS1)  -- 64 BIT WRITE
                );

WRT48_63N <= NOT INCLK  OR NOT (
            (NOT LCS3 AND NOT LCS2 AND NOT LCS1) -- 16 BIT WRITE AND AD=00
         OR (INCLK AND  LCS3 AND NOT LCS2)       -- 32 BIT WRITE AND AD=00
         OR (INCLK AND  LCS3 AND LCS1)  -- 64 BIT WRITE
                );

DUP_LS_IN <= LCS3; -- Duplicate LS 16 BIT IN onto ms 16-bit into FIFO
                   -- now active low

-- needed to rename "out" to "xout" in the next equation
-- since "out" is a reserved word in VHDL.


LASTDO <= (XOUT AND LCS2);       -- FOR OUT FIFO COUNT

-- moved from : fif_cnt.abf
-- description: fifo controller for crossbar
-- history: 5/20/92 converted to vhdl from Bob Frisch's
--          abf text file by trm
--


x_cnt_rstn <= NOT ( LDSLVAD OR NOT RN);
x_cnt_rst  <= NOT x_cnt_rstn;

wpn_proc: process begin

        wait until (CLK = '1');
        FO_WPN <=  NOT (FIFOCLK AND XOUT);

end process;

en_fo_wrtc_proc: process begin

        wait until (clk = '0');
        EN_FO_WRTC <= NOT FO_WPN;
end process;

--wrt0_15N_dly IS WRT CLK TO INPUT FIFO
```

```
vme_ctl.vhd          Tue Jan 19 10:11:09 1993          5

--
--       -------- INPUT FIFO WRT COUNTER ------------------
--
--IN_RDA(0:3)    - 4 BIT COUNTER
--               - INCREMENTS ON wrt0_15N_dly GOING UP
--               - CLEARED BY X_CNT_RST
--       NOT NOT  WANT TO DELAY COUNT UP TO MEET TAH ON RAMS
--
--INPUT FIFO WRT COUNTER
in_wrta_ci1 <= in_wrta(0);
in_wrta_ci2 <= in_wrta_ci1 and in_wrta(1);
in_wrta_ci3 <= in_wrta_ci2 and in_wrta(2);
in_wrta_civ <= ( in_wrta_ci3 &  in_wrta_ci2  & in_wrta_ci1 & b"1");
pre_in_wrta <= in_wrta xor in_wrta_civ;

dffc_v(pre_in_wrta,x_cnt_rst,wrt0_15N,in_wrta);

--       ------   out wrt counter ---------------
--       EN_FO_WRTC       - WHEN HIGH INCREMENT
--       X_CNT_RST                - CLEAR


--OUTPUT FIFO WRT COUNTER
fo_wrta_ci1 <= fo_wrta(0);
fo_wrta_ci2 <= fo_wrta_ci1 and fo_wrta(1) ;
fo_wrta_ci3 <= fo_wrta_ci2 and fo_wrta(2) ;

fo_wrta_civ <= ( fo_wrta_ci3 &  fo_wrta_ci2  & fo_wrta_ci1 & b"1" );
x_inc_fo_wrta <= fo_wrta xor fo_wrta_civ;
pre_fo_wrta <= x_inc_fo_wrta when (en_fo_wrtc = '1') else fo_wrta;

clkn <= NOT clk;
 dffc_v(pre_fo_wrta,x_cnt_rst,clkn,fo_wrta);
--      input        clr     clk       output


--       ------  input read counter   ---------------
--       EN_IN_RDC        - WHEN HIGH INCREMENT
--       X_CNT_RST                - CLEAR

--INPUT FIFO READ COUNTER
--EN_IN_RDC <= FIFOCLK AND NOT XOUT;

in_rda_ci1 <= in_rda(0) AND NOT xout;
in_rda_ci2 <= in_rda_ci1 and in_rda(1);
in_rda_ci3 <= in_rda_ci2 and in_rda(2);
```

```
vme_ctl.vhd        Tue Jan 19 10:11:09 1993        6

in_rda_civ <= ( in_rda_ci3 &  in_rda_ci2  & in_rda_ci1 & NOT xout);
x_inc_in_rda <= in_rda xor in_rda_civ;
pre_in_rda <= x_inc_in_rda when (fifoclk = '1') else in_rda;

dffc_v(pre_in_rda,x_cnt_rst,clk,in_rda);
--      input        clr    clk       output


--OUTPUT READ COUNTERS
--       - EFFECTIVELY INC ON OUTLEN UP IF LASTDO
--       - ADDRESS TO FIFO CHANGES ON OUTLEN LOW
--
--
--              OUTLEN                                /|
--             +------                           +---o< |+----OUTLEN
--             |                                 |      \|
--             |                                 |
--           +---+                             +---+
--           |CE |              /    \ ifo_rda  |CE |
--     +---->|   |----------->| +1 |----------->|   |--+----> (Fo_rda(3:0)
--     |     |reg|              \_EN_/          |reg|  |
--     |     +---+                |             +---+  |
--     |                  enb_inc--+                    |
--     +-----------------------------------------------+
--
--

-- The registers are clk by system clock with sync. clock enables


--OUTPUT READ COUNTER INCREMENTER
-- increment enable
--FO_RD_INC <= LASTDO AND XOUT;
--LASTDO <= (XOUT AND LCS2);     -- FOR OUT FIFO COUNT

rda_ci1 <= rfo_rda(0) and xout;
rda_ci2 <= rda_ci1 and rfo_rda(1);
rda_ci3 <= rda_ci2 and rfo_rda(2);
rda_civ <= ( rda_ci3 & rda_ci2 & rda_ci1 & xout);

x_inc_rda  <=  rfo_rda xor rda_civ;
ifo_rda  <=  x_inc_rda when (lcs2 = '1') else rfo_rda;
pre_fo_rda <= ifo_rda when (rd_clk_en = '0') else fo_rda;

-- **************** the old way with output latches *****************
-- the registers:
--dffc_v(fo_rda,x_cnt_rst,outleni2,rfo_rda);
```

```
vme_ctl.vhd          Tue Jan 19 10:11:09 1993          7

--        input   clr        clk      output
-- the latches:
--dlatchc_v(ifo_rda,x_cnt_rst,outleni,fo_rda);
--          input   clr    le      output

dffc_v(pre_fo_rda,x_cnt_rst,clk,fo_rda);
--        input   clr        clk      output

rforda_proc: process
        begin
        wait until CLK = '1';
        if (rd_clk_en = '0') then
                rfo_rda <= rfo_rda;-- hold
        elsif (rd_clk_en = '1') then
                rfo_rda <= fo_rda; -- update
        else
                rfo_rda <= x"X" ;
        end if;
end process;

--rforda_proc: process
--      begin
--      wait until CLK = '1';
--
--      if (outlen = '0' AND fo_rst = '0') then
--              fo_rda <= ifo_rda ;
--              rfo_rda <= rfo_rda;
--      elsif (outlen = '1' AND fo_rst = '0') then
--              fo_rda <= fo_rda;
--              rfo_rda <= fo_rda;
--      elsif fo_rst = '1' then
--              fo_rda <= b"0000";
--      else
--              fo_rda <= x"X";
--      end if;

END rtl;
```

```
xbal.vhd        Tue Nov 10 16:07:37 1992        1

-- filename: XBAL.ABF
-- description: Takes addresses coming in from a
--              PBUS on ports E and F of a crossbar
--              and formats them into proper route/address
--              fields.
--
-- history:
-- trm          5/18/92 created
-- tpb          7/25/92 modified to allow expanded route
-- tpb          7/25/92 added RAM_3_CHIPs option
-- tpb          8/4/92  modified for broadcast using BROADCAST_SEL
-- cek          10/8/92 Created xbal.abf from xba.abf to split the
--              xba into most and least significant 16-bit words.
-- cek          11/4/92 Added structure for synthesis.
--
-- GENERATE PAM(31:0)
--       -  ROUTE ADDRESS
--       - ADDRESS WITH PCON, R/W,LOCK

--*******************************************
--PDI BUS DEFINITION FOR LDSLVAD
--*******************************************
--
-- 1    PDI31        - "1" if broadcast
-- 3    PDI(30:29)  - SPECIFY 1 OF 4 PORTS
-- 6    PDI(28:23)  - NEXT 6 BITS OF ROUTE if RAM_OR_CHIPS = "1"
-- 15   PDI(22:8)   - 15 MS ADDRESS BITS -> 27:13 of node address
-- 1    PDI(7:6)    - UNDEFINED (IACK ??)
-- 1    PDI(5)      - PREAD
-- 1    PDI(4)      - PLOCKN
-- 4    PDI(0:3)    - PCONO

-- NOTE: if RAM_3_CHIPS = "0" then the look-up RAM is 18-bits
--        and PDI(28:23) are not driven.


-- ************************ ROUTE BITs ********************************

-- if broadcast and  BROADCAST_SEL = 0:

--      RAM Code       Port Connections              Route Required
--      --------       ----------------              --------------
--        0 0              B C D           ->            0 0 0
--        0 1              B C             ->            0 0 1
--        1 0            A B C D           ->            0 1 0
--        1 1            A B C             ->            0 1 1
```

```
xbal.vhd        Tue Nov 10 16:07:37 1992        2

-- if broadcast and  BROADCAST_SEL = 1:

--       RAM Code        Port Connections                 Route Required
--       --------        ----------------                 --------------
--         0 0              B   D               ->            1 0 0
--         0 1              B                   ->            1 0 1
--         1 0            A B C D               ->            1 1 0
--         1 1            A B                   ->            1 1 1

-- if not broadcast :

--       RAM Code        Port Connections                 Route Required
--       --------        ----------------                 --------------
--         0 0              D                   ->            1 0 0
--         0 1              C                   ->            1 0 1
--         1 0              B                   ->            1 1 0
--         1 1              A                   ->            1 1 1

-- *********************************************************************


ENTITY xbal IS PORT (


CLK, LDSLVAD, INC_XA,
adphase, RAM_3_CHIPS                     : IN VLBIT;

PDI                                      : IN VLBIT_VECTOR(31 downto 0);
PAI                                      : IN VLBIT_VECTOR(12 downto 3);


PAM                                      : OUT VLBIT_VECTOR(15 downto 0);
-- timing optimization i/o
x_adphasen                               : inout vlbit;
x_ldslvadn                               : inout vlbit;
x_ldslvadp0, x_ldslvadp1, x_ldslvadp2    : inout vlbit;
x_cp0,  x_cp1                            : inout vlbit;
x_pPAO                                   : inout vlbit_vector(15 downto 0);
x_pPAM                                   : inout vlbit_vector(15 downto 0);
x_xainc                                  : inout vlbit_vector(11 downto 3)
);

END xbal;
```

```
xbal.vhd        Tue Nov 10 16:07:37 1992        3

ARCHITECTURE pla OF xbal IS

SIGNAL PAO              : VLBIT_VECTOR(15 downto 0);
SIGNAL ROUTEO_TOP       : VLBIT_VECTOR(24 downto 8);
SIGNAL ROUTEO_BOTTOM    : VLBIT_VECTOR(24 downto 8);
SIGNAL ROUTEOTOP31      : VLBIT;
signal xainc_civ        : vlbit_vector(11 downto 3);
signal ci4 ,ci5 ,ci6 ,ci7 ,ci8 ,ci9 ,ci10,ci11 : vlbit;

BEGIN

-- X address incrementer - replaces addum in process PA1_PROC
ci4 <= PAO(3);
ci5 <= ci4 and PAO(4);
ci6 <= ci5 and PAO(5);
x_cp0 <= ci6;
ci7 <= ci6 and PAO(6);
ci8 <= ci7 and PAO(7);
x_cp1 <= PAO(6) and PAO(7);
ci9 <= x_cp0 and x_cp1 and PAO(8);
ci10 <= ci9 and PAO(9);
ci11 <= ci10 and PAO(10);

xainc_civ <= ( ci11 & ci10  & ci9  & ci8  & ci7  & ci6  & ci5  & ci4  & b"1");
x_xainc     <= xainc_civ xor PAO(11 downto 3);

x_adphasen <= NOT adphase;
x_ldslvadn <= NOT ldslvad;
x_ldslvadp0 <= NOT x_ldslvadn;
x_ldslvadp1 <= NOT x_ldslvadn;
x_ldslvadp2 <= NOT x_ldslvadn;

x_pPAO <= PAO(15 downto 12) & x_xainc(11 downto 3) & PAO(2 downto 0) when (INC_XA = '1') -- inc
                else PAO;                -- hold

PA1_PROC: PROCESS

   BEGIN
   wait until (clk = '1');


IF (x_LDSLVadp0 = '1') THEN

        PAO <= PDI(10 downto 8) & PAI(12 downto 3) & b"0"   &  PDI(5 downto 4);
--              ( PCON's )     &  ( MS ADDR's )   &  ( LS ADDR's )   & (IACK) & (R/W,LOCK)
ELSE
        PAO <= x_pPAO;  -- hold or increment
```

```
xbal.vhd          Tue Nov 10 16:07:37 1992          4

END IF;

IF (x_LDSLVadp1 = '1') THEN
        ROUTEO_TOP <= PDI(24 downto 8);            -- taken in 24-bits in case 3-Ram Configuration
ELSE
        ROUTEO_TOP <= ROUTEO_TOP;                  -- hold
END IF;
IF (x_LDSLVadp2 = '1') THEN
        ROUTEO_BOTTOM  <= ROUTEO_TOP ;
        ROUTEOTOP31 <= PDI(31);

--ELSIF (LDSLVAD = '0' AND INC_XA = '1') THEN
--
----    x_xainc := addum(PAO(11 downto 3),b"1");
--      PAO <= PAO(15 downto 12) & x_xainc(11 downto 3) & PAO(2 downto 0); -- inc
--      ROUTEO_TOP <= ROUTEO_TOP;                  -- hold
--      ROUTEO_BOTTOM  <= ROUTEO_BOTTOM;           -- hold
--      ROUTEOTOP31 <= ROUTEOTOP31;
ELSE

--      PAO <= x_pPAO;
        ROUTEO_BOTTOM  <= ROUTEO_BOTTOM;           -- hold
        ROUTEOTOP31 <= ROUTEOTOP31;
END IF;

END PROCESS;


PAM <=  PAO(15 downto 0)
         when (x_adphasen = '0' ) else
        x_pPAM
         when (x_adphasen = '1' ) else
        x"XXXX"; -- just to keep simulator happy

x_pPAM <= ROUTEO_BOTTOM(24 downto 12) & b"11"    & ROUTEOTOP31
--           ROUTE ( 27-bits  + 2 dummy's )         &(PRICRITY)&(BROADCAST)
          when (RAM_3_CHIPS = '1') else
         ROUTEO_BOTTOM(12 downto 8) & b"00000000" & b"11"     & ROUTEOTOP31
--            &  ROUTE ( 21- bits )      &  filler     &(PRIORITY) & (BROADCAST)
          when (RAM_3_CHIPS = '0') else
         x"XXXX"; -- just to keep simulator happy

--              ROUTEO_BOTTOM(24 downto 12) & b"11"    & ROUTEOTOP31
----         ROUTE ( 27-bits  + 2 dummy's )         &(PRIORITY)&(BROADCAST)
--      when (adphase = '0' AND RAM_3_CHIPS = '1') else
--
--
```

```
--              ROUTEO_BOTTOM(12 downto 8) & b"00000000" & b"11"     & ROUTEOTOP31
----                & ROUTE ( 21- bits )       &  filler     &(PRIORITY) & (BROADCAST)
--
--      when (adphase = '0' AND RAM_3_CHIPS = '0') else
--
--              x"XXXX"; -- just to keep simulator happy

END pla;
```

```
xbam.vhd        Tue Nov 10 16:07:45 1992        1

-- filename: XBAM.ABF
-- description: Takes addresses coming in from a
--              PBUS on ports E and F of a crossbar
--              and formats them into proper route/address
--              fields.
--
-- history:
-- trm          5/18/92 created
-- tpb          7/25/92 modified to allow expanded route
-- tpb          7/25/92 added RAM_3_CHIPs option
-- tpb          8/4/92 modified for broadcast using BROADCAST_SEL
-- cek          10/8/92 Created xbam.abf from xba.abf to split the
--              xba into most and least significant 16-bit words.
-- cek          11/4/92 Added structure for synthesis.
--
-- GENERATE PAM(31:0)
--      -  ROUTE ADDRESS
--      - ADDRESS WITH PCON, R/W,LOCK

--*******************************************
--PDI BUS DEFINITION FOR LDSLVAD
--*******************************************
--
-- 1    PDI31       - "1" if broadcast
-- 3    PDI(30:29)  - SPECIFY 1 OF 4 PORTS
-- 6    PDI(28:23)  - NEXT 6 BITS OF ROUTE if RAM_OR_CHIPS = "1"
-- 15   PDI(22:8)   - 15 MS ADDRESS BITS -> 27:13 of node address
-- 1    PDI(7:6)    - UNDEFINED (IACK ??)
-- 1    PDI(5)      - PREAD
-- 1    PDI(4)      - PLOCKN
-- 4    PDI(0:3)    - PCONO

-- NOTE: if RAM_3_CHIPS = "0" then the look-up RAM is 18-bits
--       and PDI(28:23) are not driven.


-- ************************* ROUTE BITs *********************************

-- if broadcast and  BROADCAST_SEL = 0:

--      RAM Code      Port Connections           Route Required
--      --------      ----------------           --------------
--        0 0             B C D          ->          0 0 0
--        0 1             B C            ->          0 0 1
--        1 0           A B C D          ->          0 1 0
--        1 1           A B C            ->          0 1 1
```

```
xbam.vhd          Tue Nov 10 16:07:45 1992          2


-- if broadcast and  BROADCAST_SEL = 1:

--        RAM Code        Port Connections               Rcute Required
--        --------        ----------------               --------------
--          0 0               B   D            ->           1 0 0
--          0 1               B                ->           1 0 1
--          1 0             A B C D            ->           1 1 0
--          1 1             A B                ->           1 1 1

-- if not broadcast :

--        RAM Code        Port Connections               Route Required
--        --------        ----------------               --------------
--          0 0               D                ->           1 0 0
--          0 1               C                ->           1 0 1
--          1 0               B                ->           1 1 0
--          1 1               A                ->           1 1 1

-- ************************************************************************


ENTITY xbam IS PORT (


CLK, LDSLVAD, FORCE_32E,
adphase, RAM_3_CHIPS, BROADCAST_SEL       : IN VLBIT;

PDI                                       : IN VLBIT_VECTOR(31 downto 0);

PAM                                       : OUT VLBIT_VECTOR(31 downto 16);
-- timing optimization i/o
x_adphasen                                : inout vlbit;
x_ldslvadn                                : inout vlbit;
x_ldslvadp0, x_ldslvadp1, x_ldslvadp2     : inout vlbit;
x_adp, x_adpn                             : inout vlbit_vector(31 downto 16)
);
END xbam;

ARCHITECTURE pla OF xbam IS

SIGNAL PAO              : VLBIT_VECTOR(31 downto 16);
SIGNAL ROUTEO_TOP       : VLBIT_VECTOR(31 downto 13);
SIGNAL ROUTEO_BOTTOM    : VLBIT_VECTOR(31 downto 13);
SIGNAL ROUTE_MSB        : VLBIT;
```

```
BEGIN

x_adphasen <= NOT adphase;
x_ldslvadn <= NOT ldslvad;
x_ldslvadp0 <= NOT x_ldslvadn;
x_ldslvadp1 <= NOT x_ldslvadn;
x_ldslvadp2 <= NOT x_ldslvadn;

PA1_PROC: PROCESS

   BEGIN
   wait until (clk = '1');

IF (x_LDSLVADp0 = '1') THEN

        PAO <= PDI(3 downto 0) & PDI(22 downto 11) ;
--              ( PCON's )     &  ( MS ADDR's )   &  ( LS ADDR's )   & (IACK) & (R/W,LOCK)
ELSE
        PAO <= PAO;        -- hold
END IF;

IF (x_LDSLVADp1 = '1') THEN
        ROUTEO_TOP <= PDI(31 downto 13);                -- taken in 24-bits in case 3-Ram Configuration
ELSE
        ROUTEO_TOP <= ROUTEO_TOP;               -- hold
END IF;
IF (x_LDSLVADp2 = '1') THEN
        ROUTEO_BOTTOM  <= ROUTEO_TOP ;
ELSE
        ROUTEO_BOTTOM  <= ROUTEO_BOTTOM;        -- hold
END IF;


END PROCESS;

ROUTE_MSB  <=  ( ROUTEO_TOP(31) AND BROADCAST_SEL )     -- set if broadcast and BROADCAST_SEL = 1
              OR  NOT ROUTEO_TOP(31);                    -- set if not broadcast

PAM <=          x_adp
        when (x_adphasen = '0') else
                x_adpn
        when (x_adphasen = '1') else
                x"XXXX"; -- just to keep simulator happy
```

```
xbam.vhd        Tue Nov 10 16:07:45 1992        4

x_adp <=        PAO(31 downto 16)
        when (force_32e = '0') else
                b"1001" & PAO(27 downto 16)             -- force PCON's to 32 even
        when (force_32e = '1') else
                x"XXXX"; -- just to keep simulator happy

x_adpn <=       ROUTE_MSB & ROUTEO_TOP(30 downto 23) & ROUTEO_BOTTOM(31 downto 25)
--                        &     ROUTE ( 27-bits  + 2 dummy's )        &(PRIORITY)&(BROADCAST)
        when (RAM_3_CHIPS = '1') else
                ROUTE_MSB & ROUTEO_TOP(30 downto 29) & ROUTEO_BOTTOM(31 downto 29) & ROUTEO_BOTTOM(22 downto 13)
--                        &                  ROUTE ( 21- bits )
        when (RAM_3_CHIPS = '0') else
                x"XXXX"; -- just to keep simulator happy

END pla;
```

```
xbreg32.vhd        Fri Nov 20 09:53:57 1992        1

--Title: XBREG32
--Desc:  32 bit regster model
--Date:  April 7, 1992

entity XBREG32 is port(
--INS
        DIN:                                IN      vlbit_vector(31 downto 0);
        CLK:                                IN      vlbit;

--OUTS
        DOUT:                               OUT     vlbit_vector(31 downto 0) );

end XBREG32;

architecture behavior of XBREG32 is

--INTERNAL

begin

reg32_proc: process begin wait until clk = '1';

        if(vecZ(DIN)) then
                DOUT <= X"XXXXXXXX";
        else
                DOUT <= DIN;
        end if;

end process;


end behavior;
```

```
xbutil.vhd        Wed Oct 21 15:28:46 1992        1

LIBRARY synth;
USE synth.stdsynth.all;

-- Title: XBUTIL
-- Desc:  clock and reset functions
-- Date:  April 8, 1992

entity XBUTIL is port(
        reset:          IN      vlbit;
        clkin:          IN      vlbit;
        clkn:           OUT     vlbit;
        clk:            OUT     vlbit;
        c20m:           INOUT   vlbit;
        resetn:         INOUT   vlbit;
        rd:             INOUT   vlbit);

end XBUTIL;

ARCHITECTURE pla OF XBUTIL IS

signal resetd:  vlbit;
BEGIN

resetd <= reset after 2 ns;

-- just invert reset for now

resetn <= not reset;

dff(resetd,clkin,rd);

-- just invert the clk to produce clkn:

clkn <= NOT (clkin);
clk  <= clkin;

-- generate C20M: (clk / 2)

C20MPROC: PROCESS

BEGIN

   WAIT UNTIL (prising(clkin) OR (resetn = '0'));
      IF (resetn = '0') then c20m <= '0';
   ELSE
      c20m <= NOT c20m;
   END IF;
```

```
END PROCESS;
END pla;
```

```
xcv32.vhd        Wed Oct 21 13:33:31 1992        1

-- xcv32.vhd
-- a 32 bit transceiver bidirect on one side, in
-- and out port on the other side.
-- author: Tom Morin
-- history: 4/2/92 initial creation

LIBRARY synth;
USE synth.stdsynth.all;

ENTITY xcv32 IS PORT (

OE : IN VLBIT;
AIN : IN VLBIT_VECTOR (31 downto 0);
BOUT : OUT VLBIT_VECTOR (31 downto 0);
CBI  : INOUT VLBIT_VECTOR (31 downto 0));

END xcv32;

ARCHITECTURE rtl OF xcv32 IS

BEGIN

CBI <= b"ZZZZZZZZZZZZZZZZZZZZZZZZZZZZZZZZ" when ('1' = OE )
      ELSE AIN;
--      ELSE b"XXXXXXXXXXXXXXXXXXXXXXXXXXXXXXXX";

BOUT <= CBI;

END rtl;
```

Mercury Computer Systems
MODULE DEVELOPMENT

Title
*CE ASIC: VHDL Listings*

February 1, 1993 add16.vhd
bereg32.vhd
buf13.vhd
buf27.vhd
cecon.vhd
cnt32.vhd
cs8gate.vhd
datapath.vhd
dmacnt.vhd
dmacpt.vhd
dmala.vhd
dninc32.vhd
dracnt.vhd
dreg32.vhd
eccerr.vhd
edc.vhd
edcgen.vhd
enpgo.vhd
ereg29.vhd
ereg32.vhd
fifctl.vhd
fifram.vhd
hmnmux.vhd
i2mux25.vhd
i2mux32.vhd
i3mux32.vhd
i4mux11.vhd
ilat32.vhd
ilat7.vhd
inc11.vhd
lat16.vhd
lat20.vhd
lat32.vhd
lat39.vhd
load.vhd
mbfifcnt.vhd
ncnt32.vhd
ndec32.vhd
ndinc25.vhd
ndmacnt.vhd
ndmala.vhd
ndracnt.vhd
ninc16.vhd
ninc25.vhd
ninc32.vhd
nmbfifcnt.vhd
nrefcnt.vhd
padrctl.vhd
pageram.vhd
pmux.vhd
pwrgate32.vhd
rammux.vhd
refcnt.vhd
reg11.vhd
reg32.vhd
remmux.vhd
selvis.vhd
slvad.vhd
slvdec.vhd
utility.vhd
vis.vhd
vrammux.vhd
xcv1.vhd
xcv16.vhd
xcv32.vhd
xcv7.vhd Computer Systems, Inc.
MERCURY

```
add16.vhd        Wed Oct 21 13:55:00 1992        1

-- ADD16.VHD
-- a 16 bit addr
-- author: Tom Morin
-- history: 4/13/92 created

ENTITY add16 IS PORT (

ain, bin : in vlbit_vector(15 downto 0);
cout     : out vlbit_vector(15 downto 0));

END add16;

ARCHITECTURE rtl OF add16 IS

BEGIN

add16_proc: process(ain, bin)

variable add16_temp : vlbit_vector(16 downto 0);

begin

add16_temp := addum(ain(15 downto 0), bin(15 downto 0));

cout <= add16_temp(15 downto 0);

end process;

end rtl;
```

bereg32.vhd Wed Oct 21 13:55:00 1992 1

```
-- bereg32
-- a 32 bit register with rising edge clock
-- and byte clock enables
-- author: Tom Morin
-- history: 4/14/92 created

LIBRARY synth;
USE synth.stdsynth.all;

ENTITY bereg32 IS PORT(

DIN : IN VLBIT_VECTOR(31 DOWNTO 0);
BE3, BE2, BE1, BE0 : IN VLBIT;
CLK  : IN VLBIT;
DOUT : INOUT VLBIT_VECTOR(31 DOWNTO 0)
                    );

END bereg32;

ARCHITECTURE rtl OF bereg32 IS

signal byte3, byte2, byte1, byte0 : vlbit_vector(7 downto 0);

BEGIN

byte3 <= din(31 downto 24) when (be3 = '1') else dout(31 downto 24);
byte2 <= din(23 downto 16) when (be2 = '1') else dout(23 downto 16);
byte1 <= din(15 downto  8) when (be1 = '1') else dout(15 downto  8);
byte0 <= din( 7 downto  0) when (be0 = '1') else dout( 7 downto  0);


bereg32_proc: process begin wait until (clk = '1');

   dout <= byte3 & byte2 & byte1 & byte0;

end process;

END rtl;
```

```
buf13.vhd        Wed Oct 21 13:55:00 1992        1

-- buf13
-- a 13 bit buffer
-- 9/2/92 trm

LIBRARY synth;
USE synth.stdsynth.all;

ENTITY buf13 IS PORT(

DIN : IN VLBIT_VECTOR(12 DOWNTO 0);
DOUT : OUT VLBIT_VECTOR(12 DOWNTO 0)
                    );

END buf13;

ARCHITECTURE rtl OF buf13 IS

BEGIN

        DOUT <= DIN;

END rtl;
```

```
buf27.vhd          Wed Oct 21 13:55:00 1992          1

-- buf27
-- a 27 bit buffer
-- 7/7/92 trm

LIBRARY synth;
USE synth.stdsynth.all;

ENTITY buf27 IS PORT(

DIN : IN VLBIT_VECTOR(26 DOWNTO 0);
DOUT : OUT VLBIT_VECTOR(26 DOWNTO 0)
                    );

END buf27;

ARCHITECTURE rtl OF buf27 IS

BEGIN

        DOUT <= DIN;

END rtl;
```

```
cecon.vhd        Wed Dec 23 15:54:51 1992        1

-- i/o changes
--      added mcfgo,rds0na,mcfgo,nrdyr perite_rdy
--      removed na,nrdyn

-- removed doen stuff to off chip
-- added pmon and extra outputs for rply and master oe
-- inverted ras/cas/ramwrt

--  added doenf
-- removed oecatrn and miscon(9) (testpar)
--  gated ramwrtn - can undo see ramwrtn
--

-- added test signal as input
-- added rw_len as output
--      - goes low when latch driving ram data should open

-- ordfull - change to remove orc0
--EN_SREQ <= (NOT EX_KILL AND NOT REQ_OD) ;     -- ri that was not a kill
-- NOT NOT  changed x_p_passna to not include z_enpgo
-- NOT NOT  deleteed mcowns and NOT blkego from last two lines of enmgo
-- timing ram write data -- fixed delay from s1 write should do it
--      rw_len <= S1WRTITE OR TEST ;
--
--              S1WRITE <= OPICKS1W ;
-- new input and output, delay rw_len in pcc between 8 and 12

-- x_pk_ds deleted terms in x_dma_pk_strb

-- x_pk_split_m  x_qpreadi_pck, req_i1,req_i2,strobei1

-- gated NOT req_o into dmapck to prevent repick till req_o is done
-- also added reqodd gating to insre that req_o is low for at least 2 bus
--      cycle before reasseting
-- changed polarity of pgonst in hold fro req860 - un did this
-- NOT NOT NOT  9/24 removed blkego from enmgo -- only on for mcowns
-- remove from i/o
--      sel_datm
--      dataphase
--      split
--  add
--      - drvpn
--      - sel_na sel_dma sel_page


-- should set 20m to come in late
--      - utility must drive it hard
```

```
cecon.vhd          Wed Dec 23 15:54:51 1992          2

-- for speed
--        - ras    - seperate bank selsfor mc/host
--        - ken    - have internal decode on mc address only
--
LIBRARY synth;
USE synth.stdsynth.all;

ENTITY  cecon IS PORT (


--        INPUTS

          PMON0                    : IN VLBIT ;
          PMON1                    : IN VLBIT ;
          PMON2                    : IN VLBIT ;
          REFCNT8                  : IN VLBIT ;
          REFRATE                  : IN VLBIT ;
          TESTDOE                  : IN VLBIT ;
          FORCEDOE                 : IN VLBIT ;
          TESTINC                  : IN VLBIT ;
          FORCEINC                 : IN VLBIT ;
          LATTEST                  : IN VLBIT ;
          INTERNPAGE               : IN VLBIT ;
          REQ_I1                   : IN VLBIT ;
          REQ_I2                   : IN VLBIT ;
          STROBEI1                 : IN VLBIT ;
          DMATC                    : IN VLBIT ;
          MEMN                     : IN VLBIT ;
          ADS                      : IN VLBIT ;
          B2K                      : IN VLBIT ;
          MBANK0                   : IN VLBIT ;
          MBANK1                   : IN VLBIT ;
          BANK0                    : IN VLBIT ;
          BANK1                    : IN VLBIT ;
          C20M                     : IN VLBIT ;
          CACHN                    : IN VLBIT ;
          CLK                      : IN VLBIT ;
          COLBNDN                  : IN VLBIT ;
          CS8                      : IN VLBIT ;
          DMACNT31                 : IN VLBIT ;
          DMAWRT                   : IN VLBIT ;
          ENDMA                    : IN VLBIT ;
          ENDMAINT                 : IN VLBIT ;
          EX_RD_ERI                : IN VLBIT ;
          INTERUPT                 : IN VLBIT ;
          MEM_ER                   : IN VLBIT ;
          GNEAR                    : IN VLBIT ;
```

```
        NLOCKN                    : IN VLBIT ;
        NREADN                    : IN VLBIT ;
        FASTD                     : IN VLBIT ;
        LENA                      : IN VLBIT ;
        LD_PER_CON                : IN VLBIT ;
        PLOCKNI                   : IN VLBIT ;
        PREADI                    : IN VLBIT ;
        REFCNT12                   : IN VLBIT ;
        REQ_I                      : IN VLBIT ;
        RN                        : IN VLBIT ;
        RPLY_I2                   : IN VLBIT;
        RPLY_I                    : IN VLBIT ;
        SPLIT_AD                   : IN VLBIT ;
        STROBEI                   : IN VLBIT ;

A                 : IN VLBIT_VECTOR(31 downto 3 ) ;
BCOFF             : IN VLBIT_VECTOR(11 downto 8 ) ;
BE                : IN VLBIT_VECTOR( 7 downto 0 ) ;
PCONI             : IN VLBIT_VECTOR( 3 downto 0 ) ;
PIH               : IN VLBIT_VECTOR( 4 downto 0 ) ;
BDOM              : IN VLBIT_VECTOR(10 downto 0 ) ;
MA                : INOUT VLBIT_VECTOR(27 downto 3 ) ;      -- master address

--      OUTPUTS
mcfgo           :out vlbit ;
rds0na          :out vlbit ;
mcpfgo          :out vlbit ;
nrdyr           :out vlbit ;
pwrite_rdy            :out vlbit ;

OE_RPLYN2                    : out vlbit;
OE_RPLYN0                    : out vlbit;
OEMASN2                      : out vlbit;
OEMASN0                      : out vlbit;


        M_OE_HLD                    : INOUT VLBIT ;
        EN_SLV_OE                    : INOUT VLBIT ;
        PRERAS                    : INOUT VLBIT ;
        PRECAS                    : INOUT VLBIT ;
RW_LEN                : out VLBIT ;
MOREGOS                : inout VLBIT ;
a11d                   : inout VLBIT ;
gateonn                : OUT VLBIT ;                -- reg inv
shift                  : OUT VLBIT ;                -- async
sel_na                 : OUT VLBIT ;                -- async
sel_page               : OUT VLBIT ;                -- async
```

```
cecon.vhd          Wed Dec 23 15:54:51 1992        4

    sel_dma          : OUT VLBIT ;                  -- async
    drvpn            : OUT VLBIT ;                  -- async
   Odmablkn          : OUT VLBIT ;                  -- reg/inv
   OMCOWNS           : OUT VLBIT ;                  -- reg- non inv
   OACOMP0           : OUT VLBIT ;                  -- reg- non inv
   OACOMP1           : OUT VLBIT ;                  -- reg- non inv
   OBCASTSEL         : OUT VLBIT ;                  -- reg-non inv
   PK_CASL           : OUT VLBIT ;                  -- reg-non inv
   PK_CASM           : OUT VLBIT ;                  -- reg-non inv
   OADPHASE        : INOUT VLBIT ;                  -- reg/inv
   OCMDLOAD          : OUT VLBIT ;                  -- reg non inv
    COLSEL0          : OUT VLBIT ;                  -- reg/inv
    COLSEL1          : OUT VLBIT ;                  -- reg/inv
    DLAINC           : OUT VLBIT ;                  -- async
   ODMACMD           : OUT VLBIT ;                  -- reg-non inv
   ODMASEL           : OUT VLBIT ;                  -- reg/inv
    DRAINC           : OUT VLBIT ;                  -- async
   OPER_CNT          : OUT VLBIT ;  -- reg-non inv
    RW_SEL860N       : OUT VLBIT ;                  -- reg/inv
    EX_RD_ERO        : OUT VLBIT ;                  -- reg-non inv
   OFIFORST          : OUT VLBIT ;                  -- reg-non inv
    FIFOWRTN         : OUT VLBIT ;                  -- reg-non
    FIFRDCLK         : OUT VLBIT ;                  -- async
   OPK_RTALEN        : OUT VLBIT ;                  -- reg/inv
    HPICKS1W         : OUT VLBIT ;                  -- async
   OKEN            : INOUT VLBIT ;                  -- went to i/o
    MAS_RD_ER        : OUT VLBIT ;                  -- reg-non inv
    -- NA               : OUT VLBIT ;  -- async NOT NOT now generated externally
    -- NRDYN            : OUT VLBIT ;  -- async NOT NOT now generated externally
    PK_OEATNN        : OUT VLBIT ;                  -- async inv
    OEMASN           : OUT VLBIT ;                  -- async
    OE_RPLYN         : OUT VLBIT ;                  -- async
    PALDENA          : INOUT VLBIT ;                  -- async
    HLD0N            : OUT VLBIT ;                  -- reg/inv
    HLD1N            : OUT VLBIT ;                  -- reg/inv
    HLD2N            : OUT VLBIT ;                  -- reg/inv
    HLD3N            : OUT VLBIT ;                  -- reg/inv
    PICKS1R          : OUT VLBIT ;                  -- async
   OPICKS1W        : INOUT VLBIT ;                  -- went i/o
   OPINCLKEN         : OUT VLBIT ;                  -- reg/inv
    PKDMAINT         : OUT VLBIT ;                  -- reg-non inv
   OPLOCKNO          : OUT VLBIT ;                  -- reg-non inv
   OPREADO           : OUT VLBIT ;                  -- reg-non inv
    RAMWRTN          : OUT VLBIT ;                  -- reg-non inv
   OREFRESHN         : OUT VLBIT ;                  -- reg-non inv
   OREQ_O            : OUT VLBIT ;                  -- reg-non inv
   OROWN             : OUT VLBIT ;                  -- reg-non inv
```

```
cecon.vhd          Wed Dec 23 15:54:51 1992        5

 ROWND                    : OUT VLBIT ;              -- reg-non inv
 RPLYO                    : OUT VLBIT ;              -- reg-non inv
ORTALEN                   : OUT VLBIT ;              -- reg-non inv
 RW_SELPN                 : OUT VLBIT ;              -- reg/inv
 FIN_SELRAMN              : OUT VLBIT ;              -- reg/inv
OWRTBLK                   : OUT VLBIT ;              -- reg/inv
OSLVSELN                  : OUT VLBIT ;              -- reg/inv
OSLV_AD_LEN               : OUT VLBIT ;              -- reg-non inv
 STROBEO                  : OUT VLBIT ;              -- reg- non inv
 WCCLK                  : INOUT VLBIT ;             -- async

 C20                      : INOUT VLBIT ;             -- async
 RAS1                     : INOUT VLBIT ;              -- reg -non inv
 RAS0                     : INOUT VLBIT ;              -- reg -non inv
--  -----------------SPEED VECTORS  ----------------------------

z_nrepick_ras0 ,
z_nrepick_ras1 ,
z_rmwur,
z_pout          : inout vlbit;

x_enpgo_1       : out   vlbit;
dis_pgo_2       : out vlbit;

z_enpgo         : in vlbit;

z_enmgo,
z_readn,
z_64bitur,

x_en86gop,
x_en86go,
x_p_passna,
x_fmwrite_ok,
x_fmread_ok,
x_pkmrdyr,
x_as_pk,
x_slv_pk_hr,
x_pk_slv,
x_split_pk,
x_ds_pck,
x_qds_pck,
x_en_gsreq,
x_en_sreq,
x_ennosplit ,
x_ensplit ,
x_pk_ds,
```

```
x_dma_pk_stb,
x_ends,
x_pgopck,
x_hld_enas ,
x_reqhold,
x_pk_cng,
x_pk_req,
x_pk_dataphase,
x_qpreadi_pk,
x_pk_split_md       :INOUT VLBIT ;
XMAI                : OUT VLBIT_VECTOR(11 downto 3) ;


PCONO                : INOUT VLBIT_VECTOR(3 downto 0) );


END  cecon;
ARCHITECTURE pla OF  cecon IS


SIGNAL

PRAMWRTN,
gateona,
C20N,
HLD0,
HLD1,
HLD2,
HLD3,
ACOMP0,
ACOMP1,
ADPHASEN            ,
BCASTSEL            ,
CMDLOAD             ,
COLSEL0N            ,
COLSEL1N            ,
DATAPHASE           ,
--DLAINC            ,
DMACMD              ,
DMASELN             ,
--DRAINC            ,
PER_CNT             ,
RW_SEL860           ,
EX_RD_ER            ,
FIFORST             ,
```

```
cecon.vhd        Wed Dec 23 15:54:51 1992        7

--FIFOWRTN              ,
--FIFRDCLK              ,
PK_RTALEN               ,
--HPICKS1W              ,
--KEN                   ,
--MAS_RD_ER             ,
--NA
--NRDYN
PK_OEATNA                 ,
--OEMASN                ,
--OE_RPLYN              ,
--PALDENA               ,
PBEN0                 ,
PBEN1                 ,
PBEN2                 ,
PBEN3                 ,
--PICKS1R               ,
--PICKS1W               ,
PINCLKENA             ,
--PKDMAINT              ,
PLOCKNO               ,
PREADO                ,
--RAMWRTN               ,
--RAS0                  ,
--RAS1                  ,
REFRESHN              ,
REQ_O                  ,
ROWN                  ,
--ROWND                 ,
--RPLYO                 ,
RTALEN                ,
RW_SELP               ,
FIN_SELRAM               ,
SLVSEL                ,
SLV_AD_LEN            ,
SPLIT
--STROBEO               ,
--WCCLK

      : VLBIT;

--IO SIGNALS

     SIGNAL     pk_ex_kill                  :VLBIT ;
     SIGNAL     A2R                :VLBIT ;
     SIGNAL     ASDRV              :VLBIT ;
     SIGNAL     BC0                :VLBIT ;
```

cecon.vhd Wed Dec 23 15:54:51 1992 8

```
      SIGNAL    BC1                 :VLBIT ;
      SIGNAL    BC2                 :VLBIT ;
      SIGNAL    BC3                 :VLBIT ;
      SIGNAL    BEMPTY              :VLBIT ;
      SIGNAL    BLKEGO              :VLBIT ;
      SIGNAL    BUFFULL             :VLBIT ;
      SIGNAL    CASPICK             :VLBIT ;
      SIGNAL    CASPICKD            :VLBIT ;
      SIGNAL    CASRN               :VLBIT ;
      SIGNAL    CD                  :VLBIT ;
      SIGNAL    CODER               :VLBIT ;
--      SIGNAL  CS8CODE             :VLBIT ;
      SIGNAL    CU                  :VLBIT ;
      SIGNAL    DINPENDING          :VLBIT ;
      SIGNAL    DIN_ON_BUS           :VLBIT ;
      SIGNAL    DMABLK              :VLBIT ;
      SIGNAL    DMABUF              :VLBIT ;
      SIGNAL    DMAIN               :VLBIT ;
      SIGNAL    DMAREQM             :VLBIT ;
      SIGNAL    DOWNSM              :VLBIT ;
      SIGNAL    DSELND              :VLBIT ;
      SIGNAL    DSPULSE             :VLBIT ;
      SIGNAL    ENAS                :VLBIT ;
      SIGNAL    ENMREAD             :VLBIT ;
      SIGNAL    EN_RPLY             :VLBIT ;
      SIGNAL    NOT_KILL             :VLBIT ;
      SIGNAL    GON                 :VLBIT ;
      SIGNAL    GONS                :VLBIT ;
      SIGNAL    GPREADI             :VLBIT ;
      SIGNAL    HLDSLVENA            :VLBIT ;
      SIGNAL    HMN                 :VLBIT ;
      SIGNAL    HMND                :VLBIT ;
      SIGNAL    HR0                 :VLBIT ;
      SIGNAL    HR1                 :VLBIT ;
      SIGNAL    INT                 :VLBIT ;
      SIGNAL    LOAD_ROUTE          :VLBIT ;
      SIGNAL    MASTER              :VLBIT ;
      SIGNAL    MC_FGO              :VLBIT ;
      SIGNAL    MC_PFGO              :VLBIT ;
      SIGNAL    MCOWNS              :VLBIT ;
      SIGNAL    MINPROC             :VLBIT ;
      SIGNAL    MLOCKED             :VLBIT ;
      SIGNAL    MOFIC               :VLBIT ;
      SIGNAL    MRDYR               :VLBIT ;
      SIGNAL    NINTERNAL           :VLBIT ;
--      SIGNAL  NRDYR             :VLBIT ;
      SIGNAL    O64BITR             :VLBIT ;
```

```
cecon.vhd        Wed Dec 23 15:54:51 1992        9
     SIGNAL      ORC0                  :VLBIT ;
     SIGNAL      ORC1                  :VLBIT ;
     SIGNAL      ORC2                  :VLBIT ;
     SIGNAL      ORC3                  :VLBIT ;
     SIGNAL      ORDFULL               :VLBIT ;
--     SIGNAL    PWRITE_RDY                   :VLBIT ;
     SIGNAL      PASSNA                   :VLBIT ;
     SIGNAL      PC0                   :VLBIT ;
     SIGNAL      PC1                   :VLBIT ;
     SIGNAL      PC2                   :VLBIT ;
     SIGNAL      PCKNRDY               :VLBIT ;
     SIGNAL      PCKNRDYD              :VLBIT ;
     SIGNAL      PCRESET               :VLBIT ;
     SIGNAL      PGONST                :VLBIT ;
     SIGNAL      PK_F_RDCLK            :VLBIT ;
     SIGNAL      PK_LASTN              :VLBIT ;
     SIGNAL      PK_SONA               :VLBIT ;
     SIGNAL      PLOCKED               :VLBIT ;
     SIGNAL      POUT                  :VLBIT ;
     SIGNAL      PREFETCH              :VLBIT ;
     SIGNAL      RACK                  :VLBIT ;
     SIGNAL      RCUED                 :VLBIT ;
     SIGNAL      REFREQ                :VLBIT ;
     SIGNAL      REQ860                :VLBIT ;
     SIGNAL      RMWDN                 :VLBIT ;
     SIGNAL      NRMWUR                 :VLBIT ;
     SIGNAL      ROUT                  :VLBIT ;
     SIGNAL      SONA                    :VLBIT ;
     SIGNAL      S1                    :VLBIT ;
     SIGNAL      SLVASD                :VLBIT ;
     SIGNAL      SLVCASPICK            :VLBIT ;
     SIGNAL      SLVDSD                :VLBIT ;
     SIGNAL      SLVOUT                :VLBIT ;
     SIGNAL      SPLIT_FILL            :VLBIT ;
     SIGNAL      SPLIT_MD              :VLBIT ;
     SIGNAL      WRTBLKN               :VLBIT ;

-- PAL SIGNALS

-- ADSD
SIGNAL  ENCNT, FLASTN, CACHER,HGO,nfirstgo,
         GONBLK         :VLBIT;
-- BUFCON
SIGNAL F20M, PK_FRST, SPLIT_FILLD, PC3   :VLBIT;

-- DMA
```

```
cecon.vhd        Wed Dec 23 15:54:51 1992        10

SIGNAL

DMAO, ENDMAOUT, BCUND, BCDNU, FASTDMA, DMAPCK,PAGE_BRK,DBEMPTY,DBUFFULL,DMAHOLD,
EN_CAS_DMAO ,EN_CAS_DMAI,ENCNTD_O, PCK_DS_DMAI, DONECMD, DMAACTIVE,
PK_DONECMD : VLBIT;


-- FIFO
SIGNAL ORCU, ORCD : VLBIT;

-- IOCON
SIGNAL  REN_SLV_OE,GPREADID,GPREADID2,
PK_EN_SLV_OE, SRDCON, BLK_M_DOED,BLK_M_DOE,
REFCNTD, REFCNT, REFC0, REFC1, IGNORE_SREQ , ENBCAST, BLK_DS_PCK,
VALID_SLV , BROADCAST, PCK_ROUTE,REFEDGE,REFRATED,
PK_REF, PK_DMA, GSREQD, SREQD, LD_ROUTE_D : VLBIT;


-- MASTER
signal  EXT_ACCESS,LAST_EXT  : vlbit;

-- NBUSCON
SIGNAL  LASTN, NPICK_MEM ,PICK, CLKD, CLKD2,
S0 , PK_PICKS1R, PK_PICKS1W, s1write : VLBIT;


-- NADEC
SIGNAL  NKENA : VLBIT;

-- PERFORM
SIGNAL  prownd,memory,external,n10,lmemn,
t1,t0, m1, m0, c2, c1, c0,
mmaster, mcycle, xmaster, xcycle, ncycle,stall, gonsd, rod :VLBIT;


-- REQ
SIGNAL
WANTBUS, PREQ_O, REQ_ODD,REQ_OD, RID, EX_KILL,
CNG_TO_AD, ASDRVD, NOSPLIT, shiftn  : VLBIT;


-- SBEN
SIGNAL   NORMPK, CS8PCK : VLBIT;


--  MISC
SIGNAL DMADONE : VLBIT ;
```

```
cecon.vhd        Wed Dec 23 15:54:51 1992        11

-- ADDED 8/24/92 FOR XMAI INITIALIZATION
SIGNAL XXMAI3,XXMAI4,XXMAI5,XXMAI6,XXMAI7,XXMAI8,XXMAI9,XXMAI10,XXMAI11: VLBIT;

BEGIN
gateonn         <= NOT gateona;
shift           <= NOT shiftn;
C20             <= NOT C20N;
HLD0N           <= NOT HLD0;
HLD1N           <= NOT HLD1;
HLD2N           <= NOT HLD2;
HLD3N           <= NOT HLD3;

ODMABLKN        <= NOT DMABLK;
OMCOWNS         <= MCOWNS;
OACOMP0         <= ACOMP0;
OACOMP1         <= ACOMP1;
OADPHASE        <= NOT ADPHASEN       ;
OBCASTSEL       <= BCASTSEL       ;
OCMDLOAD        <= CMDLOAD        ;
COLSEL0        <= NOT COLSEL0n        ;
COLSEL1        <= NOT COLSEL1n        ;
--ODLAINC          <= DLAINC        ;
ODMACMD         <= DMACMD        ;
ODMASEL        <= NOT DMASELN        ;
--ODRAINC          <= DRAINC        ;
OPER_CNT        <= PER_CNT    ;
RW_SEL860N      <= NOT RW_SEL860        ;
EX_RD_ERO      <= EX_RD_ER    ;
OFIFORST        <= FIFORST      ;
--OFIFOWRTN        <= FIFOWRTN        ;
--OFIFRDCLK        <= FIFRDCLK        ;
OPK_RTALEN       <= PK_RTALEN         ;
--OHPICKS1W        <= HPICKS1W        ;
--OKEN             <= KEN             ;
--OMAS_RD_ER       <= MAS_RD_ER       ;
 PK_OEATNN           <= NOT PK_OEATNA            ;
--OOEMASN          <= OEMASN          ;
--OOE_RPLYN        <= OE_RPLYN        ;
--OPALDENA         <= PALDENA         ;
--OPBEN0           <= PBEN0           ;
--OPBEN1           <= PBEN1           ;
--OPBEN2           <= PBEN2           ;
--OPBEN3           <= PBEN3           ;
--OPICKS1R         <= PICKS1R         ;
--OPICKS1W         <= PICKS1W         ;
OPINCLKEN      <= NOT PINCLKENA       ;
```

```
cecon.vhd          Wed Dec 23 15:54:51 1992        12

--OPKDMAINT        <= PKDMAINT       ;
OPLOCKNO          <= PLOCKNO        ;
OPREADO           <= PREADO         ;
--ORAS0            <= RAS0           ;
--ORAS1            <= RAS1           ;
OREFRESHN         <= REFRESHN       ;
--OREQ_O           <= REQ_O          ;    -- developed with seperate register
OROWN             <= ROWN           ;
--OROWND           <= ROWND          ;
--ORPLYO           <= RPLYO          ;
ORTALEN           <= RTALEN         ;
RW_SELPN          <= NOT RW_SELP        ;
 FIN_SELRAMN          <= NOT FIN_SELRAM         ;
OWRTBLK           <=  NOT WRTBLKN        ;
OSLVSELN           <= NOT SLVSEL        ;
OSLV_AD_LEN       <= SLV_AD_LEN     ;
--OSTROBEO          <= STROBEO        ;
--OWCCLK            <= WCCLK          ;

--  NEW DEFINES TO KEEP THINGS HAPPY

DMADONE <= NOT DMACNT31;
RAMWRTN <= NOT (PRAMWRTN OR (NOT WRTBLKN)) ; -- NOT NOT NOT  take out wrtblkn for old
```

cecon.vhd Wed Dec 23 15:54:51 1992 13

```
ereg29_proc: process begin

  wait until (clk = '1');

  if (paldena = '1') then

       ma <= a(27 downto 3);
  else
       ma <= ma;
  end if;

end process;


--  PAL ADSD------------------- ADSD
-- blkna blocks for n11 purposes on cache or len


x_p_passna <=  NOT (LENA AND NOT ACOMP0) ;  -- Pass na for pbus

x_fmwrite_ok <= GNEAR AND  WRTBLKN AND NOT ROWN AND NOT NRMWUR AND NREADN AND MCOWNS;
                                        -- MEM WRITE F, ok to send ready

x_fmread_ok  <= GNEAR AND NOT WRTBLKN AND NOT ROWN AND PASSNA AND NOT NREADN AND MCOWNS;
                                        -- MEM READ F, ok to hit na


--NA <=   NOT (
--       ( RDS0NA )              -- M START read and not refresh
--     OR ( MC_FGO AND x_fmread_ok )  -- M near read
--     OR ( MC_PFGO AND z_enpgo AND x_p_passna )  -- en_pgo and not first of 128 bit
--            );
        -- fmread already gated with passna
        -- don't na on memory writes - ready will do the trick
        -- don't na on rown inactive , pick up read na on s0

--NRDYN <= NOT (
--            NRDYR                   -- reads or rmw or first write
--         OR (MC_FGO AND x_fmwrite_ok )     -- MEM WRITE F
--         OR (PWRITE_RDY)              -- P WRITE
--           );

ENCNT <= (NOT GON AND z_ENMGO AND NOT ROWN)
        OR (S0NA )
```

```
cecon.vhd        Wed Dec 23 15:54:51 1992        14

        OR (MC_PFGO AND Z_ENPGO) ;

        -- encnt says done with the address you're on
        -- effectivly na without regard to read/write or na

PASSNA <= NOT (
            (NOT CACHN AND NKENA AND NOT (ACOMP1 AND ACOMP0))   -- BLOCK FIRST 3 of cache
        OR  (LENA AND NOT ACOMP0)                            -- block first of len
              );
-- using nken instead of ken will not get an na after reading from
--      internal stuff
-- NOT NOT NOT NOT   added mcowns to prevent go immediately after slvsel deasserts

x_en86go<= MCOWNS AND HMN AND HMND AND FLASTN AND NOT GONBLK AND NOT SONA AND (C20 OR NOT BLKEGO);
x_en86gop <= MCOWNS AND HMN AND HMND AND FLASTN AND NOT GONBLK AND NOT SONA AND C20;

        -- en860 is for any 860 go's
        -- en86gop - only occurs during c20

adsd_proc: process begin wait until clk = '1';

   C20N   <= C20M;

   S0NA  <= PK_S0NA;    -- s0 for an mc access

   RDS0NA    <= NOT NREADN AND PASSNA  AND PK_S0NA ;    -- M START read and not refresh

   GONS   <= (
            NOT RN               --  force inactive on reset
        OR (  GONS AND ADS )     --  hold inactive till ads
        OR ( NOT GON AND z_enmgo )      --  deactivate on mgo
        OR ( MC_PFGO AND z_enpgo ) --  deactivate on pgo
            );  -- goes low on ads holds until go is used

   GON <= NOT (
        (NOT HMN AND NOT HMND AND GON)                       --  HOST PICK
      OR (NOT ADS  AND x_en86go)                  --  860 ADS PICK
      OR (NOT GONS AND x_en86go AND GON)          --  pick from gons
      OR ( MOREGOS AND x_en86go AND GON)          --  pick from gons
      OR (NOT GONS AND x_en86gop AND NOT GON AND NOT z_enmgo AND NOT (NOT C20 AND z_enpgo)));
                    --  hold from gons to hit on NOT C20 for pgo

   nfirstgo <= rown AND NOT blkego AND (
        (NOT ADS  AND x_en86go)                   --  860 ADS PICK
      OR (NOT GONS AND x_en86go AND GON)          --  pick from gons
      OR ( MOREGOS AND x_en86go AND GON)          --  pick from gons
                                  );
```

cecon.vhd        Wed Dec 23 15:54:51 1992        15

```
    -- qualified with blkego and rown high , blkego is only thing
            -- that could block you at this point

MCFGO <=
     (NOT ADS  AND x_en86go)                  --  860 ADS PICK
   OR (NOT GONS AND x_en86go AND GON)         --  pick from gons
   OR ( MOREGOS AND x_en86go AND GON)         --  pick from gons
                              ;
MC_FGO <=
     (NOT ADS  AND x_en86go)                  --  860 ADS PICK
   OR (NOT GONS AND x_en86go AND GON)         --  pick from gons
   OR ( MOREGOS AND x_en86go AND GON)         --  pick from gons
                              ;

    -- pfgo and go identicle except pfgo never on C20 or host

MCPFGO <=
     (NOT ADS  AND x_en86gop)                 --  860 ADS PICK
   OR (NOT GONS AND x_en86gop AND GON)        --  pick from gons
   OR ( MOREGOS AND x_en86gop AND GON)        --  pick from moregos
   OR (NOT GONS AND x_en86gop AND NOT GON AND NOT z_enmgo AND NOT (NOT C20 AND z_enpgo)) ;
                                      --  hold from gons
MC_PFGO <=
     (NOT ADS  AND x_en86gop)                 --  860 ADS PICK
   OR (NOT GONS AND x_en86gop AND GON)        --  pick from gons
   OR ( MOREGOS AND x_en86gop AND GON)        --  pick from moregos
   OR (NOT GONS AND x_en86gop AND NOT GON AND NOT z_enmgo AND NOT (NOT C20 AND z_enpgo)) ;
                                      --  hold from gons

HGO <= (NOT HMN AND NOT HMND AND GON) ;              --  HOST PICK

GONBLK <=    (
          NOT HMN             --  prevent 860 go's until ras from hmnd ends
     OR  ( GONBLK AND NOT ROWN )        --  hold till ras ends
     OR  ( NOT ROWN AND NOT FLASTN AND NOT (NOT GON AND z_enmgo )) );
                                      --  pick if ras is going to end
     --  gonblk allows hmnd to go away at any time
     -- gonblk insures ras precharge for 860 access's
     -- not necessary anymore

A11D <= ( ENCNT AND A(11))           -- pick
     OR  ( A11D AND NOT ENCNT ) ;            -- hold

-- 11/24/92 trm -We now register the next 2 outside for speed reasons:
--  CASM <= PK_CASM;
```

cecon.vhd        Wed Dec 23 15:54:51 1992        16

```
--  CASL <= PK_CASL;

   FLASTN <= PK_LASTN;

--      --------- nll multiple go's ----------------------

   CACHER <= (NOT CACHER AND ENCNT AND NOT CACHN AND NOT OKEN)  -- PICK FOR CACHE LINE
        OR (RN AND CACHER AND NOT ( ENCNT AND ACOMP0 AND ACOMP1));-- hold till cnt=3

   MOREGOS <= (NOT MOREGOS AND ENCNT AND NOT CACHN AND NOT OKEN)         -- PICK FOR CACHE LINE
        OR (NOT MOREGOS AND ENCNT AND LENA  )                     -- PICK FOR LEN
        OR (RN AND CACHER AND NOT ACOMP1)                         -- hold for cache line
        OR (RN AND MOREGOS AND NOT ( ENCNT AND ACOMP0 ));         -- hold for cache len

   ACOMP0 <= (NOT MOREGOS AND ENCNT AND NOT CACHN AND NOT OKEN)  -- PICK FOR CACHE LINE
        OR (NOT MOREGOS AND ENCNT AND LENA  )              -- PICK FOR LEN
        OR ( RN AND MOREGOS AND ( ACOMP0 XOR ENCNT)); -- COUNT ON ENCNT AND MOREGOS

   ACOMP1 <= RN AND CACHER AND ( ACOMP1 XOR (ACOMP0 AND ENCNT));
              -- CLEAR UNLESS CACHE FILL, COUNT ON ENCNT AND MOREGOS

end process;

mid_proc: process begin wait until clk = '0';

   ROWND <= NOT REFRESHN OR ROWN;    -- don't hit on refresh may get bus error

   RAS0 <= (
        ( nfirstgo AND MBANK0 )          --  MC PICK or slave pick
     OR ( MC_FGO AND z_nrepick_ras0 )            --  MC PICK or slave pick
     OR ( HGO AND BANK0 )                        -- slave pick
     OR ( RAS0 AND FLASTN )              --  HOLD TILL LASTN=0
             );

   RAS1 <= (
        ( nfirstgo AND MBANK1 )          --  MC PICK or slave pick
    OR  ( MC_FGO AND z_nrepick_ras1 )            --  MC PICK or slave pick
    OR ( HGO AND BANK1 )
    OR ( RAS1 AND FLASTN )               --  HOLD TILL LASTN=0
             );

end process ;
```

```
cecon.vhd          Wed Dec 23 15:54:51 1992          17

--      ****************bufcon 6 *********************

-- DIN_ON_BUS         FOR MASTER  SIDE OF  PREFETCH
--        - active on any rdyn or unsoln while a master
-- RACK        - TO DMA CON TO DECREMENT ORC  COUTER
--             - says the rdyn to bring data in is there\
--             - while in prefetch  can be driven from PREFETCH counter
-- PC0              COUNT INPUTS / SLAVE PREFETCHES /MASTER SIDE
-- PCKNRDY          PICK NRDY TO 860 FOR P READ
-- SLVCASPICK       HIT CASPICK
-- CU          PC COUNTER COUNT UP

--  PC COUNTER
--  MASTER  - COUNTS OR OF PREFETCHED VALUES IN
--  SLAVE   - COUNTS SO THAT YOU DON'T EXCEED 6 UNSOLICITED OUTPUTS
--            COUNTS UP ON BOUNDARY FOR MASTER OR SLAVE
--            COUNTS DOWN FOR MASTER MODE MID CYCLE


SLVCASPICK <= RN AND (
                ( SLVDSD )                              --  RESPOND TO DS
             OR ( SLVASD AND GPREADI AND PREFETCH )  --  PREFETCH ACCESS <6
              );

x_pkmrdyr <= C20 AND MASTER AND ENMREAD AND EN_RPLY;  --  DELAYED FROM BUS

masbuf_proc: process begin wait until clk = '1';

   F20M <= NOT C20;

   PINCLKENA <= ( C20 AND DIN_ON_BUS)            -- master in
           OR ( C20 AND SPLIT_FILL)              -- split fill
           OR ( C20 AND SLVDSD AND NOT GPREADI);         -- slave in

   PREFETCH <= (NOT C20 AND   ( NOT PC3 OR NOT PC2 ))
              OR (C20 AND PREFETCH);
                -- gpreadi says okay to do a slave read
                -- gated with slvasd to prevent caspick on as deaserting

   ENMREAD <= RN AND (              -- master pick on rout, hold till done as master
            ( ROUT )              --  pick on rout
         OR ( ENMREAD AND MASTER AND NOT PLOCKED) --  hold till done mastership
             );
                    -- Watch that you get 1 fifo rdclk and 1 fifo wrtclk
                    -- because none reset on test< and set.
```

```
cecon.vhd        Wed Dec 23 15:54:51 1992        18

    MRDYR <= RPLY_I AND x_pkmrdyr;  --  DELAYED FROM BUS

    DIN_ON_BUS  <= RN AND (
            ( NOT C20 AND MASTER AND MRDYR )        --  DELAYED FROM MRDYR
        OR (  C20 AND DIN_ON_BUS  )      --  20m hold
          );

    SPLIT_FILLD <= ( NOT C20 AND SPLIT_FILL)
        OR ( SPLIT_FILLD AND C20)                -- 20m hold
        OR ( SPLIT_FILLD AND ROUT);      -- hold if last cycle of split fill
                                         --      caused an rout

    RACK <= RN AND NOT C20 AND ROUT AND (
        (SPLIT_FILLD)
      OR (NOT DMASELN AND DIN_ON_BUS)                  -- for split fill
      OR ( DMASELN AND (DIN_ON_BUS OR PC0 OR PC1 OR PC2 OR PC3))   -- DMA ON RDY
         );                                                            --860 READY

-- dma will always have rout expressed as long as slave is allowing
--      more dsen's than ready's

--  rack says data requested is there, occurs with pcknrdy
--  used at fifo to count down number of outstanting reads

   PCKNRDY <= RN AND NOT C20 AND ROUT AND DMASELN AND (
          (DIN_ON_BUS OR PC0 OR PC1 OR PC2 OR PC3)      -- for 860 pick with rack
               OR SPLIT_FILLD);                   -- split fill

end process;

-- ********************************************
--  pc counter
-- ********************************************

--  as master
--  - pc counter counts number of reads sent by slave for 860
--    to generate ready's from (number of ready's - pcknrdy's)
--  as slave
--    - counts unsolicited ready's sent to prevent overflow at master
--  dma in
--    - counting is unnecessary ??

CD <= PCKNRDY;  -- on counts down on on 860 reads
                -- never counts down when counting for slave access

-- slave prefetch counting, cu available durig NOT C20 so incs at bus boundary
```

```
cecon.vhd        Wed Dec 23 15:54:51 1992        19

--      counter resets if not master and not doing a read
-- master counting
--      counts up on bus period, counts down mid cycle
--
pccnt_proc: process begin wait until clk = '1';

   CU    <= RN AND (
       ( NOT MASTER AND C20 AND NOT SLVDSD AND SLVASD AND GPREADI AND PREFETCH )
                                  --  SLAVE COUNT ON NO DS AND DOING AN ACCESS
    OR  (  MASTER AND C20 AND DIN_ON_BUS ) --  MASTER COUNTING ON READY
        );


   FIFOWRTN <= FIFORST
        OR NOT ( MOFIC OR (NOT C20 AND (DIN_ON_BUS OR SPLIT_FILL)));
--           |dma out             \--master in      \--  split


   PCKNRDYD <= PCKNRDY ;

   PCRESET <= FIFORST                      --  reset when completing a master read
        OR  (NOT MASTER AND NOT GPREADI) ;       --  reset if slave and not GPREADI

   PK_FRST <= ROUT                         -- pick on rout (clr after mread)
        OR ( NOT C20 AND SPLIT_FILL )            -- pick for split read
        OR ( PK_FRST AND NOT FIFORST ); -- hold till reset

        --  reset when completing a master read

   FIFORST <= NOT RN                       --  reset at power up
        OR ( PK_FRST AND NOT C20 AND NOT MASTER AND NOT SPLIT_FILL AND NOT ROUT AND NOT DINPENDING
                AND NOT DSPULSE);                -- when done with input data

        --  fifrstn hit on power up and if unwanted data is left in fifo
        --  after doing a master input cycle
        --      NOT NOT  only reset at end of master read to clean up prefetch's


   PC0 <= NOT PCRESET AND (PC0 XOR ( CU OR CD ));

   PC1 <= NOT PCRESET AND (PC1 XOR (
                 (CU AND PC0)          -- COUNT UP
              OR (CD AND NOT PC0)      -- COUNT DOWN
                 ));

   PC2 <= NOT PCRESET AND (PC2 XOR (
                   (CU AND  PC1 AND  PC0)          -- COUNT UP
```

```
cecon.vhd          Wed Dec 23 15:54:51 1992        20
                         OR (CD AND NOT PC1 AND NOT PC0)       -- COUNT DOWN
                         ));

   PC3 <= NOT PCRESET AND (PC3 XOR (
                            (CU AND  PC2 AND  PC1 AND  PC0)            -- COUNT UP
                         OR (CD AND NOT PC2 AND NOT PC1 AND NOT PC0)          -- COUNT DOWN
                         ));

end process;

FIFRDCLK <= (F20M AND MASTER AND NOT DMASELN AND NOT PREADO AND DSPULSE)  -- DMA OUT
      OR PK_F_RDCLK                      -- DMA IN TO MEMORY FROM NBUSCON
      OR PCKNRDYD;                         -- 860 IN

               -- clock enable to read counter on high


-- 860 master reading
--        | , | , | , | , | , | , | , | , |
-- grdy_i _____---_______________________
-- mrdyr  ________---____________________
-- din_onbus ________------______________
-- fifwrtn-----------------___----------
-- rack   ___________---_________________
-- cu     ______________---______________
-- pc          0          | 1|  0
-- pcknrdy ________________---__________
-- nrdy   -------------------___-----------------
--        | , | , | , | , | , | , | , | , |
--
-- dma in
--        | , | , | , | , | , | , | , | , |
-- grdy_i _____---_______________________
-- mrdyr  ________---____________________
-- din_onbus ________------______________
-- fifwrtn-----------------___----------
-- rack   _________________---__________________
-- dma cnt      0         |
-- caspick ______________________------__________
-- cas   ------------------------------___-------
--        | , | , | , | , | , | , | , | , |
--
```

cecon.vhd Wed Dec 23 15:54:51 1992 21

```
-- PAL DMACON     DMA 4          *****************

DMAIN   <= DMAWRT AND NOT DMACMD;        -- forced to out on cmd, else follow dmawrt
DMAO    <= NOT DMAWRT OR DMACMD ;

--  fastd is from a dmacontrol register
--      with sufficiently large input fifo could illiminate

FASTDMA <= ( NOT ASDRV OR FASTD );                   --  asdrv inactive makes fast to flush

DMAHOLD <= DOWNSM OR DMAREQM OR ( NOT DMASELN AND MINPROC) OR DINPENDING OR DMABUF
                OR CMDLOAD OR ROUT ;
        -- dmahold keeps dmablk and dmaseln active
        -- holds on split fill due to minproc

DMAPCK <= ( NOT C20 AND DMAACTIVE AND NOT MINPROC AND NOT REQ_O AND DMASELN
                AND NOT REQ860 AND NOT (NOT GON AND MEMN));
        --  DMA WANTS DMASELN to pick, first pick block

PCK_DS_DMAI <= ( C20 AND DMAIN AND DMAACTIVE  AND NOT DMASELN AND NOT REQ860
                        AND (NOT DMABUF OR DSPULSE) ); -- DMAIN ON NOT DS OR NOT DMABUF
        -- picks ds through dmabuf
        -- goes active on C20 if there are more reads to issue
        -- causes wc_clk and dmabuf for input

EN_CAS_DMAO <= NOT C20 AND DMAO AND DMAREQM AND DOWNSM AND NOT HMND AND NOT DBUFFULL ;
        -- causes caspick for dmaout
        -- relies on dmareqm to stop on
        --      - word count expied
        --      - local address page boundary

EN_CAS_DMAI <= NOT C20 AND DMAIN AND DMAREQM AND DOWNSM AND NOT HMND AND NOT DBEMPTY ;
        -- thottled by buffer not empty -ins must only advance on requested
        --      data
        -- causes caspick for dmain as long as buffer not empty
        -- relies on dmareqm to stop on
        --      - local address page boundary

WCCLK <=  FORCEINC -- clock enable to increment word counter
        OR ( NOT TESTINC AND   PCK_DS_DMAI)            -- dmain active during C20
        OR ( NOT TESTINC AND EN_CAS_DMAO AND NOT DMACMD)       -- dmao active during NOT C20
            ;
        --  WCCLK HITS WITH CASPICK ON OUT AND DMABUF ON IN
```

```
cecon.vhd        Wed Dec 23 15:54:51 1992        22

PK_DONECMD <= (NOT C20 AND CMDLOAD)                    -- PICK ON CMDLOAD PULSE
             OR (RN AND DONECMD AND DMACMD) ;-- HOLD UNTIL DMACMD GOES AWAY
                -- cause dmaactive to deassert after 3 cas picks

dmacon_proc: process begin wait until clk = '1';

   CMDLOAD <= ( NOT C20 AND DMACMD AND DOWNSM AND CASPICK )
        OR ( CMDLOAD AND C20 );
        -- delayed version of caspick during cmdload

   DONECMD <= PK_DONECMD;

   GATEONA <= RN AND (
          (NOT GON AND ROWN AND INTERNPAGE )     -- gate on data to drive control logic
        OR (NOT C20M AND CMDLOAD )               -- same timing as CMDLDD
        OR (GATEONA AND (NOT WRTBLKN OR NOT ROWN)) -- hold till rown and wrtblkn gone
               ) ;

   DMAACTIVE <= (NOT PK_DONECMD AND ENDMA AND DMACMD)
          OR  (NOT PK_DONECMD AND NOT DMACMD AND NOT DMADONE AND NOT ( WCCLK AND DMATC));
                                         --dmadone is bit 31 of dmacnt
        -- ENDMA FROM DMACPT TO SAY GO GET A COMMAND BIT
        -- DMADONE IS THE TERMINAL COUNT FROM THE WORD COUNTER


   DSELND <= DMASELN ;

   PKDMAINT <= ( DMASELN AND NOT DSELND AND NOT DMACMD AND NOT DMAACTIVE AND ENDMAINT);

   DMACMD    <= NOT RN
        OR ( DMACMD XOR ( NOT DMAACTIVE AND DMASELN AND NOT DSELND ))   -- flip
              ;

   DMABLK <= RN AND (                      -- dmablk prevents enpgo
          DMAPCK                           -- PICK
        OR ( DMABLK AND DMAHOLD )              -- HOLD
        OR ( DMABLK AND C20 )              -- 20M HOLD
                 );
        -- dmablk picks first to prevent 860 pgo's before hitting dmaseln
        -- dmablk picks with NOT C20 and holds on C20

   DMASELN <= NOT RN OR NOT (
          ( DMAPCK AND DMABLK)                 -- PICK
        OR ( NOT DMASELN AND DMAHOLD )   -- DMAHOLD
        OR ( NOT DMASELN AND C20 )       -- 20M HLD
              );
```

```
cecon.vhd          Wed Dec 23 15:54:51 1992          23

   CASPICK <= RN AND (
            ( NOT C20 AND SLVCASPICK )              -- SLAVE PICK
          OR ( EN_CAS_DMAI)                 -- dmain
          OR ( EN_CAS_DMAO)                 -- dmao
          OR ( C20 AND CASPICK)             -- C20 HOLD
             );

   DLAINC <= FORCEINC
           OR ( EN_CAS_DMAI)                -- dmain
           OR ( EN_CAS_DMAO);               -- dmao

   DMABUF <= RN AND NOT DMACMD AND (
           ( PCK_DS_DMAI)                        -- dmain pick mid cycle
         OR ( C20 AND ENCNTD_O )                      --  DMAOUT PICK
         OR ( DMABUF AND (NOT DSPULSE OR NOT C20) )   --  HOLD TILL DSPULSE
            );
       -- TRANSITIONS MID CYCLE
       --  ON OUT FILLS BUFFER UNLESS COLUMN BOUNDARY
       --  ON IN EMPTIES BUFFER

end process;

-- buffer counting
--      - counts mid cycle
--      - never conts on dmacmd
--
--      - dmaout
--              up on mem read, down on dspulse
--      - dmain
--              up on rack, down on writing to ram
--

ENDMAOUT <= DMAO AND DMAACTIVE AND (NOT REQ860 OR DMAREQM);
        -- enable request of ram for out
        -- carries terminal count and 860 not interested
        --      860 can only prevent pick of dmareqm and not hold
        -- only sampled on C20
        -- NOT NOT  on out word count changes at beginning of bus cyle
        --      - dmaactive sampled mid cycle need fast count

PAGE_BRK <= (CASPICK AND NOT COLBNDN AND C20 AND NOT DMACMD);
              -- present capick is end of page
              -- last incrented occured mid cycle of last caspick
              -- PAGE_BRK asserts when you have the last caspick of
              --      a page
```

```
cecon.vhd        Wed Dec 23 15:54:51 1992        24

dmareqm_proc: process begin wait until clk = '1';

   DMAREQM <= NOT DMASELN AND (
              (NOT DMAREQM AND C20 AND ( -- PICK TERMS
                      (DMAIN AND (BC3 OR BC2))          -- IN 4 or more elements
                   OR (DMAIN AND DINPENDING AND FASTDMA) -- FAST DMA IN on any
                   OR (ENDMAOUT AND NOT BC3)         -- OUT PICK less than 8
                   OR (ENDMAOUT AND FASTDMA AND DSPULSE) -- OUT FAST PICK
                                          ))
           OR ( DMAREQM AND C20 AND NOT PAGE_BRK AND  (              -- hold terms
                      (DINPENDING)              -- on in hold till empty
                   OR (ENDMAOUT AND NOT DBUFFULL)     -- on out hold till full
              )                          )          -- or word count exceeded
           OR ( DMAREQM AND NOT C20    )                -- 20m hold
                      );

-- dmarequest of memory stops on
--      out
--       - buffer full
--       - word count expired
--       - NOT colbndn AND caspick
--      in
--       - dinpending gone
--       - NOT colbndn AND caspick

-- ras will deassert if dmareqm deasserts
-- on cmd load don't pull away req until all 3 accessed (dmacmdhold)
--       NOT NOT  on dmaout word counter should increment on caspick asserting

end process;


--       ****************** COUNTER ************************
--       - out counts caspicks vs dspulses
--       - in counts racks vs mwriites

-- counting of buffer on ins
--       - up on rack          - mid cycle inc
--       - down on en_cas_dmai- end cycle dec
--   benefits
--       - dinpending goes away in time to drop dmareqm
--

-- counting of buffer on dma out
--       - up one cycle after caspick     - end of cycle inc
--       - count down on new dmabuf       - mid cycle dec
```

```
DBEMPTY <= ( NOT BC3 AND NOT BC2 AND NOT BC1 AND NOT BC0 );

DBUFFULL <= BC3 AND BC2 ;                --
                -- delay from caspick to count up allows 2 more to pass

DINPENDING <= DMAIN AND (BC3 OR BC2 OR BC1 OR BC0 );  --  dmain and not empty
                -- goes high as first piece written to fifo (rack and fifowrt
                --      are at same time

ENCNTD_O <= NOT DBEMPTY AND DMAO AND (NOT DMABUF OR DSPULSE );
        -- enable creating a new dmabuf ( also count down that you did it)
        -- qualified with C20 before use

BCUND <= NOT DMASELN AND NOT DMACMD AND (
        (NOT C20 AND DMAO  AND CASPICKD)  -- OUT - end - caspickd
      OR (C20 AND DMAIN AND RACK)        -- IN  - mid - RACK
           );

BCDNU <= NOT DMASELN AND NOT DMACMD AND (
          ( C20 AND DMAO  AND ENCNTD_O )        --  OUT - mid - DSPULSE OR NO DMABUF
       OR (NOT C20 AND DMAIN AND EN_CAS_DMAI)   --  IN - MWRITE NO RACK
         );

bc_proc: process begin wait until clk = '1';

   CASPICKD <= (NOT C20 AND DOWNSM AND CASPICK)
            OR (CASPICKD AND C20) ;    -- 20M HOLD

   BC0 <= RN AND (BC0 XOR (
       ( BCUND )                 --  UP
     OR ( BCDNU )                --  DOWN
                ));

   BC1 <= RN AND (BC1 XOR (
       ( BCUND AND BC0 )  --  UP
      OR ( BCDNU AND NOT BC0 ) --  DOWN
                ));

   BC2 <= RN AND (BC2 XOR (
       ( BCUND AND BC1 AND BC0 )                --  UP
      OR ( BCDNU AND NOT BC1 AND NOT BC0 )              --  DOWN
                ));

   BC3 <= RN AND (BC3 XOR (
       ( BCUND AND BC2 AND BC1 AND BC0 )              --  UP
      OR ( BCDNU AND NOT BC2 AND NOT BC1 AND NOT BC0 )          --  DOWN
```

```
cecon.vhd          Wed Dec 23 15:54:51 1992          26

                   ));

end process;

-- dmacpt ->
-- endma ->
--  dmaactive ->
--                 dmapck ->
--                          | dmablk | dmaseln |
--                                             -> endmaout
--                                                       | dmareqm |

-- dmacmd loading
```
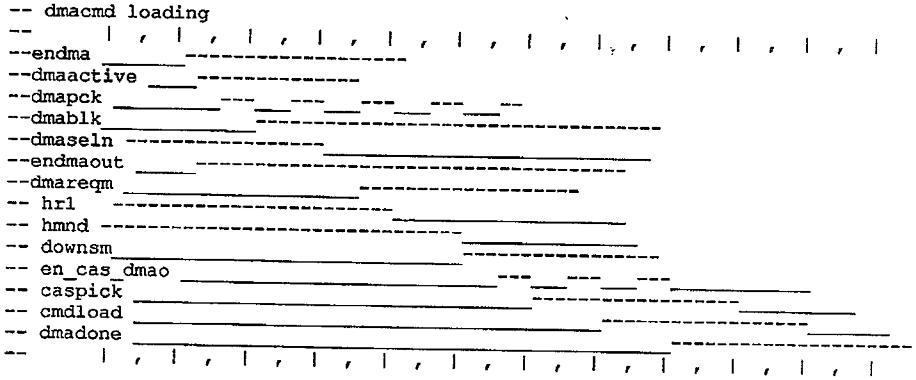
```
-- dmain thottling of dspulse
```
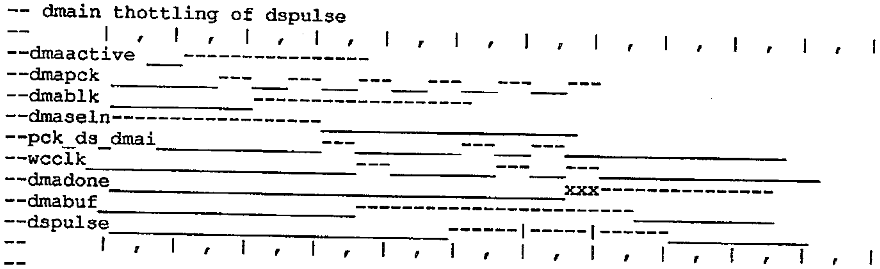
```
--
--    dmadone must be in time to to block next pck_ds_dmai
--
        -- dmareqm holds on column boundary, dendras causes hmnd to stop
```

```
cecon.vhd          Wed Dec 23 15:54:51 1992        27

        -- ON OUT DMAREQ WILL END ONLY ON BUFFER FULL OR WC_COUNT EXPIRED
        -- ON IN DMAREQ WILL STOP WHEN ALL DATA HAS BEEN WRITTEN TO RAM

--
--
-- LOCAL ADDRESS COUNTER  -column boundary
--  *********************
--       - increment mid cycle of caspick
--       - if colboundary and caspick and C20 release reqm
--       |  ,  |  ,  |  ,  |  ,  |  ,  |  ,  |  ,  |  ,  |
-- caspick ______--fe---|--ff----______
-- colbndn ----------________----------
-- reqm   --------------------
-- count    fe    |  ff   |______00

--   NOT NOT with a mid cycle access works out great
--
---
--
-- WORD COUNT COUNTER
-- *****************
--   DMAOUT
--       - must be fast to shut of dmareqm mid cycle
--       - count at begginning of caspick
--       - must kill request quickly from word count
--       |  ,  |  ,  |  ,  |  ,  |  ,  |  ,  |  ,  |  ,  |
-- caspick ______--------|--------______
-- done ________________----------______
-- reqm   --------------------
-- count    fe   |  ff   |  00________
--
--       NOT NOT  must kill quickly
--
-- DMAIN
--       - COUNT MIDCYCLE WHEN DMABUF PICKS
--       - LOTS OF TIME
--       |  ,  |  ,  |  ,  |  ,  |  ,  |  ,  |  ,  |  ,  |
-- dmabuf __________----------------__________W
-- dspulse ____________---------------__________
-- done ______________________------------------------
-- count       fe   |  ff   |   00
--
--       NOT NOT  easy 2 cycles
--
-- REMOTE ADDRESS COUNTER
--  *********************
--
```

```
cecon.vhd         Wed Dec 23 15:54:51 1992         28

-- DMAIN/DMAOUT
--       - COUNT AT END OF DSPULSE
--       - LOTS OF TIME
--      |   ,   |   ,   |   ,   |   ,   |   ,   |   ,   |   ,   |   ,   |
-- dmabuf ___________-----------------------------------
-- dspulse ______________----------------___________
-- b2k __________________________---------_______________
-- count                   fe   |  ff   |   00
--
--       NOT NOT  easy 2 cycles
--
--
```

```
cecon.vhd       Wed Dec 23 15:54:51 1992        29


-- PAL FCONB    FCON 3          *****************


-- speed
--      - enmgo to ras generation is very important
--      - enpgo must be fast to allow for eqp1 timing
--              - eqp1 arrives late


-- timing on enmgo
--  -mcaoen - non critical
--      -non critical since won't get a go during precharge 0,1
--  - wrtblkn - non critical
--      - leading edge picked from go so ok
--      - trailing edge during precharge so ok
--      - on rmwdn clears well ahead of next go (from ready)
--      - rown - non critical
--          TRAILING  EDGE non CRITICAL since go is blocked on first
--          cycle of precharge
--      - leading edge changes from go so ok
--  - lastn - not used for enmgo just blocks go

--  summary
--      - gon both edges are critical
--  if gon was blocked on cycles with row deasserting then rown trailing
--      edge becomes non critical
--  if go prevented during p1 and p2 of precharge then rowen would
--      not matter - would have to take it out of the gating
--      - this would slow down pbus access's that immediately
--          follow memory access  -not bad
-- timing on enpgo
--  - only have to meet na timing
--  - since all signals are gated with 20m, 20m is the critical signal


-- NOT NOT  note z_enmgo not gated with mcowns when row is low
--      never get a go when row is low unless mcowns, theefore if enmgo is
--      gated with go then no problem
-- blkego is not gated in on row low but won't be on since can't pick a master
--              operation with ras active

z_enmgo <=
    ( ROWN AND NOT MEMN AND MCOWNS AND NOT BLKEGO)              -- RAM START
```

```
   OR (NOT ROWN AND GNEAR AND NOT WRTBLKN AND NOT NREADN )        --M NEAR RD
   OR (NOT ROWN AND GNEAR AND  WRTBLKN AND  NREADN )        --M WRT NEAR
          ;

z_nrepick_ras0 <=
     (RAS0 AND GNEAR AND NOT WRTBLKN AND NOT NREADN )     --M NEAR RD
   OR (RAS0 AND GNEAR AND  WRTBLKN AND  NREADN ) ;       --M WRT NEAR

z_nrepick_ras1 <=
     (RAS1 AND GNEAR AND NOT WRTBLKN AND NOT NREADN )     --M NEAR RD
   OR (RAS1 AND GNEAR AND  WRTBLKN AND  NREADN ) ;       --M WRT NEAR

x_enpgo_1 <=  ROWN AND NOT BUFFULL AND NOT DMABLK AND MCOWNS AND (
         ( NOT MINPROC )                                          -- FIRST OF P
      OR ( PLOCKED AND NOT RCUED )                                -- locked
          );                                              -- others

dis_pgo_2 <= NOT ( ROWN AND NOT BUFFULL AND NOT DMABLK AND MINPROC AND MCOWNS) ;
                          -- for seqentials
```

cecon.vhd    Wed Dec 23 15:54:51 1992    31

```
-- PAL FIFO    FIFO          *****************

fifo_proc: process begin wait until clk = '1';

--   ORDFULL <= ( ORC0 AND ORC1 AND DMASELN );  -- ??? TIMING FOR MASTER
   ORDFULL <= ( ORC1 AND DMASELN );      -- ??? TIMING FOR MASTER

   ROUT <= RN AND (
          ( C20 AND DSPULSE AND PREADO )                -- pick on issue a read
        OR ( C20 AND ROUT AND ORC3 )
        OR ( C20 AND ROUT AND ORC2 )
        OR ( C20 AND ROUT AND ORC1 )
        OR ( C20 AND ROUT AND ORC0 AND NOT RACK )
        OR (NOT C20 AND ROUT )
            );

   ORC0 <= RN AND ( ORC0 XOR (
           ( ORCU )              --  count down
         OR ( ORCD )             --  COUNT DOWN
                   ));

   ORC1 <= RN AND ( ORC1 XOR (
            (ORCU AND  ORC0 ) --  count down
          OR (ORCD AND NOT ORC0 ) --  COUNT DOWN
                   ));

   ORC2 <=  RN AND (ORC2 XOR (
            ( ORCU AND  ORC1 AND  ORC0) --  count down
          OR ( ORCD AND NOT ORC1 AND NOT ORC0) --  COUNT DOWN
                    ));

   ORC3 <=  RN AND (ORC3 XOR (
            ( ORCU AND ORC2 AND ORC1 AND ORC0 )   --  count down
          OR ( ORCD AND NOT ORC2 AND NOT ORC1 AND NOT ORC0 )--count down
                    ));

end process;
        --  ROUT CHANGES MID CYCLE, MUST COME DOWN MID TO LET NBUSCON
        --      CONTROL OEATN
```

```
HLDSLVENA <=  (DINPENDING OR ROUT);

ORCU <= C20 AND DSPULSE AND NOT RACK AND PREADO  ; --  COUNT UP

ORCD <= C20 AND NOT DSPULSE AND RACK;   --  COUNT DOWN won't underflow since need
                                        --  rout to get rack
```

```
cecon.vhd          Wed Dec 23 15:54:51 1992          33


-- PAL IOCON**********************      IOCON 9    *****************


-- must make sure that if split fill that get mcowns if 860 is being split
--      that get dmaowns if dma owns memory
--      - refresh can't come in on sreq therefore won't get refresh
--      - won't get dmaowns if 860 was master since can't get dmasel if
--              minproc from 860
--

-- watch timing on mcowns so that it  doesn't interfere with enpgo timing
--      - no problem go won't pick if don't have an mcowns

--  removed ldroute from pkslvout and slvout
--  added sreq to slvread
--  made bcassel active on sel 1->3 but not zero

-- moved PK_SLV, UG_DS_PCK, SLV_DS_PCK to i/o
-- changed several from sreq to sreqd
-- changed pkref from using sreq to using sreqd
-- changed reseting on HMN, HMND
--

--      HR1     HR0     FUNCTION
--      0       0       SLAVE
--      0       1       DMA
--      1       0       REFRESH
--      1       1       NO MEMORY REQUESTS

--      - blk_ds_pck active for
--              - split fill
--              - no broadcast match
--              - ignore_sreq
--      - ignore_sreq active for
--              - split fill
--              - no broadcast match
--              - as has ended
--              ;

x_en_gsreq <= NOT C20 AND NOT_KILL AND NOT IGNORE_SREQ;
x_en_sreq <= NOT C20 AND NOT_KILL ;

BLK_DS_PCK <=
```

cecon.vhd Wed Dec 23 15:54:51 1992 34

```
      ( NOT VALID_SLV AND SPLIT_MD AND SPLIT_AD)     -- split master fill
   OR ( NOT VALID_SLV AND BROADCAST AND NOT ENBCAST)        -- block no broadcast match
   OR ( IGNORE_SREQ         );

x_ds_pck   <= NOT C20 AND NOT HR0 AND NOT HR1 AND NOT_KILL AND SLVASD ;
x_qds_pck  <= NOT C20 AND NOT HR0 AND NOT HR1 AND NOT_KILL AND SLVASD AND NOT BLK_DS_PCK;
x_split_pk <= NOT C20 AND NOT HR0 AND NOT HR1 AND NOT_KILL AND SLVASD
                AND SPLIT_MD AND SPLIT_AD AND NOT VALID_SLV;

x_qpreadi_pk  <= NOT C20 AND NOT HR0 AND NOT HR1 AND NOT_KILL AND SLVASD AND NOT BLK_DS_PCK AND
               HMND AND PREADI;        -- x_qds_pck AND hmnd AND preadi

x_as_pk <=  C20 AND NOT HR0 AND NOT HR1 AND GSREQD AND NOT MLOCKED AND NOT load_route;
                    -- 10/13 addition for locked fix

PCK_ROUTE  <= LOAD_ROUTE AND SLV_AD_LEN;

PK_REF <= NOT SREQD AND NOT C20 AND NOT MASTER AND NOT DMAREQM AND REFREQ;
x_pk_slv <= NOT C20 AND NOT MLOCKED AND NOT_KILL AND NOT IGNORE_SREQ
              AND ( NOT DMAREQM OR ( NOT HR0 AND NOT HR1)) ;
PK_DMA <= NOT C20 AND DMAREQM ;

x_slv_pk_hr <= ( x_pk_slv AND  HR0 AND  HR1 )   --  SLAVE PICK
      OR ( x_pk_slv AND NOT HR0 AND NOT HR1 );          --  SLAVE hold

sel_na  <= NOT dataphase AND oadphase AND NOT split AND dmaseln ;

sel_dma <= NOT dataphase AND oadphase AND NOT split AND NOT dmaseln ;

sel_page <= NOT dataphase AND (NOT oadphase OR split );

drvpn <= NOT (dataphase AND C20) ;


--PK_DOEN <= NOT (
--          ( NOT REQ_I AND x_pk_req ) -- PCK WITH REQUEST
--         OR ( M_OE_HLD)            -- HOLD TILL oadphase on master
--        OR ( REQ_I AND EN_SLV_OE)); -- DRIVE FOR SLAVE

OE_RPLYN <= NOT (
            ( PMON1 AND SREQD AND RN AND NOT FORCEDOE )
          OR ( PMON1 AND FORCEDOE AND TESTDOE));

OE_RPLYN2 <= NOT (
            ( PMON2 AND SREQD AND RN AND NOT FORCEDOE )
          OR ( PMON2 AND FORCEDOE AND TESTDOE));
```

```
cecon.vhd        Wed Dec 23 15:54:51 1992        35

OE_RPLYN0 <= NOT (
            ( PMON0 AND SREQD AND RN AND NOT FORCEDOE )
          OR ( PMON0 AND FORCEDOE AND TESTDOE));

OEMASN  <= NOT (
            (PMON1 AND REQ_O AND RN AND NOT FORCEDOE)
          OR (PMON1 AND FORCEDOE AND TESTDOE)) ;      -- active with request

OEMASN2  <= NOT (
            (PMON2 AND REQ_O AND RN AND NOT FORCEDOE)
          OR (PMON2 AND FORCEDOE AND TESTDOE)) ;             -- active with request

OEMASN0  <= NOT (
            (PMON0 AND REQ_O AND RN AND NOT FORCEDOE)
          OR (PMON0 AND FORCEDOE AND TESTDOE)) ;      -- active with request


slv_func_proc: process begin wait until clk = '1';

   SREQD  <= ( REQ_I AND x_en_sreq )
          OR ( C20 AND SREQD);

   GSREQD <= ( REQ_I AND x_en_gsreq )
          OR ( C20 AND GSREQD);

   SLVASD <= ( x_as_pk AND STROBEI )              --  pick for slave
        OR ( SLVASD AND REQ_I AND x_en_gsreq  );                 -- hold

   SLVDSD <= (REQ_I1 AND STROBEI AND x_qds_pck )        --  pick for slave
        OR ( C20 AND SLVDSD);   -- hold

   LOAD_ROUTE <= NOT (
          (SREQD AND SLV_AD_LEN AND C20)         -- drop one cycle after req if slv_ad
        OR (NOT LOAD_ROUTE AND SREQD)    -- HOLD TILL SREQ DEASSERTS
              );
              -- goes low at same time change to address is sent
              -- LOAD ROUTE GOES LOW AT BEGINNING OF SREQ TO HOLD
              --     BROADCSAT BIT, IT  ALSO MARKS a valid sreq when low
              -- if NOT slv_ad_len and load_route then working on last transfer

   SLV_AD_LEN <= NOT (
            ( REQ_I2 AND STROBEI AND x_ds_pck )--  force low on first dn
        OR ( NOT SLV_AD_LEN AND NOT HMND )      --  hold as long as hmnd
        OR ( NOT SLV_AD_LEN AND NOT ROWN )      --  hold through row cycles
              );

              --  slavalen closes latch to accept slave address
```

cecon.vhd Wed Dec 23 15:54:51 1992 36

```
            --      - holds until row ends

        -- at the beginning of a request load_route activates if the
        --  previous request has been serviced (slv_ad_len = 1), after
        --  loade_route picks slvad_len will pick to grab the address.
        --  slvad_len holds until the transfer has completed
        -- holding till end of row is excessive but plockni is sampled until
        --      after rown is deasserted.

   RPLYO  <= (NOT SREQD)                           -- assert on no request
        OR (NOT C20 AND NOT LOAD_ROUTE AND NOT HR0 AND NOT HR1 AND RMWDN AND NOT MLOCKED)
                                          --  DSEN pick if you know ram free
        OR (NOT C20 AND NOT LOAD_ROUTE AND BROADCAST AND NOT ENBCAST)
                                          -- for unselected broadcast
        OR ( C20 AND GPREADID2 )                   -- NORMAL READY ON READ
        OR ( C20 AND LOAD_ROUTE AND SLV_AD_LEN)    -- cng_to_ad when asserting
               ;                                   -- load_route
        -- on non selected broadcast asserts for change then stays
        --      asserted


--      -------  controlling slvout --------------------
--  ds-> GPREADI -> GPREADID -> GPREADID2 -> slvout

   GPREADI <= (                           -- read write control to bufcon
        ( REQ_I2 AND STROBEI AND x_gpreadi_pk )  -- pick on first ds of a read
      OR ( GPREADI AND SLVASD AND PLOCKNI)    -- hold till as deasserts unless lock
      OR ( GPREADI AND SLVASD AND C20)           -- 20m hold
              );
        -- asserts for 1 cycle on locked
        -- minimum width 2 cycles on non locked reads

   GPREADID <= SREQD AND (
          (NOT C20 AND GPREADI)-- delayed version of readahead
         OR (GPREADID AND C20));                   -- 20m HOLD

   GPREADID2 <= SREQD AND (
          (GPREADID AND S1)               -- PICK ON S1 OF SLAVE READ
        OR (GPREADID2 AND C20));                   -- 20M HOLD
        -- s1 required incase prefetch did not take palace

   SLVOUT <= SREQD AND (
          (NOT C20 AND GPREADID2)                  -- FOLLOW PICK
        OR ( C20 AND SLVOUT));            -- 20M HOLD

--      -------------
```

```
cecon.vhd        Wed Dec 23 15:54:51 1992        37

--      new oe control

   EX_RD_ER <= (C20 AND NOT (SREQD AND RMWDN AND NOT WRTBLKN AND SLVSEL))
                                                  -- signalling that reading
            OR  (NOT C20 AND NOT (SREQD AND SLVOUT AND NOT MEM_ER)) ;  -- sigal mem error
                -- goes low during NOT 20m when doing a slave read
                --      sigals read error during C20

   PK_EN_SLV_OE <= (NOT C20 AND SREQD AND NOT WRTBLKN AND NOT EX_RD_ER)
                                          -- picks on first rdcon sent
            OR (PK_EN_SLV_OE AND SREQD AND NOT WRTBLKN );        -- hold

   REN_SLV_OE <=  PK_EN_SLV_OE AND SREQD ;

--       |    ,    |    ,    |    ,    |    ,    |  . ,    |    ,     |
-- rown--______________________________-------------------------
--ex_rd_er ---_____-----_____-----_____-----_____--------------
--pk_en_slv_oe ____------------------------------_____________
--en_slv_oe ____________------------------------------_________
--doen ----------------------_______________________________-------
--data --------------------------[ d0m, d0l , d1m,d1l ,


   BLK_M_DOE <= oADPHASE AND REQ_O AND (      -- block doe of master for read
          ( NOT C20 AND NOT SRDCON )            -- block on rdcon
       OR ( BLK_M_DOE AND C20 AND RN ));  -- hold

   BLK_M_DOED <= BLK_M_DOE;

   MAS_RD_ER <= DIN_ON_BUS AND NOT C20 AND EX_RD_ERI AND MASTER;

   SRDCON <= NOT REQ_O          -- force high if not requesting
           OR NOT DATAPHASE            -- force high if still in oadphase
           OR NOT ( C20 AND NOT EX_RD_ERI);      -- sample on c20

--      -------   broadcast control ----------------------

   BCASTSEL <= (PIH(0) AND (PIH(4) OR PIH(3)) AND PCK_ROUTE) -- pick use offset
             OR ( BCASTSEL AND NOT PCK_ROUTE);          -- ELSE HOLD

   BROADCAST <= (PIH(0) AND PCK_ROUTE)  -- pick broadcast
             OR ( BROADCAST AND NOT PCK_ROUTE); -- ELSE HOLD

   ENBCAST <= (PCK_ROUTE AND    (
                   (NOT PIH(4) AND NOT PIH(3) AND BCOFF(8))      -- select 0
                OR (NOT PIH(4) AND  PIH(3) AND BCOFF(9))        -- select 1
                OR ( PIH(4) AND NOT PIH(3) AND BCOFF(10))       -- select 2
```

```
cecon.vhd        Wed Dec 23 15:54:51 1992        38
                 OR ( PIH(4) AND  PIH(3) AND BCOFF(11)) -- select 3
                                 )
              )
        OR (ENBCAST AND NOT PCK_ROUTE )                     -- ELSE HOLD
                ;

--      -------- should you respond ----------------------
--      valid slv doesn't pick on unselected broadcast or split fill

   VALID_SLV <= (REQ_I AND STROBEI1 AND x_qds_pck )
                                        -- pick on first valid ds_pck for ram
        OR (VALID_SLV AND SREQD);       -- hold till request goes away

   SPLIT_FILL <= ( REQ_I AND STROBEI AND x_split_pk)
                                                -- PICK
        OR (RN AND SPLIT_FILL AND STROBEI)      -- repick on each ds
        OR (RN AND SPLIT_FILL AND C20);         -- 20m hold
-- NOT NOT NOT  split_fill needs reset

   IGNORE_SREQ <=
          ( REQ_I1 AND STROBEI1 AND x_split_pk )
                                        -- BLK because split_fill
        OR (NOT C20 AND SREQD AND NOT LOAD_ROUTE AND BROADCAST AND NOT ENBCAST)
                                        -- block due to no broadcast match
        OR (SLVASD AND C20 AND NOT STROBEI)     -- as has ended
        OR (IGNORE_SREQ AND SREQD )     -- HOLD TILL SREQ DEASSERTS
                ;
        -- ON NO BROADCAST CAN PICK IGNORE IMMEDIATELY ON NOT LOAD_ROUTE
        --      SINCE ALL INFO IN ROUTE
        -- on split read should wait for ds to insure you have address

--      - ignore_sreq active for
--              - split fill
--              - no broadcast match
--              - as has ended

end process;

-- ******************** alternate hmn plan **************************
--  dma has priority then slave then refresh
--  sreq gated with not master
--  this appoach is different in that each refresh is 8 cycles
--      - aurguably simpler
--      - if refresh causes hmnd then committed to refresh
--  hrs and hmnd terminate at same point 2 before ras up for
--      COULD BE DONE FOR SLAVE ALSO IF COULD TELL ONE TRANSFER ENDDED AND NEXT
--       STARTING - would free up memory sooner
```

```
cecon.vhd        Wed Dec 23 15:54:51 1992        39

-- if in refresh and sreq or dmareq comes in
--       - hmn forced low
--       - hr0 and hr1 deassrt
--             then reassert once hmnd is inactive

-- use of Gsreq vs sreq in below
--       use gsreq if causing a slave access
--       use sreq if blocking refresh
-- once sreq sets hr it should have priority over dma
-- if an hr is active then hmn must be active (unless gated by hmnd)

--PK_DMA <= NOT C20 AND DMAREQM ;
--PK_REF <= NOT SREQD AND NOT C20 AND NOT MASTER AND NOT DMAREQM AND REFREQ;
--x_pk_slv <= NOT C20 AND NOT MLOCKED AND NOT_KILL AND NOT IGNORE_SREQ
--              AND ( NOT DMAREQM OR ( NOT HR0 AND NOT HR1)) ;
--PK_DMA <= NOT C20 AND DMAREQM ;
--
--x_slv_pk_hr <= ( x_pk_slv AND  HR0 AND  HR1 )          --  SLAVE PICK
--        OR ( x_pk_slv AND NOT HR0 AND NOT HR1 );       --  SLAVE hold


hmn_proc: process begin wait until clk = '1';

   HMN <=  NOT HMND OR NOT (                        -- high on reset or hmnd
         ( PK_DMA )
        OR ( PK_REF )
        OR ( REQ_I AND x_pk_slv )                            -- low on any pick
        OR ( SLVASD AND NOT HR0 AND NOT HR1 )                --  SLAVE hold
        OR ( C20 AND NOT HMN AND RN )               --  20M HOLD
                    );
 -- NOT NOT NOT NOT  addes 2nd term sinc hmn going away when hr was valid

   HR0 <= NOT (
        ( REQ_I AND x_slv_pk_hr)
      OR ( SLVASD AND NOT HR0 AND NOT HR1 )              --  SLAVE hold
      OR ( PK_REF AND  HR0 AND  HR1 )   --  REF pick
      OR ( PK_REF AND NOT HR0 AND  HR1 AND ( ROWN OR HMND)) --  REFRESH hold1
      OR (  NOT HMND AND NOT HR0 AND  HR1 AND ROWN )    --  REFRESH hold2
      OR (   NOT HR0 AND C20 )          -- 20m hold
                );
        -- new scheme will not hold hr on master picking at same time as hr
        --      for refresh - but master won't pick on refreq
        -- refrseh pick is prevented on sreq so that it won't interfere
        --      with split_fill

   HR1 <=  NOT (
        ( REQ_I AND x_slv_pk_hr)
```

```
cecon.vhd        Wed Dec 23 15:54:51 1992        40

      OR ( SLVASD AND NOT HR0 AND NOT HR1 )              --  SLAVE hold
      OR ( PK_DMA AND HR0 AND  HR1 )     --  DMA PICK
      OR ( PK_DMA AND HR0 AND NOT HR1 )          --  DMA HOLD
      OR ( RN AND NOT HR1 AND C20 )              --  20m hold
           );

   HMND <= NOT (
        ( REQ_I2 AND STROBEI1 AND x_qds_pck  )           --  SLAVE PICK on DS
     OR ( NOT HR0 AND NOT HR1 AND NOT HMND AND SLVASD )          --  hold on as
     OR ( PK_DMA AND NOT HR1 AND HR0 AND ROWN )                  --  DMA PICK if row inactive
     OR ( PK_DMA AND NOT HR1 AND HR0 AND NOT HMND)               --  DMA HOLD with req on NOT hmnd
     OR ( PK_REF AND ROWN AND HR1 AND NOT HR0 )                  --  refresh pick if row inactive
     OR ( RN AND NOT HMND AND ROWN AND HR1 AND NOT HR0 )         --  refresh hold
     OR ( RN AND NOT HMND AND C20 )                      --  20m hold
              );

-- hmnd pick terms for dma and refresh have rown in them, to insure ras
--      precharge, slv doesn't need them due to dsen throtthle
-- NOT NOT NOT NOT  IT IS ESSENTIAL THAT IF HMND IS GOING TO PICK THAT HR0/1 HOLD
--      OR MCAUGHT MIGHT COME IN
--      ALSO HMN MUST BE ACTIVE WHEN HR IS ACTIVE TO INSURE THAT GO IS
--      BLOCKED UNTIL MCAUGHT HAS HAD TIME TO BE ASSERTED
end process;

-- ****************  refreq generation *******************
--  refreq picks after up transition of refcnt12
--  disables 1 cycle after last row starts
--  counts out 4 periods

REFEDGE <= (REFCNT12 AND NOT REFRATED ) -- actually refcnt 6
         OR ( REFCNT8 AND REFRATED );


refcntd_proc: process begin wait until clk = '1';

   REFRATED <= REFRATE;

   REFCNTD <= (
          ( C20 AND REFEDGE )            --  DELAYED VERSION
        OR ( REFCNTD AND REFEDGE)
             );

   REFCNT <= RN AND C20 AND NOT ROWN AND NOT HMND AND HR1 AND NOT HR0;
                                         --  decode of when to count
                                         --  first clock of row
   REFREQ <= RN AND (
         ( C20 AND REFEDGE AND NOT REFCNTD )     --  pick on RFFEDGE going up
```

```
      OR ( REFREQ AND NOT (REFCNT AND REFC0 AND REFC1) ) -- HOLD TILL COUNTING TO ZERO
         );

   REFC0 <= RN AND (REFC0  XOR  REFCNT);

   REFC1 <= RN AND (REFC1 XOR ( REFCNT AND REFC0 )) ;

end process;


-- single slave read
--           |--,--|--,--|--,--|--,--|--,--|--,--|--,--|--,--|--,--|--,--|--,--|--,--|--,--|
--sreq       ____------------------------------_____--------------------------
--hr         -------____________________
--load_route --------________________________------------------__________
--slv_ad_len -----------------------_______________________----------
--ready       ________---______________________________________________________
--dseno       __________-----------------------_____
--ad@s        --  route    | ad     |dl,dm|               ,dout ,
--strobe@s                        ds|as,--|
--hmnd        -----------------------____________-----------------
--ras         -- -----___________---------___________--------------
--gpreadi    ________________________-----------_______________________
--gpreadid_______________________________------------______
--gpreadid2_________________________________----------______
-- slvout   ________________________________________------__________
-- rdy_o     ________---___________________________---__________
-- oedat     ___________________________________________-------__________
--           |--,--|--,--|--,--|--,--|--,--|--,--|--,--|--,--|--,--|--,--|--,--|--,--|--,--|


-- slave rmwd to non rmwd
--           |--,--|--,--|--,--|--,--|--,--|--,--|--,--|--,--|--,--|--,--|--,--|--,--|--,--|
--sreq       ____---------------------------_________---------------------------
--hr         -------____________________
--load_route -------________________________------------------__________
--slv_ad_len -----------------------_______________________----------
--ready       ________---______________________________________________________
--dseno       __________---------------------
--ad@s        --  route    | ad     |dl,dm|
--strobe@s                        ds|as,--|
--hmnd        -----------------------____________-----------------
--rmwdn      -------------------------__________-----------------
--ras         -- -----___________---------__________
--           |--,--|--,--|--,--|--,--|--,--|--,--|--,--|--,--|--,--|--,--|--,--|--,--|--,--|
```

```
--         |---|---|---|---|---|---|---|---|---|---|---|---|---|---|
-- hr      -----__________
-- pbdsena___________------------------------
-- pbdsena@m ___________---------------
-- ad@M                    (a0)(d0)(d1)
-- ad@S                        (a0)(d0)(d1)
-- rown    ----------_______________------------______________
-- gon     ------___-------------------------------------------
--         |---|---|---|---|---|---|---|---|---|---|---|---|---|---|

--normal refresh

--         |,|,|,|,|,|,|,|,|,|,|,|,|,|,|,|,|,|
-- refreq  ____--------------------------------__________
-- hr0  ---------_____________________________-----------
-- hmn  ---------______----------_______-----------------
-- hmnd      -------------______--------________-------------
-- refreshn-----------____________________________---------
-- rown      ----------------________--------_________-------
--         |,|,|,|,|,|,|,|,|,|,|,|,|,|,|,|,|,|

--  aborted refresh prior to hmnd hitting

--         |,|,|,|,|,|,|,|,|,|,|,|,|,|,|,|,|,|
-- dreqq  _________-----------------------__________
-- refreq ____-------------------------------------------__________
-- hr0  ---------___----------------------______
-- hr1  -----------------_____________----------
-- hmn  ---------__________-------------______-----------_
-- hmnd      --------------------______--------______-------------
-- refreshn-----------____--------------------------______---------
-- rown      ------------------------______________------_________-------
--         |,|,|,|,|,|,|,|,|,|,|,|,|,|,|,|,|,|

--  aborted refresh to hmnd hitting before other request comes in

--         |,|,|,|,|,|,|,|,|,|,|,|,|,|,|,|,|,|
-- dreqq  _____________----------------------__________
-- refreq ____-----------------------------------------------__________
-- hr0  ---------______-------------------------__________
-- hr1  --------------------______________-----------______
-- hmn  ---------_______---------______----------
-- hmnd      -------------________--------________-------------
-- refreshn-----------_____________---------------------------
```

```
-- rown          -----------------_________---------_________--------
--          |,|,|,|,|,|,|,|,|,|,|,|,|,|,|,|,|,|,|,|,|,|,|,|,|,|,|,|

-- if hmnd fires then committed to refresh
-- hr's hold until request goes away except for refresh
-- in refresh hr will drop out on another request unless hmnd is active
```

```
cecon.vhd        Wed Dec 23 15:54:51 1992        44

-- PAL MASTER**********************     MASTER 3 *****************

-- speed
--        - RPLY_I has good drive must be optimized for min set up
-- enabling transfers
--       - when a request out is made, the request pal generates enas
--       - this allows assertion of asdrv
--       - request pal deasserts enas in response to kill conditions
--               - refresh
--               - external kill
--       - master can hold asdrv only on locked

x_pgopck <= NOT C20 AND z_enpgo AND NOT GON ;
x_ends   <= RN AND NOT C20 AND EN_RPLY AND ( PLOCKED OR ENAS) AND ASDRV AND NOT SPLIT;

PALDENA <= x_pgopck;

x_PK_SPLIT_MD <= ( NOT C20 AND EN_RPLY AND SPLIT AND ENAS AND NOT SPLIT_MD AND ASDRV);
        -- active to cause ds for split gated with dsen

BUFFULL <= LAST_EXT OR EXT_ACCESS ;
        -- will block enpgo if already have data in buffer or
        --      doing a <64  bit

x_dma_pk_stb <= ( ENAS AND DMABUF AND NOT ORC3 AND (NOT B2K OR NOT DSPULSE)) ;

x_pk_ds <= ( x_ends AND z_enpgo AND NOT GON ) --  DIRECT PICK FROM GO
        OR (  x_ends AND NOT PGONST )    --  STORED PGO PICK
        OR (  x_ends AND x_dma_pk_stb ) ;

master_proc: process begin wait until clk = '1';

-- NOT NOT NOT NOT NOT must hold asdrv on locked

   PLOCKNO <= NOT (
          (x_pgopck AND NOT NLOCKN )                        -- pick with pgopck
        OR (RN AND NOT PLOCKNO AND NOT ( NOT GON AND z_enmgo AND NLOCKN )));
                                        -- hold till unlocked mem

   PLOCKED <= (NOT PLOCKNO AND DSPULSE)          -- pick on dspulse
        OR (PLOCKED AND NOT PLOCKNO) ;                  -- hold with plockno

   PREADO <= (NOT DMASELN AND NOT z_pout)
        OR ( x_pgopck AND NOT z_pout)    -- 860 pick
        OR (PREADO AND DMASELN AND NOT x_pgopck ); -- hold till 860 changes or dma
```

```
PWRITE_RDY <=                              -- hit ready for pwrite on issue of ds
      ( RPLY_I AND x_ends AND x_pgopck AND z_pout)  --  DIRECT PICK FROM GO
    OR ( RPLY_I AND x_ends AND NOT PGONST AND NOT RCUED);   --  STORED PGO PICK

BLKEGO <= SPLIT_FILL
    OR  x_pgopck           -- hit on boundary active on NOT 20m
    OR NOT PGONST          -- go in process hold from above
    OR (RCUED AND ROUT)    -- read outstanding
    OR (BLKEGO AND C20) ;  -- 20m hold
    -- BLKEGO
    --      - must pick on NOT 20m and hold on 20m
    --      - prevents go on C20 when high
    --      - also prevents enmgo easing timing on generation

PGONST <= NOT (
         ( RN AND  x_pgopck )         --  pick
       OR ( RN AND NOT PGONST AND NOT DSPULSE ) --  hold till midcycle of active ds
      );

ASDRV <=  (
     (RN AND NOT C20 AND ENAS AND (NOT PGONST OR x_pgopck OR ORDFULL ))       -- 8G0PICK
   OR (RN AND NOT C20 AND ENAS AND DSPULSE AND DMASELN AND NOT LAST_EXT)
                            -- ALLOW 860 1 MISSED CYCLE unless last externa
   OR (RN AND NOT C20 AND ENAS AND DMABUF AND (NOT B2K OR NOT DSPULSE)) -- DON'T CROSS BOUNDARY
   OR ( RN AND ASDRV AND PLOCKED)                        -- PLOCKED HOLD
   OR ( RN AND ASDRV AND C20 )                           -- 20M HOLD
   OR ( RPLY_I AND x_PK_SPLIT_MD)                -- send ds split acknowledge
       );

DSPULSE <=  (
       ( RPLY_I AND x_pk_ds )
     OR ( NOT C20 AND SPLIT_FILL AND x_pgopck )       --  SPLIT DIRECT PICK FROM GO
     OR ( NOT C20 AND SPLIT_FILL AND NOT PGONST )     --  SPLIT PGONST
     OR ( NOT C20 AND SPLIT_FILL AND DMABUF AND (NOT B2K OR NOT DSPULSE) )   -- SPLIT DMA
     OR ( DSPULSE AND C20 AND RN )
         );

STROBEO <= RN AND (
       ( RPLY_I AND x_pk_ds )
     OR ( C20 AND ASDRV )
     OR ( RPLY_I AND x_PK_SPLIT_MD)  -- send ds split acknowledge
           );

SPLIT_MD <= (RPLY_I AND x_PK_SPLIT_MD)
     OR (SPLIT_MD AND NOT SPLIT_FILL AND RN ) ;      -- hold till split_fill
```

```
cecon.vhd        Wed Dec 23 15:54:51 1992        46

   REQ860 <= RN AND (
           ( NOT C20 AND NOT GON AND MEMN AND MCOWNS )
        OR ( REQ860 AND PGONST )                   --  hold till pgonst asserts
            );

   RCUED <= RN AND (
           ( x_pgopck AND NOT z_pout )                   -- PICK ON READ REQUEST
        OR ( RCUED AND (C20 OR ROUT OR NOT PGONST) )  --  HOLD TILL ROUT GONE
           );

   LAST_EXT <= RN AND (
          ( x_pgopck AND NOT z_64bitur AND NLOCKN )  --  860 pick for less than 64 bit
        OR ( LAST_EXT AND (NOT PGONST OR ROUT OR DMABUF OR ASDRV OR C20 OR SPLIT_FILL) )
            );

   MINPROC <= RN AND (
          ( x_pgopck )           --  860 pick
        OR ( NOT C20 AND DMABUF )        --  dma pick
        OR ( MINPROC AND (NOT PGONST OR ROUT OR DMABUF OR ASDRV OR C20 OR SPLIT_FILL) )
            );

   EXT_ACCESS <=  NOT (
           NOT RN
        OR ( NOT C20 AND NOT EXT_ACCESS AND NOT x_pgopck )      -- HOLD LOW TILL PGO
        OR ( RPLY_I AND x_ends )                         -- dsen
        OR ( NOT C20 AND SPLIT_FILL)                     -- split fill
        OR ( NOT EXT_ACCESS AND C20 )                    -- ONLY CHANGE ON NOT C20
            );

   DRAINC <= FORCEINC
         OR (C20 AND DSPULSE AND NOT DMASELN) ;       -- increment dma remote address

end process;
```

```
-- PAL NBUSCON*********************      NBUSCON 7       *****************

-- speed
-- ENPGO           - ONLY NEEDED TO PWRITE DATA CAN BE CLOCKED IN
-- PCKNRDY         - P BUS READ DATA IS VALID HIT READY
--
--
-- REFRESHN --
-- CASN
-- S0
-- S1
-- Rown
--
```

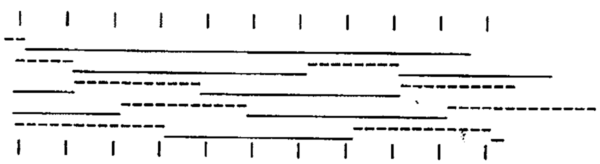

```
--       HR1     HR0     FUNCTION
--       0       0       SLAVE
--       0       1       DMA
--       1       0       REFRESH
--       1       1       NO MEMORY REQUESTS

PICK      <= (z_enmgo OR NOT HMND) AND NOT GON ;   --  also repick
NPICK_MEM    <= z_enmgo  AND NOT GON ;              --  N10 pick memory


MOFIC <= NOT RTALEN AND DOWNSM AND NOT DMACMD ; -- generate fifo out wrt for dma

PK_F_RDCLK <= DOWNSM AND CASPICK AND F20M AND WRTBLKN ;

-- PICKS1x used to generate load pulses for internal access's

PICKS1R <= PK_PICKS1R                               -- slave or first mc
        OR ( NOT ROWN AND NPICK_MEM AND NOT z_readn) ; -- remaining mc

OPICKS1W <= PK_PICKS1W                              -- slave or first mc
        OR ( NOT ROWN AND NPICK_MEM AND z_readn) ;     -- remaining mc

HPICKS1W <= (NOT S1 AND CASPICK AND SLVSEL AND NOT gpreadi);    --  host pick

rw_len <= NOT (S1WRITE OR LATTEST) ;

PK_CASM   <= (
         ( NOT ROWN AND S1 AND ( NOT WRTBLKN OR O64BITR OR NOT A2R ) )--normal pick
        OR ( NOT REFRESHN AND ROWN AND HR1 AND NOT HR0 )              --  REFRESH PICK
```

```
        OR ( NOT REFRESHN AND NOT ROWN AND (S0 OR S1) )      --  REFRESH HOLD TO NORMAL
             );                                     -- CAS DEASSERT

PK_CASL <= (
             ( NOT ROWN AND S1 AND ( NOT WRTBLKN OR O64BITR OR A2R ) ) --  NORMAL PICK
          OR ( NOT REFRESHN AND ROWN AND HR1 AND NOT HR0 )                --  REFRESH PICK
          OR ( NOT REFRESHN AND NOT ROWN AND (S0 OR S1) ) --  REFRESH HOLD TO NORMAL
             );                                     -- CAS DEASSERT

PK_LASTN <= NOT (
             NOT RN
        OR ( RMWDN AND NOT ROWN AND NOT S0 AND NOT S1 AND MCOWNS AND NOT NPICK_MEM )
        OR ( RMWDN AND NOT ROWN AND NOT S0 AND NOT S1 AND NOT MCOWNS AND HMND )
             );
        -- last transfer of sequence, so it is time to deassert ROWN
        -- important that lastn be low on cycle after ras deasserts for adsd
        --      to maintaain 3 cycle precharge

PK_S0NA     <= PICK AND ROWN AND HMND ; -- s0 of mc ram access

PK_RTALEN <=  (REFRESHN AND NOT WRTBLKN AND NOT CASRN);
                -- latch enable control for RAM-to-ASIC data

PRERAS <=  (
           (RN AND REFRESHN AND  PICK)       --  MC PICK or slave pick
        OR (RN AND REFRESHN AND NOT ROWN AND LASTN ) --  HOLD TILL LASTN=0
             );

PK_OEATNA <=                       -- READY to the i860
           PCKNRDY                 -- P READ
        OR (MCOWNS  AND RMWDN AND NOT RTALEN);  -- MEMREAD and not RMW

nbuscon_proc: process begin wait until clk = '1';

   PK_PICKS1R <=
            ( NOT C20 AND SLVCASPICK AND gPREADI)          -- SLAVE PICK
        OR ( EN_CAS_DMAO)                  -- dmao
        OR ( ROWN AND NPICK_MEM AND NOT z_readn) ;         -- first go

   PK_PICKS1W <=
            ( NOT C20 AND SLVCASPICK AND NOT gPREADI)      -- SLAVE PICK
        OR ( EN_CAS_DMAI)                  -- dmain
        OR ( ROWN AND NPICK_MEM AND z_readn) ;             -- first go

   PRAMWRTN <= NOT (NOT ROWN AND REFRESHN AND WRTBLKN);

   S1WRITE <= OPICKS1W
```

```
cecon.vhd        Wed Dec 23 15:54:51 1992        49
      OR ( WRTBLKN AND NOT RMWDN) ;

  MLOCKED <= RN AND (
        (NOT NLOCKN AND NPICK_MEM  )              --  860 PICK
      OR (MLOCKED AND NOT NPICK_MEM )             --  HOLD TILL non locked access
               );

  WRTBLKN <= NOT RN OR NOT (   -- wrtblkn asserted when we are doing a memory READ
        (NPICK_MEM AND (NOT z_readn OR z_rmwur) )      -- MC READ OR RMW PICK
      OR (REFRESHN AND (NOT z_readn OR z_rmwur) AND NOT GON AND NOT HMND)
                                                 -- host read pick or rmw pick
      OR (NOT WRTBLKN AND NOT ROWN AND RTALEN)                   -- HOLD till RTALEN ON RMWD
      OR (NOT WRTBLKN AND NOT ROWN AND RMWDN AND NOT (SLVSEL AND NOT PLOCKNI))
                  -- hold on row for non rmwd unless slave test and set
      OR (SLVSEL AND NOT S1 AND CASPICK AND z_rmwur AND WRTBLKN)

      -- PLOCK z_rmwur PICK (FOR READ PART OF XBAR SLAVE ACCESSES
              -- OF LESS THAN 32 BIT SIZE).
                 );

      -- OR SLVSEL AND z_rmwur AND NOT ROWN AND NOT PLOCKNI AND CASPICK AND WRTBLKN
      --        rmw repick for write portion of test and set
      --        add term to rmwdn, also make sure rmur is independent of read

  RMWDN   <= NOT RN OR NOT (
        ( z_rmwur AND NPICK_MEM )                 --  RMW PICK
      OR ( z_rmwur AND SLVSEL AND NOT GON )                --  SLAVE RMW NEAR PICK
      OR ( NOT RMWDN AND NOT WRTBLKN )                     --  HOLD TILL WRTBLKN DEASSERTS
      OR (SLVSEL AND NOT S1 AND CASPICK AND z_rmwur AND WRTBLKN)
              -- PLOCK RMWUR PICK (FOR READ  PART OF XBAR SLAVE ACCESSES
                  -- OF LESS THAN 32 BIT SIZE).
              );


  RTALEN <=  NOT PK_RTALEN;
              -- latch enable control for RAM-to-ASIC data

  LASTN <= PK_LASTN ;

  NRDYR <= (                          -- READY to the i860
        PCKNRDY                       -- P READ
      OR (PK_SONA AND NOT z_rmwur AND z_readn)       -- MEM WRITE FIRST OF ROW
      OR (MCOWNS  AND NOT RTALEN)     -- MEMREAD or rmw
              );

      --  ********************  rad functions **********************
```

```
cecon.vhd          Wed Dec 23 15:54:51 1992          50

  ROWN <=  NOT (
        (RN AND  PICK)          --  MC PICK or slave pick
     OR (RN AND NOT ROWN AND LASTN ) --  HOLD TILL LASTN=0
             );

  CASRN   <= NOT (
        ( NOT ROWN AND S1 )                        -- normal pick
     OR ( NOT REFRESHN AND ROWN AND HR1 AND NOT HR0)       -- REFRESH PICK
     OR ( NOT REFRESHN AND NOT ROWN AND (S0 OR S1) )     -- REFRESH HOLD TO NORMAL
            );                                   -- CAS DEASSERT

  S0      <= (
        ( PICK AND ROWN)
     OR ( NOT REFRESHN AND ROWN AND HR1 AND NOT HR0 )  --  REFRESH PICK TILL RAS STARTS
      );

  S1      <= (
        ( NOT S1 AND CASPICK ) --  host pick
     OR   S0
     OR ( WRTBLKN AND NOT RMWDN )
     OR ( NOT ROWN AND NPICK_MEM )                          --  RMWD REPICK
      );

 PRECAS     <= (
        ( NOT S1 AND CASPICK ) --  host pick
     OR ( S0 AND REFRESHN )
     OR ( WRTBLKN AND NOT RMWDN )
     OR ( NOT ROWN AND NPICK_MEM )                          --  RMWD REPICK
      );

     -- ****************** who owns **************************
     --  change ownership on rown inactive except refresh starts as row
     --      deactivates
     --  caution refreq can disable at any time

  REFRESHN <= NOT RN OR NOT  (

-- The next line has a bug in it which surfaces during TEST40LR/TEST40/HR
-- and REFCNT = 101000. Refresh turns on before the i860 access completes.
-- The monitor stops issuing accesses. Save this bug to test monitor. 5/12/92

--         ( C20 AND HR1 AND NOT HR0 AND (ROWN OR (NOT LASTN AND NOT NPICK_MEM)) )
                                      --  PICK on row inactive or going inactive
-- The next two pterms correct the previous buggy line:

           ( C20 AND HR1 AND NOT HR0 AND ROWN AND  NOT NPICK_MEM)
                                       -- ROWN INACTIVE AND NOT PICKING NEXT
```

```
        OR ( C20 AND HR1 AND NOT HR0 AND NOT ROWN AND NOT LASTN AND NOT NPICK_MEM)
                                        -- ROWN ACTIVE AND GOING INACTIVE
        OR ( NOT REFRESHN AND NOT ROWN AND LASTN )   -- hold till rown going up
        OR ( NOT REFRESHN AND HR1 AND NOT HR0 )      -- HOLD TILL REFREQA AWAY
                );

        --  NOT NOT NOT NOT  refreshn must fall if rown is going up since hmnd is
        --      going to fall

    SLVSEL   <= RN AND (
          ( NOT C20 AND ROWN AND GON AND NOT HR0 AND NOT HR1 ) -- pick
        OR (  SLVSEL AND NOT HR0 AND NOT HR1 )  --  hold on request
        OR (  SLVSEL AND NOT ROWN )             --  hold on rown
             );

    DOWNSM   <= RN AND (
          ( NOT C20 AND ROWN AND GON AND HR0 AND NOT HR1 ) -- pick
        OR (  DOWNSM AND HR0 AND NOT HR1 )              --  hold on request
        OR (  DOWNSM AND NOT ROWN )            --  hold on rown
             );

    MCOWNS   <= RN AND (
          ( HR0 AND HR1 AND ROWN )       --  PICK
        OR ( MCOWNS AND NPICK_MEM ) --  HOLD on picking row
        OR ( MCOWNS AND NOT ROWN )         --  HOLD on ROWN
             );

    COLSEL0N <= NOT (
          (ROWN AND NOT MCOWNS)          -- LOAD HMN ADDRESS at start up
        OR (S1 AND CASPICK AND DOWNSM ) -- DMA INC ON CASRN
        OR (S1 AND CASPICK AND RMWDN AND PLOCKNI));     -- SLAVE INC ON CASRN
                                         -- unless locked or rmwdn

    COLSEL1N <= NOT (
            ROWN                         -- load na or hmn at start up
        OR (MCOWNS AND NOT (NOT RMWDN OR S0 OR NPICK_MEM)));    -- NA RELOAD
                                    -- unless holding for s1 or rmwdn
-- on NOT rmwdn OR s0 OR npick_mem will be picking s1 andd therfore should hold

end process ;

--      sel1    sel0
--      1       1       -- hmn address
--      1       0       -- mc address
--      0       1       -- inc
--      0       0       -- hold
```

```
-- PAL NADEC**********************     NADEC 3    *****************

OKEN <= NOT (A(31) AND A(30) AND A(29) AND A(28) AND NOT NINTERNAL);-- MC MEMORY w/o internal

NKENA <= (A(31) AND A(30) AND A(29) AND A(28) );        -- MC MEMORY

NINTERNAL <=  NKENA AND A(27)
                AND A(26) AND A(25) AND A(24) AND A(23) AND A(22)
                AND A(21) AND A(20) AND A(19) AND A(18) AND A(17)
                AND A(16) AND A(15) AND A(14) AND A(13) AND A(12)
                AND A(11) AND A(10) AND NOT A(09);

XXMAI3  <= NOT MA(3) AND NOT ACOMP0 ;    -- expect 0 on a3 if acomp0 active
XXMAI4  <=  MA(4) XOR ( MA(3) );
XXMAI5  <=  MA(5) XOR ( MA(3) AND MA(4));
XXMAI6  <=  MA(6) XOR ( MA(3) AND MA(4) AND MA(5));
XXMAI7  <=  MA(7) XOR ( MA(3) AND MA(4) AND MA(5) AND MA(6));
XXMAI8  <=  MA(8) XOR ( MA(3) AND MA(4) AND MA(5) AND MA(6) AND MA(7));
XXMAI9  <=  MA(9) XOR ( MA(3) AND MA(4) AND MA(5) AND MA(6) AND MA(7) AND MA(8));
XXMAI10 <= MA(10) XOR ( MA(3) AND MA(4) AND MA(5) AND MA(6) AND MA(7) AND MA(8) AND MA(9));
XXMAI11 <= MA(11) XOR ( MA(3) AND MA(4) AND MA(5) AND MA(6) AND MA(7) AND MA(8) AND MA(9)
                 AND MA(10));

XMAI <= (XXMAI11 & XXMAI10 & XXMAI9 & XXMAI8 & XXMAI7 & XXMAI6 & XXMAI5
                & XXMAI4 & XXMAI3);
```

```
cecon.vhd          Wed Dec 23 15:54:51 1992          53


-- PAL PERFORM*********************     PERFORM 3       *****************

-- ?? time on wantbus AND NOT dspulse

-- 8/13/92 added NOT per_cnt to per_cnt pick terms
--         so that max count rate will be one half
--         clk rate to ease up on timing for performance
--         counter. -TRM


memory   <= NOT t1 AND NOT t0;
external <= NOT t1 AND  t0 ;
n10      <=  t1 AND NOT t0;

--      -------  memory monitor  ________________

mmaster <= (NOT m1 AND NOT m0 AND mcowns)
        OR (NOT m1 AND  m0 AND downsm)
        OR ( m1 AND NOT m0 AND slvsel)
        OR ( m1 AND  m0 );

mcycle <= ( NOT c2 AND NOT c1 AND NOT c0 AND s1)               -- access
       OR ( NOT c2 AND NOT c1 AND  c0 AND s1 AND NOT o64bitr)  -- non 64 bit
       OR ( NOT c2 AND  c1 AND NOT c0 AND s1 AND coder) -- icache fill
       OR ( NOT c2 AND  c1 AND  c0 AND prownd AND NOT rown )   -- row start
       OR (  c2 AND  c1 AND  c0 );                       -- all

--      _______ external monitor ----------------

xmaster <= (NOT m1 AND NOT m0 AND dmaseln )    -- 860 master master
        OR (NOT m1 AND  m0 AND NOT dmaseln)    -- dma master
        OR ( m1 AND  m0);                      -- either

-- NOT NOT  ri set up trouble so delayed ri,req_oin first 2 terms
xcycle <= ( NOT c2 AND NOT c1 AND NOT c0 AND NOT C20 AND  rid AND  rod) -- kill
       OR ( NOT c2 AND NOT c1 AND  c0 AND NOT C20 AND NOT rid AND NOT rod)     -- available
       OR ( NOT c2 AND  c1 AND NOT c0 AND NOT C20 AND  req_o AND NOT dspulse)  -- lost cycles
       OR ( NOT c2 AND  c1 AND  c0 AND  NOT rid AND NOT req_o AND rod) -- ORrequests unkilled
       OR (  c2 AND NOT c1 AND NOT c0 AND          NOT req_o AND rod) -- ORrequests
       OR (  c2 AND NOT c1 AND  c0 AND NOT C20 AND dspulse )        -- ORdata transfers
       OR (  c2 AND  c1 AND NOT c0 AND NOT C20 AND  split_md); --waiting for split

--      -------  860 monitor  -----------------------
```

```
stall <= NOT gons AND NOT gonsd ;

ncycle <= ( NOT c2 AND NOT c1 AND NOT c0 AND interupt ) -- interupt pending
        OR ( NOT c2 AND NOT c1 AND  c0 AND stall AND  lmemn )   --  stall going to memory
        OR ( NOT c2 AND  c1 AND NOT c0 AND stall AND NOT lmemn )        --  stall going to external
        OR ( NOT c2 AND  c1 AND  c0 AND stall AND  lmemn AND BUFFULL)
                                --  stall going to memory due to external
        OR (  c2 AND NOT c1 AND NOT c0 AND stall )              -- any stall
        OR (  c2 AND NOT c1 AND  c0 AND gons AND gonsd );
                                -- not hitting memory when could have


--      -----------------------------------------------

perform_proc: process begin wait until clk = '1';

        per_cnt <= FORCEINC
            OR ( NOT TESTINC AND NOT per_cnt AND memory AND mmaster AND mcycle AND refreshn )
            OR ( NOT TESTINC AND NOT per_cnt AND external AND xmaster AND xcycle )
            OR ( NOT TESTINC AND NOT per_cnt AND n10 AND ncycle ) ;

        prownd <= rown;
        rod <= req_o;
        gonsd <= gons;

        lmemn <= ( NOT gons AND gonsd AND NOT memn )
                OR (lmemn AND NOT gons );

        if ( ld_per_con = '1') then
                m0 <= bdom(0);
                m1 <= bdom(1);

                c0 <= bdom(4);
                c1 <= bdom(5);
                c2 <= bdom(6);

                t0 <= bdom(8);
                t1 <= bdom(9);
        else
                m0 <= m0;
                m1 <= m1;

                c0 <= c0;
                c1 <= c1;
```

```
                c2 <= c2;

                t0 <= t0;
                t1 <= t1;
        end if;

end process;
```

```
-- PAL REQ**********************    REQ 8              *****************

--  ARBITRATION RULES
--      - MUST GIVE UP BUS WHEN NOT REQ_I IS ASSERTED
--      - MUST DRIVE PBUS LINES with route info on same cycle as generating
--              request

--  request and ENAS relatioship
--      - don't deassert request until you know as is high therefore ENAS
--        must deassert before request deasserts
--
--
--  request holds active if asdrvn is asserted, or rout
--
--  ri will never happen on same cycle as ro
--
--  with requests activating on differet phases of 20m
--      - can hit oe on same cycle as request
--      - crossbar delay must be odd multiple of clocks
--      - compatible with one cycle crossbar delay for normal transfers

WANTBUS <=  DMABUF OR NOT PGONST;   -- 860 ON NOT PGONST  DMA ON DMABUF

x_pk_req <= RN AND NOT C20 AND NOT REQ_O AND WANTBUS AND NOT RID AND NOT REFREQ
                AND NOT REQ_ODD AND  NOT REQ_OD AND NOT SPLIT_MD;

x_reqhold <= RN AND REQ_O AND ( ASDRV OR ENAS OR HLDSLVENA OR C20 );

M_OE_HLD <= (REQ_O AND RN AND NOT BLK_M_DOE AND NOT BLK_M_DOED
                        AND NOT (DATAPHASE AND NOT C20 AND NOT SRDCON ))
        OR ( C20 AND REN_SLV_OE AND SREQD);             -- hold oe for slv

EN_SLV_OE <= NOT C20 AND REN_SLV_OE ;    -- slv oe on reqi

PREQ_O <=  (NOT REQ_I AND x_pk_req)
        OR x_reqhold;


NOT_KILL <= (NOT EX_KILL AND NOT REQ_OD) ;      -- ri that was not a kill

x_pk_cng <= C20 AND REQ_O AND REQ_OD AND NOT oADPHASE ;
```

```
cecon.vhd          Wed Dec 23 15:54:51 1992          57

CNG_TO_AD <= RPLY_I AND x_pk_cng ;
                                          -- change on first ready

EN_RPLY <=  oADPHASE AND REQ_O; -- only pass on oadphase

MASTER <= REQ_O;

x_hld_enas<= ENAS AND NOT SPLIT_MD AND REQ_O AND NOT EX_KILL AND NOT REFREQ AND NOT (ASDRVD AND NOT ASDRV);
x_pk_dataphase <= (REQ_O AND oADPHASE AND NOT C20 AND EN_RPLY AND NOT SPLIT) ;

x_ennosplit <= (REQ_O AND NOT C20 AND EN_RPLY AND NOT SPLIT); -- PICK ON FIRST DSEN
x_ensplit <= (REQ_O AND EN_RPLY AND C20 AND NOT NOSPLIT); -- pick on second rdy

req_proc: process begin

wait until clk = '1';

   OREQ_O  <= PREQ_O;
   REQ_O  <= PREQ_O;

   REQ_OD <= REQ_O;
   REQ_ODD <= REQ_OD;

   SHIFTN <= NOT ( req_o AND NOT oadphase );

   RID <= ( NOT C20 AND REQ_I )
        OR (  RN AND C20 AND RID );

   pk_ex_kill <= (c20 AND NOT rid AND req_o )  -- initial pick
                 OR (c20 AND ex_kill ) ;       -- hold

   EX_KILL <= (REQ_I AND PK_ex_kill)       -- KILL sent from xbar
        OR   (EX_KILL AND c20);             -- 20M HOLD

   ENAS <= (NOT REQ_I AND x_pk_req)
        OR  (NOT REQ_I AND x_hld_enas)
        OR  ( c20 AND x_hld_enas );
                -- picks with req_o
                -- holds until ex_kill OR REQ_I OR refreq OR asdrv deassert
                -- used by master pal to disable asdrv


        -- DRIVE WHEN MASTER OF EXTERNAL PORT AND NOT DOING A READ OR WHEN
        --        A SLAVE AND BEING READ

   ADPHASEN <= NOT (
              (CNG_TO_AD)              -- drive address when vou see cng_to_ad
```

```
          OR  (oADPHASE AND x_reqhold ));       -- hold till request goes away

   DATAPHASE <= ( RPLY_I2 AND x_pk_dataphase)    -- picks on first dsen after ad
             OR (DATAPHASE AND C20 AND SREQD)  -- 8/24 add for slave reads
             OR (DATAPHASE AND REQ_O AND NOT SPLIT)    -- holds till request goes away
             OR (REQ_I AND x_en_sreq );                -- always for slave access

   ASDRVD <= (RN AND NOT C20 AND ASDRV)
          OR (RN AND  C20 AND ASDRVD)  ;       -- 20m hold

--      --------  handling split read  -------------------

   SPLIT <= ( RPLY_I AND x_ensplit )     -- pick on second rdy
         OR ( SPLIT AND REQ_O);                 -- hold till NOT REQO

   NOSPLIT <= ( RPLY_I AND x_ennosplit ) -- PICK ON FIRST DSEN
           OR ( NOSPLIT AND REQ_O);      -- HOLD TILL DROP REQUEST OUT

end process;
```

```
cecon.vhd          Wed Dec 23 15:54:51 1992          59

-- PAL SBEN**********************     SBEN 3            *****************

-- SLVSEL         - SELECTS BE VERSUS PCON TO CONTROL BEN
-- DMASELN        - FORCES 64 BIT TO PBUS
-- DOWNSM         - DMA OWNS MEEMORY

--                                                    A
--        B B B B B B B B   P P P P      2    W W W W
--        0 1 2 3 4 5 6 7   3 2 1 0      R    0 1 2 3
--        ____________________________
--        1 1 1 1 1 1 1 0   0 0 0 0      0    0 0 0 1
--        1 1 1 1 1 1 0 1   0 0 0 1      0    0 0 1 0
--        1 1 1 1 1 0 1 1   0 0 1 0      0    0 1 0 0
--        1 1 1 1 0 1 1 1   0 0 1 1      0    1 0 0 0
--        1 1 1 0 1 1 1 1   0 1 0 0      1    0 0 0 1
--        1 1 0 1 1 1 1 1   0 1 0 1      1    0 0 1 0
--        1 0 1 1 1 1 1 1   0 1 1 0      1    0 1 0 0
--        0 1 1 1 1 1 1 1   0 1 1 1      1    1 0 0 0
--
--        1 1 1 1 1 1 0 0   1 0 0 0      0    0 0 1 1
--        1 1 1 1 0 0 1 1   1 0 1 0      0    1 1 0 0
--        1 1 0 0 1 1 1 1   1 1 0 0      1    0 0 1 1
--        0 0 1 1 1 1 1 1   1 1 1 0      1    1 1 0 0
--
--        1 1 1 1 0 0 0 0   1 0 0 1      0    1 1 1 1
--        0 0 0 0 1 1 1 1   1 1 0 1      1    1 1 1 1
--
--        0 0 0 0 0 0 0 0   1 0 1 1      0    1 1 1 1
--

NORMPK   <= NOT MINPROC AND NOT CS8 ;            -- NORMAL PICK
CS8PCK   <= NOT MINPROC AND CS8 ;                -- CS8 PICK

z_64bitur <=     (
           (NOT SLVSEL AND NOT BE(0) AND NOT BE(6) )             -- MC
         OR ( SLVSEL AND PCONI(3) AND NOT PCONI(2) AND PCONI(1) AND PCONI(0) )--   SLV PICK
         OR  DOWNSM                                  --  always on dma
               );

z_readn <=     NOT (
          ( NOT SLVSEL AND NOT DOWNSM AND NOT NREADN )  --   mc in
        OR (  SLVSEL AND GPREADI )                      --   slave in
        OR ( DOWNSM AND  NOT DMAIN )                --  dma in
              );
```

```
cecon.vhd        Wed Dec 23 15:54:51 1992        60

z_rmwur <= (
        ( MCOWNS AND NREADN AND ((BE(0) AND BE(4)) OR (BE(2) AND BE(6))))
                                             --  860 byte or 16 write or lock
      OR ( SLVSEL AND NOT GPREADI AND (NOT PCONI(3) OR NOT PCONI(0)) )
          );

NRMWUR <= NREADN AND ((BE(0) AND BE(4)) OR (BE(2) AND BE(6)));
                                             --  860 byte or 16 write or lock

z_pout <= (
       ( DMASELN AND NREADN  )
     OR (NOT DMASELN AND NOT DMAIN )
         );

POUT <= (
       ( DMASELN AND NREADN  )
     OR (NOT DMASELN AND NOT DMAIN )
         );

sben_proc: process begin wait until clk = '1';

   CODER <= ( NOT BE(2) AND BE(1) AND NOT BE(0))
          OR ( NOT BE(6) AND BE(5) AND NOT BE(4));

   O64BITR <= z_64bitur ;

   A2R    <= NOT (
        ( MCOWNS AND NOT BE(0) AND NOT BE(4) )           --  860 PICK
      OR ( MCOWNS AND BE(0) AND BE(1) AND BE(2) AND BE(3) )     --  860 PICK2
      OR ( SLVSEL AND NOT PCONI(2) )                     --  SLV PICK
      OR ( DOWNSM )                     --  DMA
              );


   PCONO(3) <= NOT  (
       ( NORMPK AND DMASELN AND BE(0) AND BE(2) AND BE(4) AND BE(6) )
     OR ( NORMPK AND DMASELN AND BE(1) AND BE(3) AND BE(5) AND BE(7) )
     OR (  MINPROC AND DMASELN AND NOT PCONO(3) )
     OR CS8PCK
           );

   PCONO(2) <= NOT (
        ( NORMPK AND NOT BE(4) AND NOT BE(5) AND NOT BE(6) AND NOT BE(7) )
      OR ( NORMPK AND BE(0) AND BE(1) AND BE(2) AND BE(3) )
      OR ( CS8PCK AND BE(2) )
      OR (  MINPROC AND NOT PCONO(2) )
```

```
cecon.vhd        Wed Dec 23 15:54:51 1992        61

    OR    NOT DMASELN
          );

  PCONO(1) <= NOT (
    ( NORMPK AND DMASELN AND NOT BE(0) AND NOT BE(1) AND NOT BE(2) AND NOT BE(3) AND BE(4) AND BE(5) AND BE(6) AND BE(7) )
  OR ( NORMPK AND DMASELN AND BE(0) AND BE(1) AND BE(2) AND BE(3) AND NOT BE(4) AND NOT BE(5) AND NOT BE(6) AND NOT BE(7) )
  OR ( NORMPK AND DMASELN AND BE(0) AND BE(1) AND BE(2) AND BE(3) AND BE(4) AND BE(5) )
  OR ( NORMPK AND DMASELN AND BE(0) AND BE(1) AND BE(4) AND BE(5) AND BE(6) AND BE(7) )
    OR ( CS8PCK AND BE(1) )
  OR (  MINPROC AND DMASELN AND NOT PCONO(1) )
              );

  PCONO(0)    <= NOT (
       ( NORMPK AND DMASELN AND NOT BE(7) AND BE(4) )
    OR ( NORMPK AND DMASELN AND NOT BE(5) AND BE(7) )
    OR ( NORMPK AND DMASELN AND NOT BE(3) AND BE(0) )
    OR ( NORMPK AND DMASELN AND NOT BE(1) AND BE(3) )
   OR ( CS8PCK AND BE(0) )
    OR (  MINPROC AND DMASELN AND NOT PCONO(0) )
              );

  FIN_SELRAM <= DOWNSM AND NOT WRTBLKN ;        -- fifo in mux select ram for dma out
                               -- else pin, pin must be default for master in
                               -- NOT NOT NOT  must last past fifowrt

  RW_SELP <= SLVSEL AND WRTBLKN ;       -- select p input to ram on slave write

  RW_SEL860 <= ( MCOWNS AND RMWDN AND NOT OPICKS1W )              ;
              -- select 860 to ram as default on mcowns
              -- disable on picks1w or rmwd on wrtblkn

  HLD0 <= OPICKS1W                              -- hold on s1 for a write
      OR (ROWN AND NOT PICK)  -- hold if not doing a memory operation for sso
      OR (NOT RMWDN AND ( RTALEN OR NOT PBEN0 ))  -- hold on rmwd unless ram update
      OR ( NOT WRTBLKN AND RTALEN ) ; -- hold on wrtblkn unless dmacmd load

  HLD1 <= OPICKS1W                              -- hold on s1
      OR (ROWN AND NOT PICK)  -- hold if not doing a memory operation for sso
      OR (NOT RMWDN AND ( RTALEN OR NOT PBEN1 ))  -- hold on rmwd unless ram update
      OR ( NOT WRTBLKN AND RTALEN ) ; -- hold on wrtblkn unless dmacmd load

  HLD2 <= OPICKS1W                              -- hold on s1
      OR (ROWN AND NOT PICK)  -- hold if not doing a memory operation for sso
      OR (NOT RMWDN AND ( RTALEN OR NOT PBEN2 ))  -- hold on rmwd unless ram update
      OR ( NOT WRTBLKN AND RTALEN ) ; -- hold on wrtblkn unless dmacmd load

  HLD3 <= OPICKS1W                              -- hold on s1
```

cecon.vhd Wed Dec 23 15:54:51 1992 62

```
        OR (ROWN AND NOT PICK)  -- hold if not doing a memory operation for sso
        OR (NOT RMWDN AND ( RTALEN OR NOT PBEN3 ))  -- hold on rmwd unless ram update
        OR ( NOT WRTBLKN AND RTALEN ) ; -- hold on wrtblkn unless dmacmd load

end process;


-- ben high allows new data to be clocked for output to ram or pout

-- PICKS1W <= (NOT S1 AND CASPICK AND WRTBLKN)  --  host pick
--            OR ( S0 AND WRTBLKN AND REFRESHN)
--            OR ( NOT ROWN AND NPICK_MEM AND z_readn) ;

PBEN0 <=
        ( SLVSEL AND NOT PCONI(3) AND NOT PCONI(1))  --  PWRITE byte
      OR ( SLVSEL AND NOT PCONI(3) AND NOT PCONI(0))  --  PWRITE byte
      OR ( SLVSEL AND NOT PCONI(1) AND NOT PCONI(0))  --  PWRITE 16 bit
      OR (NOT SLVSEL AND BE(0) AND BE(4))
          ;

PBEN1 <=
        ( SLVSEL AND NOT PCONI(3) AND NOT PCONI(1)) --  PWRITE byte
      OR ( SLVSEL AND NOT PCONI(3) AND  PCONI(0)) --  PWRITE byte
      OR ( SLVSEL AND NOT PCONI(1) AND NOT PCONI(0)) --  PWRITE 16 bit
      OR (NOT SLVSEL AND BE(1) AND BE(5))
        ;

PBEN2 <=
        ( SLVSEL AND NOT PCONI(3) AND  PCONI(1)) --  PWRITE byte
      OR ( SLVSEL AND NOT PCONI(3) AND NOT PCONI(0)) --  PWRITE byte
      OR ( SLVSEL AND  PCONI(1) AND NOT PCONI(0)) --  PWRITE 16 bit
      OR (NOT SLVSEL AND BE(2) AND BE(6))
        ;

PBEN3 <=
        ( SLVSEL AND NOT PCONI(1) AND  PCONI(1)) --  PWRITE byte
      OR ( SLVSEL AND NOT PCONI(3) AND  PCONI(0)) --  PWRITE byte
      OR ( SLVSEL AND  PCONI(1) AND NOT PCONI(0)) --  PWRITE 16 bit
      OR (NOT SLVSEL AND BE(3) AND BE(7))
        ;


END pla;
```

cecon.vhd Wed Dec 23 15:54:51 1992 63

```
-- COMMENTS

-- adsd
-- NO NA ON WRITES TO RAM
-- enpgo can be active whenever rown is inactive since go can't be generated
--      during first two phases of refresh
--      - no need for rowen since go blocked

-- speed
--      na should be very fast from clock but should be balanced
--              - local registers should gated a few times
--      NOT NOT NOT  optimize setupfrom adsd


-- bufcon6
-- gated slvcaspick with adsd so that memory will free up quickly
--  NOT NOT  several things assume master held on dinpending
-- speed
--      must pass slvasd deasserting to slvcaspick deassert quickly
--

-- DMA
-- speed
--      dmaactive in appears to be critical since it causes dmaactive
--              asynchronously
--              - on output word counter incs with caspick, dmadone sampled
--                      by dmareqm mid cycle
--      slvcaspick may deassert late
-- wcclk as a clock enable must go out unregistered
-- BC3 added to i/o
-- caspickd added to io

--  dinpending no longer reflects rout
--      - goes up mid cycle (with rack) and down at end( with caspick)


-- FCON

-- FIFO

-- IOCON

-- LOAD

-- MASTER
```

```
cecon.vhd        Wed Dec 23 15:54:51 1992        64

-- NBUSCON

-- NADEC

-- REQ

-- SBEN


-- UTILITY

--DOUTLENCON <= CLK AND CLKD2 AND DOUTLENCON_REG;

--   DOUTLENCON_REG <= (
--          ( NOT RTALEN AND DOWNSM )    -- CLOCK AFTER MEMREAD ON DMA READ OF MEMORY
--        OR ( NOT GON AND NOT C20 AND z_enpgo AND MEMN AND z_readn ) --  860 out
--      OR ( WRTBLKN AND NOT S1 AND CASPICK AND NOT ROWN )        --  host write to ram
--        OR ( WRTBLKN AND S0 )                         --  860 write ram
--        OR ( WRTBLKN AND NOT RMWDN )                          --  RMWD REPICK
--        OR ( WRTBLKN AND NOT ROWN AND NPICK_MEM )          --  860 ram write
--                 );
--

--  why did we need a term for dma controller n LASTN???
--              - faster re-ras
--              - may not need last equation
        --  watch what happens with refresh


--  doutlencon goes high to open latch to ecc generate circuitry and ram out
--      - must open on
--              - ram writes
--              - dma out
--              - 860 out to pbus
--              - writes to internal registers ( do ram write anyway )
--      - actual len should be gated to only go high for first halh of cycle

-- latch for data coming in from i860/pbus (after merge mux)
```

```
--DOUTLENCON <= (        -- to sben to enable clocking of data out for ram writes
--        (WRTBLKN AND NOT S1 AND CASPICK AND NOT ROWN)        -- host or dma to ram
--        OR (z_readn AND S0)                        --  860 ram write 1
--        OR (z_readn AND NOT ROWN AND NPICK_MEM )           --  860 ram write 2
--        OR PK_LENCON                                 -- DMACMD dram reads
--               );
--      -- doutlencon enables register for initial data
--      --        sben reopens for rmwd data
--
--   PK_LENCON <= NOT RTALEN AND DOWNSM AND DMACMD;     -- added 4/28/92
--
-- ENRAMORPN <= NOT (SELRAM OR RDINTERNALB OR (NOT ROWN AND CASPICK)); --
```

```
cnt32.vhd        Wed Oct 21 13:55:00 1992        1

-- filename: cnt32.vhd
-- author: Tom Morin
-- history: 4/8/92 initial creation
-- description:
--    This file implements a 32 bit free-running,
--    counter with sync load, and terminal count.

LIBRARY synth;
USE synth.stdsynth.all;

ENTITY cnt32 IS PORT (

CLK, LOAD : IN VLBIT;-- 10Mhz clock, load pulse.
din       : IN VLBIT_VECTOR(31 downto 0);
COUNTER   : OUT VLBIT_VECTOR(31 downto 0);
TC        : OUT VLBIT
);

END cnt32;

ARCHITECTURE behv OF cnt32 IS

BEGIN

-- first, do the read pointer in a clocked
-- process:

cnt_proc: process

variable cnt_temp : vlbit_vector(32 downto 0);

begin

wait until prising(clk);

if (load = '1')  then
        cnt_temp := b"0" & din;
        TC <= '0';

else
        cnt_temp := subum(cnt_temp(31 downto 0),b"1");

   if (cnt_temp(32 downto 0) = b"000000000000000000000000000000001") then
        TC <= '1';
   else
        TC <= '0';
   end if;
```

cnt32.vhd Wed Oct 21 13:55:00 1992 2

```
end if;
counter <= cnt_temp(31 downto 0);
end process;
END behv;
```

```
cs8gate.vhd        Fri Oct 23 09:28:04 1992        1

-- REMMUX.VHD
-- mux for producing crossbar addresses.
-- author: Tom Morin
-- history: 4/13/92 created

ENTITY cs8gate IS PORT (

pgaddr : in vlbit_vector(31 downto 0);
pa : out vlbit_vector(31 downto 0);
shift : in vlbit;
paus     :inout vlbit_vector(31 downto 0);
cs8n : inout vlbit;
cs8 : in vlbit);

END cs8gate;

ARCHITECTURE rtl OF cs8gate IS

SIGNAL  a31 , a30 ,
        a29 , a28 , a27 , a26 , a25 , a24 , a23 , a22 , a21 , a20 ,
        a19 , a18 , a17 , a16 , a15 , a14 , a13 , a12 , a11 , a10 ,
        a9 , a8 , a7 , a6 , a5 , a4 , a3 , a2 , a1 , a0  : vlbit;

signal pams     :vlbit_vector(31 downto 5);

BEGIN

cs8n <= not cs8 ;

--pa <=(pgaddr(31 downto 0))
--                when (cs8 = '0') else   -- page ram routing/rtn addresses
--       (b"01001001001001001001001001000110");

a0 <= pgaddr(0) and cs8n ;
a1 <= pgaddr(1) or cs8 ;
a2 <= pgaddr(2) or cs8 ;
a3 <= pgaddr(3) and cs8n ;
a4 <= pgaddr(4) and cs8n ;
a5 <= pgaddr(5) and cs8n ;
a6 <= pgaddr(6) or cs8 ;
a7 <= pgaddr(7) and cs8n ;
a8 <= pgaddr(8) and cs8n ;
a9 <= pgaddr(9) or cs8 ;

a10 <= pgaddr(10) and cs8n ;
a11 <= pgaddr(11) and cs8n ;
```

```
a12 <= pgaddr(12) or cs8 ;
a13 <= pgaddr(13) and cs8n ;
a14 <= pgaddr(14) and cs8n ;
a15 <= pgaddr(15) or cs8 ;
a16 <= pgaddr(16) and cs8n ;
a17 <= pgaddr(17) and cs8n ;
a18 <= pgaddr(18) or cs8 ;
a19 <= pgaddr(19) and cs8n ;

a20 <= pgaddr(20) and cs8n ;
a21 <= pgaddr(21) or cs8 ;
a22 <= pgaddr(22) and cs8n ;
a23 <= pgaddr(23) and cs8n ;
a24 <= pgaddr(24) or cs8 ;
a25 <= pgaddr(25) and cs8n ;
a26 <= pgaddr(26) and cs8n ;
a27 <= pgaddr(27) or cs8 ;
a28 <= pgaddr(28) and cs8n ;
a29 <= pgaddr(29) and cs8n ;

a30 <= pgaddr(30) or cs8 ;
a31 <= pgaddr(31) and cs8n ;

paus <= ( a31 & a30 &
        a29 & a28 & a27 & a26 & a25 & a24 & a23 & a22 & a21 & a20 &
        a19 & a18 & a17 & a16 & a15 & a14 & a13 & a12 & a11 & a10 &
        a9 & a8 & a7 & a6 & a5 & a4 & a3 & a2 & a1 & a0 );

pams <= not paus(28 downto 2)  when ( shift = '1' ) else not paus(31 downto 5);

pa <= not (pams ( 31 downto 5)) & paus ( 4 downto 0);

END rtl;
```

```
datapath.vhd        Tue Nov 24 17:05:39 1992        1

-- file:                    datapath.vhd
-- description:         vhdl duplicate of synth'd data path
-- history:                 mjb 9/24/92 created

use synth.stdsynth.all;

entity datapath is
        port (
                RAM                     : IN    vlbit_vector(31 downto 0);
                VIS                     : IN    vlbit_vector(31 downto 0);
                FRM_FIF         : IN    vlbit_vector(31 downto 0);
                PINI            : IN    vlbit_vector(31 downto 0);
                NDI                     : IN    vlbit_vector(31 downto 0);
                CNDON           : IN    vlbit_vector(31 downto 0);

                SELVISN         : IN    vlbit;
                WRTBLK          : IN    vlbit;
                RW_SELPN        : IN    vlbit;
                RW_SEL860N      : IN    vlbit;
                RW_HLD0N        : IN    vlbit;
                RW_HLD1N        : IN    vlbit;
                RW_HLD2N        : IN    vlbit;
                RW_HLD3N        : IN    vlbit;
                PINCLKEN        : IN    vlbit;
                FIN_SELRAMN     : IN    vlbit;
                SLVSELN         : IN    vlbit;
                DMASEL          : IN    vlbit;
                GATEON          : IN    vlbit;
                PK_RTALEN       : IN    vlbit;
                CLK                     : IN    vlbit;
                PK_OEATN        : IN    vlbit;
                DRVPN           : IN    vlbit;

                FORCEOE, TESTNOE, TESTROE, MISCON9 : IN vlbit;

                RW_DO           : INOUT vlbit_vector(31 downto 0);
                BDO                     : OUT   vlbit_vector(31 downto 0);
                TO_FIF          : OUT   vlbit_vector(31 downto 0);
                POUT            : OUT   vlbit_vector(31 downto 0);
                NDOUC           : OUT   vlbit_vector(31 downto 0);

                OEATRN0         : INOUT         vlbit;
                OEATRN1         : OUT   vlbit;
                OEATN0          : OUT   vlbit;
                OEATN1          : OUT   vlbit;
                OEATRN          : OUT   vlbit
```

```
        );
end datapath;

architecture behave of datapath is

SIGNAL          SELVIS          : vlbit;
SIGNAL          WRTBLKN         : vlbit;
SIGNAL          WRTBLKND        : vlbit;
SIGNAL          RW_SELP         : vlbit;
SIGNAL          RW_SEL860       : vlbit;
SIGNAL          RW_HLD0         : vlbit;
SIGNAL          RW_HLD1         : vlbit;
SIGNAL          RW_HLD2         : vlbit;
SIGNAL          RW_HLD3         : vlbit;
SIGNAL          PINCLKENA       : vlbit;
SIGNAL          FIN_SELRAM      : vlbit;
SIGNAL          SLVSEL          : vlbit;
SIGNAL          DMASELN         : vlbit;
SIGNAL          GATEONA         : vlbit;
SIGNAL          PK_RTALEND      : vlbit;
SIGNAL          PK_RTALEND2     : vlbit;
SIGNAL          PK_RTAD         : vlbit;
SIGNAL          PK_RTADD        : vlbit;
SIGNAL          GRTALEN         : vlbit;
SIGNAL          DRVP            : vlbit;

SIGNAL          LRAM            : vlbit_vector(31 downto 0);
SIGNAL          SPIN            : vlbit_vector(31 downto 0);
SIGNAL          PINR            : vlbit_vector(31 downto 0);
SIGNAL          PINRN           : vlbit_vector(31 downto 0);
SIGNAL          RW_FB           : vlbit_vector(31 downto 0);
SIGNAL          MRW                     : vlbit_vector(31 downto 0);
SIGNAL          MRWA            : vlbit_vector(7 downto 0);
SIGNAL          MRWB            : vlbit_vector(7 downto 0);
SIGNAL          MRWC            : vlbit_vector(7 downto 0);
SIGNAL          MRWD            : vlbit_vector(7 downto 0);
SIGNAL          MRWM            : vlbit_vector(31 downto 0);
SIGNAL          MDOUT           : vlbit_vector(31 downto 0);
SIGNAL          IPOUT           : vlbit_vector(31 downto 0);
SIGNAL          NDSEL           : vlbit_vector(1 downto 0);
SIGNAL          RWSEL0          : vlbit_vector(1 downto 0);
SIGNAL          RWSEL1          : vlbit_vector(1 downto 0);
SIGNAL          RWSEL2          : vlbit_vector(1 downto 0);
SIGNAL          RWSEL3          : vlbit_vector(1 downto 0);

begin
```

```
SELVIS          <= not SELVISN;
RW_SELP         <= not RW_SELPN;
RW_HLD0         <= not RW_HLD0N;
RW_HLD1         <= not RW_HLD1N;
RW_HLD2         <= not RW_HLD2N;
RW_HLD3         <= not RW_HLD3N;
RW_SEL860       <= not RW_SEL860N;
PINCLKENA       <= not PINCLKEN;
FIN_SELRAM      <= not FIN_SELRAMN;
SLVSEL          <= not SLVSELN;
DMASELN         <= not DMASEL;
GATEONA         <= not GATEON;
DRVP            <= not DRVPN;


clkproc1:process begin wait until CLK = '1';

        PK_RTAD <= PK_RTALEN;
        OEATN0 <= PK_OEATN;
        OEATN1 <= PK_OEATN;
        WRTBLKND <= not WRTBLK;
        OEATRN0 <= WRTBLK;
        OEATRN1 <= WRTBLK;

end process;

OEATRN <= OEATRN0 OR MISCON9 ;

clkn:process begin wait until CLK = '0';

        PK_RTADD <= PK_RTAD;

end process;

        GRTALEN <= PK_RTAD and PK_RTADD;

        dlatch_v(RAM,GRTALEN,LRAM);

        NDSEL <= (WRTBLKND & SELVIS);

        NDOUC <= LRAM when NDSEL = b"00" else
                        VIS when  NDSEL = b"01" else
                        FRM_FIF ;

        MDOUT <= not FRM_FIF when DMASELN = '0' else
                        not NDI;
```

```
datapath.vhd        Tue Nov 24 17:05:39 1992        4

        IPOUT <= not MDOUT when SLVSEL = '0' else
                 not CNDON;

        POUT <= not IPOUT when DRVP = '1' else
                x"FFFFFFFF";

        RWSEL0 <= (RW_HLD0 & RW_SELP);
        RWSEL1 <= (RW_HLD1 & RW_SELP);
        RWSEL2 <= (RW_HLD2 & RW_SELP);
        RWSEL3 <= (RW_HLD3 & RW_SELP);

        MRWA <= not CNDON(7 downto 0) when RWSEL0 = b"00" else
                not PINRN(7 downto 0) when RWSEL0 = b"01" else
                    not RW_FB(7 downto 0);

        MRWB <= not CNDON(15 downto 8) when RWSEL1 = b"00" else
                not PINRN(15 downto 8) when RWSEL1 = b"01" else
                    not RW_FB(15 downto 8);

        MRWC <= not CNDON(23 downto 16) when RWSEL2 = b"00" else
                not PINRN(23 downto 16) when RWSEL2 = b"01" else
                    not RW_FB(23 downto 16);

        MRWD <= not CNDON(31 downto 24) when RWSEL3 = b"00" else
                not PINRN(31 downto 24) when RWSEL3 = b"01" else
                    not RW_FB(31 downto 24);

        MRW <= (MRWD & MRWC & MRWB & MRWA);

        MRWM <= not MRW when RW_SEL860 = '0' else
                not NDI;

        SPIN <= not PINR when PINCLKENA = '0' else
                not PINI;

clkproc2:process begin wait until clk = '1';

        RW_FB <= MRWM;

        RW_DO <= not MRWM;

        PINRN <= SPIN;

        PINR <= not SPIN;

end process;
```

```
datapath.vhd          Tue Nov 24 17:05:39 1992          5

        TO_FIF <= not PINRN when FIN_SELRAM = '0' else
                  not CNDON;

        BDO <= RW_DO when GATEONA = '1' else
               x"00000000";

end behave;
```

```
dmacnt.vhd        Thu Oct  8 11:32:33 1992        1

-- filename: dmacnt.vhd
-- author: Tom Morin
-- history: 4/28/92 initial creation
-- description:
-- This file implements a 32 bit
-- counter with sync load and count enable.

LIBRARY synth;
USE synth.stdsynth.all;

ENTITY dmacnt IS PORT (

CLK, LOAD,CE : IN VLBIT;-- 10Mhz clock, active-low load pulse.
data_in    : IN VLBIT_VECTOR(31 downto 0);
COUNTER : INOUT VLBIT_VECTOR(31 downto 0);
DMATC    : OUT VLBIT);

END dmacnt;

ARCHITECTURE behv OF dmacnt IS

BEGIN

-- first, do the read pointer in a clocked
-- process:

cnt_proc: process

variable cnt_temp : vlbit_vector(32 downto 0);

begin

wait until (clk = '1');

   if (load = '1')  then                  -- load

        cnt_temp :=  (b"0" & data_in(31 downto 0));

   elsif ( ce = '1') then

        cnt_temp := addum(cnt_temp(31 downto 0),b"1");  --inc

   else

        cnt_temp := cnt_temp;                    -- hold

   end if;
```

```
dmacnt.vhd          Thu Oct  8 11:32:33 1992          2

-- check for the wrap condition:

   if (cnt_temp(32 downto 0) = b"100000000000000000000000000000000") then
     cnt_temp(32 downto 0) := b"000000000000000000000000000000000";
   end if;

counter(31 downto 0) <= cnt_temp(31 downto 0);

end process;

        dmatc <= (counter(31) and counter(30) and counter(29) and counter(28) and
                  counter(27) and counter(26) and counter(25) and counter(24) and
                  counter(23) and counter(22) and counter(21) and counter(20) and
                  counter(19) and counter(18) and counter(17) and counter(16) and
                  counter(15) and counter(14) and counter(13) and counter(12) and
                  counter(11) and counter(10) and counter(9) and counter(8) and
                  counter(7) and counter(6) and counter(5) and counter(4) and
                  counter(3) and counter(2) and counter(1) and counter(0));

END behv;
```

dmacpt.vhd Fri Oct 16 10:48:41 1992 1

```
-- DMACPT.VHD
-- 25 bit loadable register
-- author: Tom Morin
-- history: 4/13/92 created

ENTITY dmacpt IS PORT (

clk, dmacpt_ld : in vlbit;

dom : in vlbit_vector(27 downto 2);

dmacpt : inout vlbit_vector(27 downto 3) ;
endma  : inout vlbit );

END dmacpt;

ARCHITECTURE rtl OF dmacpt IS

BEGIN

-- most bits are latched

dmacpt <= dom(27 downto 3) when (dmacpt_ld = '1')
                else dmacpt;


dmacpt_proc: process begin

   wait until (clk = '1');

      if (dmacpt_ld = '1') then

        endma  <= dom(2);

      else

        endma  <= endma;

      end if;

end process;

end rtl;
```

```
dmala.vhd          Wed Oct 21 13:55:01 1992          1

-- DMALA.VHD
-- 25 bit loadable counter
-- author: Tom Morin
-- history: 4/13/92 created
--          9/17/92 changed colbndn to work on
--                  2K boundary instead of 4K,
--                  to allow 12/8 (1Mx16) ram chips to
--                  get a new row address when that boundary
--                  is crossed. TRM
--

ENTITY dmala IS PORT (

clk, dmala_ld,dlainc : in vlbit;

dom : in vlbit_vector(27 downto 3);

dmala : inout vlbit_vector(27 downto 3);

colbnd : out vlbit );

END dmala;

ARCHITECTURE rtl OF dmala IS

BEGIN

dmala_proc: process

variable dmala_temp : vlbit_vector(25 downto 0);

begin

   wait until (clk = '1');

      if (dmala_ld = '1' and dlainc = '0') then

        dmala_temp := (b"0" & dom(27 downto 3));

      elsif (dmala_ld = '0' and dlainc = '1') then

        dmala_temp := addum(dmala_temp(24 downto 0), b"1");

      else

        dmala_temp := dmala_temp;
```

```
dmala.vhd          Wed Oct 21 13:55:01 1992          2

      end if;

dmala <= dmala_temp(24 downto 0);

end process;

colbnd <= NOT (dmala(10) AND dmala(9) AND dmala(8)
               AND dmala(7) AND dmala(6) AND dmala(5) AND dmala(4)
               AND dmala(3));

end rtl;
```

```
dninc32.vhd          Wed Nov 18 12:54:42 1992          1

-- !!!!!! must tie cox_y to icox_y

LIBRARY synth;
USE synth.stdsynth.all;

ENTITY dninc32 IS PORT (

-- the following i/o are just to help synthesis

TESTINC : in vlbit;
co0_3,  co4_7 ,  co8_11,  co12_15,  co16_19,  co20_23,  co24_27 : inout vlbit;
ico0_3, ico4_7 , ico8_11, ico12_15, ico16_19, ico20_23, ico24_27 : in vlbit;
ci4,ci8,ci12,ci16,ci20,ci24,ci28                          : inout vlbit;
ici16                                                     : in vlbit;

-- the real i/o

d       : IN    VLBIT_VECTOR(31 downto 0);
incd    : OUT   VLBIT_VECTOR(31 downto 0);
tc      : OUT VLBIT);

END dninc32;

ARCHITECTURE behv OF dninc32 IS

SIGNAL civ        : vlbit_vector(31 downto 0);
SIGNAL
        ci1 ,ci2 ,ci3      ,ci5 ,ci6 ,ci7     , ci9 ,ci10, co28_31,
        ci11       ,ci13 ,ci14 ,ci15      , ci17 ,ci18 ,ci19 ,
        ci21 ,ci22 ,ci23      , ci25 ,ci26 ,ci27       ,ci29 ,ci30,ci31 :VLBIT;

BEGIN
co0_3   <=  TESTINC xor ( d(3)  and d(2)  and d(1)  and d(0));
co4_7   <= TESTINC xor ( d(7)  and d(6)  and d(5)  and d(4));
co8_11  <= TESTINC xor ( d(11) and d(10) and d(9)  and d(8));
co12_15 <= TESTINC xor ( d(15) and d(14) and d(13) and d(12));
co16_19 <= TESTINC xor ( d(19) and d(18) and d(17) and d(16));
co20_23 <= TESTINC xor ( d(23) and d(22) and d(21) and d(20));
co24_27 <= TESTINC xor ( d(27) and d(26) and d(25) and d(24));
co28_31 <= TESTINC xor ( d(31) and d(30) and d(29) and d(28));

ci4  <=  co0_3;
ci8  <= ico0_3 and  co4_7;
ci12 <=  co0_3 and ico4_7 and  co8_11;
ci16 <= ico0_3 and ico4_7 and ico8_11 and ico12_15;

ci20 <=  ci16 and  co16_19;
```

```
dninc32.vhd        Wed Nov 18 12:54:42 1992        2

ci24 <=  ci16 and ico16_19 and  co20_23;
ci28 <= ici16 and  co16_19 and ico20_23 and ico24_27;

tc <= ci28 and co28_31;

--ci32 <= ci16 and co16_19 and  co20_23 and  co24_27 and ico28_31;

ci1 <= d(0);
ci2 <= ci1 and d(1);
ci3 <= ci2 and d(2);

ci5 <= ci4 and d(4);
ci6 <= ci5 and d(5);
ci7 <= ci6 and d(6);

ci9 <= ci8 and d(8);
ci10 <= ci9 and d(9);
ci11 <= ci10 and d(10);

ci13 <= ci12 and d(12);
ci14 <= ci13 and d(13);
ci15 <= ci14 and d(14);


ci17 <= ci16 and d(16);
ci18 <= ci17 and d(17);
ci19 <= ci18 and d(18);

ci21 <= ci20 and d(20);
ci22 <= ci21 and d(21);
ci23 <= ci22 and d(22);


ci25 <= ci24 and d(24);
ci26 <= ci25 and d(25);
ci27 <= ci26 and d(26);

ci29 <= ci28 and d(28);
ci30 <= ci29 and d(29);
ci31 <= ci30 and d(30);

civ <= ( ci31
        & ci30 & ci29 & ci28 & ci27 & ci26 & ci25 & ci24 & ci23 & ci22 & ci21 &
          ci20 & ci19 & ci18 & ci17 & ci16 & ci15 & ci14 & ci13 & ci12 & ci11 &
          ci10  & ci9  & ci8  & ci7  & ci6  & ci5  & ci4  & ci3  & ci2  & ci1 &
          b"1");
```

```
dninc32.vhd        Wed Nov 18 12:54:42 1992        3

incd <=  civ xor d;

END behv;

--      component an4
--              port(signal a,b,c,d     :in vlbit;
--                      signal z        :out vlbit);
--      end component;


--
--   U1 : an4
--      port map( d(3)  , d(2)  , d(1)  , d(0)  , co0_3   );
--
--   U2 : an4
--      port map( d(7)  , d(6)  , d(5)  , d(4)  , co4_7   );
--
--   U3 : an4
--      port map( d(11) , d(10) , d(9)  , d(8)  , co8_11  );
--
--   U4 : an4
--      port map( d(15) , d(14) , d(13) , d(12) , co12_15 );
--
--   U5 : an4
--      port map( d(19) , d(18) , d(17) , d(16) , co16_19 );
--
--   U6 : an4
--      port map( d(23) , d(22) , d(21) , d(20) , co20_23 );
--
--   U7 : an4
--      port map( d(27) , d(26) , d(25) , d(24) , co24_27 );
--
```

```
dracnt.vhd        Wed Oct  7 09:52:19 1992        1

-- DRACNT.VHD
-- 25 bit loadable counter
-- used by the dma controller for transfer addresses
-- author: Tom Morin
-- history: 4/13/92 created
--
--          5/5/92 added fastd (dma buffer throttle control)
--                 as bit 2 of this device.

ENTITY dracnt IS PORT (

clk, dra_ld,drainc : in vlbit;

dol : in vlbit_vector(31 downto 0);

draadr : inout vlbit_vector(27 downto 3);

b2k : out vlbit ;

endmaint, dmawrt, fastd : inout vlbit);

END dracnt;

ARCHITECTURE rtl OF dracnt IS

BEGIN

dracnt_proc: process

variable dracnt_temp : vlbit_vector(25 downto 0);

begin

   wait until (clk = '1');

      if (dra_ld = '1' and drainc = '0') then   -- load

        dracnt_temp := (b"0" & dol(27 downto 3));
        dmawrt <= dol(0);
        endmaint <= dol(1);
        fastd  <= dol(2);

      elsif (dra_ld = '0' and drainc = '1') then  -- increment

        dracnt_temp := addum(dracnt_temp(24 downto 0), b"1");
        dmawrt <= dmawrt;
```

```
dracnt.vhd        Wed Oct  7 09:52:19 1992        2

        endmaint <= endmaint;
        fastd <= fastd;

      else

        dracnt_temp := dracnt_temp;              -- hold
        dmawrt <= dmawrt;
        endmaint <= endmaint;
        fastd <= fastd;

      end if;

draadr <= dracnt_temp(24 downto 0);

end process;

b2k <= draadr(10) AND draadr(9) AND draadr(8) AND draadr(7) AND draadr(6)
         AND draadr(5) AND draadr(4) AND draadr(3);

end rtl;
```

```
dreg32.vhd          Thu Dec  3 15:57:45 1992          1

-- reg32
-- a 32 bit register with rising edge clock
-- 3/31/92 trm

LIBRARY synth;
USE synth.stdsynth.all;

ENTITY dreg32 IS PORT(

DIN : IN VLBIT_VECTOR(31 DOWNTO 0);
CLK  : IN VLBIT;
DINN : INOUT VLBIT_VECTOR(31 DOWNTO 0);
DOUT : INOUT VLBIT_VECTOR(31 DOWNTO 0)
                    );

END dreg32;

ARCHITECTURE rtl OF dreg32 IS

signal dind : vlbit_vector (31 downto 0);

BEGIN

DINN <= NOT DIN;
DIND <= NOT DINN;

        dff_v(DIND, CLK, DOUT);

END rtl;
```

```
eccerr.vhd        Mon Nov 16 13:26:52 1992        1

-- filename: eccerr.vhd
-- description: introduces single-bit (correctable) and
--              double-bit (uncorrectable) ecc errors into
--              read data from two specific locations in
--              memory. (EFAAAA00 for single EFAAAA08 for double)
-- history: 8/12/92 created by trm
--
--
LIBRARY synth;
USE synth.stdsynth.all;


ENTITY eccerr IS PORT (

rasl, casm, wrtn : IN VLBIT;

addr : IN VLBIT_VECTOR(11 downto 0);

cedat, ramdat : INOUT VLBIT_VECTOR(63 downto 0) := x"ZZZZZZZZZZZZZZZZ";

raddress : INOUT VLBIT_VECTOR(31 downto 0) -- just for visibility

);

END eccerr;

ARCHITECTURE rtl OF eccerr IS

signal rowaddr : vlbit_vector(11 downto 0);
signal selsgl, seldbl, addrstb : vlbit;

BEGIN

dlatch_v(addr,rasl,rowaddr);

-- reconstruct a 32 bit address for bank1:

fulladdr: process begin

wait until (casm = '0' and rasl = '0');

raddress <= b"111011111" & rowaddr(0) & rowaddr(1) & rowaddr(2) & rowaddr(3)
          & rowaddr(4) & rowaddr(5) & rowaddr(6) & rowaddr(7)
          & rowaddr(8) & rowaddr(9) & addr(0) & addr(1) & addr(2)
          & addr(3) & addr(4) & addr(5) & addr(6) & addr(7) & addr(8)
          & addr(9) & b"000";
```

```
eccerr.vhd        Mon Nov 16 13:26:52 1992        2

addrstb <= '1' after 1 ns, '0' after 2 ns;

end process;

-- *******************************************
-- * The decoder for the ecc error addresses *
-- *******************************************

decode_proc: process

begin

wait until prising(addrstb);

if (raddress = x"EFAAAA00") then

        selsgl <= '1' after 1 ns, '0' after 50 ns;

elsif (raddress = x"EFAAAA08") then

        seldbl <= '1' after 1 ns, '0' after 50 ns;

end if;

end process;

-- *********************************************
-- * The datapath between the CAM and the DRAM *
-- *********************************************

xfer_proc: process (wrtn,cedat,ramdat,selsgl,seldbl)

begin

if (wrtn = '0') then

        cedat <= x"ZZZZZZZZZZZZZZZZ";
        ramdat <= cedat;

elsif (selsgl = '1') then

-- induce a single bit error in both halves of the read data:

        cedat <= ramdat xor x"0000000000000001";
        ramdat <= x"ZZZZZZZZZZZZZZZZ";
```

eccerr.vhd Mon Nov 16 13:26:52 1992 3

```
elsif (seldbl = '1') then

-- induce a double bit error in both halves of the read data:

        cedat <= ramdat xor x"0000000000000003";
        ramdat <= x"ZZZZZZZZZZZZZZZZ";

else

        cedat <= ramdat;
        ramdat <= x"ZZZZZZZZZZZZZZZZ";

end if;

end process;

end rtl;
```

```
edc.vhd         Wed Oct 21 13:55:01 1992        1

--Title: EDC
--Desc:  Error Detect and Correct Circuit for CAM
--Date:  March 23, 1992

entity EDC is
        port(
                D:      IN      vlbit_vector(31 downto 0);
                CB16:   IN      vlbit;
                CB8:    IN      vlbit;
                CB4:    IN      vlbit;
                CB2:    IN      vlbit;
                CB1:    IN      vlbit;
                CB0:    IN      vlbit;
                CBX:    IN      vlbit;
                RD:     OUT     vlbit_vector(31 downto 0);
                SINGL_ERR:      INOUT   vlbit;
                MULT_ERR:       OUT     vlbit
                );
end EDC;

--behavioral model implementation
architecture behavior of EDC is

SIGNAL isc16a,isc16b:   vlbit;
SIGNAL isc8a,isc8b:     vlbit;
SIGNAL isc4a,isc4b:     vlbit;
SIGNAL isc2a,isc2b:     vlbit;
SIGNAL isc1a,isc1b:     vlbit;
SIGNAL isc0a,isc0b:     vlbit;
SIGNAL iscxa,iscxb:     vlbit;
SIGNAL  SC16,SC16N:     vlbit;
SIGNAL  SC8,SC8N:       vlbit;
SIGNAL  SC4,SC4N:       vlbit;
SIGNAL  SC2,SC2N:       vlbit;
SIGNAL  SC1,SC1N:       vlbit;
SIGNAL  SC0,SC0N:       vlbit;
SIGNAL  SCX,SCXN:       vlbit;
SIGNAL invert_vec:      vlbit_vector(31 downto 0);
SIGNAL sc_vec:          vlbit_vector(7 downto 0);

SIGNAL d_fix00,d_fix01,d_fix02,d_fix03:         vlbit;
SIGNAL d_fix04,d_fix05,d_fix06,d_fix07:         vlbit;
SIGNAL d_fix08,d_fix09,d_fix10,d_fix11:         vlbit;
SIGNAL d_fix12,d_fix13,d_fix14,d_fix15:         vlbit;
SIGNAL d_fix16,d_fix17,d_fix18,d_fix19:         vlbit;
SIGNAL d_fix20,d_fix21,d_fix22,d_fix23:         vlbit;
SIGNAL d_fix24,d_fix25,d_fix26,d_fix27:         vlbit;
```

```
edc.vhd         Wed Oct 21 13:55:01 1992        2

SIGNAL d_fix28,d_fix29,d_fix30,d_fix31:         vlbit;

begin

--------------------------------------------------------------------------------
--|ECC code detector (errdet.vhd):
        isc16a <=  (D(0) xor D(1) xor D(2))
                xor (D(3) xor D(4) xor D(5))
                xor (D(6) xor D(7) xor D(24));
        isc16b <= (D(25) xor D(26) xor D(27))
                xor (D(28) xor D(29) xor D(30))
                xor (D(31) xor CB16) ;
        SC16  <= isc16a xor isc16b;
        SC16N <= not(isc16a xor isc16b);

        isc8a <= (D(8) xor D(9) xor D(10))
                xor (D(11) xor D(12) xor D(13))
                xor (D(14) xor D(15) xor D(24)) ;
        isc8b <= (D(25) xor D(26) xor D(27))
                xor (D(28) xor D(29) xor D(30))
                xor (D(31) xor CB8) ;
        SC8  <= isc8a xor isc8b;
        SC8N <= not (isc8a xor isc8b);

        isc4a <= (D(2) xor D(3) xor D(4))
                xor (D(5) xor D(6) xor D(7))
                xor (D(14) xor D(15) xor D(18)) ;
        isc4b <= (D(19) xor D(20) xor D(21))
                xor (D(22) xor D(23) xor D(30))
                xor (D(31) xor CB4) ;
        SC4  <= isc4a xor isc4b;
        SC4N <= not (isc4a xor isc4b);

        isc2a <= (D(0) xor D(1) xor D(5))
                xor (D(6) xor D(7) xor D(11))
                xor (D(12) xor D(13) xor D(16)) ;
        isc2b <=(D(17) xor D(21) xor D(22))
                xor (D(23) xor D(27) xor D(28))
                xor (D(29) xor CB2) ;
        SC2  <= isc2a xor isc2b;
        SC2N <= not (isc2a xor isc2b);

        isc1a <= (D(0) xor D(3) xor D(4))
                xor (D(7) xor D(9) xor D(10))
                xor (D(13) xor D(15) xor D(16));
        isc1b <=  (D(19) xor D(20) xor D(23))
```

```
edc.vhd         Wed Oct 21 13:55:01 1992        3

                xor (D(25) xor D(26) xor D(29))
                xor (D(31) xor CB1) ;
        SC1  <= iscla xor isclb;
        SC1N <= not (iscla xor isclb);

        isc0a <= (D(0) xor D(1) xor D(2))
                xor (D(4) xor D(6) xor D(8))
                xor (D(10) xor D(12) xor D(16)) ;
        isc0b <=  (D(17) xor D(18) xor D(20))
                xor (D(22) xor D(24) xor D(26))
                xor (D(28) xor CB0) ;
        SC0  <= isc0a xor isc0b;
        SC0N <= not (isc0a xor isc0b);

        iscxa <= (D(0) xor D(4) xor D(6))
                xor (D(7) xor D(8) xor D(9))
                xor (D(11) xor D(14) xor D(17));
        iscxb <= (D(18) xor D(19) xor D(21))
                xor (D(26) xor D(28) xor D(29))
                xor (D(31) xor CBX) ;
        SCX  <= iscxa xor iscxb;
        SCXN <= not (iscxa xor iscxb);

--|END ECC code detector (errdet.vhd):
---------------------------------------------------------------------------
--|ECC encoder (ecc_enc.vhd):

d_fix11 <= SCX and SC0N and SC1N and SC4N and SC8 and SC16N ;
d_fix13 <= SC0N and SC1 and SC2 and SC4N and SC16N ;
d_fix21 <= SCX and SC0N and SC2 and SC4 and SC16N ;
d_fix05 <= SC0N and SC1N and SC2 and SC4 and SC16 ;
d_fix27 <= SC0N and SC1N and SC2 and SC4N and SC8 and SC16 ;
d_fix29 <= SC0N and SC1 and SC2 and SC4N and SC8 and SC16 ;
d_fix07 <= SC1 and SC2 and SC4 and SC16 ;
d_fix00 <= SCX and SC0 and SC1 and SC2 ;
d_fix04 <= SCX and SC0 and SC2N and SC8N and SC16 ;
d_fix26 <= SCX and SC0 and SC2N and SC8 and SC16 ;
d_fix08 <= SCX and SC0 and SC2N and SC8 and SC16N ;
d_fix18 <= SCX and SC0 and SC2N and SC8N and SC16N ;
d_fix16 <= SC0 and SC1 and SC2 and SC16N ;
d_fix23 <= SC1 and SC2 and SC4 and SC16N ;
d_fix30 <= SC1N and SC4 and SC8 and SC16 ;
d_fix31 <= SC1 and SC4 and SC8 and SC16 ;
d_fix09 <= SCX and SC0N and SC1 and SC8 and SC16N ;
d_fix19 <= SCX and SC0N and SC1 and SC8N and SC16N ;
d_fix14 <= SCX and SC4 and SC8 and SC16N ;
d_fix15 <= SCXN and SC4 and SC8 and SC16N ;
```

```
d_fix01 <= SCXN and SC1N and SC2 and SC4N and SC8N and SC16 ;
d_fix10 <= SCXN and SC0 and SC1 and SC2N and SC8 ;
d_fix20 <= SCXN and SC0 and SC1 and SC2N and SC4 ;
d_fix12 <= SCXN and SC0 and SC1N and SC2 and SC8 ;
d_fix22 <= SCXN and SC0 and SC1N and SC2 and SC4 ;
d_fix06 <= SCX and SC0 and SC1N and SC2 and SC4 ;
d_fix17 <= SCX and SC0 and SC1N and SC2 and SC16N ;
d_fix28 <= SCX and SC0 and SC1N and SC2 and SC8 ;
d_fix02 <= SCXN and SC0 and SC1N and SC2N and SC4 ;
d_fix24 <= SCXN and SC0 and SC1N and SC2N and SC8 ;
d_fix03 <= SCXN and SC1 and SC2N and SC4 and SC16 ;
d_fix25 <= SCXN and SC1 and SC2N and SC8 and SC16 ;

-- collect d_fix into vector form
invert_vec <= (d_fix31&d_fix30&d_fix29&d_fix28&d_fix27&d_fix26&d_fix25&d_fix24&
               d_fix23&d_fix22&d_fix21&d_fix20&d_fix19&d_fix18&d_fix17&d_fix16&
               d_fix15&d_fix14&d_fix13&d_fix12&d_fix11&d_fix10&d_fix09&d_fix08&
               d_fix07&d_fix06&d_fix05&d_fix04&d_fix03&d_fix02&d_fix01&d_fix00);

--|END ECC encoder (ecc_enc.vhd):
----------------------------------------------------------------------------

--correct input data and drive RD out
RD <= D xor invert_vec;

----------------------------------------------------------------------------
---|Multiple Error Detector

sc_vec <= ('0' & SC16 & SC8 & SC4 & SC2 & SC1 & SC0 & SCX);

SINGL_ERR <='1' when (sc_vec = X"4F") ELSE
                '1' when (sc_vec = X"4A") ELSE
                '1' when (sc_vec = X"52") ELSE
                '1' when (sc_vec = X"54") ELSE
                '1' when (sc_vec = X"57") ELSE
                '1' when (sc_vec = X"58") ELSE
                '1' when (sc_vec = X"5B") ELSE
                '1' when (sc_vec = X"5D") ELSE
                '1' when (sc_vec = X"23") ELSE
                '1' when (sc_vec = X"25") ELSE
                '1' when (sc_vec = X"26") ELSE
                '1' when (sc_vec = X"29") ELSE
                '1' when (sc_vec = X"2A") ELSE
                '1' when (sc_vec = X"2C") ELSE
                '1' when (sc_vec = X"31") ELSE
                '1' when (sc_vec = X"34") ELSE
                '1' when (sc_vec = X"0E") ELSE
```

```
edc.vhd        Wed Oct 21 13:55:01 1992        5

                 '1' when (sc_vec = X"0B") ELSE
                 '1' when (sc_vec = X"13") ELSE
                 '1' when (sc_vec = X"15") ELSE
                 '1' when (sc_vec = X"16") ELSE
                 '1' when (sc_vec = X"19") ELSE
                 '1' when (sc_vec = X"1A") ELSE
                 '1' when (sc_vec = X"1C") ELSE
                 '1' when (sc_vec = X"62") ELSE
                 '1' when (sc_vec = X"64") ELSE
                 '1' when (sc_vec = X"67") ELSE
                 '1' when (sc_vec = X"68") ELSE
                 '1' when (sc_vec = X"6B") ELSE
                 '1' when (sc_vec = X"6D") ELSE
                 '1' when (sc_vec = X"70") ELSE
                 '1' when (sc_vec = X"75") ELSE
                 '1' when (sc_vec = X"01") ELSE
                 '1' when (sc_vec = X"02") ELSE
                 '1' when (sc_vec = X"04") ELSE
                 '1' when (sc_vec = X"08") ELSE
                 '1' when (sc_vec = X"10") ELSE
                 '1' when (sc_vec = X"20") ELSE
                 '1' when (sc_vec = X"40") ELSE
                 '0';

MULT_ERR <= '1' when (SINGL_ERR='0' and not(sc_vec=X"00")) ELSE
                     '0';


--|END Multiple error detector
-------------------------------------------------------------------------------


end behavior;
```

```
edcgen.vhd          Wed Oct 21 13:55:01 1992          1

--Title: EDCGEN
--Desc:  Check bit generation for CAM
--Date:  March 31, 1992

entity EDCGEN is
        port(
                D:      IN      vlbit_vector(31 downto 0);
                CB16:   OUT     vlbit;
                CB8:    OUT     vlbit;
                CB4:    OUT     vlbit;
                CB2:    OUT     vlbit;
                CB1:    OUT     vlbit;
                CB0:    OUT     vlbit;
                CBX:    OUT     vlbit
                );
end EDCGEN;

--behavioral model implementation
architecture behavior of EDCGEN is

begin

----------------------------------------------------------------------------
--|ECC code generator
        CB16 <= (D(0) xor D(1) xor D(2))
                xor (D(3) xor D(4) xor D(5))
                xor (D(6) xor D(7) xor D(24))
                xor
                (D(25) xor D(26) xor D(27))
                xor (D(28) xor D(29) xor D(30))
                xor D(31) ;

        CB8 <=  (D(8) xor D(9) xor D(10))
                xor (D(11) xor D(12) xor D(13))
                xor (D(14) xor D(15) xor D(24))
                xor
                (D(25) xor D(26) xor D(27))
                xor (D(28) xor D(29) xor D(30))
                xor D(31) ;

        CB4  <= (D(2) xor D(3) xor D(4))
                xor (D(5) xor D(6) xor D(7))
                xor (D(14) xor D(15) xor D(18))
                xor
                (D(19) xor D(20) xor D(21))
                xor (D(22) xor D(23) xor D(30))
                xor D(31) ;
```

```
edcgen.vhd          Wed Oct 21 13:55:01 1992          2

        CB2 <=  (D(0) xor D(1) xor D(5))
                xor (D(6) xor D(7) xor D(11))
                xor (D(12) xor D(13) xor D(16))
                xor
                (D(17) xor D(21) xor D(22))
                xor (D(23) xor D(27) xor D(28))
                xor D(29) ;

        CB1 <=  (D(0) xor D(3) xor D(4))
                xor (D(7) xor D(9) xor D(10))
                xor (D(13) xor D(15) xor D(16))
                xor
                (D(19) xor D(20) xor D(23))
                xor (D(25) xor D(26) xor D(29))
                xor D(31) ;

        CB0 <=  (D(0) xor D(1) xor D(2))
                xor (D(4) xor D(6) xor D(8))
                xor (D(10) xor D(12) xor D(16))
                xor
                (D(17) xor D(18) xor D(20))
                xor (D(22) xor D(24) xor D(26))
                xor D(28) ;

        CBX <=  (D(0) xor D(4) xor D(6))
                xor (D(7) xor D(8) xor D(9))
                xor (D(11) xor D(14) xor D(17))
                xor
                (D(18) xor D(19) xor D(21))
                xor (D(26) xor D(28) xor D(29))
                xor D(31) ;
---------------------------------------------------------------------------
end behavior;
```

```
enpgo.vhd        Mon Dec 14 07:33:09 1992        1

-- NOT NOT  compliment of xma

LIBRARY synth;
USE synth.stdsynth.all;

ENTITY  enpgo IS PORT (

--      INPUTS

        preado              : IN VLBIT ;
        a1ld                : IN VLBIT ;
        moregos             : IN VLBIT ;

        enpgo_1             : IN VLBIT ;
        dis_pgo2            : IN VLBIT ;
        MEMN2               : IN VLBIT ;
        BE0                 : IN VLBIT ;
        BE5                 : IN VLBIT ;
        NEARN               : IN VLBIT ;
        NREADN              : IN VLBIT ;
        UCA3                : IN VLBIT ;
        UCA4                : IN VLBIT ;

        A                   : IN VLBIT_VECTOR(11 downto 5 ) ;
        XMAI                : IN VLBIT_VECTOR(11 downto 3) ;
--      OUTPUTS
gnear           :   out vlbit  ;
z_enpgo         :   out vlbit ) ;

END  enpgo;
ARCHITECTURE pla OF  enpgo IS

SIGNAL enpgo2 : vlbit;

BEGIN

gnear <=  ( moregos)
        OR (NOT nearn AND ( a(11) xor NOT a1ld));

enpgo2 <=
         NOT (NEARN AND NOT MOREGOS)    -- ignore near on moregos from adsd
        AND NOT (BE0 OR BE5 OR dis_pgo2)    --  disable pgo 2 on dis_pgo or not 64 bit
```

```
enpgo.vhd        Mon Dec 14 07:33:09 1992        2

        AND (nreadn xor preado)
        AND (A(11) xor NOT A11D)

        AND ( UCA3 xor NOT XMAI(3) )
        AND ( UCA4 xor NOT XMAI(4) )
        AND ( A(5) xor NOT XMAI(5) )
        AND ( A(6) xor NOT XMAI(6) )
        AND ( A(7) xor NOT XMAI(7) )
        AND ( A(8) xor NOT XMAI(8) )
        AND ( A(9) xor NOT XMAI(9) )
        AND ( A(10) xor NOT XMAI(10) )
        AND ( A(11) xor NOT XMAI(11) )
                ;

z_enpgo <=(MEMN2 AND enpgo_1 ) -- optimize for memn timing
        OR (enpgo2 ) ;
                        -- optimize for ieqp1 timing
END pla;
```

```
ereg29.vhd          Wed Oct 21 13:55:01 1992          1

-- ereg29
-- a 29 bit register with rising edge clock
-- and active high clock enable.
-- author: Tom Morin
-- history: 4/15/92 created

LIBRARY synth;
USE synth.stdsynth.all;

ENTITY ereg29 IS PORT(

DIN : IN VLBIT_VECTOR(28 DOWNTO 0);
CLK   : IN VLBIT;
EN    : IN VLBIT;
DOUT : INOUT VLBIT_VECTOR(28 DOWNTO 0)
                    );

END ereg29;

ARCHITECTURE rtl OF ereg29 IS

BEGIN

ereg29_proc: process begin

  wait until (clk = '1');

  if (en = '1') then
       dout <= din;
  else
       dout <= dout;
  end if;

end process;

END rtl;
```

```
ereg32.vhd        Wed Oct 21 14:14:50 1992        1

-- ereg32
-- a 32 bit register with rising edge clock
-- and active high clock enable.
-- author: Tom Morin
-- history: 4/14/92 created

LIBRARY synth;
USE synth.stdsynth.all;

ENTITY ereg32 IS PORT(

DIN : IN VLBIT_VECTOR(31 DOWNTO 0);
CLK  : IN VLBIT;
EN   : IN VLBIT;
DOUT : INOUT VLBIT_VECTOR(31 DOWNTO 0)
                    );

END ereg32;

ARCHITECTURE rtl OF ereg32 IS

BEGIN

ereg32_proc: process begin

  wait until (clk = '1');

  if (en = '1') then
       dout <= din;
  else
       dout <= dout;
  end if;

end process;

END rtl;
```

```
fifctl.vhd        Wed Oct 21 13:55:02 1992        1

-- filename: fifctl.vhd
-- author: Tom Morin
-- history: 4/1/92 initial creation
-- description: this file implements
-- 2 four bit counters for the read and write
-- pointers used by the fifos in the cam asic.

LIBRARY synth;
USE synth.stdsynth.all;

ENTITY fifctl IS PORT (

CLK, RD, WRTN, RST : IN VLBIT;
RPT, WPT : INOUT VLBIT_VECTOR(3 downto 0));

END fifctl;

ARCHITECTURE behv OF fifctl IS

signal rpt_temp : vlbit_vector(4 downto 0);
signal wpt_temp : vlbit_vector(4 downto 0);
signal ewpt     : vlbit_vector(3 downto 0);     -- early version


BEGIN

-- first, do the read pointer in a clocked
-- process:

rpt_temp <= addum( rpt(3 downto 0),b"1");
wpt_temp <= addum(ewpt(3 downto 0),b"1");

rpt_proc: process begin wait until (clk = '1');

   if (rst = '1') then                  -- reset to 0 if reset;

        rpt <= b"0000";

   elsif (rd  = '1') then                -- add 1 if read is asserted:

        rpt <= rpt_temp(3 downto 0);

   else                         -- don't change state if nothing happening:

        rpt <= rpt;
```

fifctl.vhd Wed Oct 21 13:55:02 1992 2

```
   end if;


 -- now the write pointer

   if (rst = '1') then                    -- reset to 0 if reset;

        ewpt <= b"0000";

   elsif (wrtn  = '0') then               -- add 1 if read is asserted:

        ewpt <= wpt_temp(3 downto 0);

   else                          -- don't change state if nothing happening:

        ewpt <= ewpt;

   end if;

end process;

-- now, do the write pointer in a clocked
-- process: (clock falling edge)

wpt_proc: process begin wait until (clk = '0');

        wpt <= ewpt;    -- delay by 1/2 clock period

end process;

END behv;
```

```
fifram.vhd        Wed Oct 21 13:55:02 1992        1

LIBRARY synth;
USE synth.stdsynth.all;

ENTITY fifram IS PORT (
RP, WP : IN VLBIT_VECTOR(3 downto 0);--read pointer,write pointer
WRITE  : IN VLBIT;
DIN    : IN VLBIT_VECTOR(31 downto 0);
DOUT   : OUT VLBIT_VECTOR(31 downto 0));


END fifram;

ARCHITECTURE rtl OF fifram IS

SIGNAL writed : vlbit;

TYPE data_type IS ARRAY(31 downto 0) of vlbit; --mem width 32 bits
TYPE data_array IS ARRAY(0 to 15) of data_type; --mem depth 16 entries

BEGIN

writed <= write after 5 ns;

fifo_proc: process(din,rp,writed)

variable ram : data_array; --define the fifo memory

begin

if (write = '0') then
   ram(v1d2int(wp)) := din;

end if;
-- read the data

 dout <= ram(v1d2int(rp));

end process;

END rtl;
```

hmnmux.vhd Thu Oct 8 11:30:23 1992 1

```
-- hmnmux.vhd
-- the multiplexor for the crossbar and dma addresses.
-- produces hmna address field hmna(27:3) for rammux.
--
LIBRARY synth;
USE synth.stdsynth.all;

ENTITY hmnmux IS PORT (

dma_addr : IN VLBIT_VECTOR(27 downto 3);
fif_addr : IN VLBIT_VECTOR(14 downto 3);
bcast_addr : IN VLBIT_VECTOR(27 downto 12);
xbar_addr : IN VLBIT_VECTOR(27 downto 3);
xbar_sel, bcast_sel, fif_sel, dma_sel : INOUT VLBIT;
misc1, slvseln, slvsel2n, fifosel, bcastsel : IN VLBIT;
hmna     : OUT VLBIT_VECTOR(27 downto 3));

END hmnmux;

ARCHITECTURE rtl OF hmnmux IS

SIGNAL f14, f13, f12    : VLBIT;
SIGNAL gdma_addr : VLBIT_VECTOR(27 downto 3);
SIGNAL gfif_addr : VLBIT_VECTOR(27 downto 3);
SIGNAL gbcast_addr : VLBIT_VECTOR(27 downto 3);
SIGNAL gxbar_addr : VLBIT_VECTOR(27 downto 3);

BEGIN


-- if miscon1 =0
--      the fifo area in memory is 32kb in size and starts 64kb down
--else
--      the fifo area in memory is 4kb in size and starts 36kb down

f12  <= fif_addr(12) OR MISC1;
f13  <= fif_addr(13) OR MISC1;
f14  <= fif_addr(14) OR MISC1;

xbar_sel <= not slvsel2n and not fifosel and not bcastsel ;
bcast_sel<= not slvseln and not fifosel and     bcastsel ;
fif_sel  <= not slvsel2n and     fifosel ;
dma_sel  <= slvseln ;
```

```
hmnmux.vhd        Thu Oct  8 11:30:23 1992        2

gxbar_addr <= xbar_addr(27 downto 3)            -- normal crossbar address
                when (xbar_sel = '1' ) else
                 b"0000000000000000000000000";

gbcast_addr <=  bcast_addr(27 downto 12) & xbar_addr(11 downto 3) -- broadcast
                when (bcast_sel = '1') else
                 b"0000000000000000000000000";

gfif_addr <=    b"1111111111110" & f14 & f13 & f12 & fif_addr(11 downto 3)
                                                                   -- fifo write
                when (fif_sel = '1' ) else
                 b"0000000000000000000000000";

gdma_addr <=          dma_addr(27 downto 3)
                when (dma_sel = '1' ) else
                 b"0000000000000000000000000";

hmna <= gxbar_addr OR gbcast_addr OR gfif_addr OR gdma_addr ;

END rtl;
```

i2mux25.vhd Wed Oct 21 13:55:02 1992 1

```
-- i2mux25
-- a 25 bit 2 input mux
-- 4/13/92 trm

LIBRARY synth;
USE synth.stdsynth.all;

ENTITY I2mux25 IS PORT(

AIN,BIN : IN VLBIT_VECTOR(24 DOWNTO 0);
SEL   : IN VLBIT;
DOUT : OUT VLBIT_VECTOR(24 DOWNTO 0)
                    );

END I2mux25;

ARCHITECTURE rtl OF I2mux25 IS

BEGIN

PROC1: PROCESS (AIN,BIN,SEL)
BEGIN

      IF (SEL = '1') THEN
         DOUT <= BIN;
      ELSE
         DOUT <= AIN;
      END IF;

END PROCESS;

END rtl;
```

```
i2mux32.vhd          Wed Oct 21 13:55:02 1992          1

-- i2mux32
-- a 32 bit mux
-- 3/23/92 trm

LIBRARY synth;
USE synth.stdsynth.all;

ENTITY I2mux32 IS PORT(

AIN,BIN : IN VLBIT_VECTOR(31 DOWNTO 0);
SELB  : IN VLBIT;
DOUT : OUT VLBIT_VECTOR(31 DOWNTO 0) := x"XXXXXXXX"
                    );

END I2mux32;

ARCHITECTURE rtl OF I2mux32 IS

BEGIN

PROC1: PROCESS (AIN,BIN,SELB)
BEGIN

      IF (selb = '0') THEN
         DOUT <= BIN;
      ELSIF (selb = '1') THEN
         DOUT <= AIN;
      ELSE
         DOUT <= x"XXXXXXXX";
      END IF;

END PROCESS;

END rtl;
```

```
i3mux32.vhd        Wed Oct 21 14:14:50 1992        1

-- i3mux32
-- a 3 input 32 bit mux
-- 3/31/92 trm

LIBRARY synth;
USE synth.stdsynth.all;

ENTITY I3mux32 IS PORT(

AIN,BIN,CIN : IN VLBIT_VECTOR(31 DOWNTO 0);
SEL1,SEL0   : IN VLBIT;
DOUT : OUT VLBIT_VECTOR(31 DOWNTO 0)
                    );

END I3mux32;

ARCHITECTURE rtl OF I3mux32 IS

SIGNAL temp : vlbit_vector(31 downto 0) ;

BEGIN


temp <= BIN when (SEL1 = '1' ) else CIN ;

DOUT <= AIN when (SEL1 = '1' AND SEL0 = '1') else temp;


END rtl;
```

```
i4mux11.vhd          Tue Oct 27 22:02:42 1992          1

-- i4mux11
-- a 4 input 11 bit mux
-- 9/2/92 trm

LIBRARY synth;
USE synth.stdsynth.all;

ENTITY I4mux11 IS PORT(

AIN,BIN,CIN,DIN : IN VLBIT_VECTOR(10 DOWNTO 0);
SEL1,SEL0    : IN VLBIT;
DOUT : OUT VLBIT_VECTOR(10 DOWNTO 0)
                    );

END I4mux11;

ARCHITECTURE rtl OF I4mux11 IS


BEGIN

PROC1: PROCESS (AIN,BIN,CIN,DIN,SEL1,SEL0)
BEGIN

      IF (SEL1 = '1' AND SEL0 = '1') THEN
         DOUT <= DIN;
      ELSIF (SEL1 = '1' AND SEL0 = '0') THEN
         DOUT <= CIN;
      ELSIF (SEL1 = '0' AND SEL0 = '1') THEN
         DOUT <= BIN;
      ELSE
         DOUT <= AIN;
      END IF;

END PROCESS;

END rtl;
```

```
ilat32.vhd        Wed Oct 21 13:55:03 1992        1

-- ilat32
-- a 32 bit latch with active low le
-- 4/1/92 trm

LIBRARY synth;
USE synth.stdsynth.all;

ENTITY ilat32 IS PORT(

DIN : IN VLBIT_VECTOR(31 DOWNTO 0);
LE  : IN VLBIT;
DOUT : INOUT VLBIT_VECTOR(31 DOWNTO 0)
                    );

END ilat32;

ARCHITECTURE rtl OF ilat32 IS

signal lel : vlbit;

BEGIN

        lel <= not le;

        dlatch_v(DIN, lel, DOUT);

END rtl;
```

```
ilat7.vhd        Wed Oct 21 13:55:03 1992        1

-- ilat7
-- an 7 bit latch with active low le
-- 4/1/92 trm

LIBRARY synth;
USE synth.stdsynth.all;

ENTITY ilat7 IS PORT(

DIN : IN VLBIT_VECTOR(6 DOWNTO 0);
LE  : IN VLBIT;
DOUT : INOUT VLBIT_VECTOR(6 DOWNTO 0)
                    );

END ilat7;

ARCHITECTURE rtl OF ilat7 IS

signal lel : vlbit;

BEGIN

        lel <= NOT LE;

        dlatch_v(DIN, LEL, DOUT);

END rtl;
```

```
incl1.vhd        Wed Oct 21 13:55:03 1992        1

-- filename: incl1.vhd
-- author: Tom Morin
-- history: 9/2/92 initial creation
-- description: combinatorial add 1 to 11 bit input


ENTITY incl1 IS PORT (

DIN : IN VLBIT_1d(10 downto 0);
DOUT: OUT VLBIT_1d(10 downto 0));

END incl1;

ARCHITECTURE comb OF incl1 IS

BEGIN

incl1_proc: process(din)

variable inc_temp : vlbit_vector(11 downto 0);

begin

   inc_temp := (b"0" & din(10 downto 0));
   inc_temp := addum(inc_temp(10 downto 0),b"1");
   dout <= inc_temp(10 downto 0);

end process;

end comb;
```

```
load.vhd        Thu Jan 14 12:28:02 1993        1

-- removed test signal from latch enables
--      added len_syn as output

--  i/o changes
--      - added sw10-> sel7
--      - removed gateona


-- changed mem_er stuff by adding row_fault
-- pull out gatona
-- changed rnclr generation
-- deleted rnd, rnclr2
-- made intclear registered

-- MUST FIX COUNTERS ACCORDING TO TYPE
-- dmacmd counter may need fixed depending on type
--
-- 8/5/92 trm - corrected ld_dblkcnt address to match the spec
--       (was set to same addr as dra_ld);
--
-- 8/6/92 trm - changed mem_er to pick on NOT rtalend, since that signal
--        is active-low. Changed PAL to rev 7.
--
-- 8/10/92 trm - installed software controlled reset/cs8 support in
--               cs8, reset, and interupt equations. Using miscon(11)
--               as cs8 control bit for soft resets. PAL goes to rev 8.
--
-- 10/28/92 trm - extended row_fault by one cycle by holding on c20m.
--                This should make timing work for remote bus errors.
--
-- 1/12/93 trm - added TMS input to sync up c20m independent of reset (in
--               case of power glitches, so that ASIC oe's won't get stuck on).


LIBRARY synth;
USE synth.stdsynth.all;

ENTITY load IS PORT (

-- INS
CLK, SYSRESETN, TMS, ROWN, PCKS1W, PCKS1R, INTERNAL , TCRTC1, TCRTC2
,clkrate, CMDLOAD , PK_DMA_INT, PK_BUS_ER, PK_CORRECT_LO, PK_UNCORRECT_LO ,
PK_CORRECT_HI, PK_UNCORRECT_HI,RTALEN,
   EX_INT,
RUN ,AUTOBOOT, DMACMD, MAS_RD_ER, HPICKS1W, FIFOSEL, FORCECS8,
MCOWNS, LTEST, EN_PER_CNT : IN VLBIT;
```

```
load.vhd        Thu Jan 14 12:28:02 1993        2

A               : IN VLBIT_VECTOR(8 downto 3);
D               : IN VLBIT_VECTOR(31 downto 20);

clk10, c20m, rn : INOUT VLBIT;
miscon14 : IN VLBIT;
FORCEINC, TESTINC : INOUT VLBIT;

-- OUTS
LEN_SYN                                           : out vlbit;
SEL0, SEL1, SEL2, SEL3, SEL4, SEL5, SEL6, SEL7 :INOUT VLBIT;
CMDLDD ,
LDRTC1, DLDRTC1, LDRTC2, DLDRTC2, LDRTCF, LD_INT_MASK, LD_MISC_CON,
LD_DMA_CNT, DMALA_LD, DMACPT_LD, FCNTLD, BCAST_LD, DRA_LD,
PGWRTN, FIFOWRT,INTERUPT, CS8 , RESET, HLDECCA, MEM_ER,
EN_DBLKCNT, LD_DBLKCNT, LD_PER_CON, LD_PER_CNT,CMDLD3,
INCRTC1, INCRTC2, INCRTCF, S1W, INC_PER_CNT     : INOUT VLBIT;

IV              : OUT VLBIT_VECTOR(31 downto 0));


END load;

ARCHITECTURE pla OF load IS

SIGNAL  exd0, exd1, exd2,exd3,exd4, nex_int,iack_int : vlbit;
SIGNAL
CLK10DD, CLK10D,RNCLR, FCNTLD_DEL, LD_DMA_CNT_DEL, DMALA_LD_DEL,
LD_PER_CNT_DEL, LD_DBLKCNT_DEL, DRA_LDD, LDRTCF_DEL,
RLOAD, WLOAD, PK_PGWRTN, INTCLEAR , DLDRTC1D , DLDRTC2D,
SOFTR, RUND, IV_RTC1, IV_RTC2, IV_FIFO, IV_DMA, IV_EX, IV_OTHER ,
RTC1_INT, RTC2_INT, FIFO_INT, DMA_INT, NMI_INT ,BUS_ER_INT,
UNCORRECT_INT, CORRECT_INT, RTALEND, DMACMDD, R_BUS_ER, FWLOAD,
S1R, PLD_MISC_CON, PLDRTC1, PLDRTC2, PBCAST_LD, ROW_FAULT : VLBIT;

SIGNAL p0, p1,p2, srnd, srnd2, srnd3    :vlbit;

SIGNAL  MASK            : VLBIT_VECTOR(10 downto 0);

-- next one holds address for interrupts which clear on S1R or S1W:

SIGNAL  REGA            : VLBIT_VECTOR(8 downto 3);

BEGIN


FWLOAD <= HPICKS1W AND FIFOSEL;   -- pick to gen a mailbox interrupt
WLOAD <= PCKS1W AND INTERNAL ;  -- PICK TO GENERATE A LOAD FROM DIRECT WRITE
```

```
load.vhd        Thu Jan 14 12:28:02 1993        3

RLOAD <= PCKS1R AND INTERNAL ;  -- PICK TO GENERATE A LOAD FROM read
                                -- PICK TO GENERATE A interupt clear
RNCLR <= SRND AND NOT SRND2;-- gauranteed that data inputs are zero

-- THE FOLLOWING FORCES THE LATCHES OPEN ASYNCHRONOUSLY WHEN TEST
-- MODE IS ON:

LD_MISC_CON <= PLD_MISC_CON ;
LDRTC1      <= PLDRTC1      ;
LDRTC2      <= PLDRTC2      ;
BCAST_LD    <= PBCAST_LD    ;

SEL0 <= NOT A(5) AND NOT A(4) AND NOT A(3);
SEL1 <= NOT A(5) AND NOT A(4) AND  A(3);
SEL2 <= NOT A(5) AND  A(4) AND NOT A(3);
SEL3 <= NOT A(5) AND  A(4) AND  A(3);
SEL4 <=  A(5) AND NOT A(4) AND NOT A(3);
SEL5 <=  A(5) AND NOT A(4) AND  A(3);
SEL6 <=  A(5) AND  A(4) AND NOT A(3);
SEL7 <=  A(5) AND  A(4) AND  A(3);

load_proc: process begin wait until clk = '1';

   TESTINC <= MISCON14;

   INTCLEAR <= NOT A(8) AND A(7) AND ( WLOAD OR (RLOAD AND MCOWNS)) ;

   REGA <= A; -- just sample address

   S1R <= PCKS1R;
   S1W <= PCKS1W;

   CLK10D <= CLK10 ;
   CLK10DD <= CLK10D ;

   CMDLDD <= RN AND ((NOT C20M AND CMDLOAD)     -- delayed version of command load
        OR (C20M AND CMDLDD));                  -- 20m hold

   CMDLD3 <= RN AND ((NOT C20M AND CMDLDD)      -- delayed version of cmdldd
        OR (C20M AND CMDLD3));                  -- 20m hold

-- on direct writes load pulse is generated at s1 time
-- loads are shown active high
-- NOT NOT watch if you give a latch only load just as a terminal count load is
--      comleteing won't get good data
--      - could extend load pulse to counter
```

```
load.vhd        Thu Jan 14 12:28:02 1993        4

-- ordering of loactions is a function of preferrred read order also


   FIFOWRT       <= (WLOAD AND NOT A(8) AND NOT A(7) AND NOT A(6) AND SEL0)
                                     -- ( A= C00) mailbox fifo
                  OR FORCEINC
                  OR FWLOAD; -- host write where hmna comes from fifo counter
                            -- and not from the pin address.


   -- NMI_INT shown below at C08

   PLD_MISC_CON <= (WLOAD AND NOT A(8) AND NOT A(7) AND NOT A(6) AND SEL2)
                    OR NOT SRND ; -- ( A= C10)     misc control register

   FORCEINC      <= ( TESTINC AND WLOAD AND NOT A(8) AND NOT A(7) AND NOT A(6) AND SEL3);


   LD_INT_MASK  <= (WLOAD AND NOT A(8) AND NOT A(7) AND NOT A(6) AND  SEL4)
                    OR NOT SRND ;               -- ( A= C20)     interupt mask

   LD_PER_CON   <= (WLOAD AND NOT A(8) AND NOT A(7) AND NOT A(6) AND  SEL6)
                    OR NOT SRND ;               -- ( A= C30)


   INC_PER_CNT  <= (EN_PER_CNT AND NOT INC_PER_CNT AND SRND AND
                       NOT (WLOAD AND NOT A(8) AND NOT A(7) AND NOT A(6) AND  SEL7))
                                     -- inc when not loading next cycle
                   OR (NOT INC_PER_CNT AND LD_PER_CNT AND SRND);
                                     -- mux is switched, so load up register
      --        OR FORCEINC  handled at cecon


   LD_PER_CNT   <= (WLOAD AND NOT A(8) AND NOT A(7) AND NOT A(6) AND  SEL7)
                    OR (SRND AND LD_PER_CNT AND NOT LD_PER_CNT_DEL)
                    OR RNCLR ;           -- ( A= C38)

-- the _del signals which extend the primary load signal to 2 cycles must
-- be exactly one cycle long, to correctly operate when back-to-back load
-- cycles are generated.

   LD_PER_CNT_DEL <= LD_PER_CNT AND NOT LD_PER_CNT_DEL AND SRND;

-- RTC1 controls:

-- sync load scheme
```

```
load.vhd        Thu Jan 14 12:28:02 1993        5

--      if slw says load will definately load and prevent inc on next cycle
--              tc reload and increment are prevented on cycle after
--              loading to allow carry to propogate

   DLDRTC1<= (INTERNAL AND S1W AND NOT REGA(8) AND NOT REGA(7) AND REGA(6)
                        AND NOT REGA(5) AND NOT REGA(4) AND REGA(3)) -- ( A = C48)
        OR (CLK10 AND TCRTC1 AND NOT DLDRTC1 AND NOT DLDRTC1D )
                -- RELOAD ON TC FROM COUNTER ON C10 if did not just load
        OR RNCLR; -- initialize on startup


   INCRTC1 <= FORCEINC
            OR (NOT TESTINC AND CLK10 AND NOT DLDRTC1 AND NOT DLDRTC1D);
                        -- clk10  and not going to or just have loaded

   DLDRTC1D <= DLDRTC1;

   PLDRTC1<= (WLOAD AND NOT A(8) AND NOT A(7) AND  A(6) AND SEL0)
                            -- ( A= C40) real time clock
           OR RNCLR ;

-- RTC2 controls:


   DLDRTC2<= (INTERNAL AND S1W AND NOT REGA(8) AND NOT REGA(7) AND REGA(6)
                        AND NOT REGA(5) AND REGA(4) AND REGA(3)) -- ( A = C58)
        OR (CLK10 AND TCRTC2 AND NOT DLDRTC2 AND NOT DLDRTC2D )
                -- RELOAD ON TC FROM COUNTER ON C10 if did not just load
        OR RNCLR; -- initialize on startup


   INCRTC2 <= FORCEINC
            OR ( NOT TESTINC AND CLK10 AND NOT DLDRTC2 AND NOT DLDRTC2D);
                        -- clk10  and not going to or just have loaded

   DLDRTC2D <= DLDRTC2;

   PLDRTC2<= (WLOAD AND NOT A(8) AND NOT A(7) AND  A(6) AND SEL2)
           OR RNCLR ; -- ( A= C50)  real time clock

-- free running counter control

   INCRTCF <= FORCEINC
            OR (NOT TESTINC AND CLK10 AND NOT INCRTCF AND NOT (WLOAD AND NOT A(8) AND NOT A(7) AND  A(6)
                         AND  SEL4))
            OR (LDRTCF AND NOT INCRTCF AND SRND); -- stretch to exactly 2 cycles.
```

```
load.vhd        Thu Jan 14 12:28:02 1993        6

   LDRTCF_DEL    <= LDRTCF AND NOT LDRTCF_DEL AND SRND;

   LDRTCF        <= (WLOAD AND NOT A(8) AND NOT A(7) AND  A(6) AND  SEL4)
                  OR (SRND2 AND LDRTCF AND NOT LDRTCF_DEL) -- hold for 2 cycles
                  OR RNCLR;

   PBCAST_LD     <= (WLOAD AND NOT A(8) AND NOT A(7) AND  A(6) AND  SEL5)
                    OR NOT SRND ; -- ( A= C68)  broadcast register

   FCNTLD        <= (WLOAD AND NOT A(8) AND NOT A(7) AND  A(6) AND  SEL6)
                    OR (SRND AND FCNTLD AND NOT FCNTLD_DEL)
                    OR RNCLR ;             -- ( A= C70)  mailbox fifo counter

   FCNTLD_DEL <= FCNTLD AND NOT FCNTLD_DEL AND SRND;

-- the following can load with a write or pick up data from ram

   LD_DMA_CNT    <= (WLOAD AND NOT A(8) AND  A(7) AND NOT A(6) AND SEL0)
                                         -- ( A= C80) dma word counter
        OR (RN AND C20M AND CMDLDD AND NOT CMDLD3) -- first one
        OR (SRND AND LD_DMA_CNT AND NOT LD_DMA_CNT_DEL) --stretch to exactly 2 cycles
                 OR RNCLR ;

   LD_DMA_CNT_DEL <= LD_DMA_CNT AND NOT LD_DMA_CNT_DEL AND SRND;

   DMALA_LD      <= (WLOAD AND NOT A(8) AND  A(7) AND NOT A(6) AND SEL1)
                                         -- ( A=C88 ) dma local address
                 OR (C20M AND CMDLOAD AND CMDLD3) -- second one
                 OR (SRND AND DMALA_LD AND NOT DMALA_LD_DEL)
                                         -- stretch to exactly 2 cycles
                 OR RNCLR ;

   DMALA_LD_DEL <= DMALA_LD AND NOT DMALA_LD_DEL AND SRND;

   DMACPT_LD     <= (WLOAD AND NOT A(8) AND  A(7) AND NOT A(6) AND SEL2)
                                         -- ( A=C90 ) dma link address
                 OR (C20M AND NOT CMDLOAD AND CMDLDD )   -- last one
                    OR NOT SRND;

   DRA_LDD <= DRA_LD AND NOT DRA_LDD AND SRND;

   DRA_LD        <= (WLOAD AND NOT A(8) AND  A(7) AND NOT A(6) AND SEL3)
                                         -- ( A=C9C ) dma remote address
                 OR (C20M AND NOT CMDLOAD AND CMDLDD )   -- last one
                 OR (SRND AND DRA_LD AND NOT DRA_LDD)
                    OR RNCLR ;
```

```
load.vhd        Thu Jan 14 12:28:02 1993        7

  LD_DBLKCNT    <= (WLOAD AND NOT A(8) AND  A(7) AND NOT A(6) AND  SEL4)
                    OR (SRND AND LD_DBLKCNT AND NOT LD_DBLKCNT_DEL)
                    OR RNCLR;
                                    -- ( A=CA0 ) dma remote address

  LD_DBLKCNT_DEL <= LD_DBLKCNT AND NOT LD_DBLKCNT_DEL AND SRND;

  DMACMDD    <= DMACMD ;

  EN_DBLKCNT    <= FORCEINC
                  OR (NOT TESTINC AND DMACMD AND NOT DMACMDD) ;

  PK_PGWRTN     <= NOT ((WLOAD AND  A(8))              -- page ram
                  OR (C20M AND CMDLOAD AND CMDLDD) );  -- write on first 2

--      generating the interupt signals -------------

  RTC2_INT <= (CLK10 AND TCRTC2 AND NOT DLDRTC2 AND NOT DLDRTC2D )
                      --  terminal count that causes a load
   OR (RTC2_INT AND RN AND NOT ( REGA(6) AND REGA(5) AND REGA(4) AND  REGA(3) AND INTCLEAR ));

  RTC1_INT <= (CLK10 AND TCRTC1 AND NOT DLDRTC1 AND NOT DLDRTC1D )
                      --  terminal count that causes a load
   OR (RTC1_INT AND RN AND NOT ( REGA(6) AND REGA(5) AND REGA(4) AND NOT REGA(3) AND INTCLEAR)) ;

  FIFO_INT <= FIFOWRT                          -- PICK
   OR (FIFO_INT AND RN AND NOT ( REGA(6) AND REGA(5) AND NOT REGA(4) AND REGA(3) AND INTCLEAR));

  DMA_INT <= PK_DMA_INT                        -- PICK
   OR (DMA_INT AND RN AND NOT ( REGA(6) AND REGA(5) AND NOT REGA(4) AND NOT REGA(3) AND INTCLEAR));

  -- external interupt

  NMI_INT <= (WLOAD AND NOT A(8) AND NOT A(7) AND NOT A(6) AND SEL1)
                                 -- ( A= 8) mailbox fifo
   OR (NMI_INT AND RN AND NOT ( REGA(6) AND NOT REGA(5) AND REGA(4) AND NOT REGA(3) AND INTCLEAR));

  ROW_FAULT <= (PK_BUS_ER AND (S1R OR S1W ))   -- pick on s1
           OR (ROW_FAULT AND (NOT ROWN OR C20M)) ;   -- hold till row done

  BUS_ER_INT <= (ROW_FAULT)                    -- PICK
      OR (BUS_ER_INT AND RN
          AND NOT ( REGA(6) AND NOT REGA(5) AND NOT REGA(4) AND REGA(3) AND INTCLEAR));

  RTALEND <= RTALEN ;

  UNCORRECT_INT <= (NOT RTALEND AND (PK_UNCORRECT_LO OR PK_UNCORRECT_HI))  -- PICK
```

```
load.vhd        Thu Jan 14 12:28:02 1993        8
        OR (UNCORRECT_INT AND RN AND NOT ( REGA(6) AND NOT REGA(5) AND NOT REGA(4) AND NOT REGA(3)
                AND INTCLEAR));

   CORRECT_INT <= (NOT RTALEND AND (PK_CORRECT_LO OR PK_CORRECT_HI))  -- PICK
        OR (CORRECT_INT AND RN AND NOT (NOT REGA(6) AND  REGA(5) AND  REGA(4) AND  REGA(3)
                AND INTCLEAR));

   LEN_SYN <= NOT RTALEN AND NOT UNCORRECT_INT AND NOT CORRECT_INT ;

   R_BUS_ER <= (MAS_RD_ER)  -- PICK
        OR (R_BUS_ER AND RN AND NOT (NOT REGA(6) AND  REGA(5) AND  REGA(4) AND NOT REGA(3)
                AND INTCLEAR));

   EXD0 <= EX_INT;
   EXD1 <= EXD0;
   EXD2 <= EXD1;
   EXD3 <= EXD2;
   EXD4 <= EXD3;

   NEX_INT  <= (rn AND exd0 AND exd1 AND exd2 AND exd3 )                   -- pick
        OR (rn AND nex_int AND NOT ( NOT exd0 AND NOT exd1 AND NOT exd2 AND NOT exd3 )); -- hold

   iack_int  <= (rn AND  exd0 AND NOT exd2 AND  exd4 )   -- pick1
          OR (rn AND NOT exd0 AND  exd2 AND NOT exd4 )  -- hold
          OR (IACK_INT AND RN AND NOT (NOT REGA(6) AND  REGA(5) AND  NOT REGA(4) AND REGA(3)
                AND INTCLEAR));


-- interrupt line to the i860 - note that reset in first pterm prevents things
--                             from putting i860 into CS8 mode unintentionally
--                             during a soft reset.

   INTERUPT <= (NOT RESET AND (IV_RTC1 OR IV_RTC2 OR IV_FIFO
                OR IV_DMA OR IV_EX OR IV_OTHER))
        OR (exd4 AND NOT SOFTR AND RESET)
        OR (FORCECS8 AND  SOFTR AND RESET);

-- ORIGINAL EQUATION:
--   CS8 <= exd4 AND (  -- ONLY ENABLED ON AUTOBOOT
--          RESET            -- PICK ON RESET
--      OR (CS8 AND NOT RUN)    -- HOLD TILL LOAD MISCON TO GO
--                  ) ;

   CS8 <= (exd4 AND NOT SOFTR AND RESET)
        OR (CS8 AND NOT RUN AND SYSRESETN)
        OR FORCECS8;
```

```
   RESET <= NOT RN
        OR (NOT RUN AND NOT CS8 )
        OR (NOT RUN AND FORCECS8);

   SOFTR <= (RN AND NOT RUN AND RUND)    -- PICK ON FALLING EDGE OF RUN
          OR (RN AND SOFTR AND NOT RUN); -- HOLD TILL RISING EDGE OF RUN

   RUND <= RUN;

                                    -- force high on no error

end process;

MEM_ER <= (NOT rtalend AND ( PK_UNCORRECT_HI OR PK_UNCORRECT_LO ))
        OR row_fault;

wrtpulse_proc: process begin wait until clk = '0';

   PGWRTN <= PK_PGWRTN ;

end process;

HLDECCA <= CORRECT_INT OR UNCORRECT_INT OR BUS_ER_INT ;
                                            -- hold ecc ms address on error

IV_RTC2 <= RTC2_INT AND MASK(10);

IV_RTC1 <= RTC1_INT AND MASK(9);

IV_FIFO <= FIFO_INT AND MASK(8);

IV_DMA  <= DMA_INT  AND MASK(7);

IV_EX  <= (NEX_INT    AND MASK(6))
        OR ( IACK_INT  AND MASK(0));

IV_OTHER  <= NMI_INT
        OR ( BUS_ER_INT    AND MASK(4))
        OR ( UNCORRECT_INT AND MASK(3))
        OR ( CORRECT_INT   AND MASK(2))
        OR ( R_BUS_ER      AND MASK(1));


IV <= MASK(10 downto 0) &
      b"0" & RTC2_INT & RTC1_INT & FIFO_INT & DMA_INT & NEX_INT &
      NMI_INT & BUS_ER_INT & UNCORRECT_INT & CORRECT_INT & R_BUS_ER & IACK_INT &
      IV_RTC2 &IV_RTC1 & IV_FIFO & IV_DMA & IV_EX &IV_OTHER & b"000";
```

load.vhd    Thu Jan 14 12:28:02 1993    10

```
mask_proc: process begin wait until clk = '1';

   if ( LD_INT_MASK = '1') then

        MASK <= D(31 downto 21);

   else

        MASK <= MASK;

   end if;

end process;

RNDEL_PROC: PROCESS BEGIN WAIT UNTIL (prising(clk) OR (sysresetn = '0'));

   IF (sysresetn = '0') then
        srnd <= '0';
        srnd2 <= '0';
        srnd3 <= '0';
        rn <= '0';
   ELSE
        srnd <= '1';
        srnd2 <= srnd;
        srnd3 <= srnd2;
        rn <= srnd3;
   END IF;

END PROCESS;

-- generates 20Mhz clock - tms is low during sysreset and
-- is a periodic low pulse after sysreset goes away. This
-- syncs 20m in case of power glitches, so that ASIC oe's
-- won't get stuck asserted and burn up the chips.

C20M_PROC: PROCESS BEGIN

        WAIT UNTIL prising(clk);

        IF (tms = '0') then
           c20m <= '0';
        ELSE
           c20m <= NOT c20m;
        END IF;

END PROCESS;
```

```
load.vhd        Thu Jan 14 12:28:02 1993        11

-- generates 10Mhz clk10 from sysclk

CLK10PROC: PROCESS BEGIN WAIT UNTIL (prising(clk) );

        p0 <= (SYSRESETN AND NOT p2 AND NOT p0);        -- opposite of p0 unless p2

        p1 <= (SYSRESETN AND NOT p1 AND  p0)     -- 1 ->2
            OR (SYSRESETN AND  p1 AND NOT p0);   -- 2 ->3

        p2 <= (SYSRESETN AND clkrate AND p1 AND p0) ;

        clk10 <= (SYSRESETN AND NOT clkrate AND p1 AND NOT p0)
               OR (SYSRESETN AND  clkrate AND p1 AND p0 ) ;


END PROCESS;

END pla;

--        | , | , | , | , | , | , | , | , | , | , | , | , | ,
--ras  --------________________________-------------
-- cas  --------------___---___---___---------------------
-- DOLR -----------------------| do | d1 | d2 |-----------------
-- caspick ____------------------____________________
-- cmdload___________------------------____________________
-- cmdldd___________________-------------------____________________
-- cmdld3_________________________-------------------______________
-- cmdld5____________________________-------------------_________________
-- pagewrtn ---------------------___---___-------------------------
-- LD_DMA_CNT__________________------____________________________
-- DMALA_LD________________________------_____________________________
-- DMACPT_LD   _______________________________---_____________________________
-- DRA_LD__________________________________------_____________________________
--        | , | , | , | , | , | , | , | , | , | , | , | , | ,
```

```
lat39.vhd        Wed Oct 21 13:55:04 1992        1

-- lat39
-- a 39 bit latch with active high le
-- 3/23/92 trm

LIBRARY synth;
USE synth.stdsynth.all;

ENTITY lat39 IS PORT(

DIN : IN VLBIT_VECTOR(38 DOWNTO 0);
LE  : IN VLBIT;
DOUT : INOUT VLBIT_VECTOR(38 DOWNTO 0) := b"000000000000000000000000000000000000000"
                    );

END lat39;

ARCHITECTURE rtl OF lat39 IS

BEGIN

        dlatch_v(DIN, LE, DOUT);

END rtl;
```

```
lat32.vhd        Wed Oct 21 14:14:50 1992        1

-- lat32
-- a 32 bit latch with active high le
-- 3/23/92 trm

LIBRARY synth;
USE synth.stdsynth.all;

ENTITY lat32 IS PORT(

DIN : IN VLBIT_VECTOR(31 DOWNTO 0);
LE  : IN VLBIT;
DOUT : INOUT VLBIT_VECTOR(31 DOWNTO 0)
                    );

END lat32;

ARCHITECTURE rtl OF lat32 IS

BEGIN

        dlatch_v(DIN, LE, DOUT);

END rtl;
```

```
lat16.vhd        Wed Oct 21 13:55:03 1992        1

-- lat16
-- a 16 bit latch with active high le
-- 4/12/92 trm

LIBRARY synth;
USE synth.stdsynth.all;

ENTITY lat16 IS PORT(

DIN : IN VLBIT_VECTOR(15 DOWNTO 0);
LE  : IN VLBIT;
DOUT : INOUT VLBIT_VECTOR(15 DOWNTO 0)
                    );

END lat16;

ARCHITECTURE rtl OF lat16 IS

BEGIN

        dlatch_v(DIN, LE, DOUT);

END rtl;
```

```
lat20.vhd        Wed Oct 21 13:55:03 1992        1

-- lat20
-- a 20 bit latch with active high le
-- 7/7/92 trm

LIBRARY synth;
USE synth.stdsynth.all;

ENTITY lat20 IS PORT(

DIN : IN VLBIT_VECTOR(19 DOWNTO 0);
LE  : IN VLBIT;
DOUT : INOUT VLBIT_VECTOR(19 DOWNTO 0)
                    );

END lat20;

ARCHITECTURE rtl OF lat20 IS

BEGIN

        dlatch_v(DIN, LE, DOUT);

END rtl;
```

```
mbfifcnt.vhd          Wed Oct 21 13:55:05 1992          1

-- cnt_temp := addum(cnt_temp(31 downto 0),b"1");  --inc
-- variable cnt_temp : vlbit_vector(32 downto 0);

-- MBFIFCNT.VHD
-- 9 bit loadable counter
-- used as offset pointer to mailbox fifo area in DRAM
-- author: Tom Morin
-- history: 4/13/92 created

ENTITY mbfifcnt IS PORT (

clk, fcnt_ld, fifwrt : in vlbit;

dom : in vlbit_vector(18 downto 3);

fcnt : inout vlbit_vector(18 downto 3) );

END mbfifcnt;

ARCHITECTURE rtl OF mbfifcnt IS

SIGNAL sum :vlbit_vector(19 downto 3);

BEGIN

sum <= addum(fcnt(18 downto 3),b"1");  --inc

mbfifcnt_proc: process begin

   wait until (clk = '1');

      if (fcnt_ld = '1' ) then

        fcnt <= dom(18 downto 3);

      elsif ( fifwrt = '1') then

        fcnt <= sum(18 downto 3);

      else

        fcnt <= fcnt;

      end if;

end process;
```

```
end rtl;
```

```
ncnt32.vhd        Wed Nov 18 12:54:53 1992        1

-- assume gated clock
-- create generated clock
-- filename: ncnt32.vhd
-- author: Tom Morin
-- history: 10/5/92 initial creation
-- description:
-- This file implements a 32 bit
-- counter with sync load.

LIBRARY synth;
USE synth.stdsynth.all;

ENTITY ncnt32 IS PORT (

CE, CLK, LOADCNT : IN VLBIT;
data_in    : IN VLBIT_VECTOR(31 downto 0);
decd    : IN VLBIT_VECTOR(31 downto 0);
COUNTER : INOUT VLBIT_VECTOR(31 downto 0));

END ncnt32;

ARCHITECTURE behv OF ncnt32 IS

SIGNAL temp     :vlbit_vector(31 downto 0);

BEGIN

temp <=  decd(31 downto 0)
                when (CE = '1') else --inc
         counter(31 downto 0);        --hold

cnt_proc: process begin wait until clk = '1';

   if (LOADCNT = '1')  then               -- load
      counter <= data_in(31 downto 0);
   else
      counter <= temp;                    --inc / hold
   end if;

end process;

END behv;
```

ncnt32.vhd Wed Nov 18 12:54:53 1992 2

```
ndec32.vhd        Tue Jan  5 11:26:26 1993        1

-- !!!!!! must tie cox_y to icox_y

LIBRARY synth;
USE synth.stdsynth.all;

ENTITY ndec32 IS PORT (

-- the following i/o are just to help synthesis

TESTINC          :in vlbit;
co0_3,  co4_7 ,  co8_11,  co12_15,  co16_19,  co20_23,  co24_27 : inout vlbit;
ico0_3, ico4_7 , ico8_11, ico12_15, ico16_19, ico20_23, ico24_27 : in vlbit;
ci4,ci8,ci12,ci16,ci20,ci24,ci28                        : inout vlbit;
ici16                                                   : in vlbit;

-- the real i/o

d                              : IN    VLBIT_VECTOR(31 downto 0);
decd                           : OUT   VLBIT_VECTOR(31 downto 0);
tc                             : OUT   VLBIT);

END ndec32;

ARCHITECTURE behv OF ndec32 IS

SIGNAL civ          : vlbit_vector(31 downto 0);
SIGNAL
        ci1 ,ci2 ,ci3      ,ci5 ,ci6 ,ci7     , ci9 ,ci10,
        ci11        ,ci13 ,ci14 ,ci15      , ci17 ,ci18 ,ci19 ,
        ci21 ,ci22 ,ci23      , ci25 ,ci26 ,ci27      ,ci29 ,ci30,ci31,
        co28_31, bco0_3, tc6, tc7 :VLBIT;

BEGIN
bco0_3  <= (not d(3) and not d(2) and not d(1) and d(0));

co0_3   <=  (testinc xor (not (d(3)  or d(2)  or d(1)  or d(0))));
co4_7   <=  (testinc xor (not (d(7)  or d(6)  or d(5)  or d(4))));
co8_11  <=  (testinc xor (not (d(11) or d(10) or d(9)  or d(8))));
co12_15 <=  (testinc xor (not (d(15) or d(14) or d(13) or d(12))));
co16_19 <=  (testinc xor (not (d(19) or d(18) or d(17) or d(16))));
co20_23 <=  (testinc xor (not (d(23) or d(22) or d(21) or d(20))));
co24_27 <=  (testinc xor (not (d(27) or d(26) or d(25) or d(24))));
co28_31 <=  (testinc xor (not (d(31) or d(30) or d(29) or d(28))));

tc7 <= co28_31 and co24_27 and co20_23 and co16_19;
tc6 <= co12_15 and co8_11 and co4_7 and bco0_3;
```

```
ndec32.vhd          Tue Jan  5 11:26:26 1993        2

tc <= tc6 and tc7 and (not testinc);

ci4  <=  co0_3;
ci8  <= ico0_3 and co4_7;
ci12 <= co0_3 and ico4_7 and co8_11;
ci16 <= ico0_3 and ico4_7 and ico8_11 and ico12_15;

ci20 <=  ci16 and co16_19;
ci24 <=  ci16 and ico16_19 and co20_23;
ci28 <=  ici16 and co16_19 and ico20_23 and ico24_27;

ci1 <= (not d(0));
ci2 <= ci1 and (not d(1));
ci3 <= ci2 and (not d(2));

ci5 <= ci4 and (not d(4));
ci6 <= ci5 and (not d(5));
ci7 <= ci6 and (not d(6));

ci9 <= ci8 and (not d(8));
ci10 <= ci9 and (not d(9));
ci11 <= ci10 and (not d(10));

ci13 <= ci12 and (not d(12));
ci14 <= ci13 and (not d(13));
ci15 <= ci14 and (not d(14));

ci17 <= ci16 and (not d(16));
ci18 <= ci17 and (not d(17));
ci19 <= ci18 and (not d(18));

ci21 <= ci20 and (not d(20));
ci22 <= ci21 and (not d(21));
ci23 <= ci22 and (not d(22));

ci25 <= ci24 and (not d(24));
ci26 <= ci25 and (not d(25));
ci27 <= ci26 and (not d(26));

ci29 <= ci28 and (not d(28));
ci30 <= ci29 and (not d(29));
ci31 <= ci30 and (not d(30));

civ <= ( ci31
        & ci30 & ci29 & ci28 & ci27 & ci26 & ci25 & ci24 & ci23 & ci22 & ci21 &
          ci20 & ci19 & ci18 & ci17 & ci16 & ci15 & ci14 & ci13 & ci12 & ci11 &
          ci10  & ci9  & ci8  & ci7  & ci6  & ci5  & ci4  & ci3  & ci2  & ci1 &
```

```
ndec32.vhd        Tue Jan  5 11:26:26 1993        3
         b"1");
decd <=  civ xor d;
END behv;
```

```
ndinc25.vhd        Wed Nov 18 12:55:27 1992        1

-- !!!!!! must tie cox_y to icox_y

LIBRARY synth;
USE synth.stdsynth.all;

ENTITY ndinc25 IS PORT (

-- the following i/o are just to help synthesis

TESTINC :IN vlbit ;
co0_3,  co4_7 ,  co8_11,  co12_15,  co16_19,  co20_23 : inout vlbit;
ico0_3, ico4_7 , ico8_11, ico12_15, ico16_19          : in vlbit;
ci4,ci8,ci12,ci16,ci20,ci24                           : inout vlbit;

-- the real i/o

d                               : IN    VLBIT_VECTOR(24 downto 0);
incd                            : OUT   VLBIT_VECTOR(24 downto 0);
b2k     : OUT VLBIT);

END ndinc25;

ARCHITECTURE behv OF ndinc25 IS

SIGNAL civ        : vlbit_vector(24 downto 0);
SIGNAL
        ci1 ,ci2 ,ci3     ,ci5 ,ci6 ,ci7     , ci9 ,ci10,
        ci11       ,ci13 ,ci14 ,ci15      , ci17 ,ci18 ,ci19 ,
        ci21 ,ci22 ,ci23    :VLBIT;

BEGIN
co0_3   <=  TESTINC xor ( d(3)  and d(2)  and d(1)  and d(0) );
co4_7   <= TESTINC xor ( d(7)  and d(6)  and d(5)  and d(4) );
co8_11  <= TESTINC xor ( d(11) and d(10) and d(9)  and d(8) );
co12_15 <= TESTINC xor ( d(15) and d(14) and d(13) and d(12) );
co16_19 <= TESTINC xor ( d(19) and d(18) and d(17) and d(16) );
co20_23 <= TESTINC xor ( d(23) and d(22) and d(21) and d(20)  );

b2k <= co0_3 and co4_7;

ci4  <=  co0_3;
ci8  <= ico0_3 and  co4_7;
ci12 <=  co0_3 and ico4_7 and  co8_11;
ci16 <= ico0_3 and ico4_7 and ico8_11 and ico12_15;

ci20 <=  ci16 and  co16_19;
ci24 <=  ci16 and ico16_19 and  co20_23;
```

```
ndinc25.vhd        Wed Nov 18 12:55:27 1992        2

ci1 <= d(0);
ci2 <= ci1 and d(1);
ci3 <= ci2 and d(2);

ci5 <= ci4 and d(4);
ci6 <= ci5 and d(5);
ci7 <= ci6 and d(6);

ci9 <= ci8 and d(8);
ci10 <= ci9 and d(9);
ci11 <= ci10 and d(10);

ci13 <= ci12 and d(12);
ci14 <= ci13 and d(13);
ci15 <= ci14 and d(14);


ci17 <= ci16 and d(16);
ci18 <= ci17 and d(17);
ci19 <= ci18 and d(18);

ci21 <= ci20 and d(20);
ci22 <= ci21 and d(21);
ci23 <= ci22 and d(22);

civ <= (  ci24 & ci23 & ci22 & ci21 &
          ci20 & ci19 & ci18 & ci17 & ci16 & ci15 & ci14 & ci13 & ci12 & ci11 &
          ci10  & ci9  & ci8  & ci7  & ci6  & ci5  & ci4  & ci3  & ci2  & ci1 &
          b"1");

incd <=  civ xor d;

END behv;
```

```
ndmacnt.vhd        Wed Nov 18 12:55:41 1992        1

-- assume gated clock
-- create generated clock
-- filename: ndmacnt.vhd
-- author: Tom Morin
-- history: 4/28/92 initial creation
-- description:
-- This file implements a 32 bit
-- counter with sync load and count enable.

LIBRARY synth;
USE synth.stdsynth.all;

ENTITY ndmacnt IS PORT (

CLK, LOADCNT,CE : IN VLBIT;-- 10Mhz clock, active-low load pulse.
data_in    : IN VLBIT_VECTOR(31 downto 0);
incd    : IN VLBIT_VECTOR(31 downto 0);
bclk    : inout vlbit;
COUNTER : OUT VLBIT_VECTOR(31 downto 0));

END ndmacnt;

ARCHITECTURE behv OF ndmacnt IS

SIGNAL GCLK : VLBIT;

BEGIN

cntclk_proc: process begin wait until (clk = '1');

        gclk <= not (ce OR ( LOADCNT AND gclk )) ;

end process;

bclk  <= not gclk ;

cnt_proc: process begin wait until (bclk = '1');

   if (LOADCNT = '1')  then             -- load

        counter <=  (data_in(31 downto 0));

   else

        counter <= incd(31 downto 0);  --inc

   end if;
```

```
end process;

END behv;
```

```
ndmala.vhd        Wed Nov 18 12:55:50 1992        1

-- assume gated clock
-- create generated clock
-- filename: ndmala.vhd
-- author: Tom Morin
-- history: 10/5/92 initial creation
-- description:
-- This file implements a 25 bit
-- counter with sync load and count enable.

LIBRARY synth;
USE synth.stdsynth.all;

ENTITY ndmala IS PORT (

CLK, LOADCNT,CE  : IN VLBIT;
data_in    : IN VLBIT_VECTOR(24 downto 0);
incd    : IN VLBIT_VECTOR(24 downto 0);
bclk    : inout vlbit;
COUNTER : OUT VLBIT_VECTOR(24 downto 0));

END ndmala;

ARCHITECTURE behv OF ndmala IS

SIGNAL GCLK : VLBIT;

BEGIN

cntclk_proc: process begin wait until (clk = '1');

        gclk <= not (ce OR ( LOADCNT AND gclk )) ;

end process;


bclk  <= not gclk ;

cnt_proc: process begin wait until (bclk = '1');

   if (LOADCNT = '1')  then              -- load

        counter <=  (data_in(24 downto 0));

   else

        counter <= incd(24 downto 0);  --inc
```

```
ndmala.vhd        Wed Nov 18 12:55:50 1992        2
   end if;
end process;

END behv;
```

```
ndracnt.vhd        Wed Nov 18 12:56:06 1992        1

-- assume gated clock
-- create generated clock
-- filename: ndracnt.vhd
-- author: Tom Morin
-- history: 10/5/92 initial creation
-- description:
-- This file implements a 25 bit
-- counter with sync load and count enable.

LIBRARY synth;
USE synth.stdsynth.all;

ENTITY ndracnt IS PORT (

CLK, LOADCNT, CE : IN VLBIT;
data_in    : IN VLBIT_VECTOR(27 downto 0);
incd    : IN VLBIT_VECTOR(24 downto 0);
bclk    : inout vlbit;
COUNTER : OUT VLBIT_VECTOR(24 downto 0);
FASTD, ENDMAINT, DMAWRT : INOUT VLBIT

);

END ndracnt;

ARCHITECTURE behv OF ndracnt IS

SIGNAL GCLK : VLBIT;

BEGIN

cntclk_proc: process begin wait until (clk = '1');

        gclk <= not (ce OR (LOADCNT AND gclk));

end process;

bclk  <= not gclk ;

cnt_proc: process begin wait until (bclk = '1');

   if (LOADCNT = '1')  then             -- load

        counter  <= (data_in(27 downto 3));
        fastd    <= data_in(2);
        endmaint <= data_in(1);
        dmawrt   <= data_in(0);
```

```
   else
        counter <= incd(24 downto 0);  --inc
        fastd    <= fastd;
        endmaint <= endmaint;
        dmawrt   <= dmawrt;

   end if;

end process;


END behv;
```

```
ninc16.vhd          Wed Nov 18 12:56:18 1992          1

-- !!!!!! must tie cox_y to icox_y

LIBRARY synth;
USE synth.stdsynth.all;

ENTITY ninc16 IS PORT (

-- the following i/o are just to help synthesis

TESTINC :in vlbit;
co0_3,  co4_7 ,  co8_11  : inout vlbit;
ico0_3, ico4_7           : in vlbit;
ci4,ci8,ci12             : inout vlbit;

-- the real i/o

d
incd                              : IN    VLBIT_VECTOR(15 downto 0);
                                  : OUT   VLBIT_VECTOR(15 downto 0));

END ninc16;

ARCHITECTURE behv OF ninc16 IS

SIGNAL civ          : vlbit_vector(15 downto 0);
SIGNAL
        ci1 ,ci2 ,ci3      ,ci5 ,ci6 ,ci7      , ci9 ,ci10,
        ci11, ci13, ci14, ci15 :VLBIT;

BEGIN

co0_3  <=  TESTINC xor ( d(3)  and d(2)  and d(1)  and d(0));
co4_7   <= TESTINC xor ( d(7)  and d(6)  and d(5)  and d(4));
co8_11  <= TESTINC xor ( d(11) and d(10) and d(9)  and d(8));

ci4  <=  co0_3;
ci8  <= ico0_3 and  co4_7;
ci12 <=  co0_3 and ico4_7 and  co8_11;

ci1 <= d(0);
ci2 <= ci1 and d(1);
ci3 <= ci2 and d(2);

ci5 <= ci4 and d(4);
ci6 <= ci5 and d(5);
ci7 <= ci6 and d(6);

ci9 <= ci8 and d(8);
```

```
ninc16.vhd        Wed Nov 18 12:56:18 1992        2

ci10 <= ci9 and d(9);
ci11 <= ci10 and d(10);

ci13 <= ci12 and d(12);
ci14 <= ci13 and d(13);
ci15 <= ci14 and d(14);

civ <= (  ci15 & ci14 & ci13 & ci12 & ci11 &
          ci10  & ci9  & ci8  & ci7  & ci6  & ci5  & ci4  & ci3  & ci2  & ci1 &
          b"1");

incd <=  civ xor d;

END behv;
```

```
ninc25.vhd        Wed Nov 18 12:56:27 1992        1

-- !!!!!! must tie cox_y to icox_y

LIBRARY synth;
USE synth.stdsynth.all;

ENTITY ninc25 IS PORT (

-- the following i/o are just to help synthesis

TESTINC :in vlbit;
co0_3,  co4_7 ,  co8_11,  co12_15,  co16_19,  co20_23 : inout vlbit;
ico0_3, ico4_7 , ico8_11, ico12_15, ico16_19          : in vlbit;
ci4,ci8,ci12,ci16,ci20,ci24                           : inout vlbit;

-- the real i/o

d
incd                              : IN    VLBIT_VECTOR(24 downto 0);
colbndn : OUT VLBIT);             : OUT   VLBIT_VECTOR(24 downto 0);

END ninc25;

ARCHITECTURE behv OF ninc25 IS

SIGNAL civ        : vlbit_vector(24 downto 0);
SIGNAL
        ci1 ,ci2 ,ci3      ,ci5 ,ci6 ,ci7      , ci9 ,ci10,
        ci11       ,ci13 ,ci14 ,ci15      , ci17 ,ci18 ,ci19 ,
        ci21 ,ci22 ,ci23   :VLBIT;

BEGIN
co0_3   <= TESTINC xor ( d(3)  and d(2)  and d(1)  and d(0));
co4_7   <= TESTINC xor ( d(7)  and d(6)  and d(5)  and d(4));
co8_11  <= TESTINC xor ( d(11) and d(10) and d(9)  and d(8));
co12_15 <= TESTINC xor ( d(15) and d(14) and d(13) and d(12));
co16_19 <= TESTINC xor ( d(19) and d(18) and d(17) and d(16));
co20_23 <= TESTINC xor ( d(23) and d(22) and d(21) and d(20)) ;

colbndn <= not (co0_3 and co4_7);

ci4  <=  co0_3;
ci8  <= ico0_3 and  co4_7;
ci12 <=  co0_3 and ico4_7 and  co8_11;
ci16 <= ico0_3 and ico4_7 and ico8_11 and ico12_15;

ci20 <=  ci16 and  co16_19;
ci24 <=  ci16 and ico16_19 and  co20_23;
```

```
ci1 <= d(0);
ci2 <= ci1 and d(1);
ci3 <= ci2 and d(2);

ci5 <= ci4 and d(4);
ci6 <= ci5 and d(5);
ci7 <= ci6 and d(6);

ci9 <= ci8 and d(8);
ci10 <= ci9 and d(9);
ci11 <= ci10 and d(10);

ci13 <= ci12 and d(12);
ci14 <= ci13 and d(13);
ci15 <= ci14 and d(14);


ci17 <= ci16 and d(16);
ci18 <= ci17 and d(17);
ci19 <= ci18 and d(18);

ci21 <= ci20 and d(20);
ci22 <= ci21 and d(21);
ci23 <= ci22 and d(22);

civ <= (  ci24 & ci23 & ci22 & ci21 &
          ci20 & ci19 & ci18 & ci17 & ci16 & ci15 & ci14 & ci13 & ci12 & ci11 &
          ci10  & ci9  & ci8  & ci7  & ci6  & ci5  & ci4  & ci3  & ci2  & ci1 &
          b"1");

incd <=  civ xor d;

END behv;
```

```
ninc32.vhd          Wed Nov 18 12:56:43 1992          1

-- !!!!!! must tie cox_y to icox_y

LIBRARY synth;
USE synth.stdsynth.all;

ENTITY ninc32 IS PORT (

-- the following i/o are just to help synthesis

TESTINC :in vlbit;
co0_3,  co4_7 ,  co8_11,  co12_15,  co16_19,  co20_23,  co24_27 : inout vlbit;
ico0_3, ico4_7 , ico8_11, ico12_15, ico16_19, ico20_23, ico24_27 : in vlbit;
ci4,ci8,ci12,ci16,ci20,ci24,ci28                                 : inout vlbit;
ici16                                                            : in vlbit;

-- the real i/o

d                                : IN    VLBIT_VECTOR(31 downto 0);
incd                             : OUT   VLBIT_VECTOR(31 downto 0));

END ninc32;

ARCHITECTURE behv OF ninc32 IS

SIGNAL civ          : vlbit_vector(31 downto 0);
SIGNAL
        ci1 ,ci2 ,ci3      ,ci5 ,ci6 ,ci7      , ci9 ,ci10,
        ci11       ,ci13 ,ci14 ,ci15      , ci17 ,ci18 ,ci19 ,
        ci21 ,ci22 ,ci23      , ci25 ,ci26 ,ci27       ,ci29 ,ci30,ci31 :VLBIT;

BEGIN
co0_3  <=  TESTINC xor ( d(3)   and d(2)   and d(1)   and d(0));
co4_7   <= TESTINC xor ( d(7)   and d(6)   and d(5)   and d(4));
co8_11  <= TESTINC xor ( d(11)  and d(10)  and d(9)   and d(8));
co12_15 <= TESTINC xor ( d(15)  and d(14)  and d(13)  and d(12));
co16_19 <= TESTINC xor ( d(19)  and d(18)  and d(17)  and d(16));
co20_23 <= TESTINC xor ( d(23)  and d(22)  and d(21)  and d(20)) ;
co24_27 <= TESTINC xor ( d(27)  and d(26)  and d(25)  and d(24)) ;

ci4  <=  co0_3;
ci8  <= ico0_3 and  co4_7;
ci12 <=  co0_3 and ico4_7 and  co8_11;
ci16 <= ico0_3 and ico4_7 and ico8_11 and ico12_15;

ci20 <=  ci16 and  co16_19;
ci24 <=  ci16 and ico16_19 and  co20_23;
ci28 <= ici16 and  co16_19 and ico20_23 and ico24_27;
```

```
ninc32.vhd        Wed Nov 18 12:56:43 1992        2

--ci32 <= ci16 and co16_19 and  co20_23 and  co24_27 and ico28_31;

ci1 <= d(0);
ci2 <= ci1 and d(1);
ci3 <= ci2 and d(2);

ci5 <= ci4 and d(4);
ci6 <= ci5 and d(5);
ci7 <= ci6 and d(6);

ci9 <= ci8 and d(8);
ci10 <= ci9 and d(9);
ci11 <= ci10 and d(10);

ci13 <= ci12 and d(12);
ci14 <= ci13 and d(13);
ci15 <= ci14 and d(14);


ci17 <= ci16 and d(16);
ci18 <= ci17 and d(17);
ci19 <= ci18 and d(18);

ci21 <= ci20 and d(20);
ci22 <= ci21 and d(21);
ci23 <= ci22 and d(22);


ci25 <= ci24 and d(24);
ci26 <= ci25 and d(25);
ci27 <= ci26 and d(26);

ci29 <= ci28 and d(28);
ci30 <= ci29 and d(29);
ci31 <= ci30 and d(30);

civ <= ( ci31
        & ci30 & ci29 & ci28 & ci27 & ci26 & ci25 & ci24 & ci23 & ci22 & ci21 &
          ci20 & ci19 & ci18 & ci17 & ci16 & ci15 & ci14 & ci13 & ci12 & ci11 &
          ci10  & ci9  & ci8  & ci7  & ci6  & ci5  & ci4  & ci3  & ci2  & ci1 &
          b"1");

incd <=  civ xor d;

END behv;

--      component an4
```

```
ninc32.vhd          Wed Nov 18 12:56:43 1992        3

--              port(signal a,b,c,d      :in vlbit;
--                      signal z         :out vlbit);
--          end component;


--
--     U1 : an4
--        port map( d(3)   , d(2)   , d(1)   , d(0)   , co0_3    );
--
--     U2 : an4
--        port map( d(7)   , d(6)   , d(5)   , d(4)   , co4_7    );
--
--     U3 : an4
--        port map( d(11)  , d(10)  , d(9)   , d(8)   , co8_11   );
--
--     U4 : an4
--        port map( d(15)  , d(14)  , d(13)  , d(12)  , co12_15 );
--
--     U5 : an4
--        port map( d(19)  , d(18)  , d(17)  , d(16)  , co16_19 );
--
--     U6 : an4
--        port map( d(23)  , d(22)  , d(21)  , d(20)  , co20_23 );
--
--     U7 : an4
--        port map( d(27)  , d(26)  , d(25)  , d(24)  , co24_27 );
--
```

```
nmbfifcnt.vhd        Wed Nov 18 12:56:53 1992        1

-- assume gated clock
-- create generated clock
-- filename: nmbfifcnt.vhd
-- author: Tom Morin
-- history: 10/5/92 initial creation
-- description:
-- This file implements a 25 bit
-- counter with sync load and count enable.

LIBRARY synth;
USE synth.stdsynth.all;

ENTITY nmbfifcnt IS PORT (

CLK, loadcnt,CE : IN VLBIT;
data_in     : IN VLBIT_VECTOR(15 downto 0);
incd    : IN VLBIT_VECTOR(15 downto 0);
bclk    : inout vlbit;
COUNTER : OUT VLBIT_VECTOR(15 downto 0));

END nmbfifcnt;

ARCHITECTURE behv OF nmbfifcnt IS

SIGNAL GCLK : VLBIT;

BEGIN

cntclk_proc: process begin wait until (clk = '1');

        gclk <= not (ce OR ( loadcnt AND gclk )) ;

end process;


bclk  <= not gclk ;

cnt_proc: process begin wait until (bclk = '1');

   if (loadcnt = '1')  then             -- load

        counter <=  (data_in(15 downto 0));

   else

        counter <= incd(15 downto 0);  --inc
```

nmbfifcnt.vhd Wed Nov 18 12:56:53 1992 2

```
   end if;
end process;

END behv;
```

```
nrefcnt.vhd          Wed Nov 18 12:57:01 1992          1

-- assume gated clock
-- create generated clock
-- filename: ncnt32.vhd
-- author: Tom Morin
-- history: 10/5/92 initial creation
-- description:
-- This file implements a 32 bit
-- counter with sync load.

LIBRARY synth;
USE synth.stdsynth.all;

ENTITY nrefcnt IS PORT (

CLK10, CLK40, LOADCNT : IN VLBIT;
data_in    : IN VLBIT_VECTOR(31 downto 0);
incd    : IN VLBIT_VECTOR(31 downto 0);
bclk,bclkn      : inout vlbit;
COUNTER : OUT VLBIT_VECTOR(31 downto 0));

END nrefcnt;

ARCHITECTURE behv OF nrefcnt IS

BEGIN

bclkn  <= not clk10;
bclk  <= not bclkn ;

cnt_proc: process begin

   wait until bclk = '1';

   if (loadcnt = '1')  then                -- load
      counter <= data_in(31 downto 0);
   else
      counter <= incd(31 downto 0);   --inc
   end if;

end process;


END behv;
```

```
padrctl.vhd        Fri Oct 23 09:26:14 1992        1

-- inverted ram address to pick up some speed
-- may want to make read address registered

-- spped
--       - write address must be fast to meet taa to write setup
--       - read address must be fast to get data to 860
--              - rdinternal should be fast to stear mux
--       - bcolr can be slow
-- this implementation  has a tough time

LIBRARY synth;
USE synth.stdsynth.all;

ENTITY padrctl IS PORT (

clk,paldena,pickslw, pickslr, internal  :IN VLBIT ;
pcolr    : IN VLBIT_VECTOR(7 downto 3);
na  : IN VLBIT_VECTOR(31 downto 28);
dmablkn : IN VLBIT;    -- selects dma address counter
addrph  : IN VLBIT;    -- second crossbar transfer phase
cmdldd, CMDLD3 : IN VLBIT;

ENVIS :  OUT VLBIT;
rdintearlyn      : OUT VLBIT;
rdinternaln      : OUT VLBIT;
rdpgad           : INOUT VLBIT_VECTOR(4 downto 0);
wrtpgad          : INOUT VLBIT_VECTOR(4 downto 0);
BCOLR            :   OUT VLBIT_VECTOR(4 downto 0) );

END padrctl;

ARCHITECTURE pla OF padrctl IS

SIGNAL nacnth  : VLBIT_VECTOR(31 downto 28);
SIGNAL ereada           : VLBIT_VECTOR(4 downto 0) ;
SIGNAL rd0,rd1,rd2,rd3,rd4,wrt0,wrt1,wrt2,wrt3,wrt4,
        rds1d,rds1dd,hldwrta,
        rdinternal,rds1,gpickslr, gpickslw      : VLBIT;
signal  RDINTearly                              : VLBIT;

BEGIN

-- select codes for the remote address mux:
--
--  11 = sel860
--  10 = seldma
```

```
padrctl.vhd        Fri Oct 23 09:26:14 1992        2

--  0X = selpage ram
--

gpicks1r <= internal and picks1r;
gpicks1w <= internal and picks1w;

pgad_proc: process begin wait until clk='1';

   if (paldena = '1') then
        nacnth <= na;
     else
        nacnth <= nacnth;
     end if;

   rd0 <= (NOT dmablkn AND addrph)                 -- dma
        OR (dmablkn AND rds1d AND ereada(0))      -- pick for read internal
        OR (dmablkn AND rds1dd AND NOT rdpgad(0))-- hold for read internal
        OR (dmablkn AND NOT rds1d AND NOT rds1dd AND addrph) ;

   rd1 <= (dmablkn AND rds1d AND ereada(1))        -- pick for read internal
        OR (dmablkn AND rds1dd AND NOT rdpgad(1))-- hold for read internal
        OR (dmablkn AND NOT rds1d AND NOT rds1dd AND  paldena AND na(28))
        OR (dmablkn AND NOT rds1d AND NOT rds1dd AND NOT paldena AND nacnth(28)) ;

   rd2 <= (dmablkn AND rds1d AND ereada(2))        -- pick for read internal
        OR (dmablkn AND rds1dd AND NOT rdpgad(2))-- hold for read internal
        OR (dmablkn AND NOT rds1d AND NOT rds1dd AND  paldena AND na(29))
        OR (dmablkn AND NOT rds1d AND NOT rds1dd AND NOT paldena AND nacnth(29)) ;

   rd3 <= (dmablkn AND rds1d AND ereada(3))        -- pick for read internal
        OR (dmablkn AND rds1dd AND NOT rdpgad(3))-- hold for read internal
        OR (dmablkn AND NOT rds1d AND NOT rds1dd AND  paldena AND na(30))
        OR (dmablkn AND NOT rds1d AND NOT rds1dd AND NOT paldena AND nacnth(30)) ;

   rd4 <= (dmablkn AND rds1d AND ereada(4))        -- pick for read internal
        OR (dmablkn AND rds1dd AND NOT rdpgad(4))-- hold for read internal
        OR (dmablkn AND NOT rds1d AND NOT rds1dd AND  paldena AND na(31))
        OR (dmablkn AND NOT rds1d AND NOT rds1dd AND NOT paldena AND nacnth(31)) ;

        -- addrph is use to select return route


   hldwrta <= gpicks1w;

   wrt0 <= (cmdldd AND cmdld3)
        OR (NOT cmdldd AND gpicks1w AND pcolr(3))
        OR (hldwrta AND NOT wrtpgad(0));
```

```
padrctl.vhd        Fri Oct 23 09:26:14 1992        3

   wrt1 <= (NOT cmdldd AND gpickslw AND pcolr(4))
          OR( hldwrta AND NOT wrtpgad(1));

   wrt2 <= (NOT cmdldd AND gpickslw AND pcolr(5))
          OR( hldwrta AND NOT wrtpgad(2));

   wrt3 <= (NOT cmdldd AND gpickslw AND pcolr(6))
          OR( hldwrta AND NOT wrtpgad(3));

   wrt4 <= (NOT cmdldd AND gpickslw AND pcolr(7))
          OR( hldwrta AND NOT wrtpgad(4));


        if  (gpickslr = '1')  then        -- update write
                ereada <= PCOLR(7 downto 3) ;

             else                         --hold
                ereada <= ereada;
        end if;


        rds1 <= gpickslr ;
        rds1d <= rds1 ;
        rds1dd <= rds1d ;

        RDINTEARLY <= (rds1 OR rds1d);

        RDINTERNAL <= rdintearly ;

end process;

ENVIS <= rds1d;

BCOLR <= ereada ;                -- buffer for visibility mux

rdintearlyn <= not RDINTearly ;
rdinternaln <= not RDINTERNAL ;

rdpgad <= not ( rd4 & rd3 & rd2 & rd1 & rd0 ) ;
wrtpgad <= not ( wrt4 & wrt3 & wrt2 & wrt1 & wrt0 ) ;

END pla;
```

```
pageram.vhd         Thu Oct  8 11:31:58 1992        1

-- PAGERAM.VHD
-- 32 bit wide x 32 deep static RAM
-- used in page ram section
-- author: Tom Morin
-- history: 4/13/92 created

ENTITY pageram IS PORT (

rdpgad, wrtpgad : in vlbit_vector(4 downto 0);
we   : in vlbit;
din  : in vlbit_vector(31 downto 0);
dout : out vlbit_vector(31 downto 0) );

END pageram;

ARCHITECTURE rtl OF pageram IS

TYPE data_type IS ARRAY(31 downto 0) of vlbit; --32 wide
TYPE data_array IS ARRAY(0 to 31) of data_type; --16 deep

BEGIN

pageram_wr_proc: process(rdpgad, we)

VARIABLE memory : data_array; --the ram

begin

if (we = '0') then

   memory(v1d2int(wrtpgad)) := din(31 downto 0);

end if;

-- do the read:

   dout <= memory(v1d2int(rdpgad));

end process;

end rtl;
```

```
pmux.vhd        Wed Jan 13 15:15:05 1993        1

-- 1/13/93 removed plockno from DMA address LSB -trm

-- PMUX.VHD

ENTITY PMUX IS PORT (

pdolg   : in vlbit_vector(31 downto 0);
pdomg   : in vlbit_vector(31 downto 0);
nacnt  : in vlbit_vector(27 downto 3);
pcono  : in vlbit_vector(3 downto 0);
pgaddr : in vlbit_vector(31 downto 0);
dracnt : in vlbit_vector(27 downto 3);
preado, plockno, sel_na, sel_dma,sel_page : in vlbit;
pa     : out vlbit_vector(31 downto 0) );

END PMUX;

ARCHITECTURE rtl OF PMUX IS

SIGNAL  na, pga, da, dl, dm     : vlbit_vector(31 downto 0);

BEGIN


na <= (pcono(3 downto 0) & nacnt(27 downto 3) & b"0" & preado & plockno)
                when (sel_na = '1') else       -- 860 memory addresses
        (b"00000000000000000000000000000000");


dl <=not (pdolg(31 downto 0));

dm <=not (pdomg(31 downto 0));

pga <=(pgaddr(31 downto 0))
                when (sel_page = '1') else   -- page ram routing/rtn addresses
        (b"00000000000000000000000000000000");


da <=  (b"1011" & dracnt(27 downto 3) & b"0" & preado & b"1")
                                               -- dma memory addresses
                when (sel_dma = '1') else
        (b"00000000000000000000000000000000");

pa <= ( na OR pga OR da OR dl OR dm) ;

END rtl;
```

```
pwrgate32.vhd        Wed Oct 21 13:55:05 1992        1

-- pwrgate32
-- a 32 bit anding function
-- to reduce noise for things that connect
-- to a bus that don't need bus contents
-- all the time
-- 4/20/92 trm

LIBRARY synth;
USE synth.stdsynth.all;

ENTITY pwrgate32 IS PORT(

DIN : IN VLBIT_VECTOR(31 DOWNTO 0);
GATE : IN VLBIT;
DOUT : OUT VLBIT_VECTOR(31 DOWNTO 0)
                    );

END pwrgate32;

ARCHITECTURE rtl OF pwrgate32 IS

BEGIN

pwrgate32_proc: process (DIN, GATE) begin

        if (gate = '0') then
           DOUT <= x"00000000";

        elsif (gate = '1') then
           DOUT <= DIN;

        else
           DOUT <= x"XXXXXXXX";

        end if;

end process;

END rtl;
```

```
rammux.vhd        Wed Oct 21 13:55:05 1992        1

-- speed
--      - most critical are cna -> out
--      - na is next most critical
--      - hmna come in very early
--
--      - developing bank0, bank1 from na is tight
--      - internal is also important
--      inputs
--              - hmna, siz, chpsel, mcowns , are all in real early
--
-- rammux.vhd
-- 4/8/92 trm
-- this device muxes the address for the drams
--
-- The following chart details the operation of this row/col address mux.
-- There are 7 configurations of ram chips under consideration for this
-- architecture:
--
--                        row/col        chpsiz
--                     number of bits    field
--     256Kx4,256KX16      9/9           101
--     1Mx4               10/10          110
--     4Mx4,4MX16         12/10          110
--     8MX8               13/10          110 (8K REF)
--     1Mx16              12/8           101
--     16Mx4              13/11          011
--
-- This mux will produce the following address bits on the following RA lines
-- for the following ram configurations:
--                                                          new 8/26/92
--
--                                           4MX16        /----------\
--           CHIP CONFIG: 1MX16  256KX16 4MX4  1MX4  16MX4   8MX8
--                         12/8    9/9   12/10 10/10  13/11   13/10
--
-- RA12         25 /13      X/X    X/X    X/X   X/X   25/13   25/X
-- RA11   11 OR 23 / X     11/X    X/X   23/X   X/X   23/X    23/X
-- RA10   12 OR 24 /11     12/X   12/11  24/X   X/X   24/X    24/X
-- RA9    13 OR 26 / 3     13/3   13/3   13/3  13/3   26/3    13/3
-- RA8          14 / 4     14/4   14/4   14/4  14/4   14/4    14/4
-- RA7          15 / 5     15/5   15/5   15/5  15/5   15/5    15/5
-- RA6          16 / 6     16/6   16/6   16/6  16/6   16/6    16/6
-- RA5          17 / 7     17/7   17/7   17/7  17/7   17/7    17/7
-- RA4          18 / 8     18/8   18/8   18/8  18/8   18/8    18/8
-- RA3          19 / 9     19/9   19/9   19/9  19/9   19/9    19/9
-- RA2          20 /10     20/10  20/10  20/10 20/10  20/10   20/10
-- RA1          21 /11     21/X    X/X   21/11 21/11  21/11   21/11
```

```
rammux.vhd        Wed Oct 21 13:55:05 1992        2

-- RA0          22 /12      22/X    X/X  22/12 22/12  22/12  22/12
--  |                |
--          chpsel settings: 000    x00   110   xx0     111    110
--RA bit        row/col       \___________________________________/
--              bit sent       requirements for ROW/COL configs

LIBRARY synth;
USE synth.stdsynth.all;

ENTITY rammux IS PORT(

hmna   : in vlbit_vector(27 downto 3); -- the pbus or dma address
na     : in vlbit_vector(31 downto 3); -- the i860 address
cna    : in vlbit_vector(13 downto 3); -- registered column bits from the 860
siz    : in vlbit_vector(3 downto 0);  -- the bank size jumpers
chpsel : in vlbit_vector(2 downto 0);  -- the memory chip config jumpers
hldecca,                 -- asserted to hold row address
mcowns,                  -- asserted when the 860 is using dram
rownd : in vlbit;        -- asserted when it is time to drive row address
refreshn : in vlbit;     --
ECCA     : inout vlbit_vector(15 downto 0); -- MS ADDRESS of ERROR
ra     : out vlbit_vector(12 downto 0); -- the dram row/col bits
bus_er : out vlbit;   -- acsessed page 0 or non existant memory
bank0 : inout vlbit;   -- used by nbuscon to determine the dram bank.
bank1 : inout vlbit;   -- used by nbuscon to determine the dram bank.
internal : out vlbit);   -- used by load to specifyoperation to asic internals

END rammux;


ARCHITECTURE rtl OF rammux IS

SIGNAL

pra12, pra11,pra10,pra9,pra8,pra7,pra6,pra5,pra4,pra3,pra2,pra1,pra0,
MCOK, HMNOK,
BANKG2M, BANKG4M, BANKG8M, BANKG16M, BANKG32M, BANKG64M,
BANK2M, BANK4M, BANK8M, BANK16M, BANK32M, BANK64M, BANK128M : vlbit;

BEGIN

BANK2M    <= NOT SIZ(2) AND NOT SIZ(1) AND NOT SIZ(0);
BANK4M    <= NOT SIZ(2) AND NOT SIZ(1) AND     SIZ(0);
BANK8M    <= NOT SIZ(2) AND     SIZ(1) AND NOT SIZ(0);
BANK16M   <= NOT SIZ(2) AND     SIZ(1) AND     SIZ(0);
BANK32M   <=     SIZ(2) AND NOT SIZ(1) AND NOT SIZ(0);
BANK64M   <=     SIZ(2) AND NOT SIZ(1) AND     SIZ(0);
```

```
rammux.vhd          Wed Oct 21 13:55:05 1992          3

BANK128M <=      SIZ(2) AND      SIZ(1) AND NOT SIZ(0);

BANKG2M    <=     SIZ(2) OR   SIZ(1) OR SIZ(0);
BANKG4M    <=     SIZ(2) OR   SIZ(1) ;
BANKG8M    <=     SIZ(2) OR  (SIZ(1) AND SIZ(0));
BANKG16M   <=     SIZ(2) ;
BANKG32M   <=     SIZ(2) AND (SIZ(1) OR SIZ(0));
BANKG64M   <=     SIZ(2) AND  SIZ(1) ;

internal <= (MCOWNS AND NA(31) AND NA(30) AND NA(29) AND NA(28) AND NA(27)
                AND NA(26) AND NA(25) AND NA(24) AND NA(23) AND NA(22)
                AND NA(21) AND NA(20) AND NA(19) AND NA(18) AND NA(17)
                AND NA(16) AND NA(15) AND NA(14) AND NA(13) AND NA(12)
                AND NA(11) AND NA(10) AND NOT NA(09))
          OR (NOT MCOWNS AND HMNA(27)
               AND HMNA(26) AND HMNA(25) AND HMNA(24) AND HMNA(23) AND HMNA(22)
               AND HMNA(21) AND HMNA(20) AND HMNA(19) AND HMNA(18) AND HMNA(17)
               AND HMNA(16) AND HMNA(15) AND HMNA(14) AND HMNA(13) AND HMNA(12)
               AND HMNA(11) AND HMNA(10) AND NOT HMNA(09));

-- 2:1 MUX for final output:

RA <=
      -- SEND OUT THE COLUMN BITS
      (cna(13) & b"0" & cna(11) & cna(3) & cna(4) & cna(5) & cna(6) & cna(7)
        & cna(8) & cna(9) & cna(10) & cna(11) & cna(12)) WHEN (rownd = '0')
         ELSE

      -- SEND OUT THE ROW BITS
      (pra12 & pra11 & pra10 & pra9 & pra8 & pra7 & pra6 & pra5 & pra4 & pra3
        & pra2 & pra1 & pra0);

-- 2:1 or 4:1 mux to make up row address:

-- TO SATISFY THE ADDRESSING REQUIREMENTS FOR THE DIFFERENT CHIP CONFIGS,
-- PER THE ABOVE CHART:
--
-- chpsel2 controls what gets muxed in for ram address bit 11
-- chpsel1 controls what gets muxed in for ram address bit 10
-- chpsel0 controls what gets muxed in for ram address bit 9

pra12 <= (mcowns AND na(25))
       OR (NOT mcowns AND hmna(25));

pra11 <= (mcowns AND NOT chpsel(2) AND na(11))
      OR (mcowns AND     chpsel(2) AND na(23))
      OR (NOT mcowns AND NOT chpsel(2) AND hmna(11))
```

```
rammux.vhd          Wed Oct 21 13:55:05 1992          4

        OR (NOT mcowns AND      chpsel(2) AND hmna(23));

pra10 <= (mcowns AND NOT chpsel(1) AND na(12))
        OR (mcowns AND     chpsel(1) AND na(24))
        OR (NOT mcowns AND NOT chpsel(1) AND hmna(12))
        OR (NOT mcowns AND     chpsel(1) AND hmna(24));

pra9 <=  (mcowns AND NOT chpsel(0) AND na(13))
        OR (mcowns AND     chpsel(0) AND na(26))
        OR (NOT mcowns AND NOT chpsel(0) AND hmna(13))
        OR (NOT mcowns AND     chpsel(0) AND hmna(26));

pra8 <=  (mcowns AND na(14))
        OR (NOT mcowns AND hmna(14));

pra7 <=  (mcowns AND na(15))
        OR (NOT mcowns AND hmna(15));

pra6 <=  (mcowns AND na(16))
        OR (NOT mcowns AND hmna(16));

pra5 <=  (mcowns AND na(17))
        OR (NOT mcowns AND hmna(17));

pra4 <=  (mcowns AND na(18))
        OR (NOT mcowns AND hmna(18));

pra3 <=  (mcowns AND na(19))
        OR (NOT mcowns AND hmna(19));

pra2 <=  (mcowns AND na(20))
        OR (NOT mcowns AND hmna(20));

pra1 <=  (mcowns AND na(21))
        OR (NOT mcowns AND hmna(21));

pra0 <=  (mcowns AND na(22))
        OR (NOT mcowns AND hmna(22));

HMNOK <= NOT MCOWNS AND
             (BANKG2M    OR   HMNA(22))
         AND (BANKG4M    OR   HMNA(23))
         AND (BANKG8M    OR   HMNA(24))
         AND (BANKG16M   OR   HMNA(25))
         AND (BANKG32M   OR   HMNA(26))
         AND (BANKG64M   OR   HMNA(27));
```

```
MCOK <= MCOWNS AND
              (BANKG2M    OR   NA(22))
         AND  (BANKG4M    OR   NA(23))
         AND  (BANKG8M    OR   NA(24))
         AND  (BANKG16M   OR   NA(25))
         AND  (BANKG32M   OR   NA(26))
         AND  (BANKG64M   OR   NA(27))
         AND  (NA(31) AND NA(30) AND NA(29) );


BANK0 <= ( MCOWNS AND        (
                               ( BANK2M    AND NA(21)   )
                            OR ( BANK4M    AND NA(22)   )
                            OR ( BANK8M    AND NA(23)   )
                            OR ( BANK16M   AND NA(24)   )
                            OR ( BANK32M   AND NA(25)   )
                            OR ( BANK64M   AND NA(26)   )
                            OR ( BANK128M AND NA(27)    )
                              ))
        OR ( (NOT MCOWNS) AND (
                               (BANK2M    AND HMNA(21))
                            OR (BANK4M    AND HMNA(22))
                            OR (BANK8M    AND HMNA(23))
                            OR (BANK16M   AND HMNA(24))
                            OR (BANK32M   AND HMNA(25))
                            OR (BANK64M   AND HMNA(26))
                            OR (BANK128M AND HMNA(27))
                              ))
        OR   (NOT REFRESHN);

BANK1 <= ( SIZ(3) AND MCOWNS AND      (
                               ( BANK2M    AND NOT NA(21)   )
                            OR ( BANK4M    AND NOT NA(22)   )
                            OR ( BANK8M    AND NOT NA(23)   )
                            OR ( BANK16M   AND NOT NA(24)   )
                            OR ( BANK32M   AND NOT NA(25)   )
                            OR ( BANK64M   AND NOT NA(26)   )
                            OR ( BANK128M AND NOT NA(27)    )
                              ))
        OR ( SIZ(3) AND NOT MCOWNS AND (
                               (BANK2M    AND NOT HMNA(21))
                            OR (BANK4M    AND NOT HMNA(22))
                            OR (BANK8M    AND NOT HMNA(23))
                            OR (BANK16M   AND NOT HMNA(24))
                            OR (BANK32M   AND NOT HMNA(25))
                            OR (BANK64M   AND NOT HMNA(26))
```

```
rammux.vhd        Wed Oct 21 13:55:05 1992        6

                        OR (BANK128M AND NOT HMNA(27))
                         ))
        OR (SIZ(3) AND NOT REFRESHN);

BUS_ER <= (NOT (MCOK  OR HMNOK))  -- outside of range
       OR (NOT (BANK0 OR BANK1)); -- bank1 not enabled

ecc_proc: process begin wait until rownd = '0';

-- could use clk and enable on !rown & rowndd
-- rownd must not transition on refresh

        IF (hldecca = '1') THEN

                ECCA <= ECCA;

        ELSIF (mcowns = '1') THEN

                ECCA <= na(27 downto 13) & b"1";

        ELSE

                ECCA <= hmna(27 downto 13) & b"0";

        END IF;

end process;

END rtl;

--                  RAM CHIP CONFIGURATION GUIDE                  --
--*****************************************************************
--1Mx4 chip  16 chips/bank  0.5Mb/chip x 16 chips/bank = 8Mb/bank
--           requires: 23 address bits 10/10
--
--      Bank0 EF800000 - EFFFFFFF
--      Bank1 EF000000 - EF7FFFFF - enableable
--
-- 1 bank miscon setting: 0 0100 00xx (041)
-- 2 bank miscon setting: 1 0100 00xx (141)
--
--*****************************************************************
--1Mx16 chip  4 chips/bank  2.0 Mb/chip x 4 chips/bank = 8Mb/bank
--           requires: 23 address bits 12/8
--
--      Bank0 EF800000 - EFFFFFFF
--      Bank1 EF000000 - EF7FFFFF - enableable
```

```
rammux.vhd          Wed Oct 21 13:55:05 1992          7

--
-- 1 bank miscon setting: 0 0100 00xx (041)
-- 2 bank miscon setting: 1 0100 00xx (141)
--
--*****************************************************************
--256Kx16 chip 4 chips/bank  0.5Mb/chip x 4 chips/bank = 2Mb/bank
--              requires: 21 address bits 9/9
--
--       Bank0 EFE00000 - EFFFFFFF
--       Bank1 EFC00000 - EFDFFFFF - enableable
--
-- 1 bank miscon setting: 0 0000 00xx (001)
-- 2 bank miscon setting: 1 0000 00xx (101)
--
--*****************************************************************
--4Mx4 chip 16 chips/bank  2.0 Mb/chip x 16 chips/bank = 32Mb/bank
--          requires: 25 address bits 12/10
--
--       Bank0 EE000000 - EFFFFFFF
--       Bank1 EC000000 - EDFFFFFF - enableable
--
--
-- 1 bank miscon setting: 0 1001 10xx (099)
-- 2 bank miscon setting: 1 1001 10xx (199)
--
--*****************************************************************
--4Mx16 chip 4 chips/bank 8.0 Mb/chip x 4 chips/bank = 32 Mb/bank
--          requires: 25 address bits 12/10
--
--       Bank0 EE000000 - EFFFFFFF
--       Bank1 EC000000 - EDFFFFFF - enableable
--
--
-- 1 bank miscon setting: 0 1001 10xx (099)
-- 2 bank miscon setting: 1 1001 10xx (199)
--
--*****************************************************************
--16Mx4 chip 16 chips/bank 8.0 Mb/chip x 16 chips/bank = 128Mb/bank
--          requires: 27 address bits 13/11
--
--       Bank0 E8000000 - EFFFFFFF
--       Bank1 E0000000 - E7FFFFFF - enableable
--
-- 1 bank miscon setting: 0 1101 11xx (0DD)
-- 2 bank miscon setting: 1 1101 11xx (1DD)
--
--*****************************************************************
```

rammux.vhd Wed Oct 21 13:55:05 1992 8

```
--8Mx8 chip    8 chips/bank 8.0MB/chip x 8 chips/bank = 64Mb/bank
--             requires:  26 address bits (13/10)
--
--       Bank0 EC000000 - EFFFFFFF
--       Bank1 E8000000 - EBFFFFFF - enableable
--
-- 1 bank miscon setting: 0 1011 10xx (0B9)
-- 2 bank miscon setting: 1 1011 10xx (1B9)
--****************************************************************
```

```
refcnt.vhd        Wed Oct 21 13:55:05 1992        1

-- filename: refcnt.vhd
-- author: Tom Morin
-- history: 4/8/92 initial creation
-- description:
--    This file implements a 32 bit free-running,
--    counter with sync load, and terminal count.

LIBRARY synth;
USE synth.stdsynth.all;

ENTITY refcnt IS PORT (

CLK, LOAD, CLK10 : IN VLBIT;-- 40Mhz clock, load pulse.
din         : IN VLBIT_VECTOR(31 downto 0);
COUNTER     : OUT VLBIT_VECTOR(31 downto 0)

);

END refcnt;

ARCHITECTURE behv OF refcnt IS

signal clk10d : vlbit;

BEGIN

cnt_proc: process

variable cnt_temp : vlbit_vector(32 downto 0);

begin

wait until (clk = '1');

clk10d <= clk10;

if (load = '1')  then     -- load
        cnt_temp := b"0" & din;

elsif ((clk10 = '1') AND (clk10d = '0')) THEN  -- inc

        cnt_temp := addum(cnt_temp(31 downto 0),b"1");

   if (cnt_temp(32 downto 0) = b"100000000000000000000000000000000") then

        cnt_temp := b"000000000000000000000000000000000";
   else
```

```
refcnt.vhd          Wed Oct 21 13:55:05 1992          2

            cnt_temp := cnt_temp;
        end if;

    else
            cnt_temp := cnt_temp;  -- do nothing

    end if;

    counter <= cnt_temp(31 downto 0);

    end process;

    END behv;
```

reg11.vhd Wed Oct 21 13:55:06 1992 1

```
-- reg11
-- a 11 bit register with rising edge clock
-- 9/2/92 trm

LIBRARY synth;
USE synth.stdsynth.all;

ENTITY reg11 IS PORT(

DIN : IN VLBIT_VECTOR(10 DOWNTO 0);
CLK  : IN VLBIT;
DOUT : INOUT VLBIT_VECTOR(10 DOWNTO 0)
                    );

END reg11;

ARCHITECTURE rtl OF reg11 IS

BEGIN

        dff_v(DIN, CLK, DOUT);

END rtl;
```

reg32.vhd        Wed Oct 21 14:14:51 1992        1

```
-- reg32
-- a 32 bit register with rising edge clock
-- 3/31/92 trm

LIBRARY synth;
USE synth.stdsynth.all;

ENTITY reg32 IS PORT(

DIN : IN VLBIT_VECTOR(31 DOWNTO 0);
CLK  : IN VLBIT;
DOUT : INOUT VLBIT_VECTOR(31 DOWNTO 0)
                    );

END reg32;

ARCHITECTURE rtl OF reg32 IS

BEGIN

        dff_v(DIN, CLK, DOUT);

END rtl;
```

```
remmux.vhd          Wed Oct 21 13:55:06 1992          1

-- REMMUX.VHD
-- mux for producing crossbar addresses.
-- author: Tom Morin
-- history: 4/13/92 created

ENTITY remmux IS PORT (

nacnt : in vlbit_vector(27 downto 3);
pcono : in vlbit_vector(3 downto 0);
pgaddr : in vlbit_vector(31 downto 0);
dracnt : in vlbit_vector(27 downto 3);
CS8 , preado, plockno, sel1, sel0 : in vlbit;
pa     : out vlbit_vector(31 downto 0) );

END remmux;

ARCHITECTURE rtl OF remmux IS

SIGNAL sel860, seldma, selpage : vlbit;

BEGIN

sel860 <= sel1 AND sel0;
seldma <= sel1 AND (NOT sel0);
selpage <= (NOT sel1) ;

pa <= (pcono(3 downto 0) & nacnt(27 downto 3) & b"0" & preado & plockno)
               when (sel860 = '1') else        -- 860 memory addresses

      (pgaddr(31 downto 0))
               when (selpage = '1'and CS8 = '0') else
                                       -- page ram routing/rtn addresses
      (b"01001001001001001001001001000110")
               when (selpage = '1'and CS8 = '1') else

      (b"1011" & dracnt(27 downto 3) & b"0" & preado & plockno);
                                       -- dma memory addresses

END rtl;
```

selvis.vhd Thu Dec 3 16:12:42 1992 1

```
-- filename: selvis.abf
-- description: steering logic for VIS MUX
--
-- history: 11/13/92 created by mjb
--
ENTITY selvis IS PORT (

ena             : in vlbit;
sel     : in vlbit_vector(3 downto 0);
isel     : inout vlbit_vector(3 downto 0)

);

END selvis;

ARCHITECTURE rtl OF selvis IS

signal  msel     : vlbit_vector(3 downto 0);

BEGIN

msel <= b"1110" when (sel = b"0000") else        -- dra/dla
        b"0000" when (sel = b"0001") else        -- ecca/miscon
        b"1000" when (sel = b"0010") else        -- iv
        b"1101" when (sel = b"0011") else        -- percnt
        b"0001" when (sel = b"0100") else        -- rtca
        b"0101" when (sel = b"0101") else        -- rtcb
        b"1001" when (sel = b"0110") else        -- refcnt
        b"1100" when (sel = b"0111") else        -- fif/msc/lsc
        b"0010" when (sel = b"1000") else        -- dmacnt
        b"0110" when (sel = b"1001") else        -- dmacpt
        b"1010" when (sel = b"1010") else        -- dblkcnt
        b"1111";

isel <= msel when ena = '1' else
                b"1111";

END rtl;
```

```
slvad.vhd          Tue Nov 24 17:10:37 1992          1

LIBRARY SYNTH;
USE SYNTH.STDSYNTH.ALL;

-- SLVAD.VHD
-- clocks and incs crossbar addresses.
-- author: Tom Morin
-- history: 4/13/92 created

ENTITY slvad IS PORT (

clk, slvad_ld : in vlbit;

pin : in vlbit_vector(31 downto 0);

slvad : inout vlbit_vector(27 downto 3);

pconi : inout vlbit_vector(3 downto 0);

preadi,plockni : inout vlbit );

END slvad;

ARCHITECTURE rtl OF slvad IS

BEGIN

        dlatch_v( pin(27 downto 3), slvad_ld , slvad);
        dlatch_v( pin(31 downto 28) , slvad_ld , pconi  );
        dlatch( pin(1)              , slvad_ld , preadi );
        dlatch( pin(0)              , slvad_ld , plockni) ;

end rtl;
```

slvdec.vhd          Wed Oct 21 13:55:06 1992          1

```
-- SLVDEC.VHD
-- Decodes the address received from the crossbar
-- steers the hmna address mux.
-- author: Tom Morin
-- history: 4/13/92 created

ENTITY slvdec IS PORT (

PREADI  :in vlbit;

PIN : IN VLBIT_VECTOR(27 downto 3);

SPLIT_AD ,FIFOSEL : OUT vlbit );

END slvdec;

ARCHITECTURE rtl OF slvdec IS

SIGNAL TOP, TOP1K :vlbit ;

BEGIN

-- 512 bytes down from the top of memory

TOP <= PIN(27) AND PIN(26) AND PIN(25) AND PIN(24) AND PIN(23) AND PIN(22)
            AND PIN(21) AND PIN(20) AND PIN(19) AND PIN(18) AND PIN(17)
            AND PIN(16) AND PIN(15) AND PIN(14) AND PIN(13) AND PIN(12)
            AND PIN(11) AND PIN(10) AND PIN(9);

-- xxxxxFF8

SPLIT_AD <= NOT PREADI AND TOP AND PIN(8) AND PIN(7)
            AND PIN(6) AND PIN(5) AND PIN(4) AND PIN(3);

TOP1K <= PIN(27) AND PIN(26) AND PIN(25) AND PIN(24) AND PIN(23) AND PIN(22)
            AND PIN(21) AND PIN(20) AND PIN(19) AND PIN(18) AND PIN(17)
            AND PIN(16) AND PIN(15) AND PIN(14) AND PIN(13) AND PIN(12)
            AND PIN(11) AND PIN(10);

FIFOSEL <= NOT PREADI AND TOP1K AND NOT PIN(9) AND NOT PIN(8) AND NOT PIN(7)
            AND NOT PIN(6) AND NOT PIN(5) AND NOT PIN(4) AND NOT PIN(3);


END rtl;
```

utility.vhd        Fri Oct 16 14:27:04 1992        1

```
-- filename: utility.vhd
-- description: produces clocks derived
--              from 40Mhz.
-- history:     3/25/92 trm initial creation


LIBRARY synth;
USE synth.stdsynth.all;
--              ?????USE work.config_defs.all;

ENTITY utility IS PORT (

clk, rn, clkrate : IN VLBIT;

clk10, c20m : INOUT VLBIT);

END utility;

ARCHITECTURE pla OF utility IS

BEGIN

-- generate C20M: (clk / 2)

C20MPROC: PROCESS

BEGIN

   WAIT UNTIL (prising(clk) OR (rn = '0'));
      IF (rn = '0') then c20m <= '0';
   ELSE
      c20m <= NOT c20m;
   END IF;

END PROCESS;

-- generates 10Mhz clk10 from sysclk

CLK10PROC: PROCESS

VARIABLE preclk : VLBIT_VECTOR(3 downto 0);

BEGIN

   WAIT UNTIL (prising(clk) OR (rn = '0'));
```

```
utility.vhd        Fri Oct 16 14:27:04 1992        2

      IF (rn = '0' ) THEN
         preclk := b"0000";
         clk10 <= '0';

-- clk is 40mhz, so divide by 4 to make clk10:

      ELSIF (CLKRATE = '0') THEN

        IF (preclk = b"0011") THEN
            clk10 <= '1';
        ELSE
            clk10 <= '0';
        END IF;

         IF (preclk = b"0011") THEN
            preclk := b"0000";
--          clk10 <= '1';
         ELSE
            preclk := addum(preclk(2 downto 0),b"001");
--            clk10 <= '0';
         END IF;

-- clk is 50mhz, so divide by 5 to make clk10:

      ELSIF (CLKRATE = '1') THEN

        IF (preclk = b"0100") THEN
            clk10 <= '1';
        ELSE
            clk10 <= '0';
        END IF;

         IF (preclk = b"0100") THEN
            preclk := b"0000";
--            clk10 <= '1';
         ELSE
            preclk := addum(preclk(2 downto 0),b"001");
--            clk10 <= '0';
         END IF;


      ELSE
         preclk := preclk; --just a dummy statement
                           --to handle don't cares.

      END IF;
```

```
END PROCESS;
END pla;
```

```
vis.vhd        Wed Nov 25 08:12:55 1992        1

-- filename: vis.abf
-- description: The 32 bit wide 8I visibility mux
--              inside the CAM ASIC.
--
-- history: 6/9/92 created by trm
--
ENTITY vis IS PORT (

dracnt : in vlbit_vector(27 downto 12);
dmala  : in vlbit_vector(27 downto 12);
dmacnt : in vlbit_vector(31 downto 0);
dmacpt : in vlbit_vector(27 downto 3);
iv     : in vlbit_vector(31 downto 0);
ecca   : in vlbit_vector(15 downto 0);
miscon : in vlbit_vector(15 downto 0);
rtcnta : in vlbit_vector(31 downto 0);
rtcntb : in vlbit_vector(31 downto 0);
refcnt : in vlbit_vector(31 downto 0);
mbfifad : in vlbit_vector(18 downto 3);
msc     : in vlbit_vector(6 downto 0);
lsc     : in vlbit_vector(6 downto 0);
per_cnt : in vlbit_vector(31 downto 0);
dblkcnt : in vlbit_vector(31 downto 0);
ena           : in vlbit;
clk           : in vlbit;

sel    : in vlbit_vector(3 downto 0);

vis    : inout vlbit_vector(31 downto 0)

);

END vis;

ARCHITECTURE rtl OF vis IS

signal imuxout :        vlbit_vector(31 downto 0);
signal isel:            vlbit_vector(3 downto 0);

BEGIN

isel <= sel when ena = '1' else
             b"1111";

imuxout <= (dracnt(27 downto 12) & dmala(27 downto 12))  when (isel = b"0000") else
           (ecca(15 downto 0) & miscon(15 downto 0))     when (isel = b"0001") else
```

```
vis.vhd         Wed Nov 25 08:12:55 1992        2

            (iv(31 downto 0))                            when (isel = b"0010") else
            (per_cnt(31 downto 0))                       when (isel = b"0011") else
            (rtcnta(31 downto 0))                        when (isel = b"0100") else
            (rtcntb(31 downto 0))                        when (isel = b"0101") else
            (refcnt(31 downto 0))                        when (isel = b"0110") else
            ('0' & msc(6 downto 0) & '0' & lsc(6 downto 0) & mbfifad(18 downto 3))
                                                         when (isel = b"0111") else
            (dmacnt(31 downto 0))                        when (isel = b"1000") else
            (b"0000" & dmacpt(27 downto 3) & b"000")     when (isel = b"1001") else
            (dblkcnt(31 downto 0))                       when (isel = b"1010") else
            (vis(31 downto 0))  ;

reg: process begin wait until clk = '1';

        if (ena = '1') then
        vis <= imuxout;
        else
        vis <= vis;
        end if;

end process;


END rtl;
```

```
vrammux.vhd        Mon Jan 25 11:03:15 1993        1

-- speed
--      - most critical are cna -> out
--      - na is next most critical
--      - hmna come in very early
--
--      - developing bank0, bank1 from na is tight
--      - internal is also important
--      inputs
--              - hmna, siz, chpsel, mcowns , are all in real early
--
-- vrammux.vhd
-- 4/8/92 trm
-- this device muxes the address for the drams
--
-- The following chart details the operation of this row/col address mux.
-- There are 7 configurations of ram chips under consideration for this
-- architecture:
--
--                      row/col       chpsiz
--                    number of bits   field
--     16Mx1             12/12         101
--     256Kx4,256KX16     9/9          000
--     1Mx4              10/10         000
--     4Mx4,4MX16        12/10         110
--     8MX8              13/10         110 (8K REF)
--     1Mx16             12/8          000
--     16Mx4             13/11         111
--
-- This mux will produce the following address bits on the following RA lines
-- for the following ram configurations:                              new
--                                                     new 8/26/92  1/25/93
--
--                                      4MX16         /__________\ /____\
--          CHIP CONFIG: 1MX16   256KX16 4MX4   1MX4  16MX4   8MX8  16MX1
--                        12/8    9/9   12/10  10/10  13/11  13/10  12/12
--
-- RA12        25 /13      X/X    X/X    X/X    X/X   25/13   25/X  25/13
-- RA11  11 OR 23 /24L    11/X    X/X   23/X    X/X   23/X    23/X  23/24L
-- RA10  12 OR 24 /11     12/X   12/11  24/X    X/X   24/X    24/X   X/X
-- RA9   13 OR 26 / 3     13/3   13/3   13/3   13/3   26/3    13/3  26/3
-- RA8         14 / 4     14/4   14/4   14/4   14/4   14/4    14/4  14/4
-- RA7         15 / 5     15/5   15/5   15/5   15/5   15/5    15/5  15/5
-- RA6         16 / 6     16/6   16/6   16/6   16/6   16/6    16/6  16/6
-- RA5         17 / 7     17/7   17/7   17/7   17/7   17/7    17/7  17/7
-- RA4         18 / 8     18/8   18/8   18/8   18/8   18/8    18/8  18/8
-- RA3         19 / 9     19/9   19/9   19/9   19/9   19/9    19/9  19/9
```

```
vrammux.vhd         Mon Jan 25 11:03:15 1993        2

-- RA2          20 /10      20/10  20/10 20/10 20/10  20/10  20/10 20/10
-- RA1          21 /11      21/X    X/X  21/11 21/11  21/11  21/11 21/11
-- RA0          22 /12      22/X    X/X  22/12 22/12  22/12  22/12 22/12
--   |              |
--         chpsel settings: 000    x00   110   xx0     111    110   101
--RA bit        row/col     \___________________________________________/
--              bit sent      requirements for ROW/COL configs

LIBRARY synth;
USE synth.stdsynth.all;

ENTITY vrammux IS PORT(

hmna    : in vlbit_vector(27 downto 9); -- the pbus or dma address
na      : in vlbit_vector(31 downto 9); -- the i860 address
siz     : in vlbit_vector(3 downto 0);  -- the bank size jumpers
mbank1,mbank0, hbank1, hbank0 : in vlbit; -- used to check for bus errors
hldecca,                   -- asserted to hold row address
mcowns,                    -- asserted when the 860 is using dram
rownd : in vlbit;          -- asserted when it is time to drive row address
refreshn : in vlbit;       --
ECCA     : inout vlbit_vector(15 downto 0); -- MS ADDRESS of ERROR
bus_er : out vlbit;    -- acsessed page 0 or non existant memory
internal,internpage : out vlbit;    -- used by load to specifyoperation to asic internals
clk, LATTEST  : in vlbit;      -- test mode
eclk  : inout vlbit); -- used to mux in clk when test is active

END vrammux;


ARCHITECTURE rtl OF vrammux IS

SIGNAL

MCOK, HMNOK,
BANKG2M, BANKG4M, BANKG8M, BANKG16M, BANKG32M, BANKG64M : vlbit;

BEGIN

BANKG2M   <=     SIZ(2) OR   SIZ(1) OR SIZ(0);
BANKG4M   <=     SIZ(2) OR   SIZ(1) ;
BANKG8M   <=     SIZ(2) OR  (SIZ(1) AND SIZ(0));
BANKG16M  <=     SIZ(2) ;
BANKG32M  <=     SIZ(2) AND (SIZ(1) OR SIZ(0));
BANKG64M  <=     SIZ(2) AND  SIZ(1) ;

internpage <= (MCOWNS AND NA(31) AND NA(30) AND NA(29) AND NA(28) AND NA(27)
```

```
                AND NA(26)  AND NA(25)  AND NA(24)  AND NA(23)  AND NA(22)
                AND NA(21)  AND NA(20)  AND NA(19)  AND NA(18)  AND NA(17)
                AND NA(16)  AND NA(15)  AND NA(14)  AND NA(13)  AND NA(12)
                AND NA(11)  AND NA(10)  )
          OR (NOT MCOWNS AND HMNA(27)
               AND HMNA(26)  AND HMNA(25)  AND HMNA(24)  AND HMNA(23)  AND HMNA(22)
               AND HMNA(21)  AND HMNA(20)  AND HMNA(19)  AND HMNA(18)  AND HMNA(17)
               AND HMNA(16)  AND HMNA(15)  AND HMNA(14)  AND HMNA(13)  AND HMNA(12)
               AND HMNA(11)  AND HMNA(10)  );

internal <= (MCOWNS AND NA(31)  AND NA(30)  AND NA(29)  AND NA(28)  AND NA(27)
                AND NA(26)  AND NA(25)  AND NA(24)  AND NA(23)  AND NA(22)
                AND NA(21)  AND NA(20)  AND NA(19)  AND NA(18)  AND NA(17)
                AND NA(16)  AND NA(15)  AND NA(14)  AND NA(13)  AND NA(12)
                AND NA(11)  AND NA(10)  AND NOT NA(09))
          OR (NOT MCOWNS AND HMNA(27)
               AND HMNA(26)  AND HMNA(25)  AND HMNA(24)  AND HMNA(23)  AND HMNA(22)
               AND HMNA(21)  AND HMNA(20)  AND HMNA(19)  AND HMNA(18)  AND HMNA(17)
               AND HMNA(16)  AND HMNA(15)  AND HMNA(14)  AND HMNA(13)  AND HMNA(12)
               AND HMNA(11)  AND HMNA(10)  AND NOT HMNA(09));

HMNOK <= NOT MCOWNS AND
              (BANKG2M    OR   HMNA(22))
         AND (BANKG4M    OR   HMNA(23))
         AND (BANKG8M    OR   HMNA(24))
         AND (BANKG16M   OR   HMNA(25))
         AND (BANKG32M   OR   HMNA(26))
         AND (BANKG64M   OR   HMNA(27));

MCOK <= MCOWNS AND
              (BANKG2M    OR   NA(22))
         AND (BANKG4M    OR   NA(23))
         AND (BANKG8M    OR   NA(24))
         AND (BANKG16M   OR   NA(25))
         AND (BANKG32M   OR   NA(26))
         AND (BANKG64M   OR   NA(27))
         AND (NA(31) AND NA(30) AND NA(29) );

eclk <= (not CLK) when (LATTEST = '1') else (not rownd);

ecc_proc: process begin wait until eclk = '1';


BUS_ER <= (NOT (MCOK  OR HMNOK OR (NOT REFRESHN)))  -- outside of range
       OR (MCOWNS AND (NOT (MBANK0 OR SIZ(3)))) -- bank1 not enabled (LOCAL 860)
       OR (NOT MCOWNS AND (NOT (HBANK0 OR SIZ(3)))); -- bank1 not enabled (HOST)
```

```
vrammux.vhd        Mon Jan 25 11:03:15 1993        4

-- could use clk and enable on !rown & rowndd
-- rownd must not transition on refresh

        IF (hldecca = '1') THEN
                ECCA <= ECCA;
        ELSIF (mcowns = '1') THEN
                ECCA <= na(27 downto 13) & b"1";
        ELSE
                ECCA <= hmna(27 downto 13) & b"0";
        END IF;

end process;

END rtl;

--                  RAM CHIP CONFIGURATION GUIDE                 --
--*****************************************************************
--1Mx4 chip  16 chips/bank  0.5Mb/chip x 16 chips/bank = 8Mb/bank
--             requires: 23 address bits 10/10
--
--       Bank0 EF800000 - EFFFFFFF
--       Bank1 EF000000 - EF7FFFFF - enableable
--
-- 1 bank miscon setting: 0 0100 00xx (041)
-- 2 bank miscon setting: 1 0100 00xx (141)
--
--*****************************************************************
--1Mx16 chip  4 chips/bank  2.0 Mb/chip x 4 chips/bank = 8Mb/bank
--              requires: 23 address bits 12/8
--
--       Bank0 EF800000 - EFFFFFFF
--       Bank1 EF000000 - EF7FFFFF - enableable
--
-- 1 bank miscon setting: 0 0100 00xx (041)
-- 2 bank miscon setting: 1 0100 00xx (141)
--
--*****************************************************************
--256Kx16 chip 4 chips/bank  0.5Mb/chip x 4 chips/bank = 2Mb/bank
--                requires: 21 address bits 9/9
--
--       Bank0 EFE00000 - EFFFFFFF
--       Bank1 EFC00000 - EFDFFFFF - enableable
--
-- 1 bank miscon setting: 0 0000 00xx (001)
-- 2 bank miscon setting: 1 0000 00xx (101)
--
--******************************************************************
```

vrammux.vhd Mon Jan 25 11:03:15 1993 5

```
--4Mx4 chip 16 chips/bank  2.0 Mb/chip x 16 chips/bank = 32Mb/bank
--          requires: 25 address bits 12/10
--
--      Bank0 EE000000 - EFFFFFFF
--      Bank1 EC000000 - EDFFFFFF - enableable
--
--
-- 1 bank miscon setting: 0 1001 10xx (099)
-- 2 bank miscon setting: 1 1001 10xx (199)
--
--****************************************************************
--4Mx16 chip 4 chips/bank 8.0 Mb/chip x 4 chips/bank = 32 Mb/bank
--          requires: 25 address bits 12/10
--
--      Bank0 EE000000 - EFFFFFFF
--      Bank1 EC000000 - EDFFFFFF - enableable
--
--
-- 1 bank miscon setting: 0 1001 10xx (099)
-- 2 bank miscon setting: 1 1001 10xx (199)
--
--****************************************************************
--16Mx4 chip 16 chips/bank 8.0 Mb/chip x 16 chips/bank = 128Mb/bank
--          requires: 27 address bits 13/11
--
--      Bank0 E8000000 - EFFFFFFF
--      Bank1 E0000000 - E7FFFFFF - enableable
--
-- 1 bank miscon setting: 0 1101 11xx (0DD)
-- 2 bank miscon setting: 1 1101 11xx (1DD)
--
--****************************************************************
--16Mx1 chip 64 chips/bank 2.0 Mb/chip x 64 chips/bank = 128Mb/bank
--          requires: 27 address bits 12/12
--
--      Bank0 E8000000 - EFFFFFFF
--      Bank1 E0000000 - E7FFFFFF - enableable
--
-- 1 bank miscon setting: 0 1101 11xx (0D5)
-- 2 bank miscon setting: 1 1101 11xx (1D5)
--
--****************************************************************
--8Mx8 chip    8 chips/bank 8.0MB/chip x 8 chips/bank = 64Mb/bank
--             requires:  26 address bits (13/10)
--
--      Bank0 EC000000 - EFFFFFFF
--      Bank1 E8000000 - EBFFFFFF - enableable
```

```
--
-- 1 bank miscon setting: 0 1011 10xx (0B9)
-- 2 bank miscon setting: 1 1011 10xx (1B9)
--*****************************************************************
```

xcv1.vhd Wed Oct 21 13:55:06 1992 1

```
-- xcv1.vhd
-- a 1 bit transceiver bidirect on one side, in
-- and out port on the other side.
-- author: Tom Morin
-- history: 4/15/92 initial creation

ENTITY xcv1 IS PORT (

OE : IN VLBIT;
AIN : IN VLBIT;
BOUT : OUT VLBIT;
CBI  : INOUT-VLBIT );

END xcv1;

ARCHITECTURE rtl OF xcv1 IS

BEGIN

CBI <= 'Z' when ('1' = OE )
      ELSE AIN when ('0' = OE)
      ELSE 'X';

BOUT <= CBI;

END rtl;
```

```
xcv16.vhd         Thu Oct  8 12:25:01 1992        1

-- xcv16.vhd
-- a 16 bit transceiver bidirect on one side, in
-- and out port on the other side.
-- author: Tom Morin
-- history: 4/2/92 initial creation

LIBRARY synth;
USE synth.stdsynth.all;

ENTITY xcv16 IS PORT (

OE : IN VLBIT;
AIN : IN VLBIT_VECTOR (15 downto 0);
BOUT : OUT VLBIT_VECTOR (15 downto 0);
CBI  : INOUT VLBIT_VECTOR (15 downto 0));

END xcv16;

ARCHITECTURE rtl OF xcv16 IS

BEGIN

CBI <= b"ZZZZZZZZZZZZZZZZ" when ('1' = OE )
      ELSE AIN;
--      ELSE b"XXXXXXXXXXXXXXXX";

BOUT <= CBI;

END rtl;
```

```
xcv32.vhd        Wed Oct 21 13:55:07 1992        1

-- xcv32.vhd
-- a 32 bit transceiver bidirect on one side, in
-- and out port on the other side.
-- author: Tom Morin
-- history: 4/2/92 initial creation

LIBRARY synth;
USE synth.stdsynth.all;

ENTITY xcv32 IS PORT (

OE : IN VLBIT;
AIN : IN VLBIT_VECTOR (31 downto 0);
BOUT : OUT VLBIT_VECTOR (31 downto 0);
CBI  : INOUT VLBIT_VECTOR (31 downto 0));

END xcv32;

ARCHITECTURE rtl OF xcv32 IS

BEGIN

CBI <= b"ZZZZZZZZZZZZZZZZZZZZZZZZZZZZZZZZ" when ('1' = OE )
      ELSE AIN;
--      ELSE b"XXXXXXXXXXXXXXXXXXXXXXXXXXXXXXXX";

BOUT <= CBI;

END rtl;
```

```
xcv7.vhd          Wed Oct 21 13:55:07 1992          1

-- xcv7.vhd
-- a 7 bit transceiver bidirect on one side, in
-- and out port on the other side.
-- author: Tom Morin
-- history: 4/2/92 initial creation

ENTITY xcv7 IS PORT (

OE : IN VLBIT;
AIN : IN VLBIT_VECTOR (6 downto 0);
BOUT : OUT VLBIT_VECTOR (6 downto 0);
CBI  : INOUT VLBIT_VECTOR (6 downto 0));

END xcv7;

ARCHITECTURE rtl OF xcv7 IS

BEGIN

CBI <= b"ZZZZZZZ" when ('1' = OE )
      ELSE AIN when ('0' = OE)
      ELSE b"XXXXXXX";

BOUT <= CBI;

END rtl;
```

I claim:

1. In a multicomputer having at least:

(a) a plurality of processing nodes, each having memory means for storing memory address-accessible digital signals, (b) each of said processing nodes having associated processing means for executing a memory access instruction for generating an access request for access to a digital signal stored in at least one of said memory means, the access request including a memory address associated with that digital signal, and (c) at least one crossbar, having a plurality of ports, each said port coupled to a processing node or a port of another crossbar, for transfer of digital signals therebetween, the improvement for providing a scalable multicomputer, wherein:

each of said processing nodes includes mapping means for mapping selected addresses contained in access requests generated by the associated processing means to addresses in the memory means of that processing nodes and for mapping other selected addresses contained in access requests generated by the associated processing means to addresses in the memory means of another processing node, a crossbar interface, coupled to a port of said crossbar, said crossbar interface including routing means responsive to selected access requests including those other selected addresses for generating a routing signal representative of a succession of crossbar ports between the associated processing node and a processing node where the requested digital signal is stored, and for transmitting said routing signal to the crossbar port to which said crossbar interface is coupled, the routing means of at least a selected processing node including (i) routing register means for storing one or more routing paths, each identifying a succession of crossbar ports between the selected processing node and another processing node, (ii) means for transmitting to the processing node in which the requested digital signal is stored an address in an access request, where that address serves as an offset into the memory of that processing node where the digital signal is stored, and (iii) means responsive to an access request for obtaining from the register means a routing path between the selected processing node and a processing node in which the requested digital signal is stored, whereby each processing node can directly access the memory means of another processing node by executing memory access instructions, of the type that it uses to access its own memory means, to generate memory access requests for directly accessing the memory means of such other processing node, said crossbar having crossbar logic circuit means comprising decoding means responsive to said routing signal for establishing an internal path through said crossbar for transferring the request and any digital signals accessed thereby between the processing node that generated the request and the processing node where the digital signal is stored, each processing node includes means for responding to a memory access request routed by the crossbar from another processing node to transfer the requested signals therewith.

2. In a multicomputer according to claim 1, wherein se crossbar logic circuit decoding means includes means responsive to a fixed relative position in said routing signal at a first crossbar port for coupling said first crossbar port to at least second crossbar port in the same crossbar.

3. In a multicomputer according to claim 2 wherein said crossbar logic circuit includes means for routing said routing signal from said second port to a processing node or crossbar port to which said second port is connected.

4. In a multicomputer according to claim 3 wherein said means for routing modifies said routing signal by moving the next successive signal therein to said fixed relative position.

5. In a multicomputer according to claim 1 wherein said crossbar logic circuit means includes for providing alternate internal paths through said crossbar in response to said routing signal.

6. In a multicomputer according to claim 1 wherein said routing means includes means for generating a routing signal including a broadcast signal designating a broadcast mode of communication, and said crossbar logic circuit means includes means responsive to said broadcast signal for establishing multiple communications paths through said crossbar.

7. In a multicomputer according to claim 1 wherein said routing means includes means for generating a routing signal that includes a priority signal designating a relative priority thereof, and said crossbar logic circuit means includes means responsive to said priority signal for establishing and disestablishing internal paths through said crossbar according to said priority signal.

8. In a multicomputer according to claim 1, the further improvement wherein the processing means associated with the selected processing node includes means for generating and storing in said routing register means one or more said routing paths.

9. In a multicomputer according to claim 1, the further improvement wherein at least a selected processing node comprises DMA controller means for transferring blocks of digital signals over a routing path between the memory means of the selected processing node and the memory means of another processing node.

10. In a multicomputer according to claim 1, the further improvement wherein a slave processing node in which a requested digital signal is stored includes means for signaling a split-read transaction and for, later, transmitting that digital signal over the crossbar to at least a selected processing node, the selected processing node includes means responsive to signalling of a split-read transaction for suspending execution of its associated processing means, and for restoring normal execution of that processing means on receipt of the requested digital signal from the slave processing node.

11. In a multicomputer according to claim 10, the further improvement wherein the selected processing node includes means for transmitting to the slave processing node a return route address identifying at least one of (i) a succession of crossbar nodes between the slave processing node and the selected processing node, and (ii) an address in the memory of the selected processing node where the requested digital signal is to be stored.

12. In a multicomputer having at least:

(a) a plurality of processing nodes, each having memory means for storing memory address-accessible digital signals, (b) each of said processing nodes having associated processing means for executing a memory access instruction for generating an access request for access to a digital signal stored in at least one of said memory means, the access request including a memory address associated with that digital signal, and (c) at least one crossbar, having a plurality of ports, each said port coupled to a processing node or a port of another crossbar, for transfer of digital signals therebetween, the improvement for providing a scalable multicomputer wherein:

each of said processing nodes includes mapping means for mapping selected addresses contained in access requests generated by the associated processing means to addresses in the memory means of that processing nodes and for mapping other selected addresses contained in access requests generated by the associated processing means to addresses in the memory means of another processing node, said mapping means including register means for storing one or more routing paths, each identifying a succession of crossbar ports between the associated processing node and another processing node. crossbar interface coupled to a port of said crossbar, said crossbar interface including routing means responsive to the access requests including those other selected addresses for generating a routing signal representative of a succession of crossbar ports between the associated processing node and a processing node where the requested digital signal is stored, and for transmitting said routing signal to the crossbar port to which said crossbar interface means is coupled, said routing means including (i) means responsive to an access request for obtaining from the register means a routing path between the associated processing node and another processing node in which the requested digital signal is stored, and (ii) means for transmitting to the processing node in which the requested digital signal is stored an address in an access request, where that address serves as an offset into the memory of that processing node where the digital signal is stored, whereby each processing node can directly access the memory means of another processing node by executing memory access instructions, of the type that it uses to access its own memory means, to generate memory access requests for directly accessing the memory means of such other processing node, said crossbar having crossbar logic circuit means comprising decoding means responsive to said routing signal for establishing an internal path through said crossbar for transferring the request and any digital signals accessed thereby between the processing node that generated the request and the processing node where the digital signal is stored, each processing node includes means for responding to a memory access request routed by the crossbar from another processing node to transfer the requested signals therewith.

13. In a multicomputer according to claim 12, the further improvement wherein the associated processing means of the processing nodes include means for generating and storing in the associated routing register means one or more said routing paths.

* * * * *